US012632015B2

(12) United States Patent　　　　　(10) Patent No.:　　US 12,632,015 B2

Chung　　　　　　　　　　　　　　　(45) Date of Patent:　　May 19, 2026

(54) FUNCTIONAL DEVICE AND METHOD FOR CONTROLLING VARIABLE PHYSICAL PARAMETER

(71) Applicant: Kuo-Chen Chung, New Taipei (TW)

(72) Inventor: Kuo-Chen Chung, New Taipei (TW)

( * ) Notice: Subject to any disclaimer, the term of this patent is extended or adjusted under 35 U.S.C. 154(b) by 745 days.

(21) Appl. No.: 17/788,866

(22) PCT Filed: Dec. 29, 2020

(86) PCT No.: PCT/CN2020/140745

§ 371 (c)(1),
(2) Date: Jun. 24, 2022

(87) PCT Pub. No.: WO2021/136253

PCT Pub. Date: Jul. 8, 2021

(65) Prior Publication Data

US 2023/0039885 A1　　　Feb. 9, 2023

(30) Foreign Application Priority Data

Dec. 31, 2019　(CN) .......................... 201911418652.6
Dec. 24, 2020　(CN) .......................... 202011556362.0

(51) Int. Cl.
G05B 13/02　　　　　(2006.01)

(52) U.S. Cl.
CPC ....... G05B 13/024 (2013.01); G05B 13/0255 (2013.01)

(58) Field of Classification Search
None
See application file for complete search history.

(56) References Cited

U.S. PATENT DOCUMENTS

| | | | |
|---|---|---|---|
| 7,411,505 B2 | 8/2008 | Smith et al. | |
| 10,166,719 B1 * | 1/2019 | Yang ..................... | B29C 64/112 |
| 2006/0120483 A1 | 6/2006 | McAlexander et al. | |
| 2009/0319060 A1 | 12/2009 | Wojsznis et al. | |
| 2011/0257936 A1 | 10/2011 | Kulik et al. | |

(Continued)

FOREIGN PATENT DOCUMENTS

| | | |
|---|---|---|
| CN | 101539983 A | 9/2009 |
| CN | 103310565 A | 9/2013 |

(Continued)

*Primary Examiner* — Fahmida Rahman

(74) *Attorney, Agent, or Firm* — Volpe Koenig

(57)　　　　　　　　ABSTRACT

A control device for controlling a first variable physical parameter characterized based on a physical parameter application state includes a sensing unit and a processing unit. The sensing unit sensing a second variable physical parameter to generate a sense signal, wherein the second variable physical parameter is characterized based on a physical parameter application range represented by a measurement value application range. The processing unit is coupled to the sensing unit, obtains a measured value in response to the sense signal, and causes the first variable physical parameter to be in the physical parameter application state under a condition that the physical parameter application range which the second variable physical parameter is currently in is determined by checking a mathematical relation between the measured value and the measurement value application range.

16 Claims, 60 Drawing Sheets

(56)         References Cited

U.S. PATENT DOCUMENTS

| 2015/0283998 | A1 * | 10/2015 | Lind ..................... B60W 30/00 |
| | | | 701/23 |
| 2015/0357887 | A1 | 12/2015 | Yamazaki et al. |
| 2016/0217953 | A1 * | 7/2016 | Ely ....................... G06F 3/0202 |
| 2018/0039721 | A1 | 2/2018 | Guo et al. |
| 2019/0195189 | A1 | 6/2019 | Echenique Subiabre |
| 2019/0243310 | A1 * | 8/2019 | Nagareda ................. G04F 3/06 |

FOREIGN PATENT DOCUMENTS

| CN | 103530271 A | 1/2014 | |
| CN | 103745181 A | 4/2014 | |
| CN | 105520717 A | 4/2016 | |
| CN | 109472339 A | 3/2019 | |
| WO | WO-2009044233 A1 * | 4/2009 | .......... G05B 19/042 |
| WO | 2017207991 A1 | 12/2017 | |

* cited by examiner

FUNCTIONAL DEVICE AND METHOD FOR CONTROLLING VARIABLE PHYSICAL PARAMETER

CROSS REFERENCE TO RELATED APPLICATIONS

This application is a 35 USC § 371 national stage of International Application No. PCT/CN2020/140745, which was filed Dec. 29, 2020 and claims the benefit of CN patent application No. 201911418652.6, filed Dec. 31, 2019 and CN patent application No. 202011556362.0, filed Dec. 24, 2020, all of which are incorporated herein by reference as if fully set forth.

TECHNICAL FIELD

The present disclosure is related to a functional device and, more particularly, is related to a functional device and method for controlling a variable physical parameter.

BACKGROUND

A control device can generate a control signal to control a physical parameter application unit included in a functional device. The functional device uses the control signal to control the physical parameter application unit. The physical parameter application unit can use at least one of a mechanical energy, an electrical energy and an optical energy, and can be one selected from a group consisting of a motor for an access control, a relay for an electrical power control, and an energy converter for an energy conversion. In order to effectively control the physical parameter application unit, the functional device can obtain a measured value based on a clock time. The functional device may need an improved mechanism to effectively use the measured value, and thereby effectively control the physical parameter application unit.

U.S. Patent Publication No. 2015/0357887 A1 discloses a product specification setting apparatus and a fan motor having the same. U.S. Pat. No. 7,411,505 B2 discloses a switch status and a radio frequency identification (RFID) tag.

SUMMARY OF EXEMPLARY EMBODIMENTS

It is an aspect of the present disclosure to provide a functional device, which effectively controls a variable physical parameter by means of a control signal and a measured value obtained based on a clock time.

It is therefore one embodiment of the present disclosure to provide a functional device for controlling a variable physical parameter characterized based on a physical parameter target state. The functional device includes a timer and a processing unit. The timer senses a clock time to generate a sense signal, wherein the clock time is characterized based on a clock time application interval represented by a measurement value application range. The processing unit is coupled to the timer, obtains a measured value in response to the sense signal, and causes the variable physical parameter to be in the physical parameter target state under a condition that the processing unit determines a situation that the clock time enters the clock time application interval by determining a first mathematical relation between the measured value and the measurement value application range.

It is therefore another embodiment of the present disclosure to provide a method for controlling a variable physical parameter characterized based on a physical parameter target state. The method includes the following steps: A clock time is sensed to generate a sense signal, wherein the clock time is characterized based on a clock time application interval represented by a measurement value application range. A measured value is obtained in response to the sense signal. In addition, under a condition that a situation that the clock time enters the clock time application interval is determined by checking a first mathematical relation between the measured value and the measurement value application range, the variable physical parameter is caused to be in the physical parameter target state.

It is therefore still another embodiment of the present disclosure to provide a functional device for controlling a variable physical parameter characterized based on a physical parameter target state. The functional device includes a timer and a processing unit. The timer senses a clock time to generate a sense signal, wherein the clock time is characterized based on a clock time application interval represented by a measurement value application range. The processing unit is coupled to the timer, obtains a measured value in response to the sense signal, and causes the variable physical parameter to be in the physical parameter target state under a condition that the processing unit determines the clock time application interval which the clock time is currently in by checking a mathematical relation between the measured value and the measurement value application range.

It is therefore still another embodiment of the present disclosure to provide a method for controlling a variable physical parameter characterized based on a physical parameter target state. The method includes the following steps: A clock time is sensed to generate a sense signal, wherein the clock time is characterized based on a clock time application interval represented by a measurement value application range. A measured value is obtained in response to the sense signal. In addition, under a condition that the clock time application interval which the clock time is currently in is determined by checking a mathematical relation between the measured value and the measurement value application range, the variable physical parameter is caused to be in the physical parameter target state.

BRIEF DESCRIPTION OF THE DRAWINGS

The foregoing and other features and advantages of the present disclosure will be more clearly understood through the following descriptions with reference to the drawings, wherein.

DETAILED DESCRIPTION OF THE PREFERRED EMBODIMENTS

The present disclosure will now be described more specifically with reference to the following embodiments. It is to be noted that the following descriptions of preferred embodiments of this disclosure are presented herein for the purposes of illustration and description only; they are not intended to be exhaustive or to be limited to the precise form disclosed.

Figure 1:
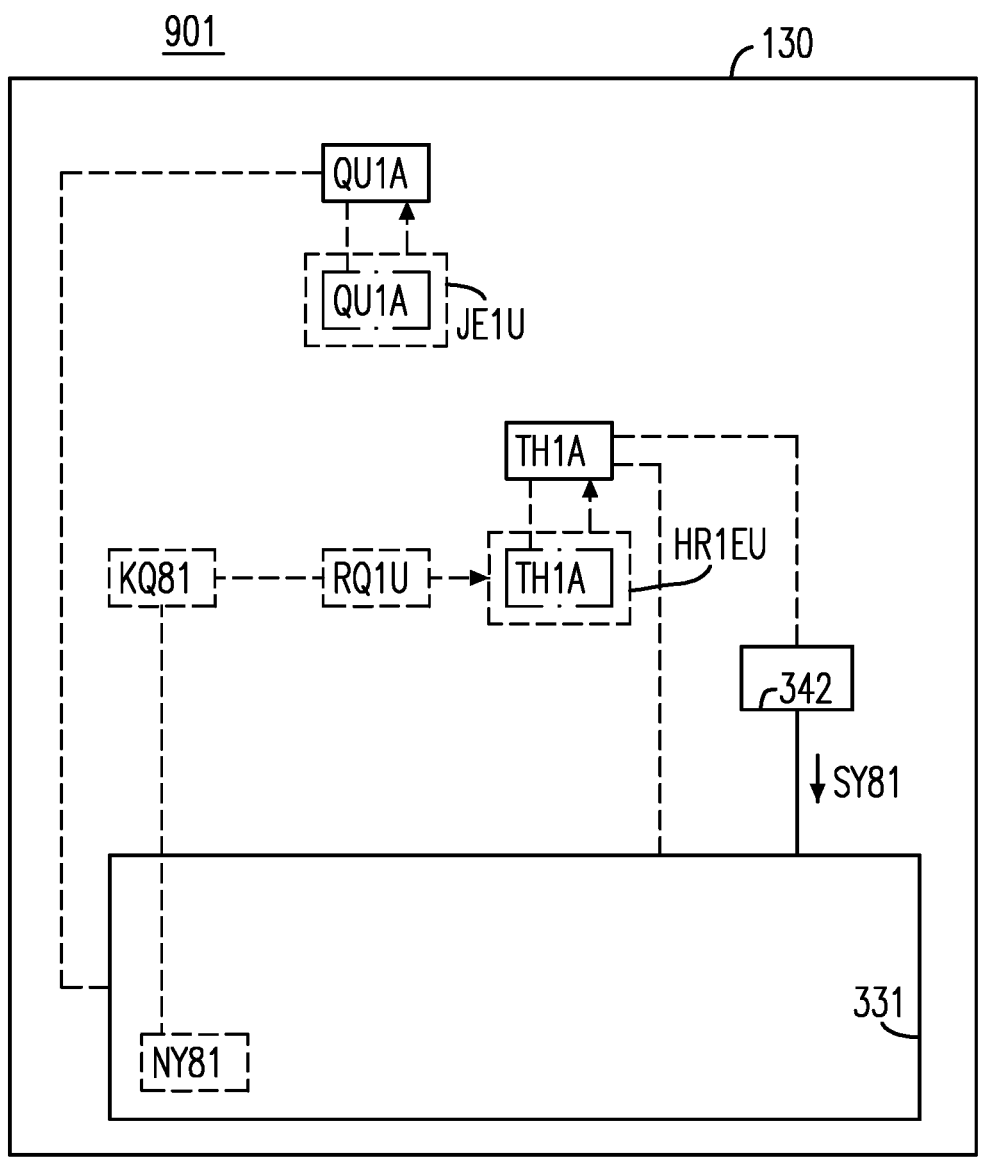
FIG. 1 is a schematic diagram showing a control system according to various embodiments of the present disclosure.

Please refer to FIG. 1, which is a schematic diagram showing a control system 901 according to various embodiments of the present disclosure. The control system 901 includes a functional device 130 for controlling a variable physical parameter QU1A. For example, the variable physical parameter QU1A is characterized based on a physical parameter target state JE1U. The functional device 130 includes a timer 342 and a processing unit 331. The timer 342 senses a clock time TH1A to generate a sense signal SY81. For example, the clock time TH1A is characterized based on a clock time application interval HR1EU represented by a measurement value application range RQ1U.

The processing unit 331 is coupled to the timer 342, obtains a measured value NY81 in response to the sense signal SY81, and causes the variable physical parameter QU1A to be in the physical parameter target state JE1U under a condition that the processing unit 331 determines the clock time application interval HR1EU which the clock time TH1A is currently in by checking a mathematical relation KQ81 between the measured value NY81 and the measurement value application range RQ1U.

Figure 2:
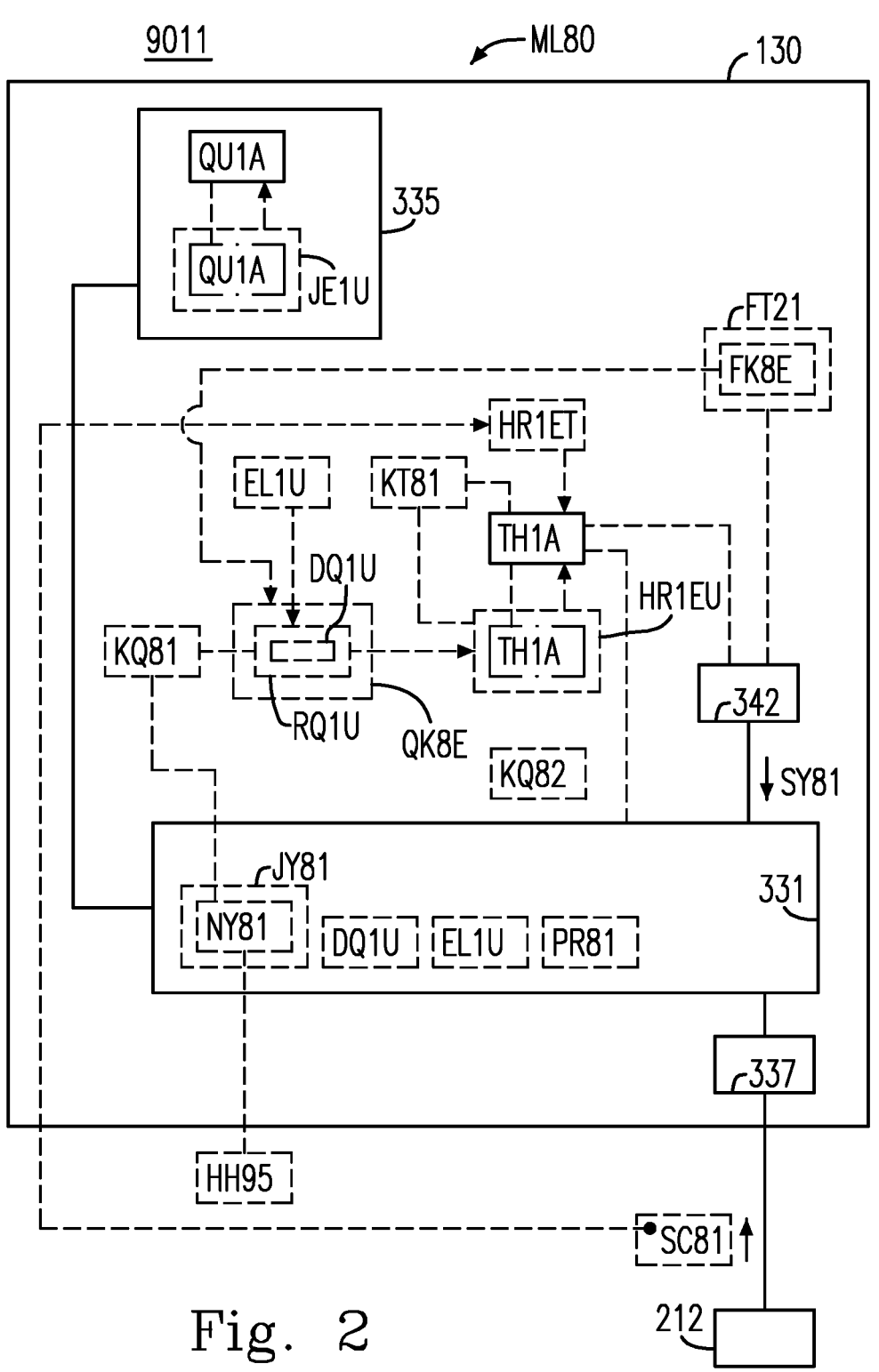
FIG. 2 is a schematic diagram showing an implementation structure of the control system shown in FIG. 1.
Figure 3:
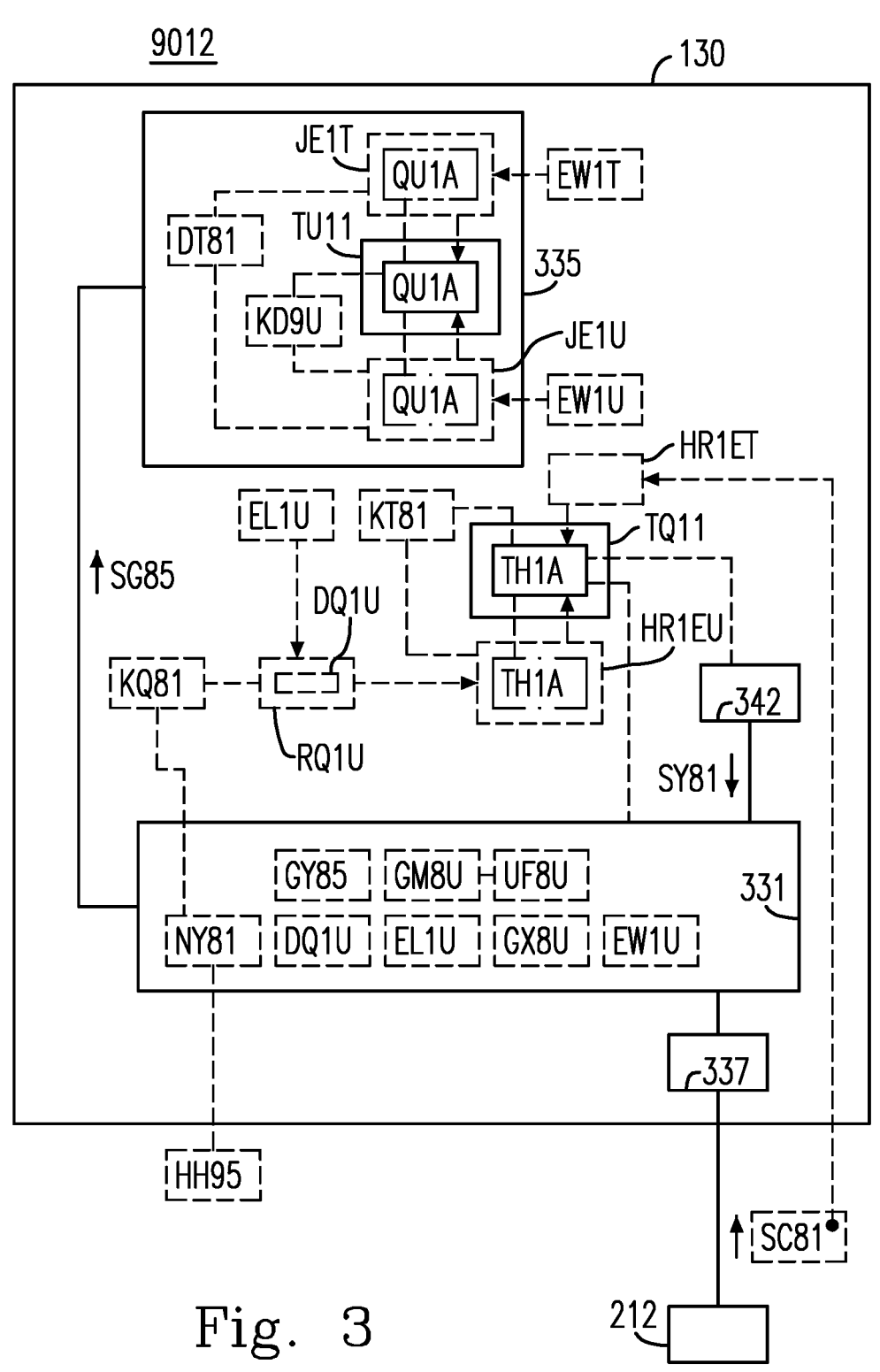
FIG. 3 is a schematic diagram showing an implementation structure of the control system shown in FIG. 1.

Please refer to FIG. 2 and FIG. 3. FIG. 2 is a schematic diagram showing an implementation structure 9011 of the control system 901 shown in FIG. 1. FIG. 3 is a schematic diagram showing an implementation structure 9012 of the control system 901 shown in FIG. 1. As shown in FIG. 2 and FIG. 3, each of the implementation structure 9011 and the implementation structure 9012 includes the functional device 130. In some embodiments, the functional device 130 further includes a receiving unit 337 coupled to the processing unit 331, and a physical parameter application unit 335 coupled to the processing unit 331. For example, the functional device 130 is a control target device. The physical parameter application unit 335 is a functional target.

The clock time TH1A is further characterized based on a clock time designation interval HR1ET being different from the clock time application interval HR1EU. For example, the clock time designation interval HR1ET is earlier than the clock time application interval HR1EU. After the receiving unit 337 receives a control signal SC81 from a control device 212, the processing unit 331 obtains the measured value NY81 in response to the sense signal SY81 due to the control signal SC81. For example, the control signal SC81 serves to indicate the clock time designation interval HR1ET. The control device 212 is one of a mobile device and a remote controller. Under a condition that the control device 212 is the remote controller, the control signal SC81 is a light signal. The functional device 130 uses the timer 342 to check a time relation KT81 between the clock time TH1A and the clock time application interval HR1EU based on the control signal SC81. For example, the sense signal SY81 is a clock time signal. The measured value NY81 is a specific count value. For example, under a condition that the control device 212 is the mobile device, the receiving unit 337 receives the control signal SC81 from the control device 212 through a wireless link, or the control signal SC81 is a radio signal.

The timer 342 meets a timer specification FT21. For example, the measurement value application range RQ1U is defaulted based on the timer specification FT21. The timer specification FT21 includes a full measurement value range representation FK8E used to indicate a full measurement value range QK8E. For example, the measurement value application range RQ1U is equal to a portion of the full measurement value range QK8E. The measured value NY81 is obtained in a designated measurement value format HH95. The measurement value application range RQ1U is defaulted in the designated measurement value format HH95 based on the timer specification FT21. For example, the clock time application interval HR1EU is a clock time candidate interval. The measurement value application range RQ1U is a measurement time value candidate range. The clock time designation interval HR1ET is a clock time target interval. The designated measurement value format HH95 is a designated count value format.

The measurement value application range RQ1U has an application range limit value pair DQ1U, and is denoted by a measurement value application range code EL1U. For example, the application range limit value pair DQ1U is defaulted. The processing unit 331 obtains the application range limit value pair DQ1U and the measurement value application range code EL1U in response to the control signal SC81, and checks the mathematical relation KQ81 by comparing the measured value NY81 and the obtained application range limit value pair DQ1U. The physical parameter target state JE1U is denoted by a physical parameter target state code EW1U. The physical parameter application unit 335 has the variable physical parameter QU1A. For example, the variable physical parameter QU1A is currently in a physical parameter application state JE1T. The application range limit value pair DQ1U is a candidate range limit value pair. The measurement value application range code EL1U is a measurement time value candidate range code.

In some embodiments, under a condition that the processing unit 331 determines the clock time application interval HR1EU which the clock time TH1A is currently in by checking the mathematical relation KQ81, the processing unit 331 obtains the physical parameter target state code EW1U based on the obtained measurement value application range code EL1U, and performs a physical parameter relation check control GX8U, used to check a physical parameter relation KD9U between the variable physical parameter QU1A and the physical parameter target state JE1U, based on the obtained physical parameter target state code EW1U.

Under a condition that the physical parameter application state JE1T is different from the physical parameter target state JE1U and the processing unit 331 determines a physical parameter state difference DT81 between the physical parameter target state JE1U and the physical parameter application state JE1T by performing the physical parameter relation check control GX8U, the processing unit 331 performs a signal generation control GY85 based on the obtained physical parameter target state code EW1U to generate an operation signal SG85, and transmits the operation signal SG85 toward the physical parameter application unit 335. For example, the operation signal SG85 is one of a functional signal and a control signal.

The physical parameter application unit 335 causes the variable physical parameter QU1A to enter the physical parameter target state JE1U from the physical parameter application state JE1T in response to the operation signal SG85. Under a condition that the processing unit 331 determines the clock time application interval HR1EU which the clock time TH1A is currently in by checking the mathematical relation KQ81, the processing unit 331 performs a data storage control operation GM8U, wherein the data storage control operation GM8U is used to cause a clock time application interval code UF8U, denoting the determined clock time application interval HR1EU, to be stored. The variable physical parameter QU1A and the clock time TH1A belong to a physical parameter type TU11 and a clock time type TQ11 respectively. For example, the physical parameter type TU11 is different from the clock time type TQ11.

Figure 4:
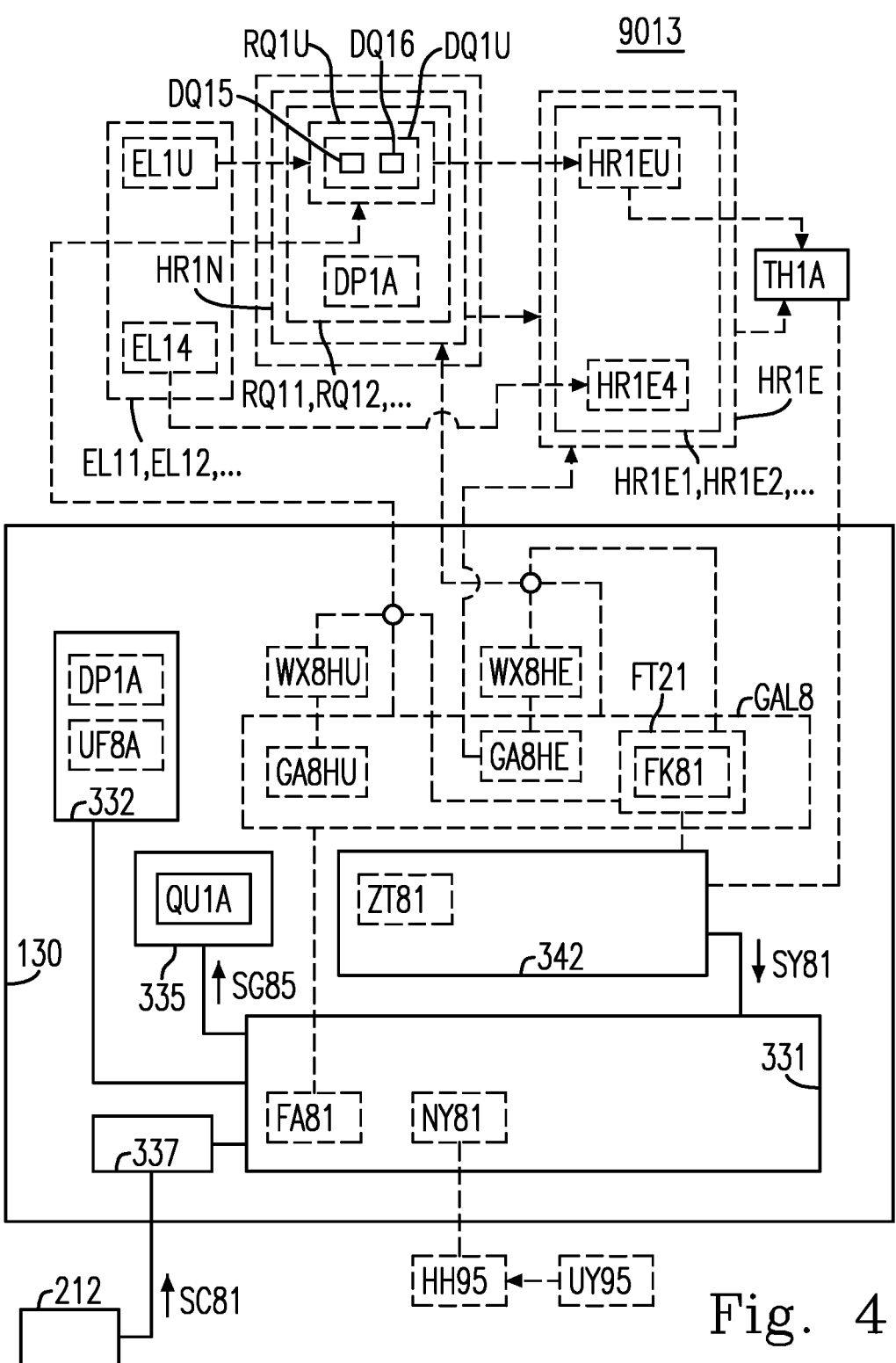
FIG. 4 is a schematic diagram showing an implementation structure of the control system shown in FIG. 1.
Figure 5:
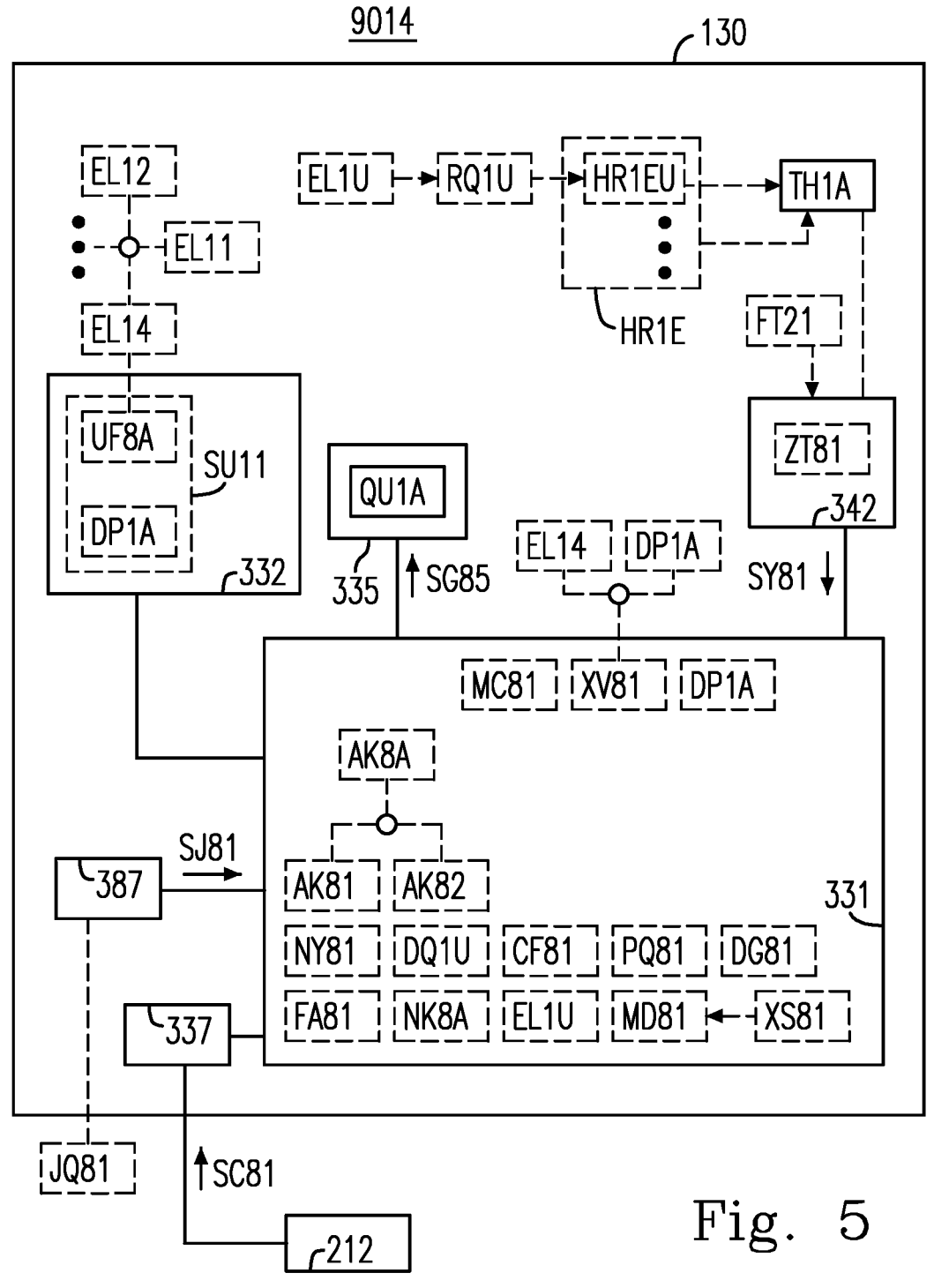
FIG. 5 is a schematic diagram showing an implementation structure of the control system shown in FIG. 1.
Figure 6:
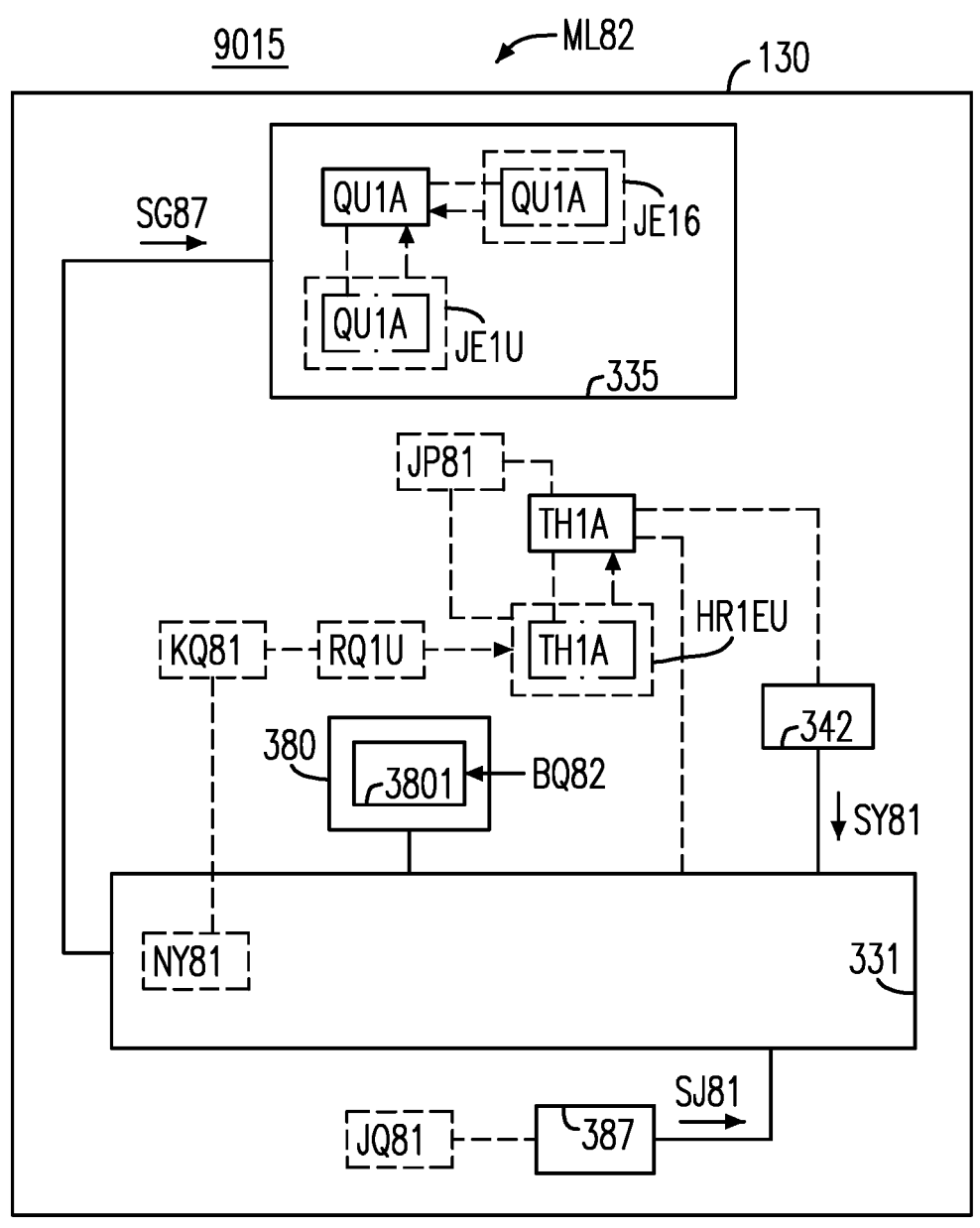
FIG. 6 is a schematic diagram showing an implementation structure of the control system shown in FIG. 1.

Please refer to FIG. 4, FIG. 5 and FIG. 6. FIG. 4 is a schematic diagram showing an implementation structure 9013 of the control system 901 shown in FIG. 1. FIG. 5 is a schematic diagram showing an implementation structure 9014 of the control system 901 shown in FIG. 1. FIG. 6 is a schematic diagram showing an implementation structure 9015 of the control system 901 shown in FIG. 1. As shown in FIG. 4, FIG. 5 and FIG. 6, each of the implementation structure 9013, the implementation structure 9014 and the implementation structure 9015 includes the functional device 130. The functional device 130 includes the processing unit 331, the timer 342 coupled to the processing unit 331, the receiving unit 337 coupled to the processing unit 331, an input unit 380 coupled to the processing unit 331, and the physical parameter application unit 335 coupled to the processing unit 331.

In some embodiments, the timer 342 meets a timer specification FT21. For example, the measurement value application range RQ1U is defaulted based on the timer specification FT21. The timer specification FT21 includes a full measurement value range representation FK8E used to indicate a full measurement value range QK8E. For example, the measurement value application range RQ1U is equal to a first portion of the full measurement value range QK8E. The processing unit 331 is configured to perform a measurement application function FA81 associated with the clock time application interval HR1EU. The measurement application function FA81 meets a measurement application function specification GAL8 associated with the clock time application interval HR1EU. For example, the measurement application function FA81 is a physical parameter control function. The measurement application function specification GAL8 is a physical parameter control function specification.

The processing unit 331 obtains the measured value NY81 in a designated measurement value format HH95 in response to the sense signal SY81. For example, the designated measurement value format HH95 is characterized based on a designated bit number UY95. The clock time TH1A is further characterized based on a rated clock time interval HR1E. For example, the rated clock time interval HR1E is represented by a rated measurement value range HR1N, and includes a plurality of different clock time reference intervals HR1E1, HR1E2, . . . respectively represented by a plurality of different measurement value reference ranges RQ11, RQ12, . . . . For example, the rated clock time interval HR1E is evenly divided to form the plurality of different clock time reference intervals HR1E1, HR1E2, . . . . The rated measurement value range HR1N is a rated measurement time value range. The plurality of different measurement value reference ranges RQ11, RQ12, . . . are a plurality of measurement time value reference ranges; and each of the plurality of different measurement value reference ranges RQ11, RQ12, . . . is defaulted based on the timer specification FT21.

The plurality of different clock time reference intervals HR1E1, HR1E2, include the clock time application interval HR1EU. The measurement application function specification GAL8 includes the timer specification FT21, a rated clock time interval representation GA8HE used to indicate the rated clock time interval HR1E, and a clock time application interval representation GA8HU used to indicate the clock time application interval HR1EU.

The rated measurement value range HR1N is equal to at least a second portion of the full measurement value range QK8E, and is defaulted in the designated measurement value format HH95 based on one selected from a group consisting of the timer specification FT21, the measurement application function specification GAL8 and a first data coding rule WX8HE. The rated measurement value range HR1N has a rated range limit value pair DP1A, and includes the plurality of different measurement value reference ranges RQ11, RQ12, . . . respectively denoted by a plurality of different measurement value reference range codes EL11, EL12, . . . .

For example, the rated range limit value pair DP1A is defaulted in the designated measurement value format HH95; and the plurality of different measurement value reference ranges RQ11, RQ12, . . . include the measurement value application range RQ1U. The first data coding rule WX8HE is used to convert the rated clock time interval representation GA8HE, and is formulated based on the timer specification FT21. For example, the plurality of different measurement value reference range codes EL11, EL12, . . . are a plurality of measurement time value reference range codes respectively.

In some embodiments, the measurement value application range RQ1U is denoted by a measurement value application range code EL1U included in the plurality of different measurement value reference range codes EL11, EL12, . . . , has an application range limit value pair DQ1U, and is defaulted in the designated measurement value format HH95 based on one selected from a group consisting of the timer specification FT21, the measurement application function specification GAL8 and a second data coding rule WX8HU. For example, each of the plurality of different measurement value reference range codes EL11, EL12, . . . is defaulted based on the measurement application function specification GAL8. The second data coding rule WX8HU is used to convert the clock time application interval representation GA8HU, and is formulated based on the timer specification FT21. The application range limit value pair DQ1U includes a first application range limit value DQ15 and a second application range limit value DQ16 being opposite to the first application range limit value DQ15.

The functional device 130 further includes a storage unit 332 coupled to the processing unit 331, and includes a trigger application unit 387 coupled to the processing unit 331. The storage unit 332 stores the defaulted rated range limit value pair DP1A and a variable clock time interval code UF8A. When a trigger event JQ81 associated with the trigger application unit 387 occurs, the variable clock time interval code UF8A is equal to a specific measurement value range code EL14 selected from the plurality of different measurement value reference range codes EL11, EL12, . . . . For example, the specific measurement value range code EL14 indicates a specific clock time interval HR1E4 which is previously determined based on a sensing operation ZT81. The specific clock time interval HR1E4 is selected from the plurality of different clock time reference intervals HR1E1, HR1E2, . . . . The sensing operation ZT81 performed by the timer 342 is used to sense the clock time TH1A.

Before the trigger event JQ81 occurs, the specific measurement value range code EL14 is assigned to the variable clock time interval code UF8A. The trigger application unit 387 causes the processing unit 331 to receive an operation request signal SJ81 in response to the trigger event JQ81. Under a condition that the trigger event JQ81 occurs, the processing unit 331 obtains an operation reference data code XV81 from the storage unit 332 in response to the operation request signal SJ81, and performs a data determination AK8A using the operation reference data code XV81 by running a data determination procedure NK8A to determine the measurement value application range code EL1U selected from the plurality of different measurement value reference range codes EL11, EL12, . . . in order to select the measurement value application range RQ1U from the plurality of different measurement value reference ranges RQ11, RQ12, . . . . The operation reference data code XV81 is equal to a permissible reference data code which is defaulted based on the measurement application function specification GAL8. The data determination procedure NK8A is built based on the measurement application function specification GAL8.

The data determination AK8A is one of a first data determination operation AK81 and a second data determination operation AK82. Under a condition that the operation reference data code XV81 is obtained by accessing the variable clock time interval code UF8A stored in the storage unit 332 to be equal to the specific measurement value range code EL14, the data determination AK8A being the first data determination operation AK81 determines the measurement value application range code EL1U based on the obtained specific measurement value range code EL14. For example, the first data determination operation AK81 is a first scientific calculation MC81 using the obtained specific measurement value range code EL14. The determined measurement value application range code EL1U is equal to or different from the obtained specific measurement value range code EL14.

Under a condition that the operation reference data code XV81 is obtained by accessing the rated range limit value pair DP1A stored in the storage unit 332 to be equal to the defaulted rated range limit value pair DP1A, the data determination AK8A being the second data determination operation AK82, by performing a second scientific calculation MD81 using the measured value NY81 and the obtained rated range limit value pair DP1A, selects the measurement value application range code EL1U from the plurality of different measurement value reference range codes EL11, EL12, . . . to determine the measurement value application range code EL1U. For example, the second scientific calculation MD81 is performed based on a specific empirical formula XS81. The specific empirical formula XS81 is formulated based on the defaulted rated range limit value pair DP1A and the plurality of different measurement value reference range codes EL11, EL12, . . . beforehand.

In some embodiments, the processing unit 331 obtains the application range limit value pair DQ1U based on the determined measurement value application range code EL1U, and checks the mathematical relation KQ81 based on a data comparison CF81 between the measured value NY81 and the obtained application range limit value pair DQ1U to make a logical decision PQ81 on whether the measured value NY81 is within the selected measurement value application range RQ1U. Under a condition that the logical decision PQ81 is positive, the processing unit 331 determines the clock time application interval HR1EU which the clock time TH1A is currently in.

Under a condition that the specific measurement value range code EL14 is different from the determined measurement value application range code EL1U and the processing unit 331 determines the clock time application interval HR1EU which the clock time TH1A is currently in by making the logical decision PQ81, the processing unit 331 uses the storage unit 332 to assign the determined measurement value application range code EL1U to the variable clock time interval code UF8A based on a code difference DG81 between the variable clock time interval code UF8A, being equal to the specific measurement value range code EL14, and the determined measurement value application range code EL1U.

The input unit 380 includes a push button 3801. The physical parameter application unit 335 has the variable physical parameter QU1A. The variable physical parameter QU1A is further characterized based on a specific physical parameter state JE16 being different from the physical parameter target state JE1U. Under a condition that the processing unit 331 causes the variable physical parameter QU1A to be in the physical parameter target state JE1U by checking the mathematical relation KQ81, the input unit 380 receives a user input operation BQ82 using the push button 3801. The processing unit 331 transmits an operation signal SG87 toward the physical parameter application unit 335 in response to the user input operation BQ82, wherein the operation signal SG87 is used to cause the variable physical parameter QU1A to leave the physical parameter target state JE1U to enter the specific physical parameter state JE16.

Please refer to FIG. 1, FIG. 2, FIG. 3, FIG. 4, FIG. 5 and FIG. 6. A method ML80 for controlling a variable physical parameter QU1A is disclosed. For example, the variable physical parameter QU1A is characterized based on a physical parameter target state JE1U. The method ML80 includes the following steps: A clock time TH1A is sensed to generate a sense signal SY81, wherein the clock time TH1A is characterized based on a clock time application interval HR1EU represented by a measurement value application range RQ1U. A measured value NY81 is obtained in response to the sense signal SY81. In addition, under a condition that the clock time application interval HR1EU which the clock time TH1A is currently in is determined by checking a mathematical relation KQ81 between the measured value NY81 and the measurement value application range RQ1U, the variable physical parameter QU1A is caused to be in the physical parameter target state JE1U.

In some embodiments, the clock time TH1A is further characterized based on a clock time designation interval HR1ET being different from the clock time application interval HR1EU. For example, the clock time designation interval HR1ET is earlier than the clock time application interval HR1EU. The method ML80 further includes the following steps: A timer 342 is provided, wherein the step of sensing the clock time TH1A is performed by using the timer 342. In addition, a control signal SC81 is received from a control device 212, wherein the control signal SC81 serves to indicate the clock time designation interval HR1ET. The control device 212 is one of a mobile device and a remote controller. Under a condition that the control device 212 is the remote controller, the control signal SC81 is a light signal. For example, under a condition that the control device 212 is the mobile device, the control signal SC81 is received from the control device 212 through a wireless link, or the control signal SC81 is a radio signal.

The step of obtaining the measured value NY81 includes a sub-step that: after the control signal SC81 is received, the measured value NY81 is obtained in response to the sense signal SY81 due to the control signal SC81. The timer 342 meets a timer specification FT21. For example, the measurement value application range RQ1U is defaulted based on the timer specification FT21. The timer specification FT21 includes a full measurement value range representation FK8E used to indicate a full measurement value range QK8E. For example, the measurement value application range RQ1U is equal to a portion of the full measurement value range QK8E. The measured value NY81 is obtained in a designated measurement value format HH95.

The measurement value application range RQ1U is defaulted in the designated measurement value format HH95 based on the timer specification FT21. The measurement value application range RQ1U has an application range limit value pair DQ1U, and is denoted by a measurement value application range code EL1U. For example, the application range limit value pair DQ1U is defaulted. The method ML80 further includes the following steps: The application range limit value pair DQ1U and the measurement value application range code EL1U are obtained in response to the control signal SC81. In addition, the mathematical relation KQ81 is checked by comparing the measured value NY81 and the obtained application range limit value pair DQ1U.

In some embodiments, the physical parameter target state JE1U is denoted by a physical parameter target state code EW1U. The variable physical parameter QU1A is currently in a physical parameter application state JE1T. The step of causing the variable physical parameter QU1A to be in the physical parameter target state includes the following substeps: Under a condition that the clock time application interval HR1EU which the clock time TH1A is currently in is determined by checking the mathematical relation KQ81, the physical parameter target state code EW1U is obtained based on the obtained measurement value application range code EL1U. In addition, based on the obtained physical parameter target state code EW1U, a physical parameter relation check control GX8U used to check a physical parameter relation KD9U between the variable physical parameter QU1A and the physical parameter target state JE1U is performed.

The step of causing the variable physical parameter QU1A to be in the physical parameter target state JE1U further includes the following sub-steps: Under a condition that the physical parameter application state JE1T is different from the physical parameter target state JE1U and a physical parameter state difference DT81 between the physical parameter target state JE1U and the physical parameter application state JE1T is determined by performing the physical parameter relation check control GX8U, a signal generation control GY85 is performed based on the obtained physical parameter target state code EW1U to generate an operation signal SG85. In addition, the variable physical parameter QU1A is caused to enter the physical parameter target state JE1U from the physical parameter application state JE1T in response to the operation signal SG85.

The method ML80 further includes a step that: under a condition that the clock time application interval HR1EU which the clock time TH1A is currently in is determined by checking the mathematical relation KQ81, a data storage control operation GM8U is performed, wherein the data storage control operation GM8U is used to cause a clock time application interval code UF8U, denoting the determined clock time application interval HR1EU, to be stored. The variable physical parameter QU1A and the clock time TH1A belong to a physical parameter type TU11 and a clock time type TQ11 respectively. For example, the physical parameter type TU11 is different from the clock time type TQ11.

In some embodiments, the method ML80 further includes the following steps: A timer 342 is provided, wherein the step of sensing the clock time TH1A is performed by using the timer 342. In addition, a measurement application function FA81 associated with the clock time application interval HR1EU is performed. The timer 342 meets a timer specification FT21. For example, the measurement value application range RQ1U is defaulted based on the timer specification FT21. The timer specification FT21 includes a full measurement value range representation FK8E used to indicate a full measurement value range QK8E. For example, the measurement value application range RQ1U is equal to a first portion of the full measurement value range QK8E.

The measurement application function FA81 meets a measurement application function specification GAL8 associated with the clock time application interval HR1EU. The measured value NY81 is obtained in a designated measurement value format HH95. For example, the designated measurement value format HH95 is characterized based on a designated bit number UY95. The clock time TH1A is further characterized based on a rated clock time interval HR1E. For example, the rated clock time interval HR1E is represented by a rated measurement value range HR1N, and includes a plurality of different clock time reference intervals HR1E1, HR1E2, . . . respectively represented by a plurality of different measurement value reference ranges RQ11, RQ12, . . . . The plurality of different clock time reference intervals HR1E1, HR1E2, . . . includes the clock time application interval HR1EU.

The measurement application function specification GAL8 includes the timer specification FT21, a rated clock time interval representation GA8HE used to indicate the rated clock time interval HR1E, and a clock time application interval representation GA8HU used to indicate the clock time application interval HR1EU. The rated measurement value range HR1N is equal to at least a second portion of the full measurement value range QK8E, and is defaulted in the designated measurement value format HH95 based on one selected from a group consisting of the timer specification FT21, the measurement application function specification GAL8 and a first data coding rule WX8HE. The rated measurement value range HR1N has a rated range limit value pair DP1A, and includes the plurality of different measurement value reference ranges RQ11, RQ12, respectively denoted by a plurality of different measurement value reference range codes EL11, EL12, . . . . For example, the rated range limit value pair DP1A is defaulted in the designated measurement value format HH95. The plurality of different measurement value reference ranges RQ11, RQ12, . . . include the measurement value application range RQ1U. The first data coding rule WX8HE is used to convert the rated clock time interval representation GA8HE, and is formulated based on the timer specification FT21.

The measurement value application range RQ1U is denoted by a measurement value application range code EL1U included in the plurality of different measurement value reference range codes EL11, EL12, . . . , has an application range limit value pair DQ1U, and is defaulted in the designated measurement value format HH95 based on one selected from a group consisting of the timer specification FT21, the measurement application function specification GAL8 and a second data coding rule WX8HU. For example, each of the plurality of different measurement value reference range codes EL11, EL12, . . . is defaulted based on the measurement application function specification GAL8. The second data coding rule WX8HU is used to convert the clock time application interval representation GA8HU, and is formulated based on the timer specification FT21. The application range limit value pair DQ1U includes a first application range limit value DQ15 and a second application range limit value DQ16 being opposite to the first application range limit value DQ15.

In some embodiments, the method ML80 further includes the following steps: A storage space SU11 is provided. In addition, the defaulted rated range limit value pair DP1A and a variable clock time interval code UF8A are stored in the storage space SU11. When a trigger event JQ81 occurs, the variable clock time interval code UF8A is equal to a specific measurement value range code EL14 selected from the plurality of different measurement value reference range codes EL11, EL12, . . . . For example, the specific measurement value range code EL14 indicates a specific clock time interval HR1E4 which is previously determined based on a sensing operation ZT81. The specific clock time interval HR1E4 is selected from the plurality of different clock time reference intervals HR1E1, HR1E2, . . . . The sensing operation ZT81 performed by the timer 342 is used to sense the clock time TH1A.

Before the trigger event JQ81 occurs, the specific measurement value range code EL14 is assigned to the variable clock time interval code UF8A. The method ML80 further includes the following steps: An operation request signal SJ81 is received in response to the trigger event JQ81. Under a condition that the trigger event JQ81 occurs, an operation reference data code XV81 is obtained from the storage space SU11 in response to the operation request signal SJ81. In addition, a data determination AK8A using the operation reference data code XV81 is performed by running a data determination procedure NK8A to determine the measurement value application range code EL1U selected from the plurality of different measurement value reference range codes EL11, EL12, . . . in order to select the measurement value application range RQ1U from the plurality of different measurement value reference ranges RQ11, RQ12, . . . . The operation reference data code XV81 is equal to a permissible reference data code which is defaulted based on the measurement application function specification GAL8.

In some embodiments, the data determination procedure NK8A is built based on the measurement application function specification GAL8. The data determination AK8A is one of a first data determination operation AK81 and a second data determination operation AK82. Under a condition that the operation reference data code XV81 is obtained by accessing the variable clock time interval code UF8A stored in the storage unit 332 to be equal to the specific measurement value range code EL14, the data determination AK8A being the first data determination operation AK81 determines the measurement value application range code EL1U based on the obtained specific measurement value range code EL14. For example, the first data determination operation AK81 is a first scientific calculation MC81 using the obtained specific measurement value range code EL14. The determined measurement value application range code EL1U is equal to or different from the obtained specific measurement value range code EL14.

Under a condition that the operation reference data code XV81 is obtained by accessing the rated range limit value pair DP1A stored in the storage unit 332 to be equal to the defaulted rated range limit value pair DP1A, the data determination AK8A being the second data determination operation AK82, by performing a second scientific calculation MD81 using the measured value NY81 and the obtained rated range limit value pair DP1A, selects the measurement value application range code EL1U from the plurality of different measurement value reference range codes EL11, EL12, . . . to determine the measurement value application range code EL1U. For example, the second scientific calculation MD81 is performed based on a specific empirical formula XS81. The specific empirical formula XS81 is formulated based on the defaulted rated range limit value pair DP1A and the plurality of different measurement value reference range codes EL11, EL12, . . . beforehand.

In some embodiments, the method ML80 further includes the following steps: The application range limit value pair DQ1U is obtained based on the determined measurement value application range code EL1U. Based on a data comparison CF81 between the measured value NY81 and the obtained application range limit value pair DQ1U, the mathematical relation KQ81 is checked to make a logical decision PQ81 on whether the measured value NY81 is within the selected measurement value application range RQ1U. In addition, under a condition that the logical decision PQ81 is positive, the clock time application interval HR1EU which the clock time TH1A is currently in is determined.

The method ML80 further includes a step that: under a condition that the specific measurement value range code EL14 is different from the determined measurement value application range code EL1U and the clock time application interval HR1EU which the clock time TH1A is currently in is determined by making the logical decision PQ81, the determined measurement value application range code EL1U is assigned to the variable clock time interval code UF8A based on a code difference DG81 between the variable clock time interval code UF8A, being equal to the specific measurement value range code EL14, and the determined measurement value application range code EL1U.

The variable physical parameter QU1A is further characterized based on a specific physical parameter state JE16 being different from the physical parameter target state JE1U. The method ML80 further includes the following steps: A push button 3801 is provided. Under a condition that the variable physical parameter QU1A is caused to be in the physical parameter target state JE1U by checking the mathematical relation KQ81, a user input operation BQ82 using the push button 3801 is received. In addition, an operation signal SG87 is generated in response to the user input operation BQ82, wherein the operation signal SG87 is used to cause the variable physical parameter QU1A to leave the physical parameter target state JE1U to enter the specific physical parameter state JE16.

Please refer to FIG. 6. FIG. 6 is a schematic diagram showing the implementation structure 9015 of the control system 901 shown in FIG. 1. As shown in FIG. 6, the implementation structure 9015 includes a functional device 130 for controlling a variable physical parameter QU1A. For example, the variable physical parameter QU1A is characterized based on a physical parameter target state JE1U. The functional device 130 includes a timer 342 and a processing unit 331. The timer 342 senses a clock time TH1A to generate a sense signal SY81. For example, the clock time TH1A is characterized based on a clock time application interval HR1EU represented by a measurement value application range RQ1U.

The processing unit 331 is coupled to the timer 342, obtains a measured value NY81 in response to the sense signal SY81, and causes the variable physical parameter QU1A to be in the physical parameter target state JE1U under a condition that the processing unit 331 determines a situation JP81 that the clock time TH1A enters the clock time application interval HR1EU by determining a first mathematical relation KQ81 between the measured value NY81 and the measurement value application range RQ1U.

Please refer to FIG. 2, FIG. 3, FIG. 4, FIG. 5 and FIG. 6. In some embodiments, the functional device 130 further includes a receiving unit 337 coupled to the processing unit 331, and a physical parameter application unit 335 coupled to the processing unit 331. The clock time TH1A is further characterized based on a clock time designation interval HR1ET being different from the clock time application interval HR1EU. For example, the clock time designation interval HR1ET is earlier than the clock time application interval HR1EU. After the receiving unit 337 has received a control signal SC81 from a control device 212, the processing unit 331 obtains a measurement value sequence JY81 including the measured value NY81 in response to the sense signal SY81 due to the control signal SC81. For example, the control signal SC81 serves to indicate the clock time designation interval HR1ET. The control device 212 is one of a mobile device and a remote controller. Under a condition that the control device 212 is the remote controller, the control signal SC81 is a light signal. For example, under a condition that the control device 212 is the mobile device, the receiving unit 337 receives the control signal SC81 from the control device 212 through a wireless link, or the control signal SC81 is a radio signal.

The processing unit 331 makes a logical decision PR81 on whether the clock time TH1A enters the clock time application interval HR1EU from the clock time designation interval HR1ET by determining a second mathematical relation KQ82 between the measurement value sequence JY81 and the measurement value application range RQ1U. Under a condition that the logical decision PR81 is positive, the processing unit 331 determines the entered clock time application interval HR1EU. The timer 342 meets a timer specification FT21. For example, the measurement value application range RQ1U is defaulted based on the timer specification FT21. The timer specification FT21 includes a full measurement value range representation FK8E used to indicate a full measurement value range QK8E. For example, the measurement value application range RQ1U is equal to a portion of the full measurement value range QK8E.

The measured value NY81 is obtained in a designated measurement value format HH95. The measurement value application range RQ1U is defaulted according to the designated measurement value format HH95 based on the timer specification FT21. The measurement value application range RQ1U has an application range limit value pair DQ1U, and is denoted by a measurement value application range code EL1U. For example, the application range limit value pair DQ1U is defaulted. The processing unit 331 obtains the application range limit value pair DQ1U and the measurement value application range code EL1U in response to the control signal SC81, and determines the first mathematical relation KQ81 by comparing the measured value NY81 and the obtained application range limit value pair DQ1U. The physical parameter target state JE1U is denoted by a physical parameter target state code EW1U.

In some embodiments, the physical parameter application unit 335 has the variable physical parameter QU1A. For example, the variable physical parameter QU1A is currently in a physical parameter application state JE1T. Under a condition that the processing unit 331 determines the entered clock time application interval HR1EU by determining the first mathematical relation KQ81, the processing unit 331 obtains the physical parameter target state code EW1U based on the obtained measurement value application range code EL1U, and performs a physical parameter relation check control GX8U, used to determine a physical parameter relation KD9U between the variable physical parameter QU1A and the physical parameter target state JE1U, based on the obtained physical parameter target state code EW1U.

Under a condition that the physical parameter application state JE1T is different from the physical parameter target state JE1U and the processing unit 331 determines a physical parameter state difference DT81 between the physical parameter target state JE1U and the physical parameter application state JE1T by performing the physical parameter relation check control GX8U, the processing unit 331 performs a signal generation control GY85 based on the obtained physical parameter target state code EW1U to generate an operation signal SG85, and transmits the operation signal SG85 toward the physical parameter application unit 335. The physical parameter application unit 335 causes the variable physical parameter QU1A to enter the physical parameter target state JE1U from the physical parameter application state JE1T in response to the operation signal SG85.

Under a condition that the processing unit 331 determines the entered clock time application interval HR1EU by determining the first mathematical relation KQ81, the processing unit 331 performs a data storage control operation GM8U, wherein the data storage control operation GM8U is used to cause a clock time application interval code UF8U, denoting the determined clock time application interval HR1EU, to be stored. The variable physical parameter QU1A and the clock time TH1A belong to a physical parameter type TU11 and a clock time type TQ11 respectively. For example, the physical parameter type TU11 is different from the clock time type TQ11.

In some embodiments, the timer 342 meets a timer specification FT21. For example, the measurement value application range RQ1U is defaulted based on the timer specification FT21. The timer specification FT21 includes a full measurement value range representation FK8E used to indicate a full measurement value range QK8E. For example, the measurement value application range RQ1U is equal to a first portion of the full measurement value range QK8E. The processing unit 331 is configured to perform a measurement application function FA81 associated with the clock time application interval HR1EU. The measurement application function FA81 meets a measurement application function specification GAL8 associated with the clock time application interval HR1EU.

The processing unit 331 obtains the measured value NY81 in a designated measurement value format HH95 in response to the sense signal SY81. For example, the designated measurement value format HH95 is characterized based on a designated bit number UY95. The clock time TH1A is further characterized based on a rated clock time interval HR1E. For example, the rated clock time interval HR1E is represented by a rated measurement value range HR1N, and includes a plurality of different clock time reference intervals HR1E1, HR1E2, . . . respectively represented by a plurality of different measurement value reference ranges RQ11, RQ12, . . . . The plurality of different clock time reference intervals HR1E1, HR1E2, . . . include the clock time application interval HR1EU. The measurement application function specification GAL8 includes the timer specification FT21, a rated clock time interval representation GA8HE used to indicate the rated clock time interval HR1E, and a clock time application interval representation GA8HU used to indicate the clock time application interval HR1EU.

In some embodiments, the rated measurement value range HR1N is equal to at least a second portion of the full measurement value range QK8E, and is defaulted in the designated measurement value format HH95 based on one selected from a group consisting of the timer specification FT21, the measurement application function specification GAL8 and a first data coding rule WX8HE. The rated measurement value range HR1N has a rated range limit value pair DP1A, and includes the plurality of different measurement value reference ranges RQ11, RQ12, . . . respectively denoted by a plurality of different measurement value reference range codes EL11, EL12, . . . . For example, the rated range limit value pair DP1A is defaulted in the designated measurement value format HH95. The plurality of different measurement value reference ranges RQ11, RQ12, . . . include the measurement value application range RQ1U. The first data coding rule WX8HE is used to convert the rated clock time interval representation GA8HE, and is formulated based on the timer specification FT21.

The measurement value application range RQ1U is denoted by a measurement value application range code EL1U included in the plurality of different measurement value reference range codes EL11, EL12, . . . , has an application range limit value pair DQ1U, and is defaulted in the designated measurement value format HH95 based on one selected from a group consisting of the timer specification FT21, the measurement application function specification GAL8 and a second data coding rule WX8HU. For example, each of the plurality of different measurement value reference range codes EL11, EL12, . . . is defaulted based on the measurement application function specification GAL8. The second data coding rule WX8HU is used to convert the clock time application interval representation GA8HU, and is formulated based on the timer specification FT21. The application range limit value pair DQ1U includes a first application range limit value DQ15 and a second application range limit value DQ16 being opposite to the first application range limit value DQ15.

In some embodiments, the functional device 130 further includes a storage unit 332 coupled to the processing unit 331, and includes a trigger application unit 387 coupled to the processing unit 331. The storage unit 332 stores the defaulted rated range limit value pair DP1A and a variable clock time interval code UF8A. When a trigger event JQ81 associated with the trigger application unit 387 occurs, the variable clock time interval code UF8A is equal to a specific measurement value range code EL14 selected from the plurality of different measurement value reference range codes EL11, EL12, . . . . For example, the specific measurement value range code EL14 indicates a specific clock time interval HR1E4 which is previously determined based on a sensing operation ZT81. The specific clock time interval HR1E4 is selected from the plurality of different clock time reference intervals HR1E1, HR1E2, . . . . The sensing operation ZT81 performed by the timer 342 is used to sense the clock time TH1A.

Before the trigger event JQ81 occurs, the specific measurement value range code EL14 is assigned to the variable clock time interval code UF8A. The trigger application unit 387 causes the processing unit 331 to receive an operation request signal SJ81 in response to the trigger event JQ81. Under a condition that the trigger event JQ81 occurs, the processing unit 331 obtains an operation reference data code XV81 from the storage unit 332 in response to the operation request signal SJ81, and performs a data determination AK8A using the operation reference data code XV81 by running a data determination procedure NK8A to determine the measurement value application range code EL1U selected from the plurality of different measurement value reference range codes EL11, EL12, . . . in order to select the measurement value application range RQ1U from the plurality of different measurement value reference ranges RQ11, RQ12, . . . . The operation reference data code XV81 is equal to a permissible reference data code which is defaulted based on the measurement application function specification GAL8. The data determination procedure NK8A is built based on the measurement application function specification GAL8.

In some embodiments, the data determination AK8A is one of a first data determination operation AK81 and a second data determination operation AK82. Under a condition that the operation reference data code XV81 is obtained by accessing the variable clock time interval code UF8A stored in the storage unit 332 to be equal to the specific measurement value range code EL14, the data determination AK8A being the first data determination operation AK81 determines the measurement value application range code EL1U based on the obtained specific measurement value range code EL14. For example, the first data determination operation AK81 is a first scientific calculation MC81 using the obtained specific measurement value range code EL14. The determined measurement value application range code EL1U is equal to or different from the obtained specific measurement value range code EL14.

Under a condition that the operation reference data code XV81 is obtained by accessing the rated range limit value pair DP1A stored in the storage unit 332 to be equal to the defaulted rated range limit value pair DP1A, the data determination AK8A being the second data determination operation AK82, by performing a second scientific calculation MD81 using the measured value NY81 and the obtained rated range limit value pair DP1A, selects the measurement value application range code EL1U from the plurality of different measurement value reference range codes EL11, EL12, . . . to determine the measurement value application range code EL1U. For example, the second scientific calculation MD81 is performed based on a specific empirical formula XS81. The specific empirical formula XS81 is formulated based on the defaulted rated range limit value pair DP1A and the plurality of different measurement value reference range codes EL11, EL12, . . . beforehand.

In some embodiments, the processing unit 331 obtains the application range limit value pair DQ1U based on the determined measurement value application range code EL1U, and determines the first mathematical relation KQ81 based on a data comparison CF81 between the measured value NY81 and the obtained application range limit value pair DQ1U to make a logical decision PQ81 on whether the measured value NY81 is within the selected measurement value application range RQ1U. Under a condition that the logical decision PQ81 is positive, the processing unit 331 determines the situation JP81. For example, the situation JP81 is a specific situation.

Under a condition that the specific measurement value range code EL14 is different from the determined measurement value application range code EL1U and the processing unit 331 determines the entered clock time application interval HR1EU by making the logical decision PQ81, the processing unit 331 uses the storage unit 332 to assign the determined measurement value application range code EL1U to the variable clock time interval code UF8A based on a code difference DG81 between the variable clock time interval code UF8A, being equal to the specific measurement value range code EL14, and the determined measurement value application range code EL1U.

The input unit 380 includes a push button 3801. The physical parameter application unit 335 has the variable physical parameter QU1A. The variable physical parameter QU1A is further characterized based on a specific physical parameter state JE16 being different from the physical parameter target state JE1U. Under a condition that the processing unit 331 causes the variable physical parameter QU1A to be in the physical parameter target state JE1U by determining the first mathematical relation KQ81, the input unit 380 receives a user input operation BQ82 using the push button 3801. The processing unit 331 transmits an operation signal SG87 toward the physical parameter application unit 335 in response to the user input operation BQ82, wherein the operation signal SG87 is used to cause the variable physical parameter QU1A to leave the physical parameter target state JE1U to enter the specific physical parameter state JE16.

Please refer to FIG. 6. A method ML82 for controlling a variable physical parameter QU1A is disclosed. For example, the variable physical parameter QU1A is characterized based on a physical parameter target state JE1U. The method includes the following steps: A clock time TH1A is sensed to generate a sense signal SY81, wherein the clock time TH1A is characterized based on a clock time application interval HR1EU represented by a measurement value application range RQ1U. A measured value NY81 is obtained in response to the sense signal SY81. In addition, under a condition that a situation JP81 that the clock time TH1A enters the clock time application interval HR1EU is determined by checking a first mathematical relation KQ81 between the measured value NY81 and the measurement value application range RQ1U, the variable physical parameter QU1A is caused to be in the physical parameter target state JE1U.

Figure 7:
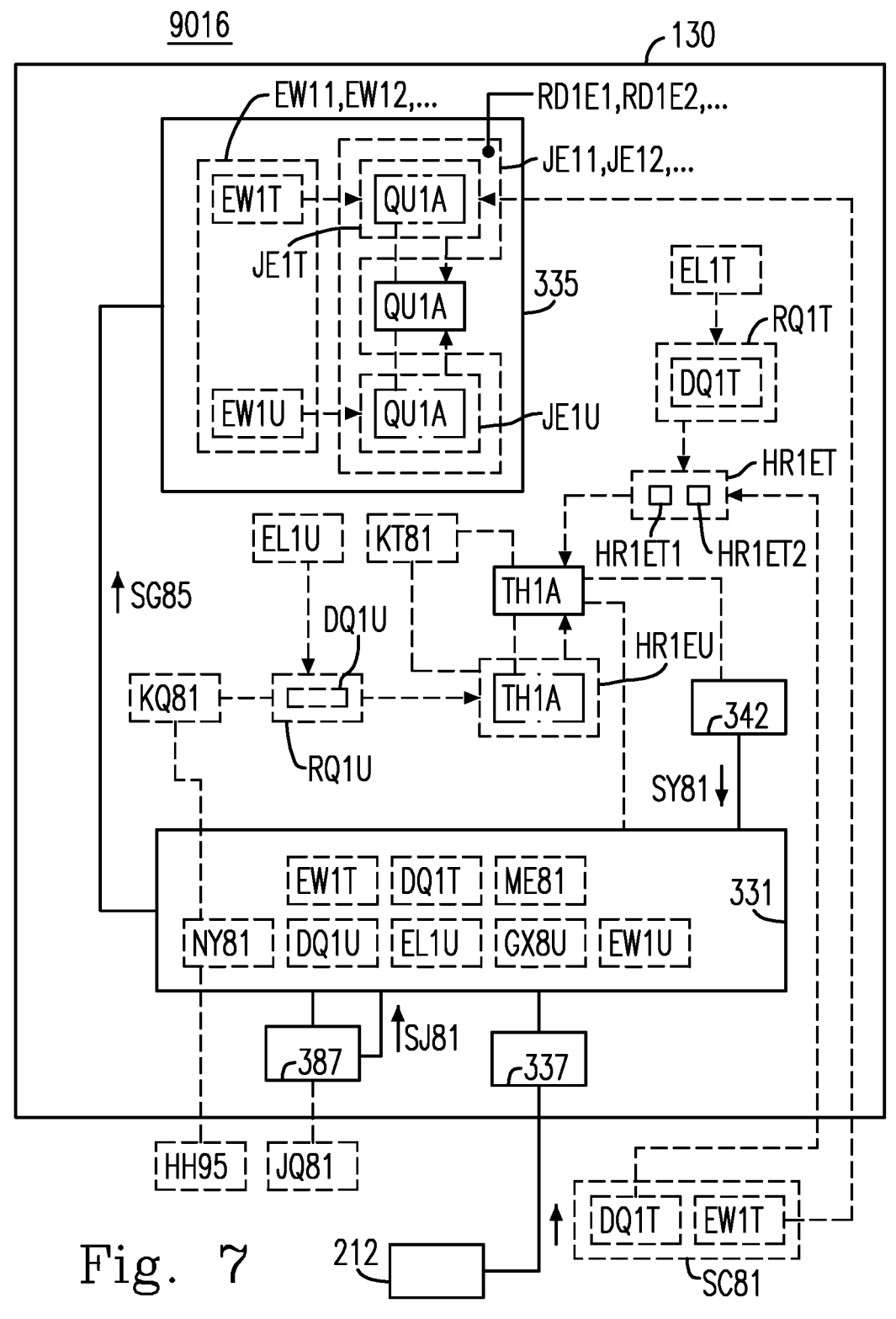
FIG. 7 is a schematic diagram showing an implementation structure of the control system shown in FIG. 1.
Figure 8:
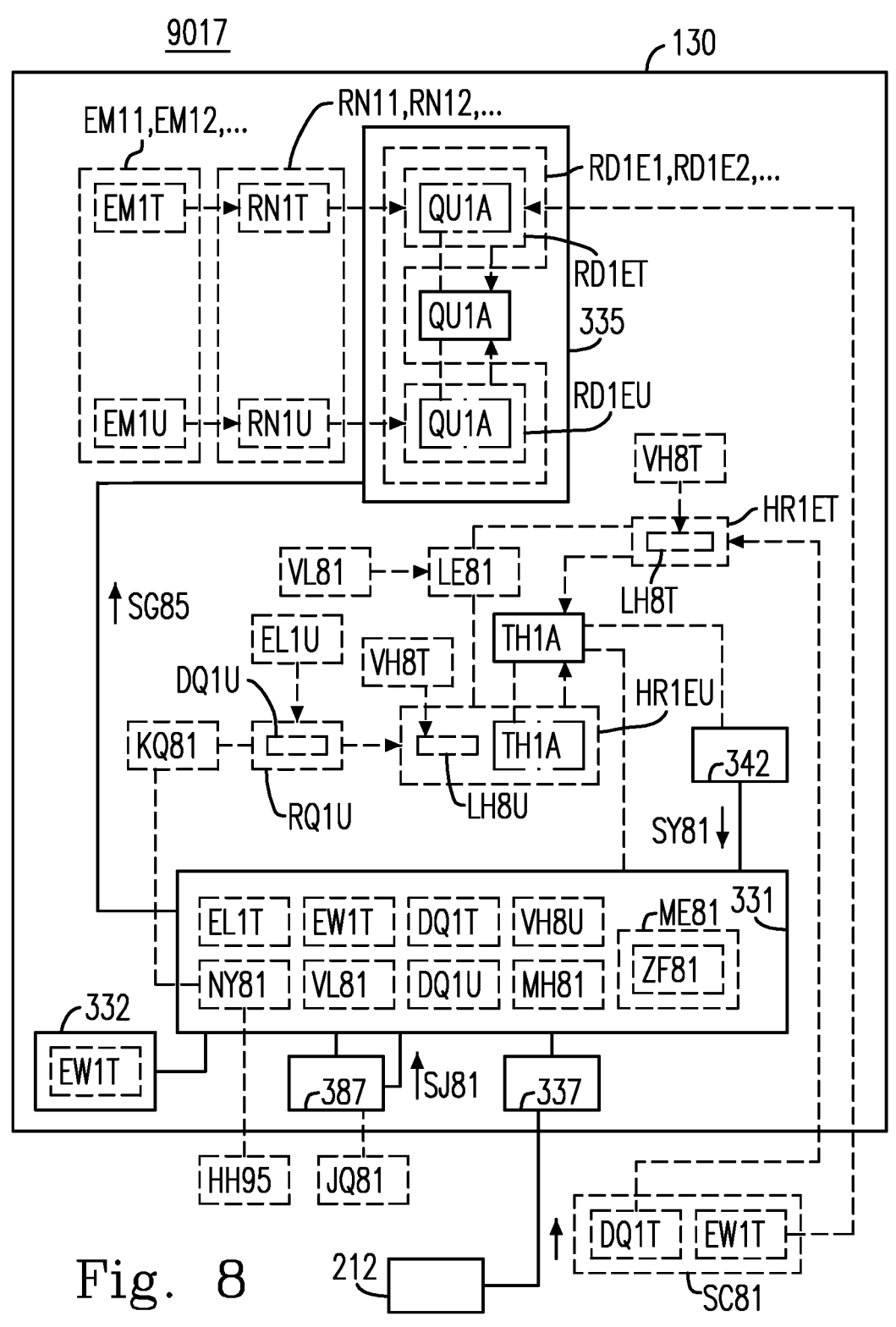
FIG. 8 is a schematic diagram showing an implementation structure of the control system shown in FIG. 1.

Please refer to FIG. 7 and FIG. 8. FIG. 7 is a schematic diagram showing an implementation structure 9016 of the control system 901 shown in FIG. 1. FIG. 8 is a schematic diagram showing an implementation structure 9017 of the control system 901 shown in FIG. 1. As shown in FIG. 7 and FIG. 8, each of the implementation structure 9016 and the implementation structure 9017 includes the control device 212 and the functional device 130. The functional device 130 includes the processing unit 331, the timer 342, the storage unit 332, the physical parameter application unit 335 and the receiving unit 337. Each of the timer 342, the storage unit 332, the physical parameter application unit 335 and the receiving unit 337 is controlled by the processing unit 331. For example, the physical parameter application unit 335 is located in one of the inside of the functional device 130 and the outside of the functional device 130.

In some embodiments, the receiving unit 337 receives the control signal SC81, serving to indicate the physical parameter application state JE1T, from the control device 212. The processing unit 331 causes the variable physical parameter QU1A to be in the physical parameter application state JE1T based on the control signal SC81. The clock time designation interval HR1ET is adjacent to the clock time application interval HR1EU, is represented by a measurement value designation range RQ1T, and has a beginning limit time HR1ET1 and an end limit time HR1ET2 being opposite to the beginning limit time HR1ET1. The measurement value designation range RQ1T has a designated range limit value pair DQ1T, and is denoted by a measurement value designation range code EL1T. For example, the measurement value designation range RQ1T is a measurement time value target range. The measurement value designation range code EL1T is a time value target range code. The designated range limit value pair DQ1T is a target range limit value pair.

The control signal SC81 serves to indicate the clock time designation interval HR1ET. The processing unit 331 controls the timer 342 in response to the control signal SC81 to cause the timer 342 to measure the clock time TH1A according to the beginning limit time HR1ET1. For example, the processing unit 331 causes the variable physical parameter QU1A to be in the physical parameter application state JE1T within the clock time designation interval HR1ET based on the control signal SC81.

In some embodiments, the physical parameter application state JE1T is denoted by a physical parameter application state code EW1T. The control signal SC81 serves to indicate the physical parameter application state JE1T by carrying one of the physical parameter application state code EW1T and the measurement value target range code EM1T, and serves to indicate at least one of the clock time designation interval HR1ET and the measurement value designation range RQ1T by carrying the designated range limit value pair DQ1T. The processing unit 331 obtains the physical parameter application state code EW1T and the designated range limit value pair DQ1T from the control signal SC81, and causes the variable physical parameter QU1A to be in the physical parameter application state JE1T within the clock time designation interval HR1ET based on the obtained physical parameter application state code EW1T.

The functional device 130 includes the trigger application unit 387. After the receiving unit 337 receives the control signal SC81 from the control device 212, the trigger event JQ81 occurs. For example, the trigger event JQ81 occurs in response to the control signal SC81. Under a condition that the trigger event JQ81 occurs, the processing unit 331 performs a scientific calculation ME81 using the obtained designated range limit value pair DQ1T in response to the trigger event JQ81 to obtain the application range limit value pair DQ1U, and checks the mathematical relation KQ81 by comparing the measured value NY81 and the obtained application range limit value pair DQ1U.

For example, the trigger event JQ81 is associated with the trigger application unit 387, and is one selected from a group consisting of a trigger action event, a user input event, a signal input event, a state change event and an integer overflow event. The trigger application unit 387 provides the operation request signal SJ81 to the processing unit 331 in response to the trigger event JQ81, and thereby causes the processing unit 331 to receive the operation request signal SJ81. The processing unit 331 performs the scientific calculation ME81 to obtain the application range limit value pair DQ1U in response to the operation request signal SJ81 in order to check the physical parameter relation KD9U between the variable physical parameter QU1A and the physical parameter target state JE1U.

In some embodiments, the variable physical parameter QU1A is characterized based on a plurality of different physical parameter reference states JE11, JE12, . . . . The plurality of different physical parameter reference states JE11, JE12, includes the physical parameter application state JE1T and the physical parameter target state JE1U, and are respectively denoted by a plurality of different physical parameter reference state codes EW11, EW12, . . . . For example, the physical parameter target state JE1U is equal to or different from the physical parameter application state JE1T. The physical parameter target state JE1T is determined according to a physical parameter target range RD1ET beforehand. The physical parameter target state JE1U is determined according to a physical parameter target range RD1EU beforehand. The plurality of different physical parameter reference states JE11, JE12, . . . are respectively determined according to a plurality of different physical parameter reference ranges RD1E1, RD1E2, . . . beforehand. For example, the physical parameter target range RD1EU is a physical parameter candidate range.

The variable physical parameter QU1A is characterized based on the plurality of different physical parameter reference ranges RD1E1, RD1E2, . . . . The plurality of different physical parameter reference ranges RD1E1, RD1E2, . . . are respectively represented by a plurality of different measurement value reference ranges RN11, RN12, . . . , and include the physical parameter target range RD1ET and the physical parameter target range RD1EU. The physical parameter target range RD1ET and the physical parameter target range RD1EU are respectively represented by a measurement value target range RN1T and a measurement value target range RN1U. The plurality of different measurement value reference ranges RN11, RN12, . . . are respectively denoted by a plurality of different measurement value reference range codes EM11, EM12, . . . , and include the measurement value target range RN1T and the measurement value target range RN1U.

The plurality of different measurement value reference range codes EM11, EM12, . . . include a measurement value target range code EM1T and a measurement value target range code EM1U, and are respectively equal to the plurality of different physical parameter reference state codes EW11, EW12, . . . . For example, the plurality of different physical parameter reference state codes EW11, EW12, . . . include the physical parameter application state code EW1T and the physical parameter target state code EW1U, and are defaulted. The measurement value target range code EM1T and the measurement value target range code EM1U are respectively equal to the physical parameter application state code EW1T and the physical parameter target state code EW1U.

In some embodiments, the clock time designation interval HR1ET and the clock time application interval HR1EU respectively have a designated time length LH8T and an application time length LH8U being equal to the designated time length LH8T. The designated time length LH8T and the application time length LH8U are respectively denoted by a measurement time length value VH8T and a measurement time length value VH8U. For example, the measurement time length value VH8U is equal to the measurement time length value VH8T. Each of the measurement time length value VH8T and the measurement time length value VH8U is defaulted in the designated measurement value format HH95 based on the timer specification FT21.

The clock time application interval HR1EU has a relative interval position LE81 being relative to the clock time designation interval HR1ET. The relative interval position LE81 is denoted by a relative value VL81. For example, under a condition that the clock time application interval HR1EU is adjacent to the clock time designation interval HR1ET, the relative value VL81 is equal to 1. The processing unit 331 obtains the relative value VL81 in response to the operation request signal SJ81. The scientific calculation ME81 performs a subtraction operation ZF81 on the obtained designated range limit value pair DQ1T to obtain the measurement time length value VH8U, and uses the obtained relative value VL81, the obtained measurement time length value VH8U and the obtained designated range limit value pair DQ1T to obtain the application range limit value pair DQ1U.

For example, the storage unit 332 stores the physical parameter application state code EW1T which is stored based on the defaulted measurement value designation range code EL1T. The processing unit 331 obtains the measurement value designation range code EL1T by performing a scientific calculation MH81 using the obtained designated range limit value pair DQ1T, and obtains the stored physical parameter application state code EW1T from the storage unit 332 based on the obtained measurement value designation range code EL1T.

Figure 9:
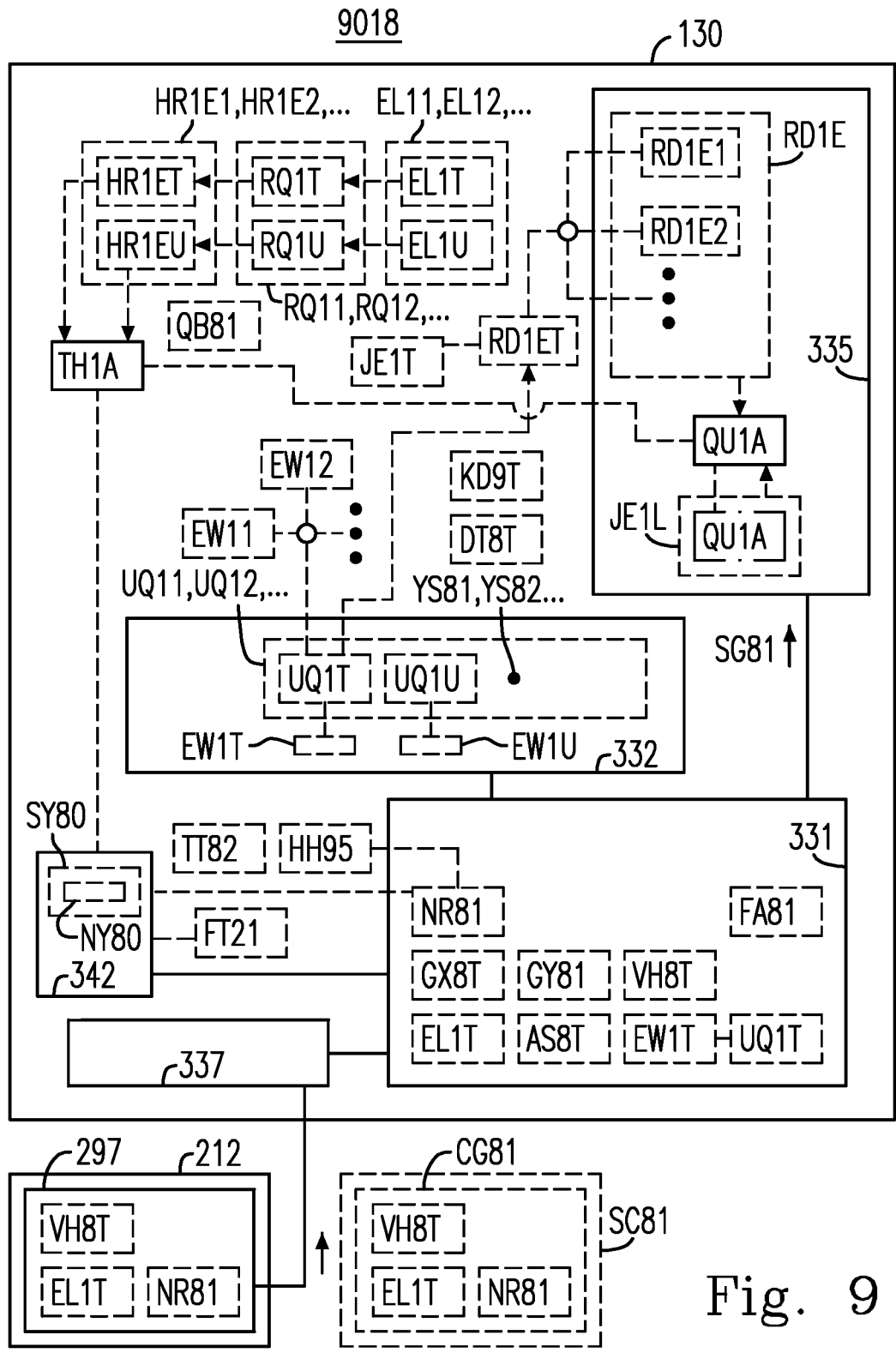
FIG. 9 is a schematic diagram showing an implementation structure of the control system shown in FIG. 1.
Figure 10:
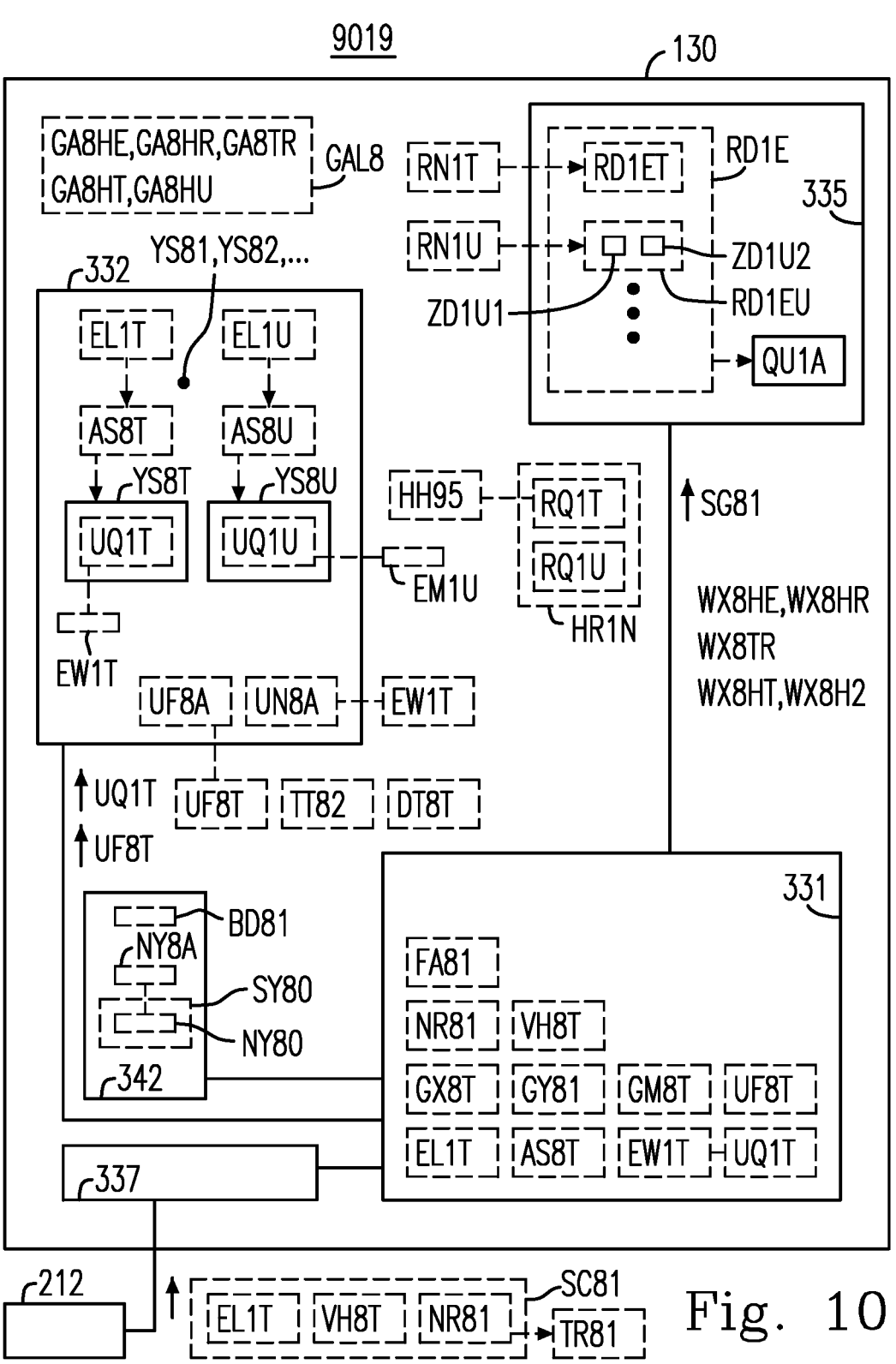
FIG. 10 is a schematic diagram showing an implementation structure of the control system shown in FIG. 1.
Figure 11:
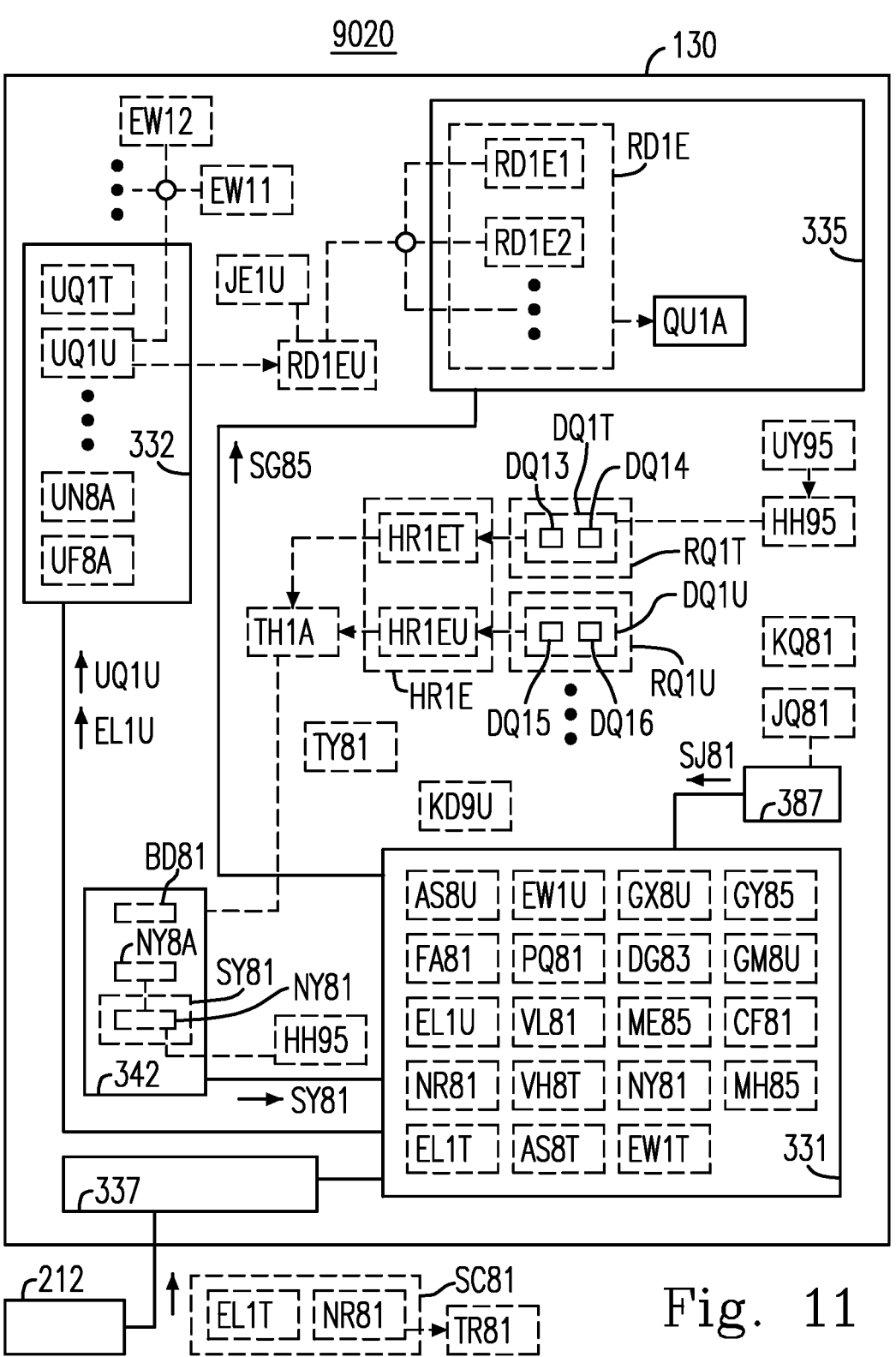
FIG. 11 is a schematic diagram showing an implementation structure of the control system shown in FIG. 1.
Figure 12:
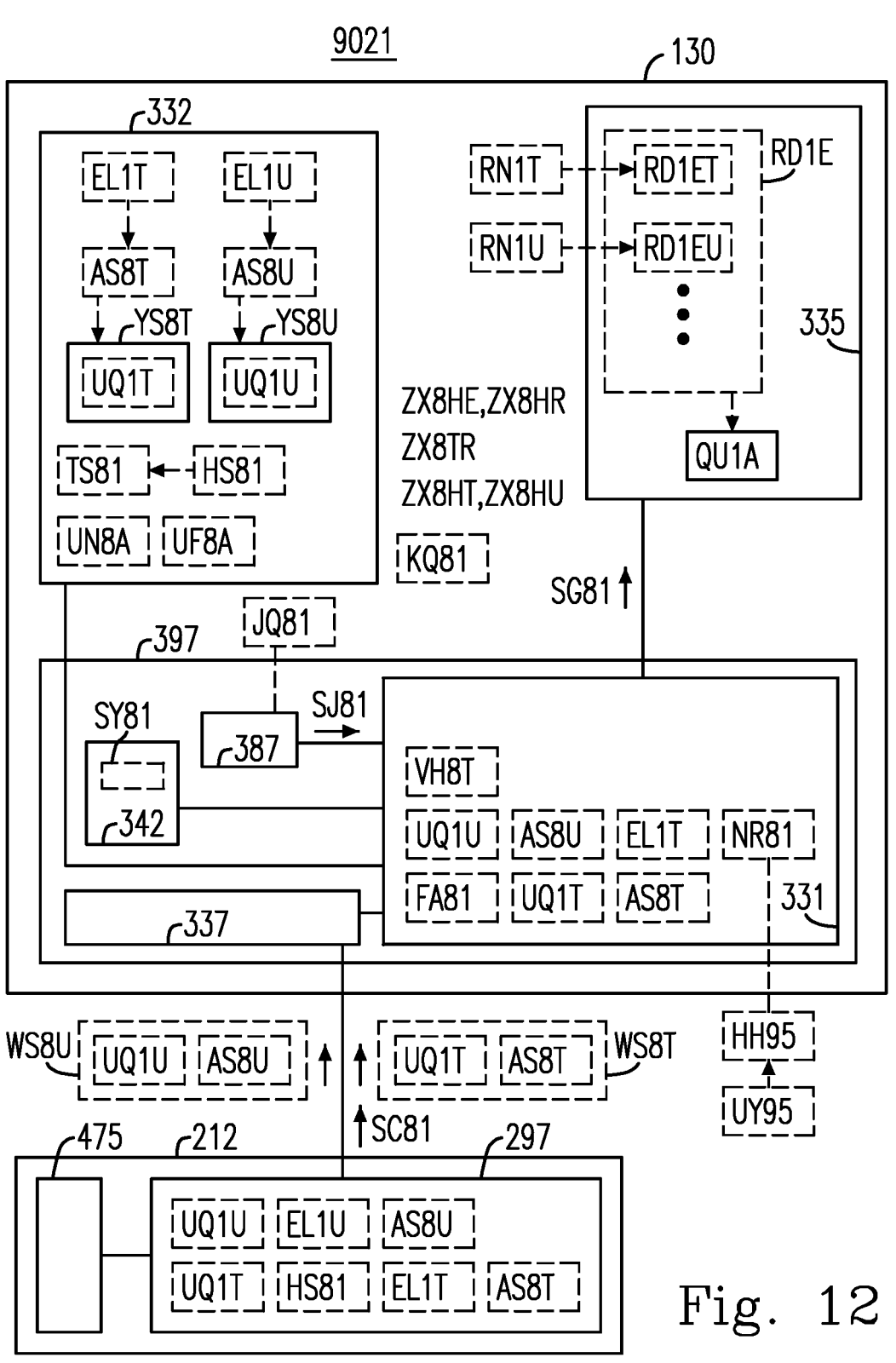
FIG. 12 is a schematic diagram showing an implementation structure of the control system shown in FIG. 1.

Please refer to FIG. 9, FIG. 10, FIG. 11 and FIG. 12. FIG. 9 is a schematic diagram showing an implementation structure 9018 of the control system 901 shown in FIG. 1. FIG. 10 is a schematic diagram showing an implementation structure 9019 of the control system 901 shown in FIG. 1. FIG. 11 is a schematic diagram showing an implementation structure 9020 of the control system 901 shown in FIG. 1. FIG. 12 is a schematic diagram showing an implementation structure 9021 of the control system 901 shown in FIG. 1. As shown in FIG. 9, FIG. 10, FIG. 11 and FIG. 12, each of the implementation structure 9018, the implementation structure 9019, the implementation structure 9020 and the implementation structure 9021 includes the control device 212 and the functional device 130. The functional device 130 includes the processing unit 331, the timer 342, the physical parameter application unit 335 and the storage unit 332.

Each of the timer 342, the physical parameter application unit 335 and the storage unit 332 is controlled by the processing unit 331.

In some embodiments, the timer 342 is controlled by the processing unit 331, and is used to measure the clock time TH1A. The timer 342 is configured to meet the timer specification FT21. The variable physical parameter QU1A is associated with the clock time TH1A. The clock time TH1A is characterized based on a plurality of different clock time reference intervals HR1E1, HR1E2, . . . . The plurality of different clock time reference intervals HR1E1, HR1E2, . . . are respectively represented by a plurality of different measurement value reference ranges RQ11, RQ12, . . . , and are arranged based on a defaulted time reference interval sequence QB81. The plurality of different measurement value reference ranges RQ11, RQ12, . . . are arranged based on the defaulted time reference interval sequence QB81. For example, the plurality of different measurement value reference ranges RQ11, RQ12, . . . are a plurality of time value reference ranges.

Each of the plurality of different measurement value reference ranges RQ11, RQ12, . . . is defaulted in a designated measurement value format HH95 based on the timer specification FT21, and are respectively denoted by a plurality of different measurement value reference range codes EL11, EL12, . . . . For example, the designated measurement value format HH95 is a designated count value format. The plurality of different measurement value reference range codes EL11, EL12, . . . are a plurality of measurement time value reference range codes respectively. The storage unit 332 has a plurality of different memory locations YS81, YS82, . . . , and stores a plurality of physical parameter designation range codes UQ11, UQ12, . . . at the plurality of different memory locations YS81, YS82, . . . respectively. For example, the plurality of physical parameter designation range codes UQ11, UQ12, . . . are respectively equal to a plurality of physical parameter designation state codes. The plurality of physical parameter designation state codes respectively denote a plurality of physical parameter designation states associated with the variable physical parameter QU1A.

The plurality of different clock time reference intervals HR1E1, HR1E2, are respectively denoted by a plurality of clock time reference interval codes. For example, the plurality of clock time reference interval codes are configured to be respectively equal to the plurality of different measurement value reference range codes EL11, EL12, Therefore, the plurality of different measurement value reference range codes EL11, EL12, . . . are configured to respectively indicate the plurality of different clock time reference intervals HR1E1, HR1E2, . . . . For example, the designated measurement value format HH95 is characterized based on the designated bit number UY95.

The plurality of different measurement value reference range codes EL11, EL12, . . . include a measurement value designation range code EL1T and a measurement value application range code EL1U. The plurality of different clock time reference intervals HR1E1, HR1E2, . . . include a clock time designation interval HR1ET and a clock time application interval HR1EU. The measurement value designation range code EL1T and the measurement value application range code EL1U are configured to respectively indicate the clock time designation interval HR1ET and the clock time application interval HR1EU. The plurality of different measurement value reference ranges RQ11, RQ12, . . . include a measurement value designation range RQ1T and a measurement value application range RQ1U.

The clock time designation interval HR1ET and the clock time application interval HR1EU are respectively represented by the measurement value designation range RQ1T and the measurement value application range RQ1U.

In some embodiments, the plurality of different memory locations YS81, YS82, . . . are respectively identified based on the plurality of different measurement value reference range codes EL11, EL12, . . . . For example, the plurality of different memory locations YS81, YS82, . . . are respectively identified based on a plurality of memory addresses AS81, AS82, . . . , or are respectively identified by the plurality of memory addresses AS81, AS82, . . . . The plurality of memory addresses AS81, AS82, . . . are respectively defaulted based on the plurality of different measurement value reference range codes EL11, EL12, . . . .

For example, the clock time TH1A is further characterized based on a rated clock time interval HR1E. The rated clock time interval HR1E includes the plurality of different clock time reference intervals HR1E1, HR1E2, . . . , and is represented by a rated measurement value range HR1N. The rated measurement value range HR1N includes the plurality of different measurement value reference ranges RQ11, RQ12, . . . , and is defaulted in the designated measurement value format HH95 based on the rated clock time interval HR1E and the timer specification FT21. For example, the rated clock time interval HR1E is equal to 24 hours. The rated measurement value range HR1N is a rated time value range.

For example, the measurement application function specification GAL8 includes a rated clock time interval representation GA8HE and a clock time reference interval representation GA8HR. The rated clock time interval representation GA8HE is used to indicate the rated clock time interval HR1E. The clock time reference interval representation GA8HR is used to indicate the plurality of different clock time reference intervals HR1E1, HR1E2, . . . . The rated measurement value range HR1N is equal to at least a second portion of the full measurement value range QK8E, and is defaulted in the designated measurement value format HH95 based on one selected from a group consisting of the timer specification FT21, the measurement application function specification GAL8 and the first data coding rule WX8HE. The first data coding rule WX8HE is used to convert the rated clock time interval representation GA8HE, and is formulated based on the timer specification FT21. For example, the rated measurement value range HR1N is defaulted by performing a data coding operation ZX8HE using the first data coding rule WX8HE.

The plurality of different measurement value reference ranges RQ11, RQ12, . . . are defaulted in the designated measurement value format HH95 based on one selected from a group consisting of the timer specification FT21, the measurement application function specification GAL8 and a data coding rule WX8HR. The data coding rule WX8HR is used to convert the clock time reference interval representation GA8HR, and is formulated based on the timer specification FT21. For example, the plurality of different measurement value reference ranges RQ11, RQ12, . . . are defaulted by performing a data coding operation ZX8HR using the data coding rule WX8HR.

In some embodiments, the plurality of physical parameter designation range codes UQ11, UQ12, . . . are configured to be respectively stored based on the plurality of different measurement value reference range codes EL11, EL12, . . . , and include a physical parameter target range code UQ1T and a physical parameter target range code UQ1U. Each of the plurality of physical parameter designation range codes UQ11, UQ12, . . . is selected from the plurality of different physical parameter reference state codes EW11, EW12, For example, the physical parameter target range code UQ1U is a physical parameter candidate range code.

The physical parameter target range code UQ1T denotes a physical parameter target range RD1ET in which the variable physical parameter QU1A is expected to be within the clock time designation interval HR1ET, and is configured to be stored at a memory location YS8T based on the measurement value designation range code EL1T. The memory location YS8T is identified based on a memory address ASST. Each of the plurality of different measurement value reference range codes EL11, EL12, . . . is defaulted based on the measurement application function specification GAL8. For example, the physical parameter target range code UQ1T is equal to the defaulted physical parameter application state code EW1T. The physical parameter target range code UQ1U is equal to the physical parameter target state code EW1U.

The physical parameter target range code UQ1U denotes a physical parameter target range RD1EU in which the variable physical parameter QU1A is expected to be within the clock time application interval HR1EU, and is configured to be stored at a memory location YS8U based on the measurement value application range code EL1U. The memory location YS8U is identified based on a memory address AS8U. Each of the physical parameter target range RD1ET and the physical parameter target range RD1EU is selected from the plurality of different physical parameter reference ranges RD1E1, RD1E2, . . . . For example, the clock time application interval HR1EU is adjacent to the clock time designation interval HR1ET. The physical parameter target range code UQ1U is equal to the physical parameter target state code EW1U. The physical parameter target range RD1EU has a defaulted physical parameter target range limit ZD1U1 and a defaulted physical parameter target range limit ZD1U2 being opposite to the defaulted physical parameter target range limit ZD1U1.

In some embodiments, when the receiving unit 337 receives the control signal SC81, the physical parameter target range code UQ1T is equal to the defaulted physical parameter application state code EW1T. The control signal SC81 carries the defaulted measurement value designation range code EL1T. The processing unit 331 obtains the carried measurement value designation range code EL1T from the control signal SC81, obtains the memory address AS8T based on obtained the measurement value designation range code EL1T, and accesses the physical parameter target range code UQ1T, stored at the memory location YS8T, based on the obtained memory address AS8T to obtain one of the physical parameter target range code UQ1T and the defaulted physical parameter application state code EW1T. For example, the clock time designation interval HR1ET and the clock time application interval HR1EU have a defaulted time interval therebetween.

For example, under a condition that the physical parameter target range code UQ1T is equal to the defaulted physical parameter application state code EW1T, the control signal SC81 serves to indicate the physical parameter application state JE1T by carrying the defaulted measurement value designation range code EL1T. When the receiving unit 337 receives the control signal SC81, the variable physical parameter QU1A is in a physical parameter application state JE1L. The processing unit 331 performs a physical parameter relation check control GX8T, used to check a physical parameter relation KD9T between the variable physical parameter QU1A and the physical parameter application state JE1T, based on the obtained physical parameter application state code EW1T. For example, the control signal SC81 serves to indicate at least one of the clock time designation interval HR1ET and the measurement value designation range RQ1T by carrying the defaulted measurement value designation range code EL1T, and serves to indicate the physical parameter application state JE1T by serving to indicate the clock time designation interval HR1ET.

In some embodiments, under a condition that the physical parameter application state JE1L is different from the physical parameter application state JE1T and the processing unit 331 determines a physical parameter state difference DT8T between the physical parameter application state JE1T and the physical parameter application state JE1L by performing the physical parameter relation check control GX8T, the processing unit 331 performs a signal generation control GY81 based on the obtained physical parameter application state code EW1T to generate an operation signal SG81, and transmits the operation signal SG81 toward the physical parameter application unit 335. The physical parameter application unit 335 causes the variable physical parameter QU1A to enter the physical parameter application state JE1T from the physical parameter application state JE1L in response to the operation signal SG81. For example, the variable physical parameter QU1A enters the physical parameter application state JE1T by entering the physical parameter target range RD1ET.

The processing unit 331 performs a data storage control operation GM8T based on the obtained measurement value designation range code EL1T, wherein the data storage control operation GM8T is used to cause a clock time application interval code UF8T, denoting the clock time designation interval HR1ET, to be stored. For example, the clock time application interval code UF8T is equal to the obtained measurement value designation range code EL1T. The data storage control operation GM8T assigns the clock time application interval code UF8T to the variable clock time interval code UF8A by using the storage unit 332.

For example, the storage unit 332 stores a variable physical parameter range code UN8A. Under a condition that the physical parameter application state JE1L is different from the physical parameter application state JE1T and the processing unit 331 determines the physical parameter state difference DT8T by performing the physical parameter relation check control GX8T, the processing unit 331 assigns one of the obtained physical parameter target range code UQ1T and the obtained physical parameter application state code EW1T to the variable physical parameter range code UN8A by using the storage unit 332.

In some embodiments, the timer 342 is configured to represent the clock time designation interval HR1ET by using the measurement value designation range RQ1T, and is configured to represent the clock time application interval HR1EU by using the measurement value application range RQ1U. The control signal SC81 further carries the measurement time length value VH8T denoting the designated time length LH8T, and a clock reference time value NR81 denoting a clock reference time TR81. For example, the clock reference time TR81 is close to a current time. For example, a time difference between the clock reference time TR81 and the current time is less than a defaulted time length. The clock reference time value NR81 is defaulted in the designated measurement value format HH95 based on the clock reference time TR81 and the timer specification FT21.

The measurement value designation range RQ1T has the designated range limit value pair DQ1T. The designated range limit value pair DQ1T includes a designated range limit value DQ13 and a designated range limit value DQ14 being opposite to the designated range limit value DQ13. For example, the designated range limit value DQ13 and the designated range limit value DQ14 are a beginning range limit value and an end range limit value respectively. The designated range limit value DQ13 is equal to the clock reference time value NR81.

The control signal SC81 carries a control message CG81. The control message CG81 includes the measurement value designation range code EL1T, the clock reference time value NR81 and the measurement time length value VH8T. For example, the measurement application function specification GAL8 includes a time length representation GA8TR. The time length representation GA8TR is used to indicate the clock reference time TR81. The clock reference time value NR81 is defaulted in the designated measurement value format HH95 based on the time length representation GA8TR, the timer specification FT21 and a data coding operation ZX8TR used to convert the time length representation GA8TR.

The control device 212 includes an operation unit 297. The processing unit 331 obtains the measurement value designation range code EL1T, the clock reference time value NR81 and the clock reference time value NR81 from the control signal SC81 in response to the control signal SC81. For example, the operation unit 297 is configured to obtain the defaulted measurement value designation range code EL1T, the defaulted clock reference time value NR81 and the defaulted measurement time length value VH8T, and outputs the control signal SC81 carrying the control message CG81 based on the obtained clock reference time value NR81, the obtained measurement value designation range code EL1T and the obtained measurement time length value VH8T.

In some embodiments, the processing unit 331 causes the timer 342 to start within a starting time TT82 based on the obtained clock reference time value NR81, and thereby causes the timer 342 to generate a sense signal SY80 within the starting time TT82 by sensing the clock time TH1A. For example, the sense signal SY80 is a clock time signal. The sense signal SY80 is an initial time signal, and carries a measured value NY80 in the designated measurement value format HH95. For example, the measured value NY80 is an initial count value. For example, the measured value NY80 is equal to the clock reference time value NR81.

For example, the timer 342 is configured to have a variable count value NY8A. Under a condition that the receiving unit 337 receives from the control device 212 the control signal SC81 carrying the clock reference time value NR81, the processing unit 331 starts the timer 342 based on the obtained clock reference time value NR81 to perform a counting operation BD81 for the measurement application function FA81 to change the variable count value NY8A. The variable count value NY8A is configured to be equal to the measured value NY80 within the starting time TT82, and is provided in the designated measurement value format HH95. For example, the measured value NY80 is configured to be equal to the obtained clock reference time value NR81.

Under a condition that the variable physical parameter QU1A is configured to be within the physical parameter target range RD1ET based on the control signal SC81, the processing unit 331 arrives an operation time TY81 based on the counting operation BD81. Within the operation time TY81, the timer 342 senses the clock time TH1A to cause the variable count value NY8A being equal to a measured value NY81, and thereby generates a sense signal SY81 carrying the measured value NY81. For example, the operation time TY81 is a designated time.

For example, the trigger application unit 387 provides the operation request signal SJ81 to the processing unit 331 in response to the trigger event JQ81, and thereby causes the processing unit 331 to receive the operation request signal SJ81. The processing unit 331 obtains the measured value NY81 in the designated measurement value format HH95 from the sense signal SY81 within the operation time TY81 in response to the operation request signal SJ81, and obtains or determines the measurement value application range code EL1U within the operation time TY81 by performing a scientific calculation MH85 using the obtained measurement value designation range code EL1T in order to check the physical parameter relation KD9U between the variable physical parameter QU1A and the physical parameter target state JE1U.

In some embodiments, the measurement value designation range RQ1T has the designated range limit value pair DQ1T. The designated range limit value pair DQ1T includes the designated range limit value DQ13 and the designated range limit value DQ14 being opposite to the designated range limit value DQ13. Each of the measurement value designation range RQ1T and the designated range limit value pair DQ1T is defaulted in the designated measurement value format HH95 based on the clock time designation interval HR1ET and the timer specification FT21. The measurement value application range RQ1U has the application range limit value pair DQ1U. The application range limit value pair DQ1U includes the first application range limit value DQ15 and the second application range limit value DQ16 being opposite to the first application range limit value DQ15. Each of the measurement value application range RQ1U and the application range limit value pair DQ1U is defaulted in the designated measurement value format HH95 based on the clock time application interval HR1EU and the timer specification FT21.

For example, the measurement application function specification GAL8 includes a clock time designation interval representation GA8HT and a clock time application interval representation GA8HU. The clock time designation interval representation GA8HT is used to indicate the clock time designation interval HR1ET. The clock time application interval representation GA8HU is used to indicate the clock time application interval HR1EU. Each of the measurement value designation range RQ1T and the designated range limit value pair DQ1T is defaulted in the designated measurement value format HH95 based on the clock time designation interval representation GA8HT, the timer specification FT21 and a data coding operation ZX8HT used to convert the clock time designation interval representation GA8HT. Each of the measurement value application range RQ1U and the application range limit value pair DQ1U is defaulted in the designated measurement value format HH95 based on the clock time application interval representation GA8HU, the timer specification FT21 and a data coding operation ZX8HU used to convert the clock time application interval representation GA8HU.

In some embodiments, the processing unit 331 determines the measurement value application range code EL1U within the operation time TY81 based on the control signal SC81 in order to check the physical parameter relation KD9U between the variable physical parameter QU1A and the physical parameter target state JE1U. For example, the processing unit 331 determines the measurement value application range code EL1U within the operation time TY81 based on the control signal SC81 in response to the operation request signal SJ81. The processing unit 331 determines the relative value VL81 within the operation time TY81, and obtains the application range limit value pair DQ1U by performing a scientific calculation ME85 using the determined relative value VL81, the obtained measurement time length value VH8T and the obtained clock reference time value NR81.

For example, the processing unit 331 determines the relative value VL81 within the operation time TY81 in response to the operation request signal SJ81, and determines the measurement value application range code EL1U based on the determined relative value VL81 and the obtained measurement value designation range code EL1T. The processing unit 331 checks the mathematical relation KQ81 based on the data comparison CF81 between the obtained measured value NY81 and the obtained application range limit value pair DQ1U to make the logical decision PQ81 on whether the measured value NY81 is within the selected measurement value application range RQ1U. Under a condition that the logical decision PQ81 is positive, the processing unit 331 determines the clock time application interval HR1EU which the clock time TH1A is currently in.

Under a condition that the obtained measurement value designation range code EL1T is different from the determined measurement value application range code EL1U and the processing unit 331 determines the clock time application interval HR1EU which the clock time TH1A is currently in by making the logical decision PQ81, the processing unit 331 performs the data storage control operation GM8U based on a code difference DG83 between the variable clock time interval code UF8A, being equal to the measurement value designation range code EL1T, and the determined measurement value application range code EL1U. The data storage control operation GM8U uses the storage unit 332 to assign the determined measurement value application range code EL1U to the variable clock time interval code UF8A.

In some embodiments, when the trigger event JQ81 occurs, the physical parameter target range code UQ1U is equal to the defaulted physical parameter target state code EW1U. Under a condition that the trigger event JQ81 occurs, the processing unit 331 determines the measurement value application range code EL1U based on the control signal SC81 in response to the operation request signal SJ81. Under a condition that the processing unit 331 determines the clock time application interval HR1EU which the clock time TH1A is currently in by making the logical decision PQ81, the processing unit 331 obtains the memory address AS8U based on the determined measurement value application range code EL1U, and accesses the physical parameter target range code UQ1U, stored at the memory location YS8U, based on the obtained memory address AS8U to obtain one of the physical parameter target range code UQ1U and the defaulted physical parameter target state code EW1U.

For example, when the processing unit 331 checks the mathematical relation KQ81, the variable physical parameter QU1A is in the physical parameter application state JE1T. The processing unit 331 performs the physical parameter relation check control GX8U, used to check the physical parameter relation KD9U between the variable physical parameter QU1A and the physical parameter target state JE1U, based on the obtained physical parameter target state code EW1U. Under a condition that the physical parameter application state JE1T is different from the physical parameter target state JE1U and the processing unit 331 determines the physical parameter state difference DT81 between the physical parameter target state JE1U and the physical parameter application state JE1T by performing the physical parameter relation check control GX8U, the processing unit 331 performs the signal generation control GY85 based on the obtained physical parameter target state code EW1U to generate the operation signal SG85, and transmits the operation signal SG85 toward the physical parameter application unit 335.

The physical parameter application unit 335 causes the variable physical parameter QU1A to enter the physical parameter target state JE1U from the physical parameter application state JE1T in response to the operation signal SG85. For example, the variable physical parameter QU1A enters the physical parameter target state JE1U by entering the physical parameter target range RD1EU. For example, under a condition that the physical parameter application state JE1T is different from the physical parameter target state JE1U and the processing unit 331 determines the physical parameter state difference DT81 by performing the physical parameter relation check control GX8U, the processing unit 331 assigns one of the obtained physical parameter target range code UQ1U and the obtained physical parameter target state code EW1U to the variable physical parameter range code UN8A by using the storage unit 332.

In some embodiments, the control device 212 includes the operation unit 297 and a state-change detector 475 coupled to the operation unit 297. The plurality of physical parameter designation range codes UQ11, UQ12, . . . belong to a physical parameter designation range code type TS81. The physical parameter designation range code type TS81 is identified by a physical parameter designation range code type identifier HS81. The physical parameter designation range code type identifier HS81 is defaulted. The memory address AS8T based on the defaulted physical parameter designation range code type identifier HS81 and the defaulted measurement value designation range code EL1T is defaulted. The memory address AS8U is defaulted based on the defaulted physical parameter designation range code type identifier HS81 and the defaulted measurement value application range code EL1U. For example, the state-change detector 475 is used to cause the operation unit 297 to transmit the control signal SC81 toward the receiving unit 337.

Before the receiving unit 337 receives the control signal SC81, the operation unit 297 is configured to fetch the defaulted physical parameter target range code UQ1T, the defaulted physical parameter designation range code type identifier HS81 and the defaulted measurement value designation range code EL1T, and fetches the memory address AS8T beforehand based on the fetched physical parameter designation range code type identifier HS81 and the fetched measurement value designation range code EL1T. The operation unit 297 provides a writing request message WS8T to the receiving unit 337 based on the fetched physical parameter target range code UQ1T and the fetched memory address AS8T. The writing request message WS8T includes the fetched physical parameter target range code UQ1T and the fetched memory address AS8T.

For example, before the receiving unit 337 receives the control signal SC81, the receiving unit 337 receives the writing request message WS8T from the operation unit 297. The processing unit 331 obtains the included physical parameter target range code UQ1T and the included memory address AS8T from the received writing request message WS8T, and uses the storage unit 332 to store the obtained physical parameter target range code UQ1T at the memory location YS8T based on the obtained physical parameter target range code UQ1T and the obtained memory address AS8T.

Before the receiving unit 337 receives the control signal SC81, the operation unit 297 is configured to fetch the physical parameter target range code UQ1U and the defaulted measurement value application range code EL1U, and fetches the memory address AS8U beforehand based on the fetched physical parameter designation range code type identifier HS81 and the fetched measurement value application range code EL1U. The processing unit 331 provides a writing request message WS8U to the receiving unit 337 based on the fetched physical parameter target range code UQ1U and the fetched memory address AS8U. The writing request message WS8U includes the fetched physical parameter target range code UQ1U and the fetched memory address AS8U.

For example, before the receiving unit 337 receives the control signal SC81, the receiving unit 337 receives the writing request message WS8U from the operation unit 297. The processing unit 331 obtains the included physical parameter target range code UQ1U and the included memory address AS8U from the received writing request message WS8U, and uses the storage unit 332 to store the obtained physical parameter target range code UQ1U at the memory location YS8U based on the obtained physical parameter target range code UQ1U and the obtained memory address AS8U.

Figure 13:
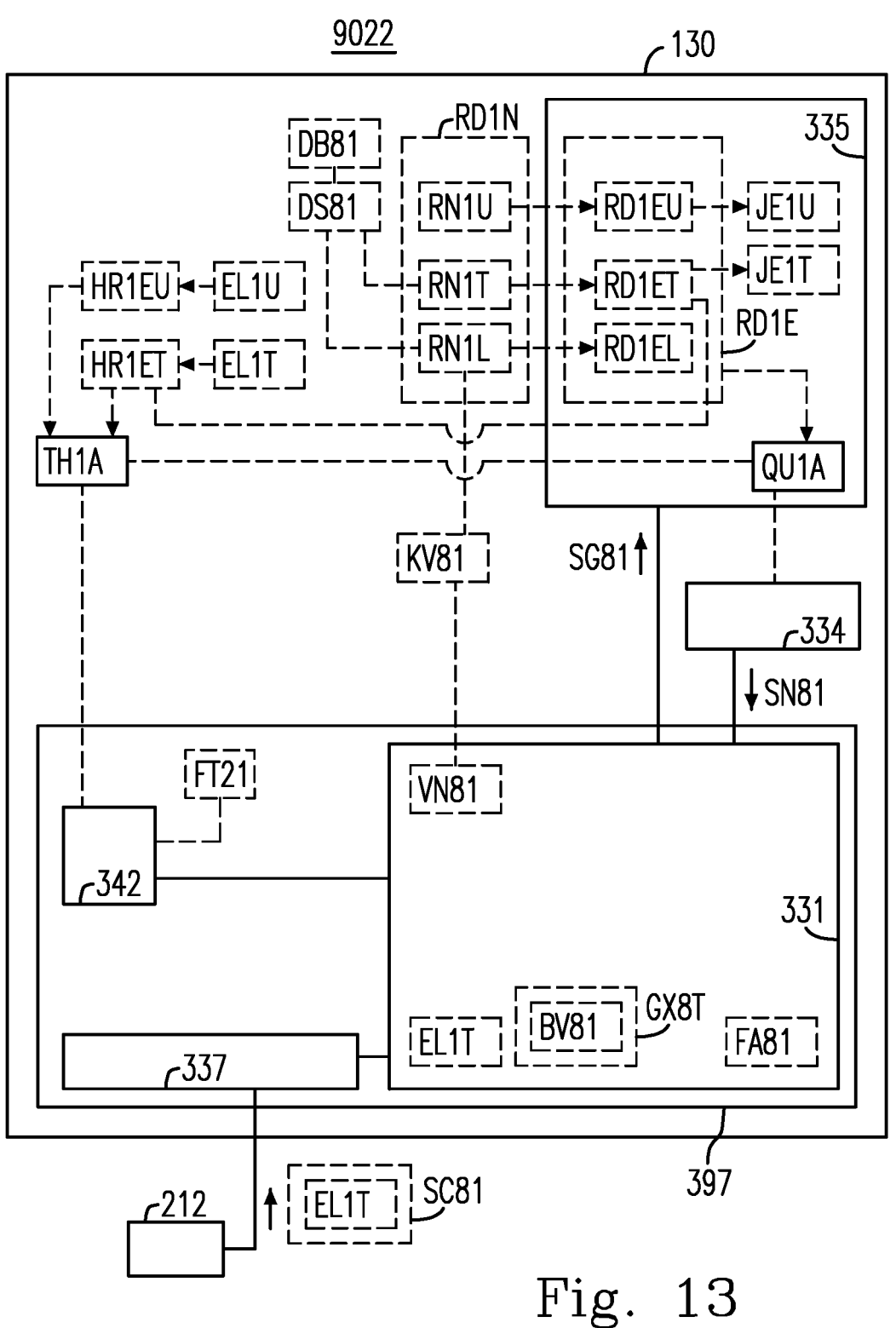
FIG. 13 is a schematic diagram showing an implementation structure of the control system shown in FIG. 1.
Figure 14:
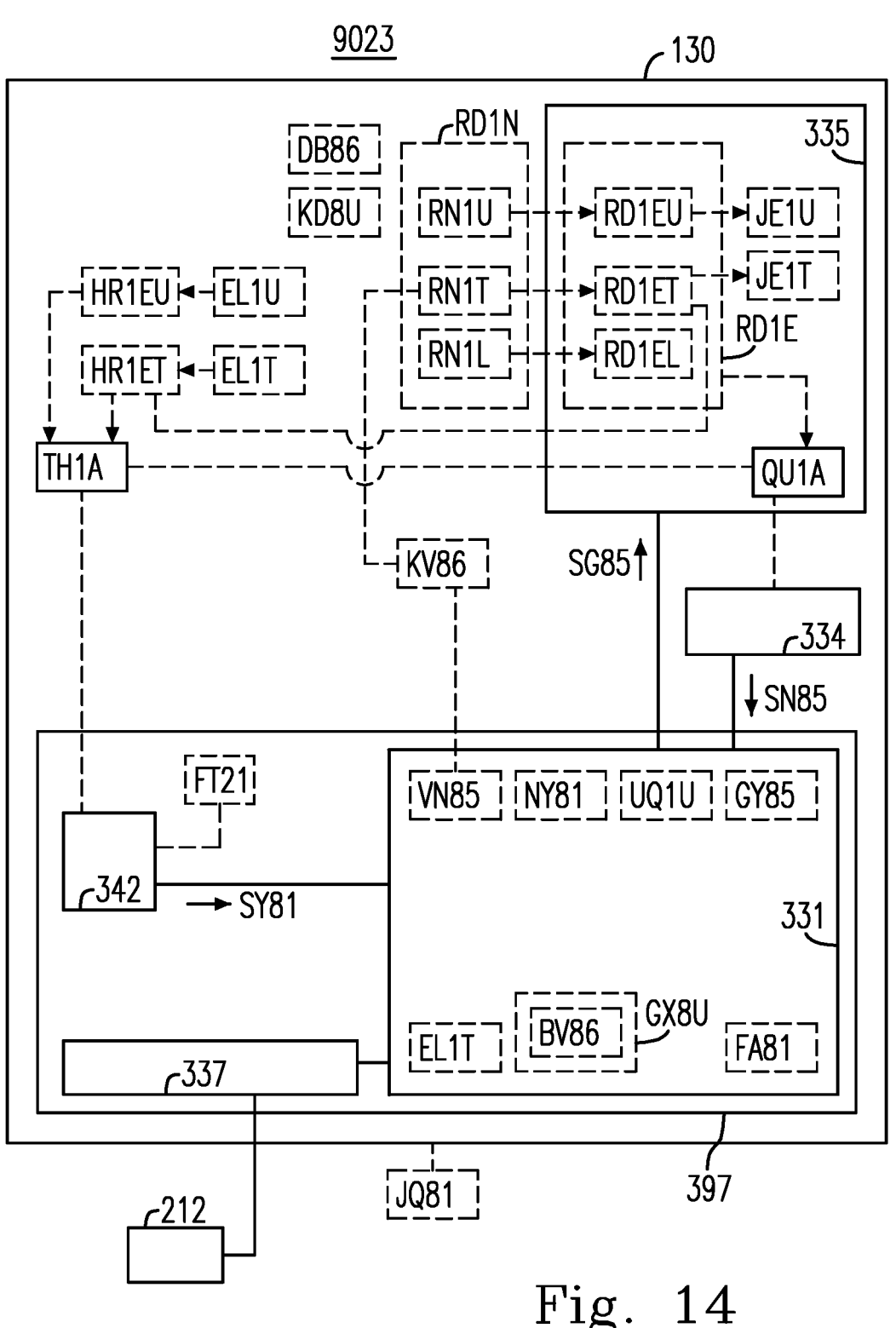
FIG. 14 is a schematic diagram showing an implementation structure of the control system shown in FIG. 1.

Please refer to FIG. 13 and FIG. 14. FIG. 13 is a schematic diagram showing an implementation structure 9022 of the control system 901 shown in FIG. 1. FIG. 14 is a schematic diagram showing an implementation structure 9023 of the control system 901 shown in FIG. 1. As shown in FIG. 13 and FIG. 14, each of the implementation structure 9022 and the implementation structure 9023 includes the control device 212 and the functional device 130. The functional device 130 includes an operation unit 397, the physical parameter application unit 335, the storage unit 332 and a sensing unit 334 coupled to the processing unit 331. The operation unit 397 includes the processing unit 331, the receiving unit 337 and the timer 342. Each of the receiving unit 337, the timer 342, the physical parameter application unit 335, the storage unit 332 and the sensing unit 334 is controlled by the processing unit 331.

In some embodiments, the variable physical parameter QU1A is further characterized based on a physical parameter target range RD1ET and a physical parameter application range RD1EL being different from the physical parameter target range RD1ET. The physical parameter application range RD1EL is represented by a measurement value application range RN1L. The sensing unit 334 senses the variable physical parameter QU1A to generate a sense signal SN81. Under a condition that the receiving unit 337 receives the control signal SC81 serving to indicate the physical parameter target range RD1ET, the processing unit 331 obtains a measured value VN81 in response to the sense signal SN81. For example, the measured value VN81 is a physical parameter measured value. When the receiving unit 337 receives the control signal SC81, the sensing unit 334 senses the variable physical parameter QU1A to generate the sense signal SN81.

Under a condition that the processing unit 331 determines the physical parameter application range RD1EL which the variable physical parameter QU1A is currently in by checking a mathematical relation KV81 between the measured value VN81 and the measurement value application range RN1L, the processing unit 331 causes the variable physical parameter QU1A to enter the physical parameter target range RD1ET based on the control signal SC81. For example, under a condition that the processing unit 331 determines the physical parameter application range RD1EL which the variable physical parameter QU1A is currently in, the processing unit 331 transmits an operation signal SG81 toward the physical parameter application unit 335 based on the control signal SC81. The operation signal SG81 is used to cause the variable physical parameter QU1A to enter the physical parameter target range RD from the physical parameter application range RD1EL which the variable physical parameter QU1A is currently in.

In some embodiments, the clock time designation interval HR1ET is associated with the physical parameter target range RD1ET. The control signal SC81 serves to indicate the physical parameter target range RD1ET by serving to indicate the clock time designation interval HR1ET. For example, the control signal SC81 causes the processing unit 331 to obtain the physical parameter application state code EW1T by carrying the measurement value designation range code EL1T to serve to indicate the physical parameter target range RD1ET. Under a condition that the processing unit 331 determines the physical parameter application range RD1EL which the variable physical parameter QU1A is currently in, the processing unit 331 determines a range difference DB81 between the physical parameter target range RD1ET and the physical parameter application range RD1EL based on the control signal SC81 to transmit the operation signal SG81 toward the physical parameter application unit 335.

The physical parameter application state JE1T is determined beforehand according to the physical parameter target range RD1ET. The operation signal SG81 is used to cause the variable physical parameter QU1A to enter the physical parameter application state JE1T. The clock time designation interval HR1ET is adjacent to the clock time application interval HR1EU. Under a condition that the clock time TH1A is in the clock time designation interval HR1ET, the variable physical parameter QU1A is in one of the physical parameter target range RD1ET and the physical parameter application state JE1T. The processing unit 331 starts the timer 342 in response to the control signal SC81 to cause the timer 342 to sense the clock time TH1A within the clock time designation interval HR1ET, and thereby causes the timer 342 to sense the clock time TH1A within the clock time application interval HR1EU.

In some embodiments, the physical parameter target range RD1ET is represented by a measurement value target range RN1T. The control signal SC81 serves to indicate the physical parameter target range RD1ET by serving to indicate the measurement value target range RN1T. For example, the processing unit 331 determines a range difference DS81 between the measurement value target range RN1T and the measurement value application range RN1L based on the control signal SC81 to determine the range difference DB81. For example, the processing unit 331 determines the range difference DB81 by performing the physical parameter relation check control GX8T. The physical parameter relation check control GX8T includes a check operation BV81 used to check the mathematical relation KV81 between the measured value VN81 and the measurement value application range RN1L.

For example, the sensing unit 334 coupled to the operation unit 397 senses the variable physical parameter QU1A to generate the sense signal SN81. Under a condition that the operation unit 397 receives the control signal SC81, the operation unit 397 obtains the measured value VN81 in response to the sense signal SN81. Under a condition that the operation unit 397 determines the physical parameter application range RD1EL which the variable physical parameter QU1A is currently in by checking the mathematical relation KV81, the operation unit 397 causes the variable physical parameter QU1A to enter the physical parameter target range RD1ET based on the control signal SC81.

In some embodiments, the physical parameter target range RD1EU is represented by a measurement value target range RN1U. The control signal SC81 is used to cause the functional device 130 to perform the physical parameter relation check control GX8U. Under a condition that the trigger event JQ81 occurs or the processing unit 331 obtains the measured value NY81, the sensing unit 334 senses the variable physical parameter QU1A to generate a sense signal SN85. The processing unit 331 obtains a measured value VN85 in response to the sense signal SN85. Under a condition that the processing unit 331 determines or obtains the physical parameter target range code UQ1U based on the control signal SC81, the processing unit 331 performs a check operation BV86, used to check a mathematical relation KV86 between the measured value VN85 and a measurement value indication range RN1G, based on the determined physical parameter target range code UQ1U. For example, the measurement value indication range RN1G is equal to one of the measurement value target range RN1T and the measurement value target range RN1U.

Under a condition that the processing unit 331 determines a range difference DB86 between the physical parameter target range RD1ET and the physical parameter target range RD1EU based on the check operation BV86, the processing unit 331 performs the signal generation control GY85 based on the determined physical parameter target range code UQ1U to generate the operation signal SG85. The operation signal SG85 is used to control the physical parameter application unit 335 to cause the variable physical parameter QU1A to enter the physical parameter target state JE1U from the physical parameter application state JE1T within the clock time application interval HR1EU.

For example, the processing unit 331 determines the range difference DB86 by performing the physical parameter relation check control GX8U. The physical parameter relation check control GX8U includes the check operation BV86 used to check the mathematical relation KV86 between the measured value VN85 and the measurement value indication range RN1G. The processing unit 331 checks a physical parameter relation KD8U between the variable physical parameter QU1A and the physical parameter target range RD1EU by checking the mathematical relation KV86.

Figure 15:
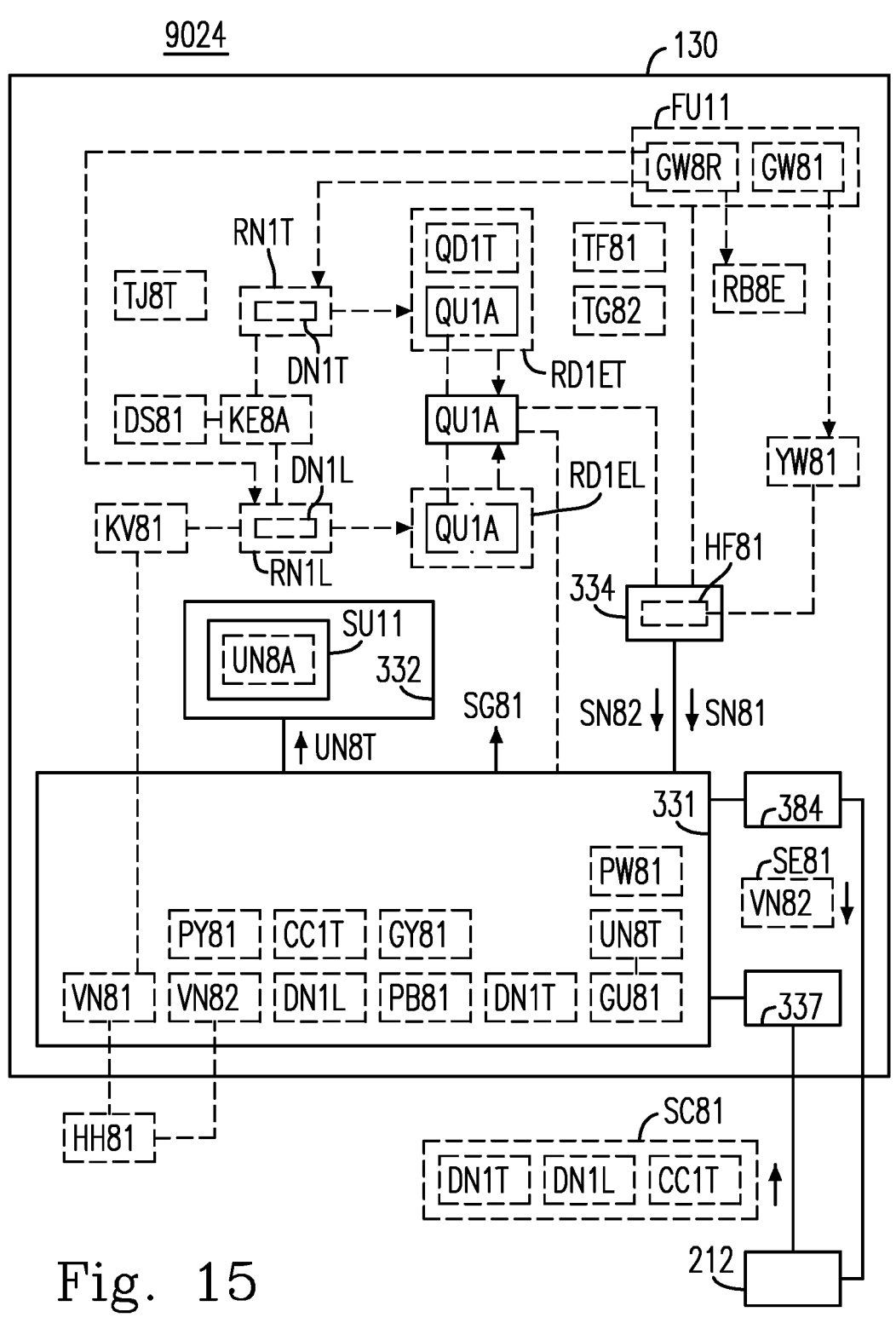
FIG. 15 is a schematic diagram showing an implementation structure of the control system shown in FIG. 1.
Figure 16:
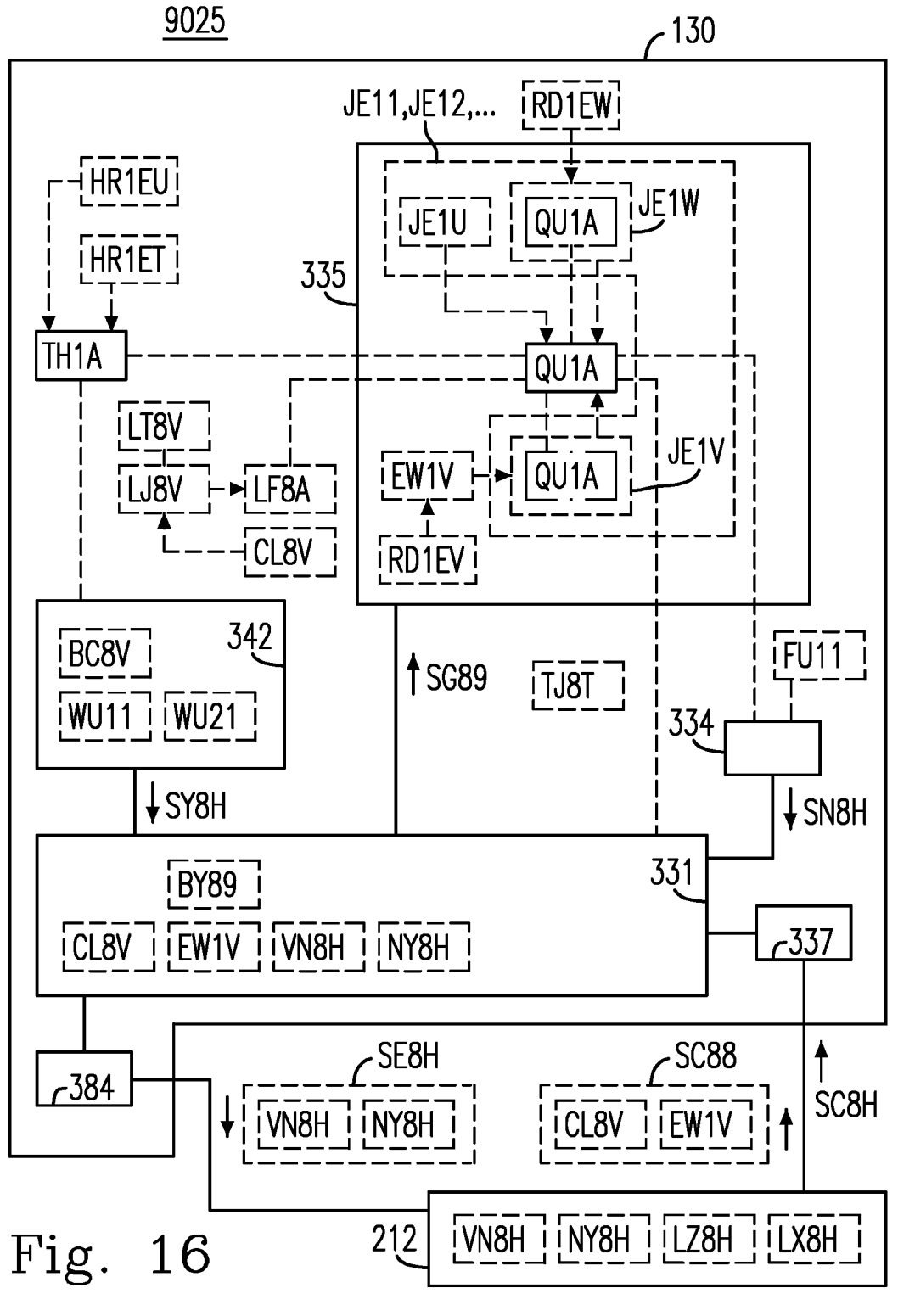
FIG. 16 is a schematic diagram showing an implementation structure of the control system shown in FIG. 1.

Please refer to FIG. 15 and FIG. 16. FIG. 15 is a schematic diagram showing an implementation structure 9024 of the control system 901 shown in FIG. 1. FIG. 16 is a schematic diagram showing an implementation structure 9025 of the control system 901 shown in FIG. 1. Please additionally refer to FIG. 13. As shown in FIG. 15 and FIG. 16, each of the implementation structure 9024 and the implementation structure 9025 includes the control device 212 and the functional device 130. In some embodiments, the sensing unit 334 is configured to meet a sensor specification FU11 associated with the measurement value application range RN1L. For example, the sensor specification FU11 includes a sensor measurement range representation GW8R used to indicate a sensor measurement range RB8E, and a sensor sensibility representation GW81 used to indicate a sensor sensibility YW81. The sensor sensibility YW81 is associated with a sense signal generation HF81 performed by the sensing unit 334. The measured value VN81 is obtained in a designated measurement value format HH81 by the processing unit 331.

Each of the measurement value target range RN1T and the measurement value application range RN1L is defaulted in the designated measurement value format HH81 based on one of the sensor measurement range representation GW8R and the sensor specification FU11. For example, each of the measurement value target range RN1T and the measurement value application range RN1L is defaulted in the designated measurement value format HH81 based on the sensor measurement range representation GW8R and the sensor sensibility representation GW81. The measurement value target range RN1T and the measurement value application range RN1L respectively have a target range limit value pair DN1T and an application range limit value pair DN1L. The control signal SC81 carries the target range limit value pair DN1T, the application range limit value pair DN1L and a handle CC1T. For example, the handle CC1T is defaulted based on a designated physical parameter QD1T being within the physical parameter target range RD1ET. The control signal SC81 serves to indicate at least one of the measurement value target range RN1T and the physical parameter target range RD1ET by carrying the target range limit value pair DN1T.

In some embodiments, the functional device 130 further includes a transmission unit 384 coupled to the processing unit 331. The transmission unit 384 is controlled by the processing unit 331. The processing unit 331 obtains the application range limit value pair DN1L from the control signal SC81, and checks the mathematical relation KV81 by comparing the measured value VN81 and the obtained application range limit value pair DN1L to make a logical decision PB81 on whether the measured value VN81 is within the measurement value application range RN1L. Under a condition that the logical decision PB81 is positive, the processing unit 331 determines the physical parameter application range RD1EL which the variable physical parameter QU1A is currently in.

The processing unit 331 obtains the target range limit value pair DN1T from the control signal SC81. Under a condition that the processing unit 331 determines the physical parameter application range RD1EL which the variable physical parameter QU1A is currently in, the processing unit 331 checks a range relation KE8A between the measurement value target range RN1T and the measurement value application range RN1L by comparing the obtained target range limit value pair DN1T and the obtained application range limit value pair DN1L to make a logical decision PY81 on whether the obtained target range limit value pair DN1T and the obtained application range limit value pair DN1L are equal.

Under a condition that the logical decision PY81 is negative, the processing unit 331 recognizes the range relation KE8A as a range difference relation to determine the range difference DS81. The processing unit 331 obtains the handle CC1T from the control signal SC81. Under a condition that the processing unit 331 determines the range difference DS81, the processing unit 331 performs a signal generation control GY81 based on the obtained handle CC1T to generate an operation signal SG81 which is used to cause the variable physical parameter QU1A to enter the physical parameter target range RD1ET. For example, the operation signal SG81 is one of a functional signal and a control signal.

In some embodiments, after the processing unit 331 performs the signal generation control GY81 within an operation time TF81, the sensing unit 334 senses the variable physical parameter QU1A to generate a sense signal SN82. The processing unit 331 obtains a measured value VN82 in the designated measurement value format HH81 in response to the sense signal SN82 within a designated time TG82 being later than the operation time TF81. Under a condition that the processing unit 331 determine within the designated time TG82 the physical parameter target range RD1ET which the variable physical parameter QU1A is currently in by comparing the measured value VN82 and the obtained target range limit value pair DN1T, the processing unit 331 causes the transmission unit 384 based on the measured value VN82 to transmit a control response signal SE81, responding to the control signal SC81, toward the control device 212, and performs a data storage control operation GU81.

The control response signal SE81 carries the measured value VN82. The data storage control operation GU81 is used to cause a physical parameter target range code UN8T, denoting the determined physical parameter target range RD1ET, to be recorded. For example, the data storage control operation GU81 is a secure operation. The processing unit 331 assigns the physical parameter target range code UN8T to the variable physical parameter range code UN8A being in the storage space SU11 by performing the data storage control operation GU81.

The timer 342 is used to measure the clock time TH1A in a timing operation mode WU21. The variable physical parameter QU1A is associated with a variable time length LF8A. For example, the timer 342 is used to measure the variable time length LF8A in a timing operation mode WU11 being different from the timing operation mode WU21. The variable time length LF8A is characterized based on a reference time length LJ8V. The reference time length LJ8V is denoted by a measurement time length value CL8V. For example, the measurement time length value CL8V is defaulted based on the timer specification FT21.

In some embodiments, the variable physical parameter QU1A is characterized based on a physical parameter target state JE1V and a physical parameter target state JE1W being different from the physical parameter target state JE1V. The physical parameter target state JE1V is equal to or different from the physical parameter target state JE1U. The physical parameter target state JE1V is denoted by a physical parameter target state code EW1V. Under a condition that the variable physical parameter QU1A is in the physical parameter target state JE1U within the clock time application interval HR1EU, the receiving unit 337 receives a control signal SC88 from the control device 212. The control signal SC88 carries the measurement time length value CL8V and the physical parameter target state code EW1V. The plurality of different physical parameter reference states JE11, JE12, . . . include the physical parameter target state JE1V and the physical parameter target state JE1W.

The processing unit 331 obtains the measurement time length value CL8V and the physical parameter target state code EW1V from the control signal SC88, stops the timer 342 in response to the control signal SC88, restarts the timer 342 based on the obtained measurement time length value CL8V, and causes the timer 342 to operate in the timing operation mode WU11 by restarting the timer 342. The timer 342 is restarted to begin an application time length LT8V matching the reference time length LJ8V, and experiences the application time length LT8V in the timing operation mode WU11 to arrive a specific time TJ8T by performing a counting operation BC8V used for the application time length LT8V.

The processing unit 331 causes the variable physical parameter QU1A to be in the physical parameter target state JE1V within the application time length LT8V based on the obtained physical parameter target state code EW1V. Under a condition that the processing unit 331 arrives the specific time TJ8T, the processing unit 331 within the specific time TJ8T performs a signal generation operation BY89 which is used to cause the variable physical parameter QU1A to leave the physical parameter target state JE1V to enter the physical parameter target state JE1W.

For example, the plurality of different physical parameter reference ranges RD1E1, RD1E2, . . . include a physical parameter target range RD1EV and a physical parameter target range RD1EW being different from the physical parameter target range RD1EV. The physical parameter target state JE1V and the physical parameter target state JE1W are respectively determined beforehand according to the physical parameter target range RD1EV and the physical parameter target range RD1EW. For example, the processing unit 331 generates an operation signal SG89, used to cause the variable physical parameter QU1A to leave the physical parameter target state JE1V to enter the physical parameter target state JE1W, by performing the signal generation operation BY89, and transmits the operation signal SG89 toward the physical parameter application unit 335.

In some embodiments, under a condition that the variable physical parameter QU1A is in the physical parameter target state JE1U within the clock time application interval HR1EU by checking the mathematical relation KQ81, the receiving unit 337 receives a control signal SC8H from the control device 212. When the receiving unit 337 receives the control signal SC8H, the sensing unit 334 senses the variable physical parameter QU1A to generate a sense signal SN8H. When the receiving unit 337 receives the control signal SC8A, the timer 342 senses the clock time TH1A to generate a sense signal SY8H.

The processing unit 331 obtains a measured value VN8H in the designated measurement value format HH81 in response to the sense signal SN8H, and obtains a measured value NY8H in the designated measurement value format HH95 in response to the sense signal SY8H. The processing unit 331 uses the measured value VN8H and the measured value NY8H in response to the control signal SC8H to cause the transmission unit 384 to transmit a control response signal SE8H, responding to the control signal SC8H, toward the control device 212. The control response signal SE8H carries the measured value VN8H and the measured value NY8H, and is used by the control device 212 to perform a specific practical operation associated with at least one of the variable physical parameter QU1A and the clock time TH1A. For example, the control device 212 receives the control response signal SE8H, obtains the measured value VN8A and the measured value NY8H from the received control response signal SE8H, displays a measurement message LZ8H associated with the variable physical parameter QU1A based on the obtained measured value VN8H, and displays a measurement message LX8H associated with the clock time TH1A based on the obtained measured value NY8H.

Figure 17:
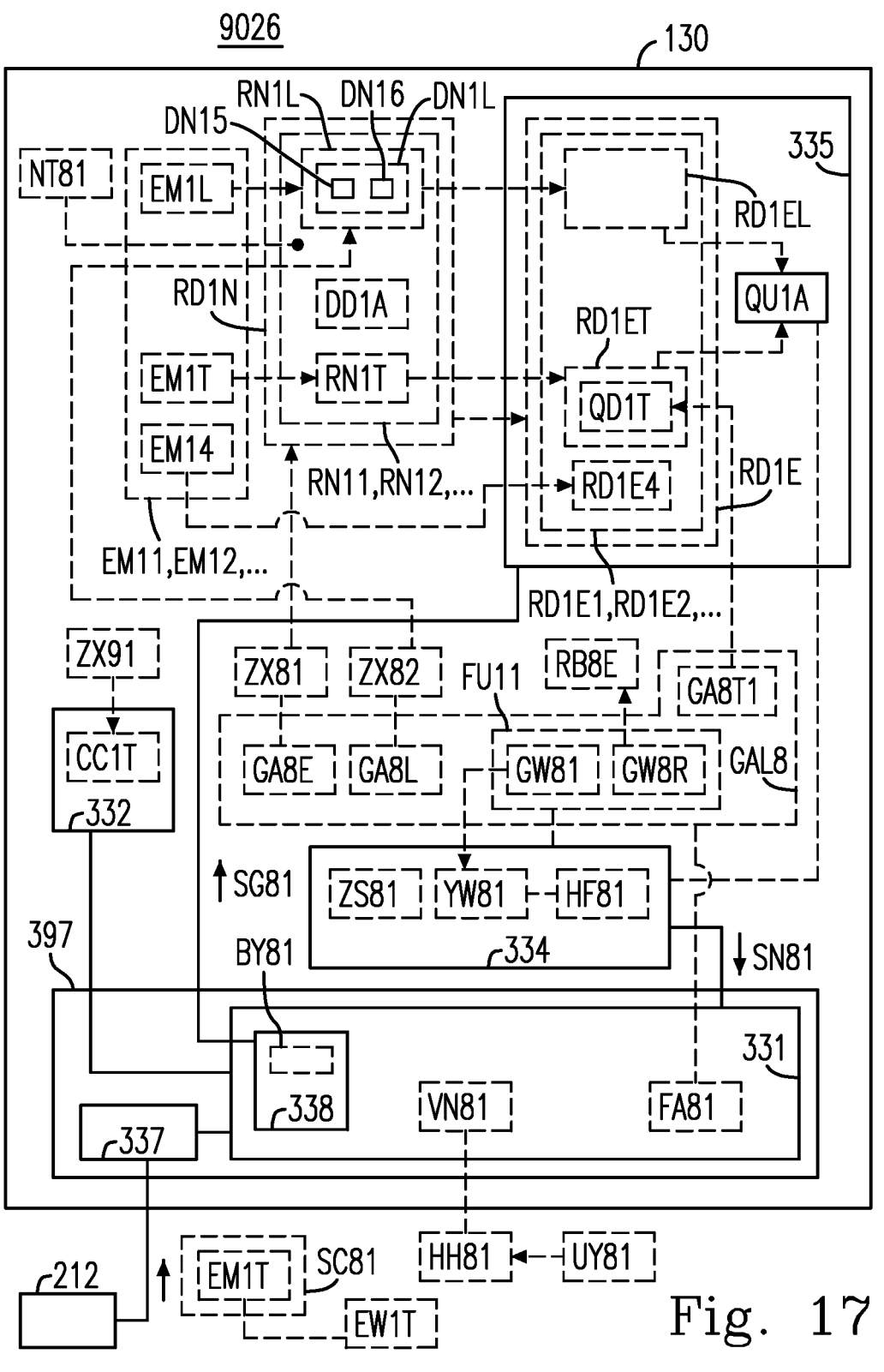
FIG. 17 is a schematic diagram showing an implementation structure of the control system shown in FIG. 1.
Figure 18:
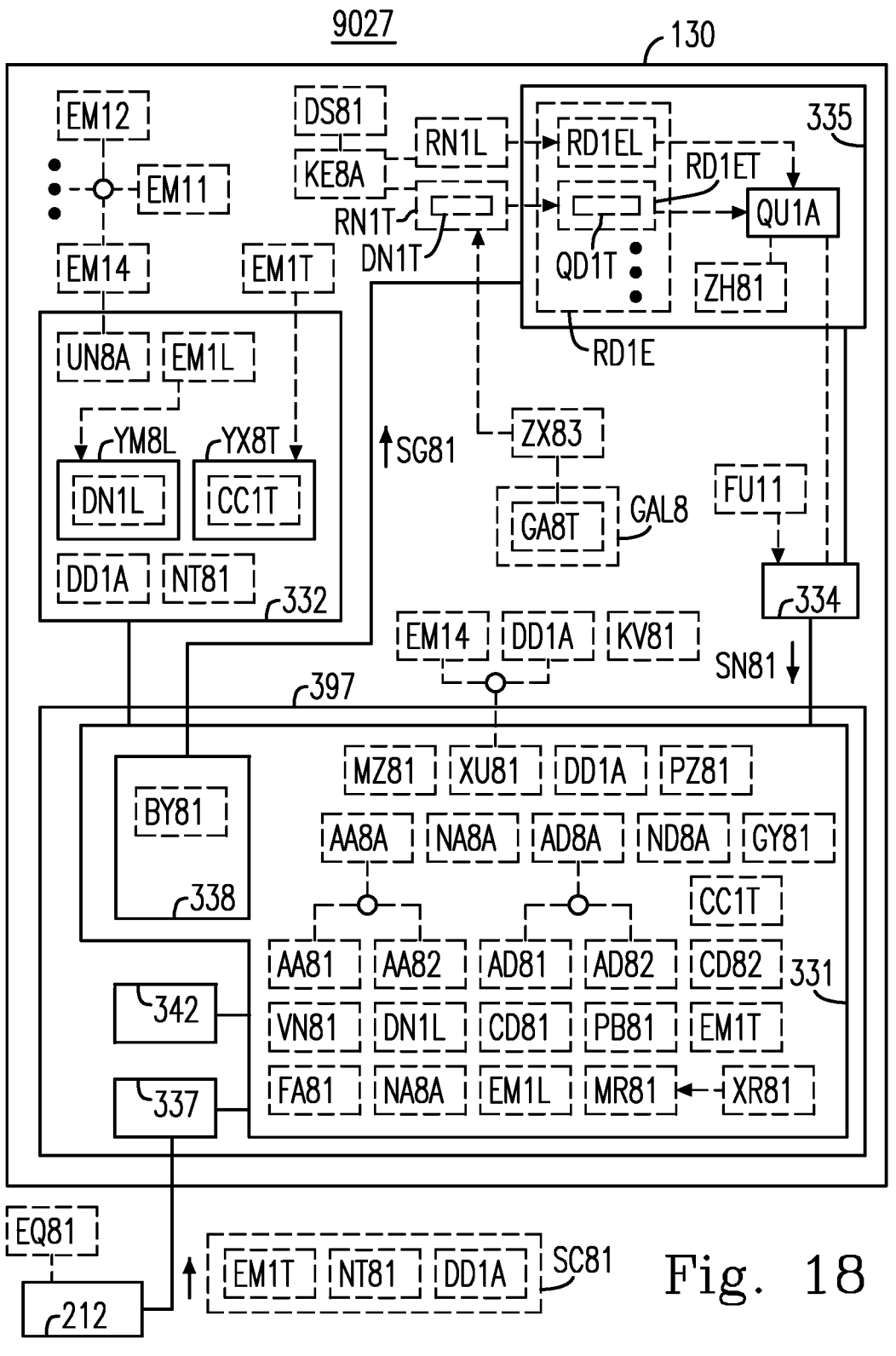
FIG. 18 is a schematic diagram showing an implementation structure of the control system shown in FIG. 1.
Figure 19:
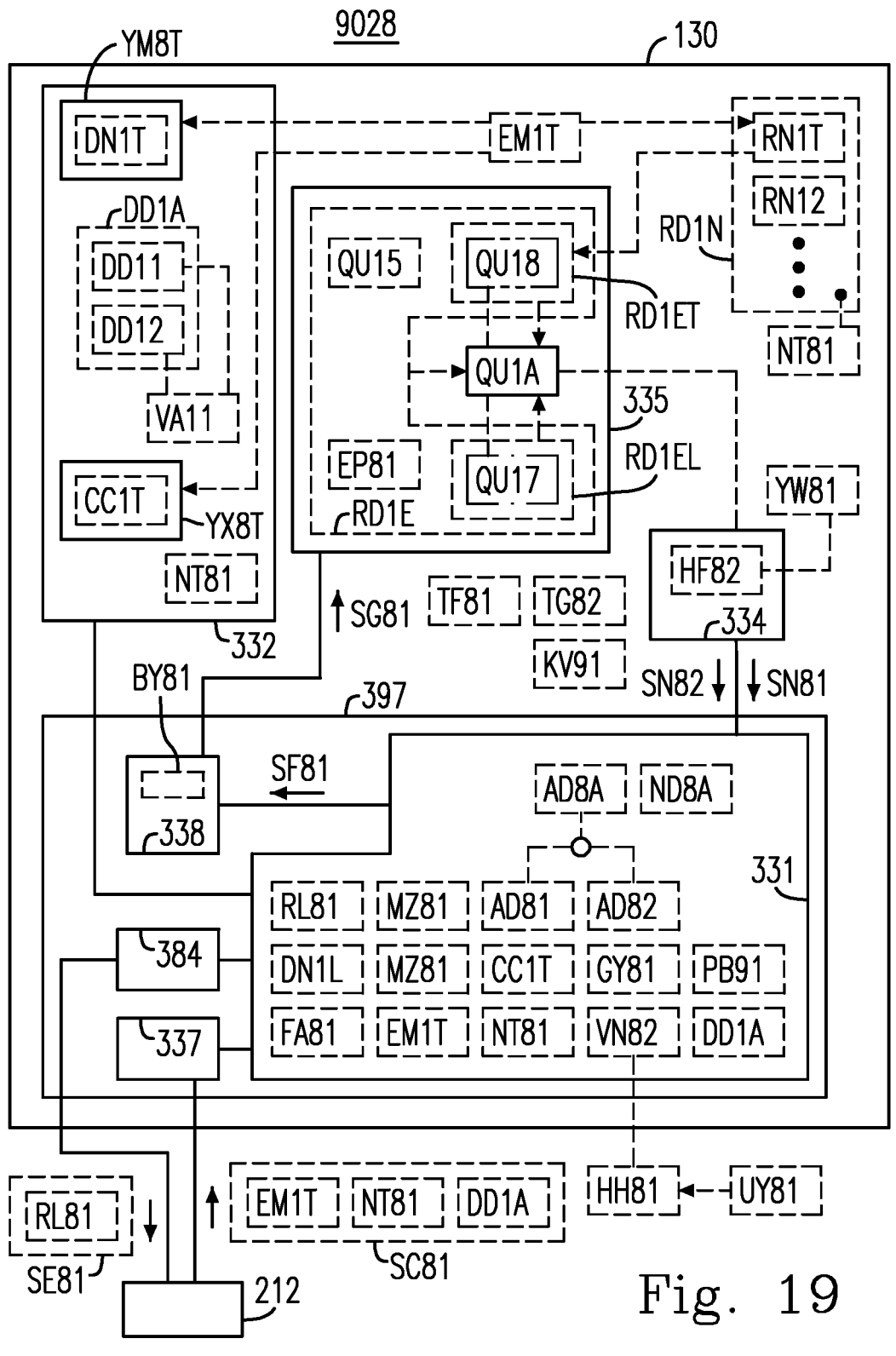
FIG. 19 is a schematic diagram showing an implementation structure of the control system shown in FIG. 1.
Figure 20:
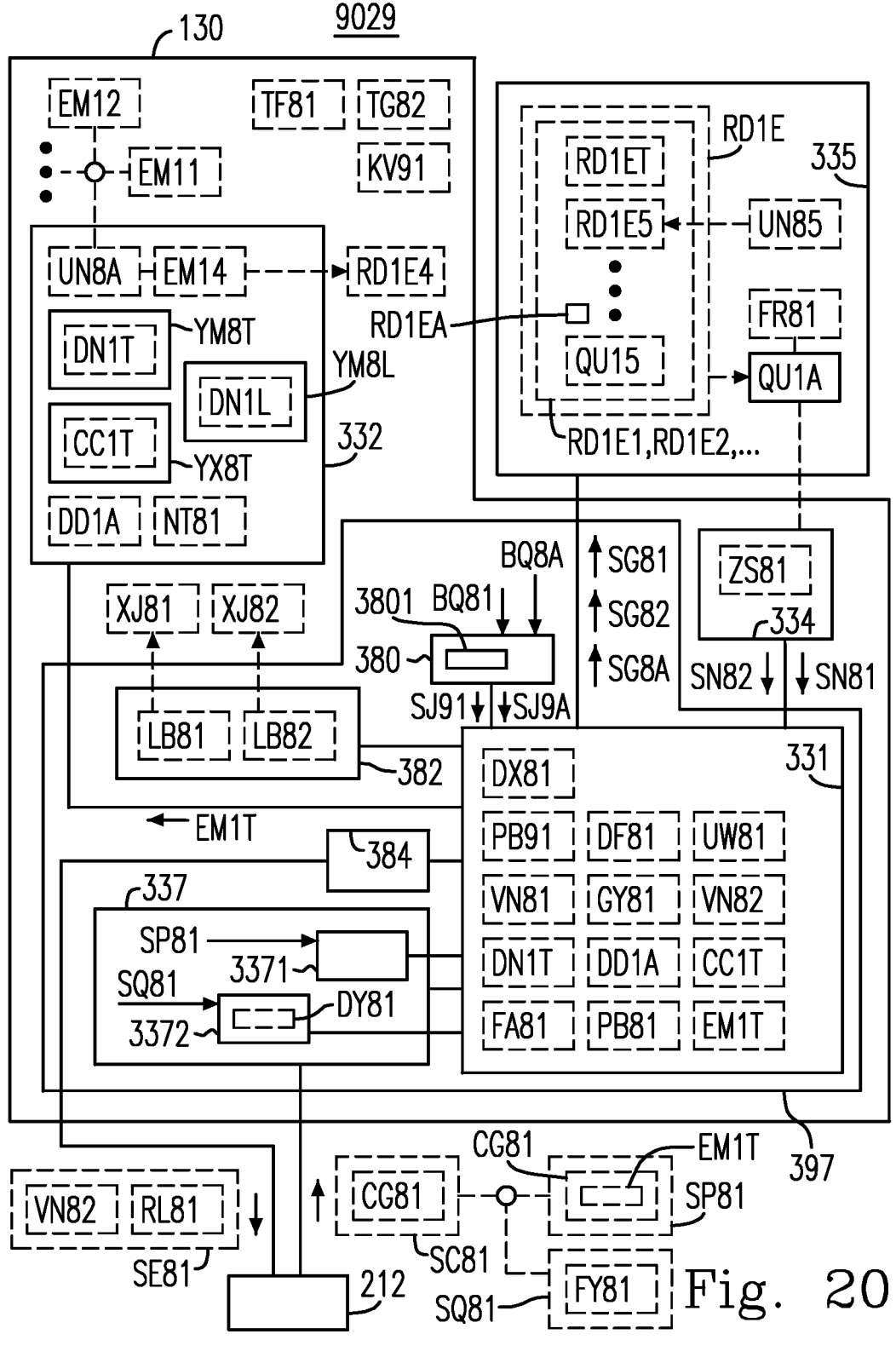
FIG. 20 is a schematic diagram showing an implementation structure of the control system shown in FIG. 1.
Figure 21:
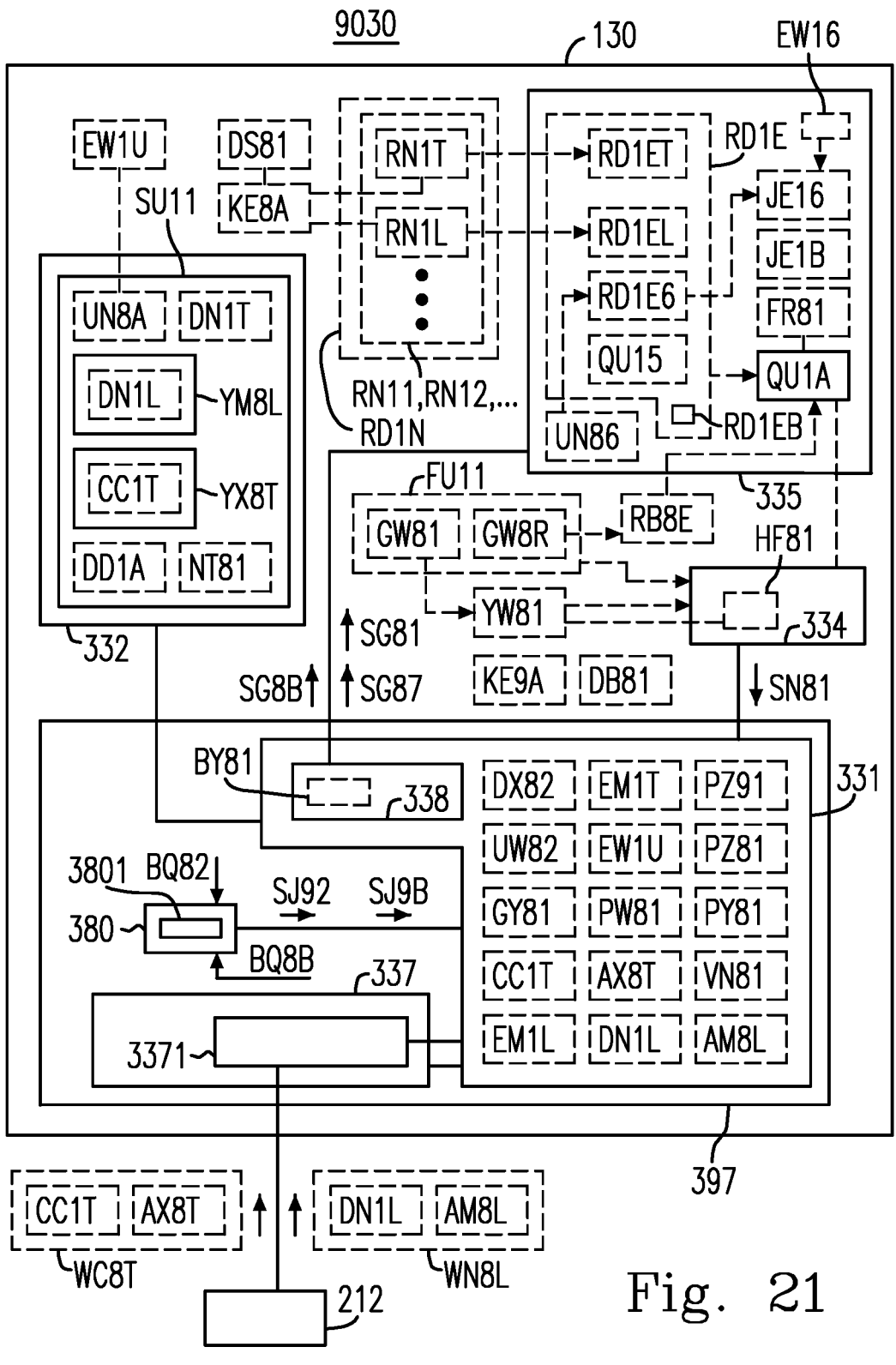
FIG. 21 is a schematic diagram showing an implementation structure of the control system shown in FIG. 1.

Please refer to FIG. 17, FIG. 18, FIG. 19, FIG. 20 and FIG. 21. FIG. 17 is a schematic diagram showing an implementation structure 9026 of the control system 901 shown in FIG. 1. FIG. 18 is a schematic diagram showing an implementation structure 9027 of the control system 901 shown in FIG. 1. FIG. 19 is a schematic diagram showing an implementation structure 9028 of the control system 901 shown in FIG. 1. FIG. 20 is a schematic diagram showing an implementation structure 9029 of the control system 901 shown in FIG. 1. FIG. 21 is a schematic diagram showing an implementation structure 9030 of the control system 901 shown in FIG. 1. As shown in FIG. 17, FIG. 18, FIG. 19, FIG. 20 and FIG. 21, each of the implementation structure 9026, the implementation structure 9027, the implementation structure 9028, the implementation structure 9029 and the implementation structure 9030 includes the control device 212 and the functional device 130.

Please additionally refer to FIG. 13. In some embodiments, the functional device 130 includes the operation unit 397, the physical parameter application unit 335, the storage unit 332 and the sensing unit 334 coupled to the processing unit 331. The operation unit 397 includes the processing unit 331, the timer 342, the receiving unit 337, an input unit 380 coupled to the processing unit 331, a display unit 382 coupled to the processing unit 331, and a transmission unit 384 coupled to the processing unit 331. Each of the physical parameter application unit 335, the storage unit 332, the sensing unit 334, the timer 342, the receiving unit 337, the input unit 380, the display unit 382 and the transmission unit 384 is controlled by the processing unit 331. For example, the physical parameter application unit 335 is disposed in the inside of the functional device 130, or is disposed in the outside of the functional device 130.

The processing unit 331 is configured to perform a measurement application function FA81 associated with the physical parameter application range RD1EL, and includes an output component 338 coupled to the physical parameter application unit 335. The measurement application function FA81 is configured to meet a measurement application function specification GAL8 associated with the physical parameter application range RD1EL. The sensing unit 334 is configured to meet a sensor specification FU11 associated with the measurement value application range RN1L. For example, the sensor specification FU11 includes a sensor measurement range representation GW8R used to indicate a sensor measurement range RB8E, and a sensor sensibility representation GW81 used to indicate a sensor sensibility YW81. The sensor sensibility YW81 is associated with a sense signal generation HF81 which is performed by the sensing unit 334.

Under a condition that the receiving unit 337 receives the control signal SC81 from a control device 212, the processing unit 331 obtains the measured value VN81 in a designated measurement value format HH81 in response to the sense signal SN81. For example, the designated measurement value format HH81 is characterized based on a designated bit number UY81. For example, when the receiving unit 337 receives the control signal SC81, the sensing unit 334 senses the variable physical parameter QU1A to perform the sense signal generation HF81 being dependent on the sensor sensibility YW81, wherein the sense signal generation HF81 is used to generate the sense signal SN81. Under a condition that the processing unit 331 determines the range difference DS81 based on the control signal SC81, the processing unit 331 uses the output component 338 to output the operation signal SG81, wherein the operation signal SG81 is used to cause the variable physical parameter QU1A to enter the physical parameter target range RD1ET.

The variable physical parameter QU1A is further characterized based on a rated physical parameter range RD1E. For example, the rated physical parameter range RD1E is represented by a rated measurement value range RD1N, and includes a plurality of different physical parameter reference ranges RD1E1, RD1E2, . . . respectively represented by a plurality of different measurement value reference ranges RN11, RN12, . . . . Each of the physical parameter target range RD1ET and the physical parameter application range RD1EL is included in the plurality of different physical parameter reference ranges RD1E1, RD1E2, . . . . The measurement application function specification GAL8 includes the sensor specification FU11, a rated physical parameter range representation GA8E used to indicate the rated physical parameter range RD1E, and a physical parameter application range representation GA8L used to indicate the physical parameter application range RD1EL.

The rated measurement value range RD1N is defaulted in the designated measurement value format HH81 based on the rated physical parameter range representation GA8E, the sensor measurement range representation GW8R and a data coding operation ZX81 used to convert the rated physical parameter range representation GA8E, has a rated range limit value pair DD1A, and includes the plurality of different measurement value reference ranges RN11, RN12, . . . respectively denoted by a plurality of different measurement value reference range codes EM11, EM12, . . . . For example, the rated range limit value pair DD1A is defaulted in the designated measurement value format HH81. The plurality of different measurement value reference ranges RN11, RN12, . . . includes the measurement value target range RN1T and the measurement value application range RN1L. Each of the rated measurement value range RD1N and the rated range limit value pair DD is defaulted in the designated measurement value format HH81 based on one of the sensor measurement range representation GW8R and the sensor specification FU11.

In some embodiments, the measurement value target range RN1T is denoted by a measurement value target range code EM1T included in the plurality of different measurement value reference range codes EM11, EM12, . . . , thereby the measurement value target range code EM1T is configured to indicate the physical parameter target range RD1ET. For example, each of the plurality of different measurement value reference range codes EM11, EM12, . . . is defaulted based on the measurement application function specification GAL8. The control signal SC81 serves to indicate at least one of the measurement value target range RN1T and the physical parameter target range RD1ET by carrying the measurement value target range code EM1T. For example, the measurement value target range code EM1T is equal to the physical parameter application state code EW1T.

The measurement value application range RN1L is denoted by a measurement value application range code EMIL included in the plurality of different measurement value reference range codes EM11, EM12, . . . , and has an application range limit value pair DN1L; thereby the measurement value application range code EMIL is configured to indicate the physical parameter application range RD1EL. For example, the application range limit value pair DN1L is defaulted in the designated measurement value format HH81 based on the physical parameter application range representation GA8L, the sensor measurement range representation GW8R and a data coding operation ZX82 used to convert the physical parameter application range representation GA8L. The measurement value application range RN1L is defaulted in the designated measurement value format HH81 based on the physical parameter application range representation GA8L, the sensor measurement range representation GW8R and the data coding operation ZX82.

In some embodiments, the storage unit 332 stores the defaulted rated range limit value pair DD1A and a variable physical parameter range code UN8A. The control signal SC81 further carry the rated range limit value pair DD1A. When the receiving unit 337 receives the control signal SC81, the variable physical parameter range code UN8A is equal to a specific measurement value range code EM14 selected from the plurality of different measurement value reference range codes EM11, EM12, . . . .

For example, the specific measurement value range code EM14 indicates a specific physical parameter range RD1E4 which is previously determined by the processing unit 331 based on a sensing operation ZS81. The specific physical parameter range RD1E4 is selected from the plurality of different physical parameter reference ranges RD1E1, RD1E2, . . . . The sensing operation ZS81 performed by the sensing unit 334 is used to sense the variable physical parameter QU1A. Before the receiving unit 337 receives the control signal SC81, the specific measurement value range code EM14 is assigned to the variable physical parameter range code UN8A.

For example, before the receiving unit 337 receives the control signal SC81, the processing unit 331 obtains the specific measurement value range code EM14. Under a condition that the processing unit 331 determines the specific physical parameter range RD1E4 based on the sensing operation ZS81 before the receiving unit 337 receives the control signal SC81, the processing unit 331 assigns the obtained specific measurement value range code EM14 to the variable physical parameter range code UN8A by using the storage unit 332. The specific measurement value range code EM14 denotes a specific measurement value range which is configured to represent the specific physical parameter range RD1E4. The specific measurement value range is defaulted in the designated measurement value format HH81 based on one of the sensor measurement range representation GW8R and the sensor specification FU11. For example, the sensing unit 334 performs a sense signal generation, being dependent on the sensor sensibility YW81, by performing the sensing operation ZS81 to generate a sense signal.

Before the receiving unit 337 receives the control signal SC81, the processing unit 331 receives the sense signal, obtains a specific measured value in the designated measurement value format HH81 in response to the sense signal, and performs a specific check operation used to check a mathematical relation between the specific measured value and the specific measurement value range. Under a condition that the processing unit 331 determines the specific physical parameter range RD1E4 in which the variable physical parameter QU1A is based on the specific check operation, the processing unit 331 assigns the obtained specific measurement value range code EM14 to the variable physical parameter range code UN8A by using the storage unit 332. The processing unit 331 decides whether the processing unit 331 is to use the storage unit 332 to change the variable physical parameter range code UN8A in response to a specific sensing operation used to sense the variable physical parameter QU1A. For example, the specific sensing operation is performed by the sensing unit 334.

In some embodiments, under a condition that the receiving unit 337 receives the control signal SC81, the processing unit 331 obtains an operation reference data code XU81 from one of the control signal SC81 and the storage unit 332 in response to the control signal SC81, and performs a data determination AA8A using the operation reference data code XU81 by running a data determination procedure NA8A to determine the measurement value application range code EMIL selected from the plurality of different measurement value reference range codes EM11, EM12, . . . in order to select the measurement value application range RN1L from the plurality of different measurement value reference ranges RN11, RN12, . . . .

The operation reference data code XU81 is equal to a permissible reference data code which is defaulted based on the measurement application function specification GAL8. The data determination procedure NA8A is built based on the measurement application function specification GAL8. The data determination AA8A is one of a data determination operation AA81 and a data determination operation AA82. Under a condition that the operation reference data code XU81 is obtained to be equal to the specific measurement value range code EM14 by accessing the variable physical parameter range code UN8A stored in the storage unit 332, the data determination AA8A being the data determination operation AA81 determines the measurement value application range code EMIL based on the obtained specific measurement value range code EM14. For example, the determined measurement value application range code EMIL is equal to or different from the obtained specific measurement value range code EM14.

Under a condition that the operation reference data code XU81 is obtained to be equal to the defaulted rated range limit value pair DD1A from one of the control signal SC81 and the storage unit 332, the data determination AA8A being the data determination operation AA82 selects the measurement value application range code EMIL from the plurality of different measurement value reference range codes EM11, EM12, . . . by performing a scientific calculation MR81 using the measured value VN81 and obtained the rated range limit value pair DD1A to determine the measurement value application range code EMIL. For example, the scientific calculation MR81 is performed based on a specific empirical formula XR81. The specific empirical formula XR81 is formulated beforehand based on the defaulted rated range limit value pair DD1A and the plurality of different measurement value reference range codes EM11, EM12, . . . . For example, the specific empirical formula XR81 is formulated beforehand based on the measurement application function specification GAL8.

In some embodiments, the processing unit 331 obtains the application range limit value pair DN1L based on the determined measurement value application range code EMIL, and checks the mathematical relation KV81 based on a data comparison CD81 between the measured value VN81 and the obtained application range limit value pair DN1L to make a logical decision PB81 on whether the measured value VN81 is within the selected measurement value application range RN1L. Under a condition that the logical decision PB81 is positive, the processing unit 331 determines the physical parameter application range RD1EL which the variable physical parameter QU1A is currently in.

The processing unit 331 obtains the measurement value target range code EM1T from the control signal SC81. Under a condition that the processing unit 331 determines the physical parameter application range RD1EL which the variable physical parameter QU1A is currently in, the processing unit 331來 checks a range relation KE8A between the measurement value target range RN1T and the measurement value application range RN1L by comparing the obtained measurement value target range code EM1T and the determined measurement value application range code EMIL to make a logical decision PZ81 on whether the obtained measurement value target range code EM1T and the determined measurement value application range code EMIL are equal. Under a condition that the logical decision PZ81 is negative, the processing unit 331 recognizes the range relation KE8A as a range difference relation to determine the range difference DS81.

For example, under a condition that the processing unit 331 determines the physical parameter application range RD1EL which the variable physical parameter QU1A is currently in, the processing unit 331 checks a range relation KE9A between the physical parameter target range RD1ET and the physical parameter application range RD1EL by comparing the obtained measurement value target range code EM1T and the determined measurement value application range code EMIL to make a logical decision PZ91 on whether the physical parameter target range RD1ET and the physical parameter application range RD1EL are equal. Under a condition that the logical decision PZ91 is negative, the processing unit 331 recognizes the range relation KE9A as a range difference relation to determine the range difference DB81. Under a condition that the logical decision PZ81 is negative, the logical decision PZ91 is negative.

In some embodiments, the application range limit value pair DN1L includes an application range limit value DN15 of the measurement value application range RN1L and an application range limit value DN16 being opposite to the application range limit value DN15. The functional device 130 further includes a physical parameter application unit 335 coupled to the output component 338. The physical parameter application unit 335 has the variable physical parameter QU1A. For example, the sensing unit 334 is coupled to the physical parameter application unit 335. The processing unit 331 causes the physical parameter application unit 335 by using the output component 338 to perform a specific functional operation ZH81 associated with the variable physical parameter QU1A. For example, the specific functional operation ZH81 is used to cause a trigger event EQ81 to occur, and is a spatial motion operation. The control device 212 outputs the control signal SC81 in response to the trigger event EQ81.

For example, under a condition that the application range limit value DN15 is different from the application range limit value DN16 and the measured value VN81 is between the application range limit value DN15 and the application range limit value DN16, the processing unit 331 makes the logical decision PB81 to be positive by comparing the measured value VN81 and the obtained application range limit value pair DN1L. Under a condition that the application range limit value DN15, the application range limit value DN16 and the measured value VN81 are equal, the processing unit 331 makes the logical decision PB81 to be positive by comparing the measured value VN81 and the obtained application range limit value pair DN1L.

The measurement application function specification GAL8 further includes a physical parameter representation GA8T1. The physical parameter representation GA8T1 is used to indicate a designated physical parameter QD1T being within the physical parameter target range RD1ET. The storage unit 332 has a memory location YM8L and a memory location YX8T being different from the memory location YM8L, stores the application range limit value pair DN1L at the memory location YM8L, and stores a handle CC1T at the memory location YX8T.

For example, the memory location YM8L is identified based on the defaulted measurement value application range code EMIL. The memory location YX8T is identified based on the defaulted measurement value target range code EM1T. The handle CC1T is defaulted based on the physical parameter representation GA8T1 and a data coding operation ZX91 used to convert the physical parameter representation GA8T1. For example, the application range limit value pair DN1L and the handle CC1T are respectively stored by the storage unit 332 based on the defaulted measurement value application range code EMIL and the defaulted measurement value target range code EM1T.

In some embodiments, the processing unit 331 performs a data acquisition AD8A using the determined measurement value application range code EMIL by running a data acquisition procedure ND8A to obtain the application range limit value pair DN1L. For example, the data acquisition AD8A is one of a data acquisition operation AD81 and a data acquisition operation AD82. The data acquisition procedure ND8A is built based on the measurement application function specification GAL8. The data acquisition operation AD81 uses the storage unit 332 based on the determined measurement value application range code EMIL to access the application range limit value pair DN1L, stored at the memory location YM8L, to obtain the application range limit value pair DN1L.

The data acquisition operation AD82 fetches the rated range limit value pair DD1A by means of one of the control signal SC81 and the storage unit 332, and obtains the application range limit value pair DN1L by performing a scientific calculation MZ81 using the determined measurement value application range code EMIL and the fetched rated range limit value pair DD1A. For example, the rated range limit value pair DD1A includes a rated range limit value DD11 of the rated measurement value range RD1N and a rated range limit value DD12 being opposite to the rated range limit value DD11, and is defaulted in the designated measurement value format HH81 based on the rated physical parameter range representation GA8E, the sensor measurement range representation GW8R and the data coding operation ZX81.

Under a condition that the processing unit 331 determines the range difference DS81, the processing unit 331 uses the storage unit 332 based on the obtained measurement value target range code EM1T to access the handle CC1T stored at the memory location YX8T, and performs a signal generation control GY81 for the measurement application function FA81 based on the accessed handle CC1T to control the output component 338. The output component 338 performs a signal generation operation BY81 for the measurement application function FA81 in response to the signal generation control GY81 to generate an operation signal SG81, wherein the operation signal SG81 is used to control the physical parameter application unit 335 to cause the variable physical parameter QU1A to enter the physical parameter target range RD1ET.

For example, the operation unit 397 includes the processing unit 331, the receiving unit 337, the timer 342, and the output component 338 coupled to the processing unit 331. The output component 338 is located in the outside of the processing unit 331, and is controlled by the processing unit 331. The processing unit 331 performs the signal generation control GY81, used to control the output component 338, to provide a control signal SF81 to the output component 338. The output component 338 performs the signal generation operation BY81 for the measurement application function FA81 in response to the control signal SF81 to generate the operation signal SG81, and transmits the operation signal SG81 toward the physical parameter application unit 335.

In some embodiments, the control device 212 is an external device. The plurality of different measurement value reference ranges RN11, RN12, . . . have a total reference range number NT81. The total reference range number NT81 is defaulted based on the measurement application function specification GAL8. The processing unit 331 obtains the total reference range number NT81 in response to the control signal SC81. The scientific calculation MR81 further uses the obtained total reference range number NT81. The scientific calculation MZ81 further uses the obtained total reference range number NT81. For example, the total reference range number NT81 is greater than or equal to 2. For example, there is the total reference range number NT11≥3; there is the total reference range number NT11≥4; there is the total reference range number NT11≥5; there is the total reference range number NT11≥6; and there is the total reference range number NT11≤255.

The physical parameter application unit 335 changes the variable physical parameter QU1A from a specific physical parameter QU17 to a specific physical parameter QU18 in response to the operation signal SG81. For example, the specific physical parameter QU17 is within the physical parameter application range RD1EL; and the specific physical parameter QU18 is within the physical parameter target range RD1ET. The measurement application function specification GAL8 further includes a physical parameter candidate range representation GA8T used to indicate the physical parameter target range RD1ET.

The measurement value target range RN1T is a first portion of the rated measurement value range RD1N, and has a target range limit value pair DN1T. For example, the target range limit value pair DN1T is defaulted in the designated measurement value format HH81 based on the physical parameter candidate range representation GA8T, the sensor measurement range representation GW8R and a data coding operation ZX83 used to convert the physical parameter candidate range representation GA8T. The measurement value target range RN1T is defaulted in the designated measurement value format HH81 based on the physical parameter candidate range representation GA8T, the sensor measurement range representation GW8R and the data coding operation ZX83. The measurement value application range RN1L is a second portion of the rated measurement value range RD1N.

The physical parameter target range RD1ET is separate from or adjacent to the physical parameter application range RD1EL. Under a condition that the physical parameter target range RD1ET is separate from the physical parameter application range RD1EL, the measurement value target range RN1T is separate from the measurement value application range RN1L. Under a condition that the physical parameter target range RD1ET is adjacent to the physical parameter application range RD1EL, the measurement value target range RN1T is adjacent to the measurement value application range RN1L.

For example, the measurement value application range code EM1L is configured to be equal to an integer. The rated range limit value DD12 is greater than the rated range limit value DD11. The rated range limit value DD12 and the rated range limit value DD11 have therebetween a relative value VA11 being relative to the rated range limit value DD11. The relative value VA11 is equal to a calculation result which the rated range limit value DD11 is subtracted from the rated range limit value DD12. For example, the application range limit value pair DN1L is defaulted based on the rated range limit value DD11, the rated range limit value DD12, the integer, and a ratio of the relative value VA11 to the total reference range number NT81. The scientific calculation MZ81 uses one selected from a group consisting of the rated range limit value DD11, the rated range limit value DD12, the integer, the ratio and any combination thereof.

In some embodiments, the storage unit 332 further has a memory location YM8T being different from the memory location YX8T, and stores the target range limit value pair DN1T at the memory location YM8T. For example, the memory location YM8T is identified based on the defaulted measurement value target range code EM1T. After the processing unit 331 performs the signal generation control GY81 within an operation time TF81, the sensing unit 334 senses the variable physical parameter QU1A to generate a sense signal SN82. For example, after the processing unit 331 performs the signal generation control GY81, the sensing unit 334 senses the variable physical parameter QU1A to perform a sense signal generation HF82 being dependent on the sensor sensibility YW81, wherein the sense signal generation HF82 is used to generate the sense signal SN82.

The processing unit 331 obtains a measured value VN82 in the designated measurement value format HH81 in response to the sense signal SN82 within a designated time TG82 being later than the operation time TF81. The processing unit 331 uses the storage unit 332 based on the obtained measurement value target range code EM1T to access the target range limit value pair DN1T stored at the memory location YM8T, and checks a mathematical relation KV91 between the measured value VN82 and the measurement value target range RN1T by comparing the measured value VN82 and the accessed target range limit value pair DN1T to make a logical decision PB91 on whether the measured value VN82 is within the measurement value target range RN1T.

Under a condition that the logical decision PB91 is positive, the processing unit 331 determines within the designated time TG82 the physical parameter target range RD1ET which the variable physical parameter QU1A is currently in, generates a positive operation report RL81, and causes the transmission unit 384 to output a control response signal SE81 carrying the positive operation report RL81, thereby the control response signal SE81 is used to cause the control device 212 to obtain the positive operation report RL81. For example, the positive operation report RL81 indicates an operation situation EP81 that the variable physical parameter QU1A successfully enters the physical parameter target range RD1ET. The processing unit 331 responds to the control signal SC81 by causing the transmission unit 384 to generate the control response signal SE81. For example, the processing unit 331 causes the control response signal SE81 to further carry the obtained measured value VN82 based on the obtained measured value VN82.

In some embodiments, under a condition that the specific measurement value range code EM14 is different from the obtained measurement value target range code EM1T and the processing unit 331 determines the physical parameter target range RD1ET which the variable physical parameter QU1A is currently in by making the logical decision PB91, the processing unit 331 uses the storage unit 332 based on a code difference DF81 between the variable physical parameter range code UN8A, being equal to the specific measurement value range code EM14, and the obtained measurement value target range code EM1T to assign the obtained measurement value target range code EM1T to the variable physical parameter range code UN8A.

When the receiving unit 337 receives the control signal SC81, the display unit 382 displays a state indication LB81. For example, the state indication LB81 is used to indicate a specific state XJ81 that the variable physical parameter QU1A is configured to be within the specific physical parameter range RD1E4. Under a condition that the specific measurement value range code EM14 is different from the obtained measurement value target range code EM1T and the processing unit 331 determines the physical parameter target range RD1ET which the variable physical parameter QU1A is currently in by making the logical decision PB91, the processing unit 331 further causes the display unit 382 based on the code difference DF81 to change the state indication LB81 to a state indication LB82. For example, the state indication LB82 is used to indicate a specific state XJ82 that the variable physical parameter QU1A is configured to be within the physical parameter target range RD1ET.

The control signal SC81 is one of an electrical signal SP81 and a light signal SQ81. The receiving unit 337 includes a receiving component 3371 and a receiving component 3372. The receiving component 3371 is coupled to the processing unit 331. Under a condition that the control signal SC81 is the electrical signal SP81, the receiving component 3371 causes the processing unit 331 by receiving the electrical signal SP81 carrying a control message CG81 to obtain the control message CG81. For example, the control message CG81 includes the measurement value designation range code EL1T. The processing unit 331 obtains the defaulted measurement value target range code EM1T based on the measurement value designation range code EL1T of the control message CG81. For example, the control message CG81 further includes the measurement value target range code EM1T. For example, the receiving component 3371 and the receiving component 3372 are two input components respectively.

The receiving component 3372 is coupled to the processing unit 331. Under a condition that the control signal SC81 is the light signal SQ81, the receiving component 3372 receives the light signal SQ81 carrying a coded image FY81. For example, the coded image FY81 represents the control message CG81. The input unit 380 is coupled to the processing unit 331, and includes a push button 3801. Under a condition that the variable physical parameter QU1A is configured to be within the physical parameter target range RD1ET based on the control signal SC81, the input unit 380 receives a user input operation BQ81 using the push button 3801, and causes the processing unit 331 to receive an operation request signal SJ91 in response to the user input operation BQ81. The processing unit 331 determines a specific input code UW81 in response to the operation request signal SJ91. For example, the input unit 380 provides the operation request signal SJ91 to the processing unit 331 in response to the user input operation BQ81 using the push button 3801, and thereby causes the processing unit 331 to receive the operation request signal SJ91. The specific input code UW81 is selected from the plurality of different measurement value reference range codes EM11, EM12, . . . .

In some embodiments, under a condition that the control signal SC81 is the light signal SQ81, the receiving component 3372 senses the coded image FY81 to determine a coded data DY81, and decodes the coded data DY81 to provide the control message CG81 to the processing unit 331. For example, when the input unit 380 receives the user input operation BQ81, the variable physical parameter range code UN8A is equal to the defaulted measurement value target range code EM1T. The processing unit 331 obtains the measurement value target range code EM1T from the variable physical parameter range code UN8A in response to the operation request signal SJ91. Under a condition that the specific input code UW81 is different from the defaulted measurement value target range code EM1T, the processing unit 331 uses the output component 338 based on a code difference DX81 between the variable physical parameter range code UN8A, being equal to the obtained measurement value target range code EM1T, and the specific input code UW81 to cause the variable physical parameter QU1A to leave the physical parameter target range RD1ET to enter a specific physical parameter range RD1E5 which is included in the plurality of different physical parameter reference ranges RD1E1, RD1E2, . . . .

For example, the push button 3801 receives the user input operation BQ81. The specific physical parameter range RD1E5 is denoted by a specific physical parameter range code UN85. Under a condition that the specific input code UW81 is equal to the specific physical parameter range code UN85, the processing unit 331 causes the output component 338 based on the code difference DX81 to transmit an operation signal SG82 toward the physical parameter application unit 335. The operation signal SG82 is used to cause the variable physical parameter QU1A to leave the physical parameter target range RD1ET to enter the specific physical parameter range RD1E5.

Under a condition that the variable physical parameter QU1A is configured to be in the specific physical parameter range RD1E5 based on the functional signal SG82, the input unit 380 receives a user input operation BQ8A using the push button 3801, and provides an operation request signal SJ9A to the processing unit 331 in response to the user input operation BQ8A. For example, under a condition that the variable physical parameter QU1A is in the specific physical parameter range RD1E5, the push button 3801 receives the user input operation BQ8A to cause the input unit 380 to receive the user input operation BQ8A. The processing unit 331 causes the output component 338 to transmit an operation signal SG8A toward the physical parameter application unit 335 in response to the operation request signal SJ9A. The operation signal SG8A is used to cause the variable physical parameter QU1A to leave the specific physical parameter range RD1E5 to enter a specific physical parameter range RD1EA which is included in the plurality of different physical parameter reference ranges RD1E1, RD1E2, . . . . For example, the specific physical parameter range RD1EA is equal to the physical parameter target range RD1ET.

The sensing unit 334 senses the variable physical parameter QU1A, being in a constraint condition FR81, to provide the sense signal SN81 to the processing unit 331. For example, the constraint condition FR81 is that the variable physical parameter QU1A is equal to a specific physical parameter QU15 included in the rated physical parameter range RD1E. The processing unit 331 estimates the specific physical parameter QU15 based on the sense signal SN81 to obtain the measured value VN81. Because the variable physical parameter QU1A being in the constraint condition FR81 is within the physical parameter application range RD1EL, the processing unit 331 recognizes the measured value VN81 as a permissible value being within the measurement value application range RN1L, thereby recognize the mathematical relation KV81 between the measured value VN81 and the measurement value application range RN1L as a numerical-value intersection relation, and thereby determines the physical parameter application range RD1EL which the variable physical parameter QU1A is currently in.

In some embodiments, the sensing unit 334 is characterized based on the sensor sensibility YW81 associated with the sense signal generation HF81, and is configured to meet the sensor specification FU11. The sensor specification FU11 includes the sensor sensibility representation GW81 used to indicate the sensor sensibility YW81, and the sensor measurement range representation GW8R used to indicate the sensor measurement range RB8E. For example, the rated physical parameter range RD1E is configured to be equal to the sensor measurement range RB8E, or is configured to be a portion of the sensor measurement range RB8E. The sensor measurement range RB8E is associated with a physical parameter sensing performed by the sensing unit 334. The sensor measurement range representation GW8R is provided based on a first defaulted measurement unit. For example, the first defaulted measurement unit is one of a metric measurement unit and a British Association measurement unit.

Each of the rated measurement value range RD1N, the rated range limit value pair DD1A, the measurement value application range RN1L, the application range limit value pair DN1L, the measurement value target range RN1T, the target range limit value pair DN1T, the measurement value target range RN1U and the plurality of different measurement value reference ranges RN11, RN12, . . . is defaulted in the designated measurement value format HH81 based on one of the sensor measurement range representation GW8R and the sensor specification FU11. For example, each of the rated measurement value range RD1N and the rated range limit value pair DD1A is defaulted in the designated measurement value format HH81 based on the rated physical parameter range representation GA8E, the sensor measurement range representation GW8R, the sensor sensibility representation GW81 and the data coding operation ZX81. Each of the measurement value application range RN1L and the application range limit value pair DN1L is defaulted in the designated measurement value format HH81 based on the physical parameter application range representation GA8L, the sensor measurement range representation GW8R, the sensor sensibility representation GW81 and the data coding operation ZX82.

Each of the measurement value target range RN1T and the target range limit value pair DN1T is defaulted in the designated measurement value format HH81 based on the physical parameter candidate range representation GA8T, the sensor measurement range representation GW8R, the sensor sensibility representation GW81 and the data coding operation ZX83. Each of the rated physical parameter range representation GA8E, the physical parameter application range representation GA8L, the physical parameter representation GA8T1 and the physical parameter candidate range representation GA8T is provided based on a second defaulted measurement unit. For example, the second defaulted measurement unit is one of a metric measurement unit and a British Association measurement unit, and is equal to or different from the first defaulted measurement unit.

The variable physical parameter QU1A is further characterized based on the sensor measurement range RB8E. For example, each of the sensor measurement range representation GW8R, the rated physical parameter range representation GA8E, the physical parameter application range representation GA8L, the physical parameter candidate range representation GA8T and the physical parameter representation GA8T1 belongs to a decimal data type. Each of the measured value VN81, the measured value VN82, the rated range limit value pair DD1A, the application range limit value pair DN1L, the target range limit value pair DN1T and the handle CC1T belongs to the binary data type, and is suitable to be applied to computer processing. Each of the sensor specification FU11 and the measurement application function specification GAL8 is defaulted.

In some embodiments, before the receiving unit 337 receives the control signal SC81, the receiving unit 337 receives a writing request message WN8L which includes the defaulted application range limit value pair DN1L and a memory address AM8L. For example, the memory location YM8L is identified based on the memory address AM8L; and the memory address AM8L is defaulted based on the defaulted measurement value application range code EMIL. The processing unit 331 uses the storage unit 332 in response to the writing request message WN8L to store the application range limit value pair DN1L of the writing request message WN8L to the memory location YM8L.

Before the receiving unit 337 receives the control signal SC81, the receiving unit 337 receives a writing request message WC8T which includes the defaulted handle CC1T and a memory address AX8T. For example, the memory location YX8T is identified based on the memory address AX8T; and the memory address AX8T is defaulted based on the defaulted measurement value target range code EM1T. The processing unit 331 uses the storage unit 332 in response to the writing request message WC8T to store the handle CC1T of the writing request message WC8T to the memory location YX8T.

In some embodiments, the functional device 130 is used to control the variable physical parameter QU1A by generating an operation signal SG81. The variable physical parameter QU1A is characterized based on the physical parameter target range RD1ET represented by the measurement value target range RN1T, and the physical parameter application range RD1EL represented by the measurement value application range RN1L. The sensing unit 334 senses the variable physical parameter QU1A to generate a sense signal SN81. Under a condition that the receiving unit 337 receives a control signal SC81 serving to indicate the measurement value target range RN1T, the processing unit 331 obtains a measured value VN81 in response to the sense signal SN81.

Under a condition that the processing unit 331 determines the physical parameter application range RD1EL which the variable physical parameter QU1A is currently in by checking a mathematical relation KV81 between the measured value VN81 and the measurement value application range RN1L, the processing unit 331 determines a range relation KE8A between the measurement value target range RN1T and the measurement value application range RN1L based on the control signal SC81 to make a reasonable decision PW81 on whether the operation signal SG81 is to be generated by the output component 338, wherein the operation signal SG81 is used to cause the variable physical parameter QU1A to enter the physical parameter target range RD1ET.

For example, under a condition that the processing unit 331 determines the physical parameter application range RD1EL which the variable physical parameter QU1A is currently in by checking the mathematical relation KV81, the processing unit 331 determines a range relation KE9A between the physical parameter target range RD1ET and the physical parameter application range RD1EL based on the control signal SC81 to make the reasonable decision PW81.

In some embodiments, under a condition that the processing unit 331 determines the physical parameter application range RD1EL which the variable physical parameter QU1A is currently in, the processing unit 331 checks the range relation KE8A by comparing the obtained target range limit value pair DN1T and the obtained application range limit value pair DN1L to make a logical decision PY81 on whether the obtained target range limit value pair DN1T and the obtained application range limit value pair DN1L are equal.

Under a condition that the logical decision PY81 is negative, the processing unit 331 recognizes the range relation KE8A as a range difference relation to make the reasonable decision PW81 to be positive. Under a condition that the reasonable decision PW81 is positive, the processing unit 331 performs a signal generation control GY81 based on the obtained handle CC1T to cause the output component 338 to generate an operation signal SG81, wherein the operation signal SG81 is used to cause the variable physical parameter QU1A to enter the physical parameter target range RD1ET.

In some embodiments, under a condition that the processing unit 331 determines the physical parameter application range RD1EL which the variable physical parameter QU1A is currently in, the processing unit 331 checks the range relation KE8A by comparing the obtained measurement value target range code EM1T and the determined measurement value application range code EMIL to make a logical decision PZ81 on whether the obtained measurement value target range code EM1T and the determined measurement value application range code EMIL are equal. Under a condition that the logical decision PZ81 is negative, the processing unit 331 recognizes the range relation KE8A as a range difference relation to make the reasonable decision PW81 to be positive.

For example, under a condition that the processing unit 331 determines the physical parameter application range RD1EL which the variable physical parameter QU1A is currently in, the processing unit 331 checks the range relation KE9A between the physical parameter target range RD1ET and the physical parameter application range RD by comparing the obtained measurement value target range code EM1T and the determined measurement value application range code EMIL to make the logical decision PZ91 on whether the physical parameter target range RD1ET and the physical parameter application range RD1EL are equal. Under a condition that the logical decision PZ91 is negative, the processing unit 331 determines the range difference DB81 by recognizing the range relation KE9A as a range difference relation to make the reasonable decision PW81 to be positive. Under a condition that the logical decision PZ81 is negative, the logical decision PZ91 is negative.

Under a condition that the reasonable decision PW81 is positive, the processing unit 331 uses the storage unit 332 based on the obtained measurement value target range code EM1T to access the handle CC1T stored at the memory location YX8T. The processing unit 331 performs a signal generation control GY81 for the measurement application function FA81 based on the accessed handle CC1T. The output component 338 performs a signal generation operation BY81 for the measurement application function FA81 in response to the signal generation control GY81 to generate an operation signal SG81. The operation signal SG81 is used to control the physical parameter application unit 335 to cause the variable physical parameter QU1A to enter the physical parameter target range RD1ET.

In some embodiments, the plurality of different physical parameter reference states JE11, JE12, . . . includes the specific physical parameter state JE16. The specific physical parameter state JE16 is denoted by a specific physical parameter state code EW16. The plurality of different physical parameter reference state codes EW11, EW12, . . . include the specific physical parameter state code EW16. Under a condition that the processing unit 331 causes the variable physical parameter QU1A to be in the physical parameter target state JE1U by checking the first mathematical relation KQ81, the input unit 380 receives the user input operation BQ82 using the push button 3801, and causes the processing unit 331 to receive an operation request signal SJ92 in response to the user input operation BQ82. For example, the plurality of different physical parameter reference ranges RD1E1, RD1E2, . . . include a specific physical parameter range RD1E6 being different from the physical parameter target range RD1EU. The specific physical parameter state JE16 is determined beforehand according to the specific physical parameter range RD1E6.

For example, the input unit 380 provides the operation request signal SJ92 to the processing unit 331 in response to the user input operation BQ82 using the push button 3801, and thereby causes the processing unit 331 to receive the operation request signal SJ92. The processing unit 331 determines a specific input code UW82 in response to the operation request signal SJ92. For example, the specific input code UW82 is selected from the plurality of different physical parameter reference state codes EW11, EW12, . . . . For example, the specific input code UW82 is selected from the plurality of different measurement value reference range codes EM11, EM12, . . . . When the input unit 380 receives the user input operation BQ82, the variable physical parameter range code UN8A is equal to the defaulted physical parameter target state code EW1U. The processing unit 331 obtains the physical parameter target state code EW1U from the variable physical parameter range code UN8A in response to the operation request signal SJ92.

In some embodiments, the specific physical parameter range RD1E6 is denoted by a specific physical parameter range code UN86. Under a condition that the specific input code UW82 is equal to the specific physical parameter range code UN86 and is different from the defaulted physical parameter target state code EW1U, the processing unit 331 uses the output component 338 to cause the output component 338 to generate the operation signal SG87 based on a code difference DX82 between the variable physical parameter range code UN8A, being equal to the obtained measurement value target range code EM1U, and the specific input code UW82. The operation signal SG87 is used to cause the variable physical parameter QU1A to leave the physical parameter target state JE1U to enter the specific physical parameter state JE16. The output component 338 transmits the operation signal SG87 toward the physical parameter application unit 335. The physical parameter application unit 335 causes the variable physical parameter QU1A to leave the physical parameter target state JE1U to enter the specific physical parameter state JE16 in response to the operation signal SG87.

For example, under a condition that the variable physical parameter QU1A is configured to be in the specific physical parameter range RD1E6 (or the specific physical parameter state JE16) based on the functional signal SG87, the input unit 380 receives a user input operation BQ8B using the push button 3801, and provides an operation request signal SJ9B to the processing unit 331 in response to the user input operation BQ8B. For example, under a condition that the variable physical parameter QU1A is in the specific physical parameter range RD1E6, the push button 3801 receives the user input operation BQ8B to cause the input unit 380 to receive the user input operation BQ8B.

The processing unit 331 causes the output component 338 to transmit an operation signal SG8B toward the physical parameter application unit 335 in response to the operation request signal SJ9B. The operation signal SG8B is used to cause the variable physical parameter QU1A to leave the specific physical parameter range RD1E6 (or the specific physical parameter state JE16) to enter a specific physical parameter range RD1EB (or a specific physical parameter state JE1B) which is included in the plurality of different physical parameter reference ranges RD1E1, RD1E2, . . . . For example, the specific physical parameter range RD1EB is equal to the physical parameter target range RD1EU. The specific physical parameter state JE1B is determined beforehand according to the specific physical parameter range RD1EB.

Figure 22:
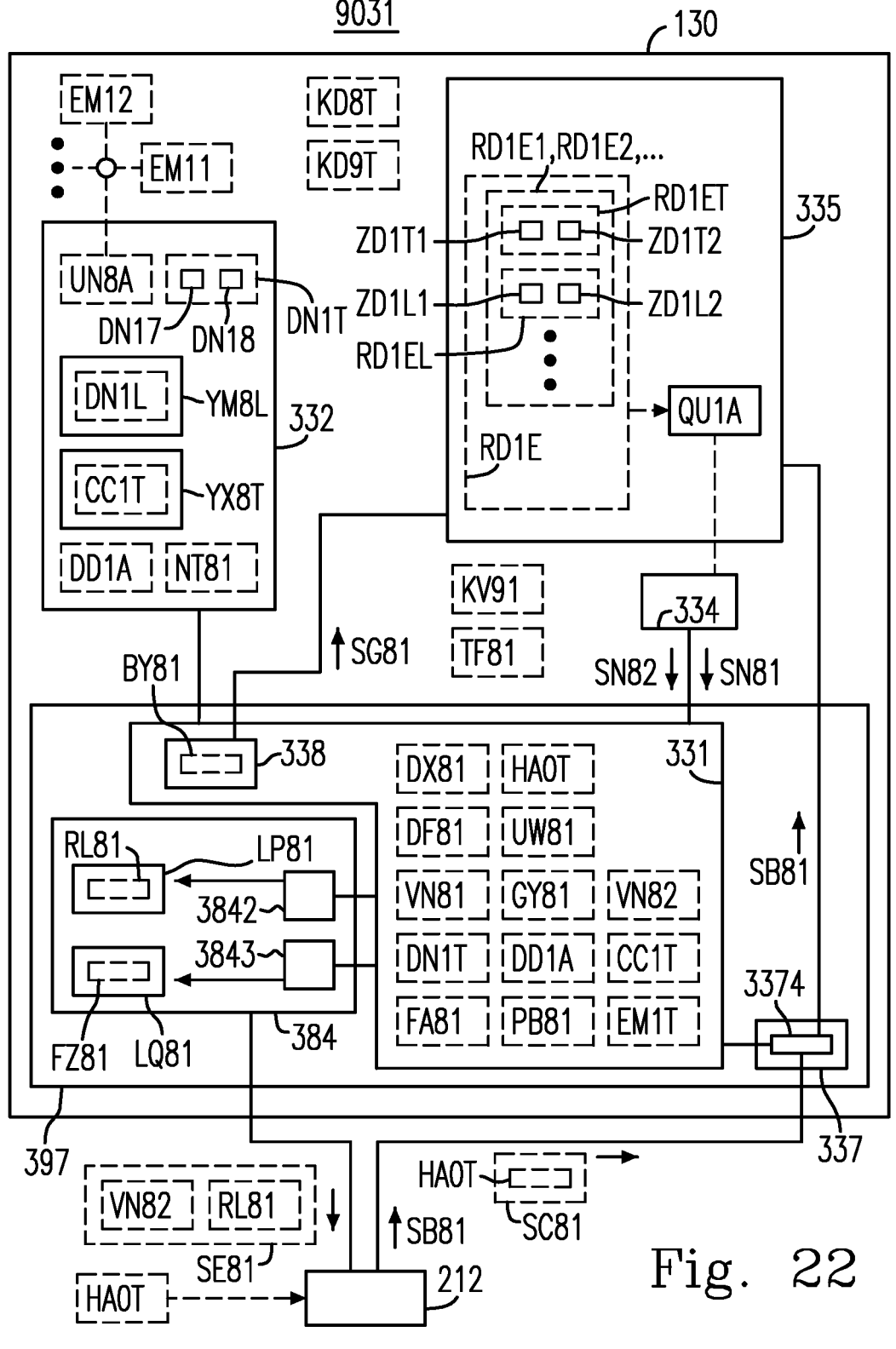
FIG. 22 is a schematic diagram showing an implementation structure of the control system shown in FIG. 1.
Figure 23:
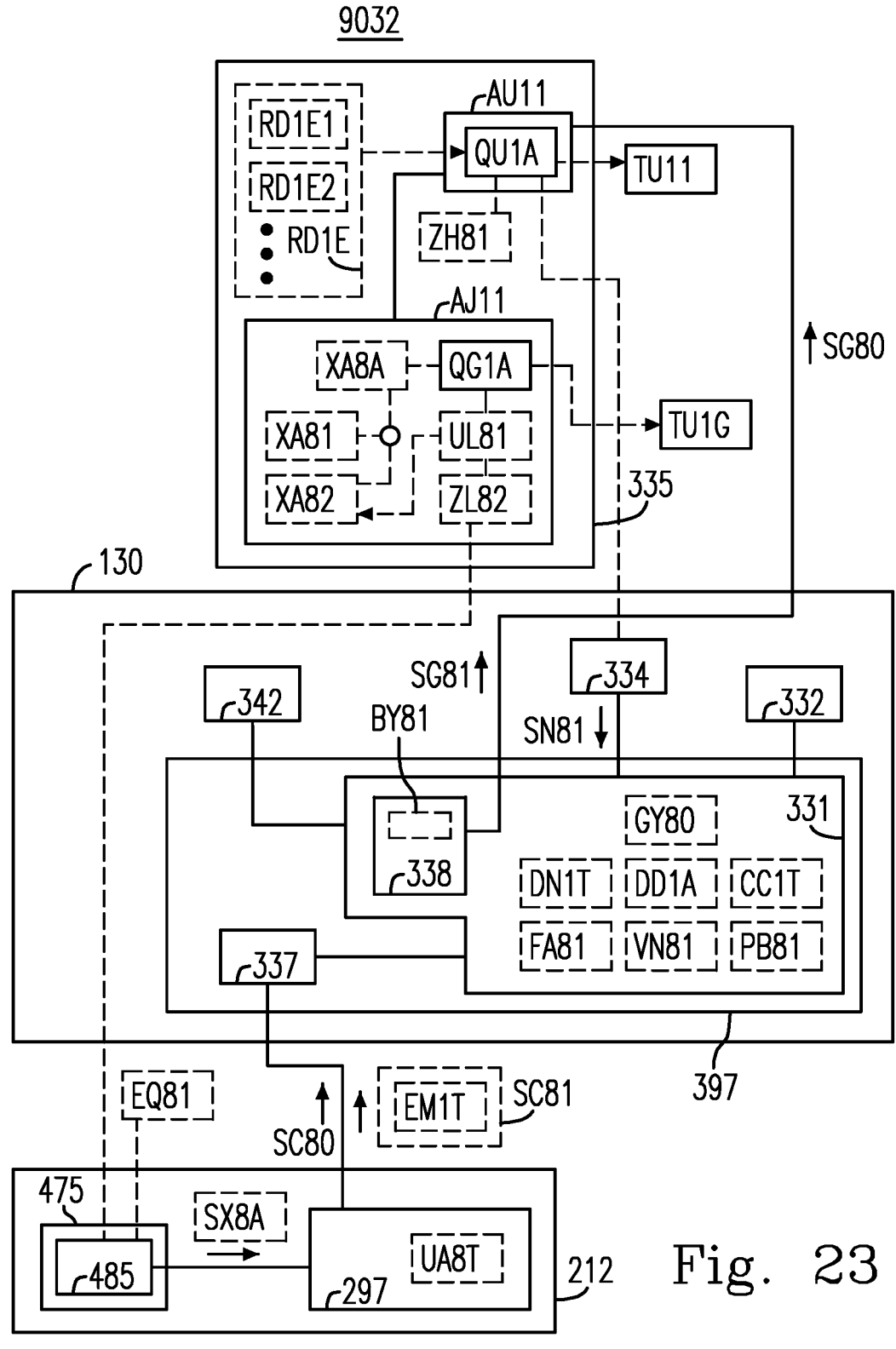
FIG. 23 is a schematic diagram showing an implementation structure of the control system shown in FIG. 1.

Please refer to FIG. 22 and FIG. 23. FIG. 22 is a schematic diagram showing an implementation structure 9031 of the control system 901 shown in FIG. 1. FIG. 23 is a schematic diagram showing an implementation structure 9032 of the control system 901 shown in FIG. 1. As shown in FIG. 22 and FIG. 23, each of the implementation structure 9031 and the implementation structure 9032 includes the control device 212 and the functional device 130. The functional device 130 includes the operation unit 397, the sensing unit 334, the physical parameter application unit 335 and the storage unit 332. The operation unit 397 includes the processing unit 331, the receiving unit 337, the input unit 380 and the transmission unit 384. The receiving unit 337 includes the receiving component 3371 and the receiving component 3372. The transmission unit 384 includes a transmission component 3842 and a transmission component 3843. Each of the sensing unit 334, the physical parameter application unit 335, the storage unit 332, the receiving component 3371, the receiving component 3372, the input unit 380, the transmission component 3842 and the transmission component 3843 is coupled to the processing unit 331, and is controlled by the processing unit 331. The processing unit 331 includes the output component 338.

In some embodiments, the output component 338 is coupled to the physical parameter application unit 335. The processing unit 331 performs the signal generation control GY81 within the operation time TF81 based on the obtained handle CC1T. The output component 338 performs the signal generation operation BY81 for the measurement application function FA81 in response to the signal generation control GY81 to generate the operation signal SG81 within the operation time TF81. For example, the operation signal SG81 is a control signal. The output component 338 transmits the operation signal SG81 to the physical parameter application unit 335. The physical parameter application unit 335 causes the variable physical parameter QU1A to enter the physical parameter target range RD1ET in response to the operation signal SG81. For example, the operation signal SG81 is one of a pulse width modulation signal, an electrical level signal, a driving signal and an instruction signal.

Under a condition that the processing unit 331 checks the mathematical relation KV91 to determine the physical parameter target range RD1ET which the variable physical parameter QU1A is currently in, the processing unit 331 determines the positive operation report RL81, and causes the transmission unit 384 to generate the control response signal SE81 which carries the positive operation report RL81 and the measured value VN82. The control response signal SE81 is one of an electrical signal LP81 and a light signal LQ81. The transmission component 3842 is a transmitter. The transmission component 3843 is a light emitting component. For example, the transmission component 3842 and the transmission component 3843 are two output components respectively.

For example, the processing unit 331 determines a physical parameter situation which the variable physical parameter QU1A is currently within the physical parameter target range RD1ET by checking the mathematical relation KV91, and thereby recognize a physical parameter relation KD8T between the variable physical parameter QU1A and the physical parameter target range RD1ET as a physical parameter intersection relation which the variable physical parameter QU1A is currently within the physical parameter target range RD1ET. For example, the processing unit 331 checks one of the physical parameter relation KD8T and the physical parameter relation KD9T by checking the mathematical relation KV91.

In some embodiments, under a condition that the transmission component 3842 is configured to generate the control response signal SE81, the processing unit 331 causes the transmission component 3842 to transmit the electrical signal LP81, carrying the positive operation report RL81, toward the control device 212 based on the determined positive operation report RL81. Under a condition that the transmission component 3843 is configured to generate the control response signal SE81, the processing unit 331 來 causes the transmission component 3843 to generate the light signal LQ81, carrying the positive operation report RL81, based on the determined positive operation report RL81, thereby the control device 212 receives the generated light signal LQ81 from the transmission component 3843. For example, the light emitting component is a display component. The light signal LQ81 carries a coded image FZ81 representing the positive operation report RL81. For example, the coded image FZ81 is a bar code image. For example, the electrical signal LP81 is a radio signal. The light signal LQ81 is an infrared signal.

For example, the control device 212 is identified by a control device identifier HA0T. The control signal SC81 further carries the control device identifier HA0T. The processing unit 331 obtains the control device identifier HA0T from the control signal SC81 in response to the control signal SC81, and causes the transmission component 3842 to transmit the electrical signal LP81, carrying the positive operation report RL81, toward the control device 212 based on the obtained control device identifier HA0T and the determined positive operation report RL81.

In some embodiments, the operation unit 297 of the control device 212 is configured to wiredly or wirelessly communicate with the operation unit 397; therefore, the operation unit 297 is configured to wiredly or wirelessly transmit the control signal SC81 toward the operation unit 397. For example, the receiving unit 337 wiredly or wirelessly receives the control signal SC81 from the control device 212. The control signal SC81 is one of the electrical signal SP81 and the light signal SQ81. The receiving component 3371 is a receiver, and receives the electrical signal SP81 from the control device 212 under a condition that the control signal SC81 is the electrical signal SP81. The receiving component 3372 is a reader, and receives the light signal SQ81, carrying the coded image FY81, from the control device 212 under a condition that the control signal SC81 is the light signal SQ81. For example, the coded image FY81 is a bar code image. For example, the electrical signal SP81 is a radio signal. The light signal SQ81 is an infrared signal.

The physical parameter application unit 335 has the variable physical parameter QU1A. The receiving unit 337 further includes a receiving component 3374. The receiving component 3374 is coupled to the processing unit 331, is controlled by the processing unit 331, and receives a physical parameter signal SB81 from the control device 212 under a condition that the variable physical parameter QU1A is to be provided by means of the control device 212. The physical parameter application unit 335 receives the physical parameter signal SB81 from the receiving component 3374. The processing unit 331 causes the physical parameter application unit 335 by using the output component 338 to use the physical parameter signal SB81 to form the variable physical parameter QU1A which is determined according to the physical parameter signal SB81. For example, the receiving component 3374 is a receiver. The control device 212 wiredly or wirelessly transmits the physical parameter signal SB81 to the receiving component 3374. For example, the receiving component 3371, the receiving component 3372 and the receiving component 3374 are three input components respectively.

The physical parameter target range RD1ET has a defaulted physical parameter target range limit ZD1T1 and a defaulted physical parameter target range limit ZD1T2 being opposite to the defaulted physical parameter target range limit ZD1T1. The target range limit value pair DN1T includes a target range limit value DN17 of the measurement value target range RN1T and a target range limit value DN18 being opposite to the target range limit value DN17. The defaulted physical parameter target range limit ZD1T1 is denoted by the target range limit value DN17. The defaulted physical parameter target range limit ZD1T2 is denoted by the target range limit value DN18.

The physical parameter application range RD1EL has a defaulted physical parameter application range limit ZD1L1 and a defaulted physical parameter application range limit ZD1L2 being opposite to the defaulted physical parameter application range limit ZD1L1. The defaulted physical parameter application range limit ZD1L1 is denoted by the application range limit value DN15. The defaulted physical parameter application range limit ZD1L2 is denoted by the application range limit value DN16.

In some embodiments, the trigger event EQ81 is a state change event. The control device 212 includes an operation unit 297 and a state-change detector 475 coupled to the operation unit 297. For example, the state-change detector 475 is one of a limit detector and an edge detector. The limit detector is a limit switch 485. The state-change detector 475 is configured to detect a characteristic physical parameter arrival ZL82 associated with a defaulted characteristic physical parameter UL81. For example, the defaulted characteristic physical parameter UL81 is a defaulted limit location. The characteristic physical parameter arrival ZL82 is a limit location arrival.

The physical parameter application unit 335 includes a physical parameter application area AJ11. The physical parameter application area AJ11 has a variable physical parameter QG1A. The variable physical parameter QG1A is dependent on the variable physical parameter QU1A, and is characterized based on the defaulted characteristic physical parameter UL81. For example, the physical parameter application area AJ11 is one selected from a group consisting of a load area, a display area, a sensing area, a power supply area and an environment area. The defaulted characteristic physical parameter UL81 is associated with the variable physical parameter QU1A.

Before the receiving unit 337 receives the control signal SC81, the receiving unit 337 receives a control signal SC80 from the operation unit 297. The processing unit 331 performs a signal generation control GY80 used to control the output component 338 in response to the received control signal SC80. The output component 338 generates an operation signal SG80 used to control the variable physical parameter QU1A in response to the signal generation control GY80. The physical parameter application unit 335 receives the operation signal SG80 from the output component 338, and performs the specific functional operation ZH81 associated with the variable physical parameter QU1A in response to the received operation signal SG80. The specific functional operation ZH81 is used to control the variable physical parameter QG1A, and causes the trigger event EQ81 to occur by changing the variable physical parameter QG1A. The variable physical parameter QG1A is configured to be in a variable physical state XA8A. For example, the operation unit 397 is controlled by the control device 212 to cause the physical parameter application unit 335 to perform the specific functional operation ZH81. The state-change detector 475 generates a trigger signal SX8A in response to the specific functional operation ZH81.

Under a condition that the variable physical parameter QU1A is within the specific physical parameter range RD1E4, the specific functional operation ZH81 causes the variable physical parameter QG1A to arrive the defaulted characteristic physical parameter UL81 to form the characteristic physical parameter arrival ZL82, and changes the variable physical state XA8A from a non-characteristic physical parameter arrival state XA81 to a practical characteristic physical parameter arrival state XA82 by forming the characteristic physical parameter arrival ZL82. The state-change detector 475 generates the trigger signal SX8A in response to the characteristic physical parameter arrival ZL82. For example, the practical characteristic physical parameter arrival state XA82 is characterized based on the defaulted characteristic physical parameter UL81. The state-change detector 475 generates the trigger signal SX8A in response to a state change event that the variable physical parameter QG1A is changed from the non-characteristic physical parameter arrival state XA81 to the practical characteristic physical parameter arrival state XA82.

For example, the state-change detector 475 is a trigger application unit. The trigger event EQ81 is the state change event that the variable physical parameter QG1A enters the practical characteristic physical parameter arrival state XA82. The operation unit 297 receives the trigger signal SX8A, and generates the control signal SC81 in response to the received trigger signal SX8A. For example, under a condition that the state-change detector 475 is the limit switch 485, the characteristic physical parameter arrival ZL82 is a limit location arrival that the variable physical parameter QG1A being equal to a variable spatial location arrives the defaulted characteristic physical parameter UL81 being equal to a defaulted limit location. The trigger signal SX8A is an operation request signal.

For example, the operation unit 297 obtains a control application code UA8T including at least one of the target range limit value pair DN1T and the measurement value target range code EM1T in response to the received trigger signal SX8A, and generates the control signal SC81 carrying at least one of the target range limit value pair DN1T and the measurement value target range code EM1T based on the control application code UA8T. For example, the physical parameter application unit 335 forms the variable physical parameter QG1A in the physical parameter application area AJ11 by performing the specific functional operation ZH81 which is caused based on the variable physical parameter QU1A. Under a condition that the physical parameter application area AJ11 is coupled to the state-change detector 475, the state-change detector 475 detects the characteristic physical parameter arrival ZL82.

In some embodiments, the variable physical parameter QU1A is one selected from a group consisting of a first variable electrical parameter, a first variable mechanics parameter, a first variable optical parameter, a first variable temperature, a first variable electrical voltage, a first variable electrical current, a first variable electrical power, a first variable electrical resistance, a first variable electrical capacitance, a first variable electrical inductance, a first variable frequency, a first clock time, a first variable time length, a first variable luminance, a first variable luminous intensity, a first variable sound volume, a first variable data flow, a first variable amplitude, a first variable spatial location, a first variable displacement, a first variable sequence position, a first variable angle, a first variable spatial length, a first variable distance, a first variable translational velocity, a first variable angular velocity, a first variable acceleration, a first variable force, a first variable pressure and a first variable mechanical power.

The operation unit 397 is configured to perform the measurement application function FA81 associated with the variable physical parameter QU1A by means of the control signal SC81. The functional device 130 is one selected from a plurality of application devices. The measurement application function FA81 is one selected from a plurality of specific control functions, wherein the plurality of specific control functions include a light control function, a force control function, an electricity control function, a magnetic control function and any combination thereof. The plurality of application devices include a control target device, a relay, a control switch device, a motor, an illuminating device, a door, a vending machine, an energy converter, a load device, a timing device, a toy, an electric appliance, a printing device, a display apparatus, a mobile device, a loudspeaker and any combination thereof.

The physical parameter application unit 335 is one selected from a plurality of application targets, and is configured to perform a specific application function. The specific application function is one selected from a plurality of physical parameter application functions, wherein the plurality of physical parameter application functions include a light-using function, a force-using function, an electricity-using function, a magnetism-using function and any combination thereof. The plurality of application targets include an electronic component, an actuator, a resistor, a capacitor, an inductor, a relay, a control switch, a transistor, a motor, an illuminating unit, an energy conversion unit, a load unit, a timing unit, a printing unit, a display target, a loudspeaker and any combination thereof. For example, the physical parameter application unit 335 is a physically realizable functional unit.

For example, the variable physical parameter QU1A and the variable physical parameter QG1A respectively belong to a physical parameter type TU11 and a physical parameter type TU1G. The physical parameter type TU11 is equal to or different from the physical parameter type TU1G. The defaulted characteristic physical parameter UL81 belongs to the physical parameter type TU1G. The physical parameter application unit 335 further includes a physical parameter formation area AU11 which has the variable physical parameter QU1A. The physical parameter application area AJ11 is coupled to the physical parameter formation area AU11. For example, the specific functional operation ZH81 is used to drive the physical parameter application area AJ11 to form the characteristic physical parameter arrival ZL82. For example, the physical parameter formation area AU11 is one selected from a group consisting of a load area, a display area, a sensing area, a power supply area and an environment area. For example, the physical parameter type TU11 is different from a time type.

The variable physical parameter QG1A is one selected from a group consisting of a variable electrical parameter, a variable mechanics parameter, a variable optical parameter, a variable temperature, a variable electrical voltage, a variable electrical current, a variable electrical power, a variable electrical resistance, a variable electrical capacitance, a variable electrical inductance, a variable frequency, a clock time, a variable time length, a variable luminance, a variable luminous intensity, a variable sound volume, a variable data flow, a variable amplitude, a variable spatial location, a variable displacement, a variable sequence position, a variable angle, a variable spatial length, a variable distance, a variable translational velocity, a variable angular velocity, a variable acceleration, a variable force, a variable pressure and a variable mechanical power. For example, the variable physical parameter QU1A is equal to or different from the variable physical parameter QG1A.

Figure 24:
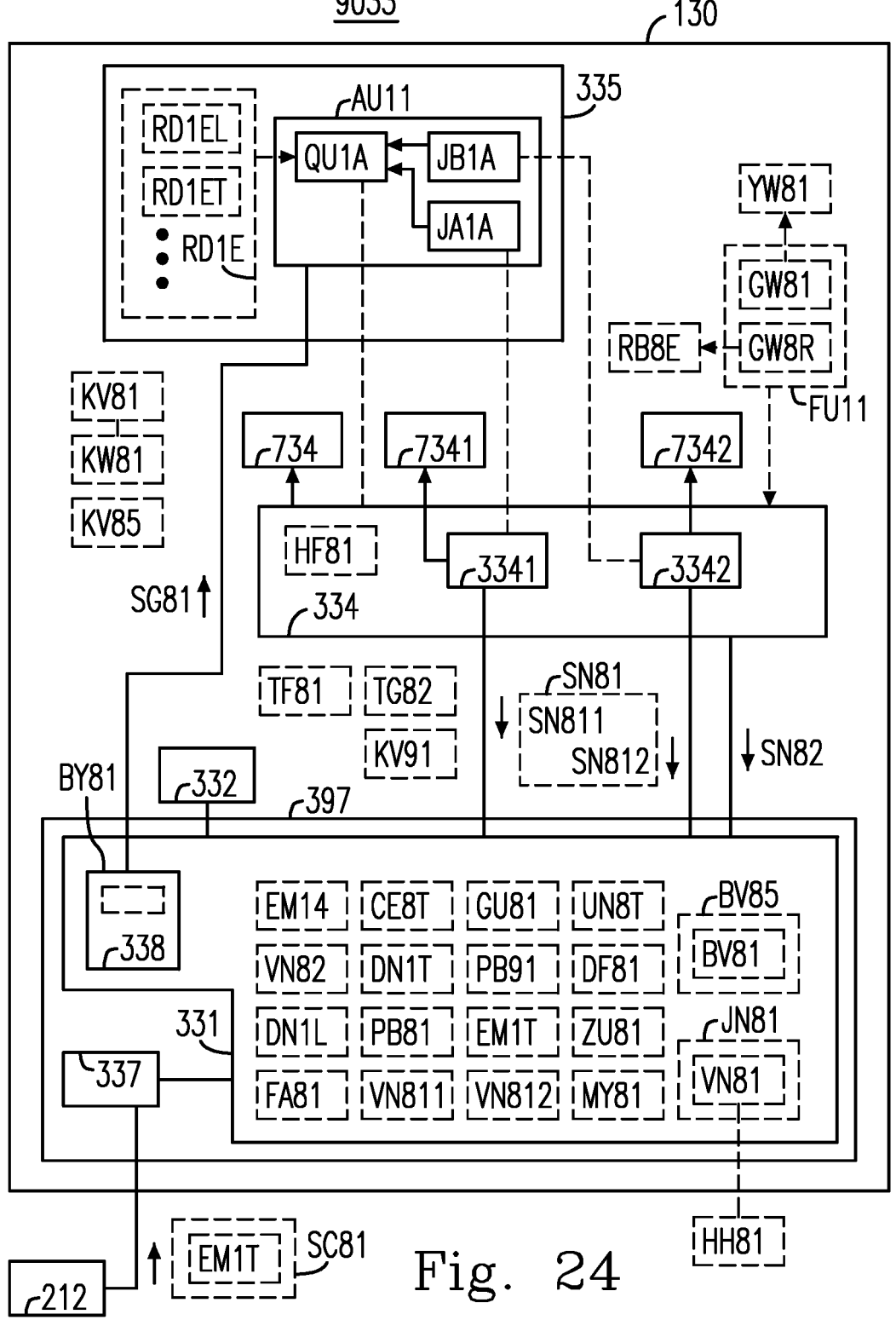
FIG. 24 is a schematic diagram showing an implementation structure of the control system shown in FIG. 1.
Figure 25:
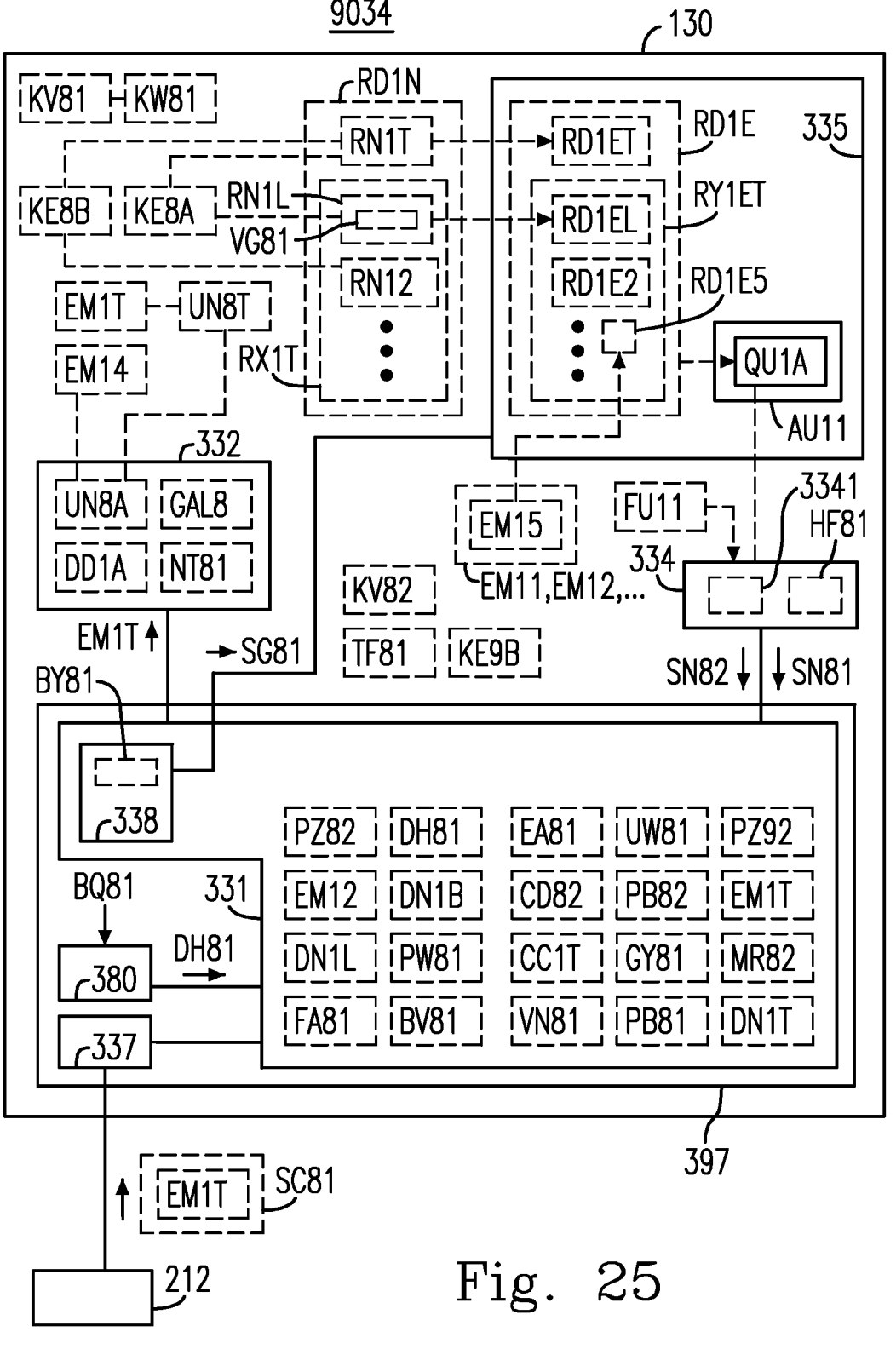
FIG. 25 is a schematic diagram showing an implementation structure of the control system shown in FIG. 1.
Figure 26:
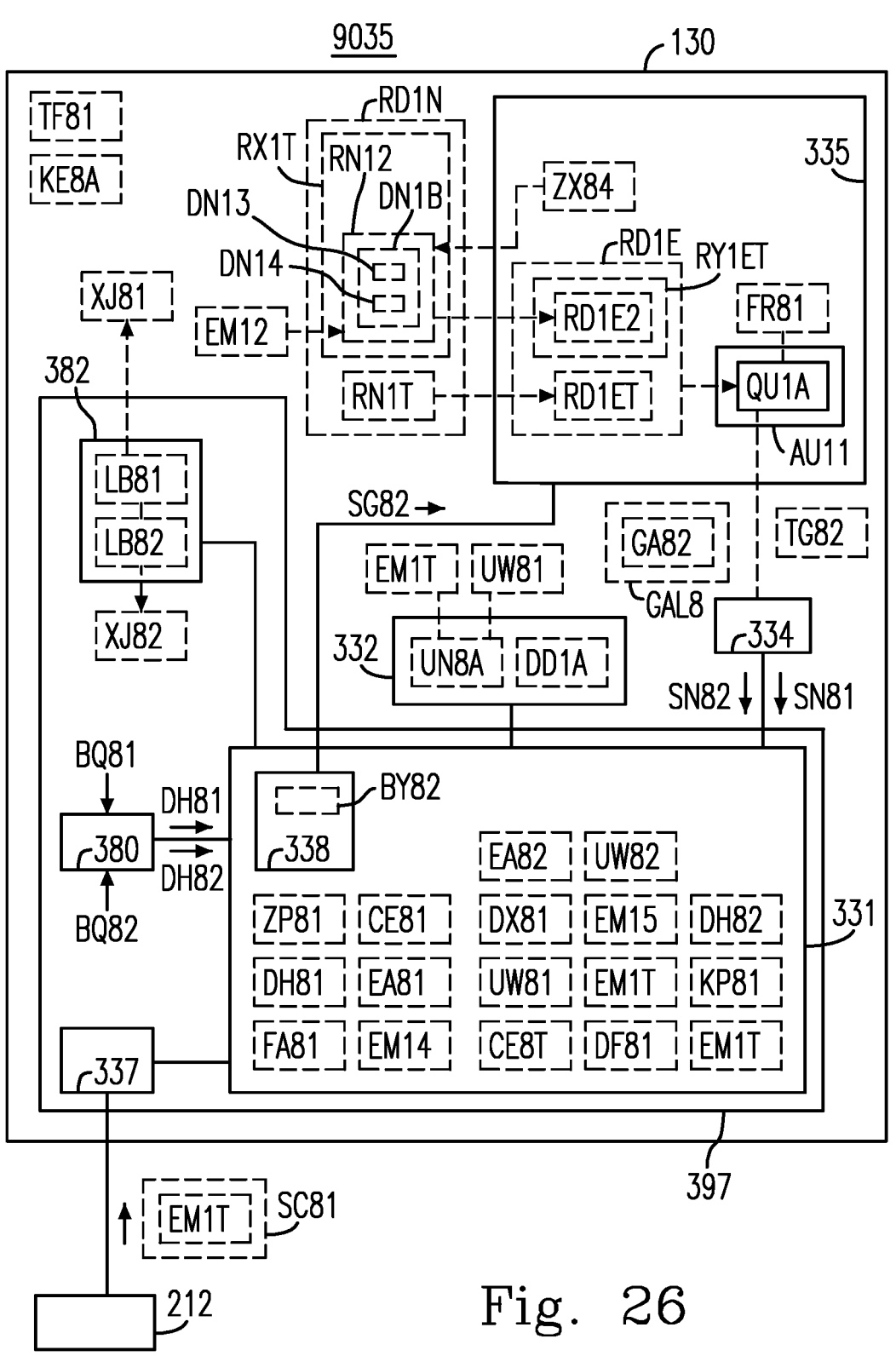
FIG. 26 is a schematic diagram showing an implementation structure of the control system shown in FIG. 1.

Please refer to FIG. 24, FIG. 25 and FIG. 26. FIG. 24 is a schematic diagram showing an implementation structure 9033 of the control system 901 shown in FIG. 1. FIG. 25 is a schematic diagram showing an implementation structure 9034 of the control system 901 shown in FIG. 1. FIG. 26 is a schematic diagram showing an implementation structure 9035 of the control system 901 shown in FIG. 1. As shown in FIG. 24, FIG. 25 and FIG. 26, each of the implementation structure 9033, the implementation structure 9034 and the implementation structure 9035 includes the control device 212 and the functional device 130. The functional device 130 includes the operation unit 397, the sensing unit 334, the physical parameter application unit 335 and the storage unit 332. The operation unit 397 includes the processing unit 331, the receiving unit 337, the display unit 382 and the transmission unit 384. Each of the receiving unit 337, the display unit 382, the transmission unit 384, the sensing unit 334, the physical parameter application unit 335 and the storage unit 332 is controlled by the processing unit 331.

In some embodiments, the sensing unit 334 senses the variable physical parameter QU1A to generate the sense signal SN81. For example, under a condition that the receiving unit 337 receives the control signal SC81, the sensing unit 334 senses the variable physical parameter QU1A to generate the sense signal SN81. After the processing unit 331 uses the output component 338 to generate the operation signal SG81 within the operation time TF81 by performing the signal generation control GY81, the sensing unit 334 senses the variable physical parameter QU1A to generate the sense signal SN82. For example, the sensing unit 334 is one selected from a group consisting of a time sensing unit, an electrical-parameter sensing unit, a mechanics-parameter sensing unit, an optical-parameter sensing unit, a temperature sensing unit, a wetness sensing unit, a motion sensing unit and a magnetic-parameter sensing unit.

The sensing unit 334 includes a sensing component 3341 coupled to the processing unit 331, and uses the sensing component 3341 to generate the sense signal SN81 and the sense signal SN82. The sensing component 3341 belongs to a sensor type 7341, and is one selected from a first plurality of application sensors. The first plurality of application sensors includes a first electrical-voltage sensor, a first electrical-current sensor, a first electrical-resistance sensor, a first electrical-capacitance sensor, a first electrical-inductance sensor, a first accelerometer, a first gyroscope, a first pressure transducer, a first strain gauge, a first timer, a first light detector, a first temperature sensor and a first wetness sensor. For example, the sensing component 3341 generates a sense signal component SN811. The sense signal SN81 includes the sense signal component SN811.

The sensing unit 334 further includes a sensing component 3342 coupled to the processing unit 331, and uses the sensing component 3342 to generate the sense signal SN81 and the sense signal SN82. The sensing component 3342 belongs to a sensor type 7342, and is one selected from a second plurality of application sensors. The sensor type 7342 is different from or independent of the sensor type 7341. The second plurality of application sensors include a second electrical-voltage sensor, a second electrical-current sensor, a second electrical-resistance sensor, a second electrical-capacitance sensor, a second electrical-inductance sensor, a second accelerometer, a second gyroscope, a second pressure transducer, a second strain gauge, a second timer, a second light detector, a second temperature sensor and a second wetness sensor.

For example, the sensing component 3342 generates a sense signal component SN812. The sense signal SN81 further includes the sense signal component SN812. For example, the sensing unit 334 belongs to a sensor type 734. The sensor type 734 is associated with the sensor type 7341 and the sensor type 7342. For example, the sensing unit 334, the sensing component 3341 and the sensing component 3342 are an electrical-power sensing unit, an electrical-voltage sensor and an electrical-current sensor respectively. For example, the sensing unit 334, the sensing component 3341 and the sensing component 3342 are an inertia measurement unit, an accelerometer and a gyroscope respectively.

In some embodiments, the variable physical parameter QU1A is dependent on a variable physical parameter JA1A and a variable physical parameter JB1A being different from the variable physical parameter JA1A. For example, the variable physical parameter QU1A, the variable physical parameter JA1A and the variable physical parameter JB1A are a variable electrical power, a variable electrical voltage and a variable electrical current respectively, and respectively belong to a first physical parameter type, a second physical parameter type and a third physical parameter type. The second physical parameter type is different from or independent of the third physical parameter type. The first physical parameter type is dependent on the second physical parameter type and the third physical parameter type. The sensing component 3341 senses the variable physical parameter JA1A to generate the sense signal component SN811. The sensing component 3342 senses the variable physical parameter JB1A to generate the sense signal component SN812.

The processing unit 331 receives the sense signal component SN811 and the sense signal component SN812. Under a condition that the receiving unit 337 receives the control signal SC81, the processing unit 331 obtains the measured value VN81 in response to the sense signal component SN811 and the sense signal component SN812. For example, the processing unit 331 obtains a measured value VN811 in response to the sense signal component SN811, obtains a measured value VN812 in response to the sense signal component SN812, and obtains the measured value VN81 by performing a scientific calculation MY81 using the measured value VN811 and the measured value VN812. The scientific calculation MY81 is formulated beforehand based on the first physical parameter type, the second physical parameter type and the third physical parameter type.

Each of the variable physical parameter JA1A and the variable physical parameter JB1A is one selected from a group consisting of a variable electrical parameter, a variable mechanics parameter, a variable optical parameter, a variable temperature, a variable electrical voltage, a variable electrical current, a variable electrical power, a variable electrical resistance, a variable electrical capacitance, a variable electrical inductance, a variable frequency, a clock time, a variable time length, a variable luminance, a variable luminous intensity, a variable sound volume, a variable data flow, a variable amplitude, a variable spatial location, a variable displacement, a variable sequence position, a variable angle, a variable spatial length, a variable distance, a variable translational velocity, a variable angular velocity, a variable acceleration, a variable force, a variable pressure and a variable mechanical power.

In some embodiments, the sensing unit 334 is configured to meet the sensor specification FU11. The sensing unit 334 generates the sense signal SN81 by performing the sense signal generation HF81 being dependent on the sensor sensibility YW81. The physical parameter application unit 335 includes the physical parameter formation area AU11 which has the variable physical parameter QU1A. Under a condition that the receiving unit 337 receives the control signal SC81 and the variable physical parameter QU1A exists in the physical parameter formation area AU11, the sensing unit 334 senses the variable physical parameter QU1A to generate the sense signal SN81. For example, the sensing unit 334 is coupled to the physical parameter formation area AU11, or is located in the physical parameter formation area AU11. The processing unit 331 receives the sense signal SN81, and obtains the measured value VN81 in the designated measurement value format HH81 by processing the received sense signal SN81.

The processing unit 331 performs a check operation BV81 used to check the mathematical relation KV81 between the measured value VN81 and the measurement value application range RN1L by comparing the measured value VN81 and the obtained application range limit value pair DN1L, and makes the logical decision PB81 based on the check operation BV81. In some embodiments, the processing unit 331 processes the received sense signal SN81 to obtain a measurement value sequence JN81 which includes the measured value VN81. The processing unit 331 performs a check operation BV85 used to check a mathematical relation KV85 between the measurement value sequence JN81 and the measurement value application range RN1L by comparing the measurement value sequence JN81 and the obtained application range limit value pair DN1L. The processing unit 331 makes the logical decision PB81 based on the check operation BV85. For example, the check operation BV85 includes the check operation BV81.

For example, under a condition that the processing unit 331 recognizes the measured value VN81 as a permissible value VG81 being within the measurement value application range RN1L based on the data comparison CD81, the processing unit 331 makes the logical decision PB81 to be positive. Alternatively, under a condition that the processing unit 331 recognizes the mathematical relation KV81 as a numerical-value intersection relation KW81, the processing unit 331 makes the logical decision PB81 to be positive.

In some embodiments, the processing unit 331 obtains the measurement value target range code EM1T from the control signal SC81 in response to the control signal SC81. The processing unit 331 performs a verification operation ZU81 associated with the variable physical parameter QU1A within the designated time TG82 being later than the operation time TF81. Under a condition that the processing unit 331 determines the physical parameter target range RD1ET which the variable physical parameter QU1A enters based on the verification operation ZU81, the processing unit 331 uses the storage unit 332 to assign the obtained measurement value target range code EM1T to the variable physical parameter range code UN8A. For example, the verification operation ZU81 obtains the measured value VN82 in the designated measurement value format HH81 within the designated time TG82 being later than the operation time TF81 in response to the sense signal SN82.

The verification operation ZU81 obtains the target range limit value pair DN1T based on the obtained measurement value target range code EM1T, and checks the mathematical relation KV91 between the measured value VN82 and the measurement value target range RN1T by comparing the measured value VN82 and the obtained target range limit value pair DN1T to make the logical decision PB91 on whether the measured value VN82 is within the measurement value target range RN1T. Under a condition that the logical decision PB91 is positive, the verification operation ZU81 determines the physical parameter target range RD1ET which the variable physical parameter QU1A is currently in, or determines the physical parameter target range RD1ET which the variable physical parameter QU1A enters.

Under a condition that the specific measurement value range code EM14 is different from the obtained measurement value target range code EM1T and the processing unit 331 determines the physical parameter target range RD1ET which the variable physical parameter QU1A is currently in based on the verification operation ZU81, the processing unit 331 uses the storage unit 332 to assign the obtained measurement value target range code EM1T to the variable physical parameter range code UN8A based on the code difference DF81 between the variable physical parameter range code UN8A, being equal to the specific measurement value range code EM14, and the obtained measurement value target range code EM1T.

In some embodiments, under a condition that the processing unit 331 determines within the designated time TG82 the physical parameter target range RD1ET which the variable physical parameter QU1A is currently in based on the verification operation ZU81, the processing unit 331 performs a data comparison CE8T between the variable physical parameter range code UN8A, being equal to the specific measurement value range code EM14, and the obtained measurement value target range code EM1T. Under a condition that the processing unit 331 determines the code difference DF81 between the variable physical parameter range code UN8A, being equal to the specific measurement value range code EM14, and the obtained measurement value target range code EM1T based on the data comparison CE8T, the processing unit 331 uses the storage unit 332 to assign the obtained measurement value target range code EM1T to the variable physical parameter range code UN8A.

For example, under a condition that the processing unit 331 determines the code difference DF81 based on the data comparison CE8T, the processing unit 331 performs the data storage control operation GU81, wherein the data storage control operation GU81 is used to cause the physical parameter target range code UN8T, denoting the determined physical parameter target range RD1ET, to be recorded by the storage unit 332. For example, the physical parameter target range code UN8T is equal to the obtained measurement value target range code EM1T. The data storage control operation GU81 uses the storage unit 332 to assign the obtained measurement value target range code EM1T to the variable physical parameter range code UN8A.

When the receiving unit 337 receives the control signal SC81, the display unit 382 displays the state indication LB81. For example, the state indication LB81 is used to indicate the specific state XJ81 that the variable physical parameter QU1A is configured to be within the specific physical parameter range RD1E4. Before the receiving unit 337 receives the control signal SC81, the processing unit 331 is configured to obtain the specific measurement value range code EM14, and causes the display unit 382 to display the state indication LB81 based on the obtained specific measurement value range code EM14.

Under a condition that the processing unit 331 determines the code difference DF81 based on the data comparison CE8T, the processing unit 331 causes the display unit 382 to change the state indication LB81 to the state indication LB82 based on the obtained measurement value target range code EM1T. For example, the state indication LB82 is used to indicate the specific state XJ82 that the variable physical parameter QU1A is currently within the physical parameter target range RD1ET.

In some embodiments, each of the physical parameter target range RD1ET and the physical parameter application range RD1EL is included in the plurality of different physical parameter reference ranges RD1E1, RD1E2, . . . . The physical parameter target range RD1ET is equal to or different from the physical parameter application range RD1EL. The variable physical parameter QU1A is further characterized based on a physical parameter candidate range RD1E2. The physical parameter candidate range RD1E2 is different from the physical parameter application range RD1EL, and is equal to or different from the physical parameter target range RD1ET. For example, the physical parameter application range RD1EL is a physical parameter candidate range.

The physical parameter target range RD1ET is configured to correspond to a corresponding physical parameter range RY1ET. The rated physical parameter range RD1E is equal to a range combination of the physical parameter target range RD1ET and the corresponding physical parameter range RY1ET, and includes the physical parameter application range RD1EL and the physical parameter candidate range RD1E2. The measurement value target range RN1T is configured to correspond to a corresponding measurement value range RX1T. The rated measurement value range RD1N is equal to a range combination of the measurement value target range RN1T and the corresponding measurement value range RX1T. The corresponding physical parameter range RY1ET is represented by the corresponding measurement value range RX1T. For example, the corresponding measurement value range RX1T is defaulted in the designated measurement value format HH81 based on one of the sensor measurement range representation GW8R and the sensor specification FU11.

Each of the measurement value target range RN1T and the measurement value application range RN1L is included in the plurality of different measurement value reference ranges RN11, RN12, . . . . The measurement value target range RN1T is equal to or different from the measurement value application range RN1L. The physical parameter candidate range RD1E2 is represented by a measurement value candidate range RN12. The measurement value candidate range RN12 is different from the measurement value application range RN1L, and is equal to or different from the measurement value target range RN1T. The rated measurement value range RD1N includes the measurement value application range RN1L and the measurement value candidate range RN12. For example, the measurement value candidate range RN12 is defaulted based on the physical parameter candidate range RD1E2 and the rated measurement value range RD1N. The measurement value application range RN1L is a measurement value candidate range.

The rated measurement value range RD1N is defaulted in the designated measurement value format HH81 based on the rated physical parameter range representation GA8E, the sensor measurement range representation GW8R and the rated physical parameter range representation GA8E.

In some embodiments, the physical parameter application range RD1EL is separate from or adjacent to the physical parameter candidate range RD1E2. Under a condition that the physical parameter application range RD1EL is separate from the physical parameter candidate range RD1E2, the measurement value application range RN1L is separate from the measurement value candidate range RN12. Under a condition that the physical parameter application range RD is adjacent to the physical parameter candidate range RD1E2, the measurement value application range RN1L is adjacent to the measurement value candidate range RN12. The plurality of different physical parameter reference ranges RD1E1, RD1E2, . . . include the physical parameter candidate range RD1E2, are respectively represented by the plurality of different measurement value reference ranges RN11, RN12, . . . , and are respectively denoted by a plurality of physical parameter reference range codes.

The measurement value candidate range RN12 is denoted by a measurement value candidate range code EM12, and has a candidate range limit value pair DN1B, thereby the measurement value candidate range code EM12 is configured to indicate the physical parameter candidate range RD1E2. For example, the candidate range limit value pair DN1B includes a candidate range limit value DN13 and a candidate range limit value DN14 being opposite to the candidate range limit value DN13. Each of the measurement value candidate range code EM12 and the candidate range limit value pair DN1B is defaulted. The plurality of different measurement value reference range codes EM11, EM12, . . . include the defaulted measurement value candidate range code EM12. The plurality of different measurement value reference ranges RN11, RN12, . . . include the measurement value candidate range RN12, and are respectively denoted by the plurality of different measurement value reference range codes EM11, EM12, . . . . For example, the plurality of physical parameter reference range codes are configured to be equal to the plurality of different measurement value reference range codes EM11, EM12, . . . respectively.

For example, the measurement application function specification GAL8 further includes a physical parameter candidate range representation GA82 which is used to indicate the physical parameter candidate range RD1E2. Each of the measurement value candidate range RN12 and the candidate range limit value pair DN1B is defaulted in the designated measurement value format HH81 based on the sensor specification FU11. For example, each of the measurement value candidate range RN12 and the candidate range limit value pair DN1B is defaulted in the designated measurement value format HH81 based on the physical parameter candidate range representation GA82, the sensor measurement range representation GW8R, the sensor sensibility representation GW81, and a data coding operation ZX84 used to convert the physical parameter candidate range representation GA82.

In some embodiments, the measurement application function specification GAL8 is used to indicate the rated physical parameter range RD1E and the plurality of different physical parameter reference ranges RD1E1, RD1E2, . . . . Each of the rated measurement value range RD1N, the rated range limit value pair DD1A, the plurality of different measurement value reference ranges RN11, RN12, . . . , and the plurality of different measurement value reference range codes EM11, EM12, . . . is defaulted based on the measurement application function specification GAL8. The measurement application function FA81 is selected from a plurality of different physical parameter control action functions. The storage unit 332 stores the measurement application function specification GAL8.

The processing unit 331 sets the rated range limit value pair DD1A, the application range limit value pair DN1L, the target range limit value pair DN1T, the candidate range limit value pair DN1B, . . . beforehand according to the measurement application function specification GAL8. The sense signal SN81 includes sense data. For example, the sense data belong to the binary data type. The processing unit 331 obtains the measured value VN81 in the designated measurement value format HH81 based on the sense data.

In some embodiments, the operation unit 397 is configured to perform the measurement application function FA81 by means of the control signal SC81. The processing unit 331 makes the logical decision PB81 on whether the measured value VN81 is within the measurement value application range RN1L based on the check operation BV81 for the measurement application function FA81. Under a condition that the logical decision PB81 is positive, the processing unit 331 checks the range relation KE8A to make the reasonable decision PW81 by comparing the obtained target range limit value pair DN1T and the obtained application range limit value pair DN1L.

For example, under a condition that the reasonable decision PW81 is positive, the processing unit 331 performs the signal generation control GY81 based on the obtained handle CC1T to cause the output component 338 to generate the operation signal SG81, wherein the operation signal SG81 is used to cause the variable physical parameter QU1A to enter the physical parameter target range RD1ET. Under a condition that the logical decision PB81 is negative, the processing unit 331 determines the measurement value candidate range code EM12, selected from the plurality of different measurement value reference range codes EM11, EM12, . . . , by performing a scientific calculation MR82 using the determined measurement value application range code EMIL in order to select the measurement value candidate range RN12 from the plurality of different measurement value reference ranges RN11, RN12, . . . .

The processing unit 331 obtains the candidate range limit value pair DN1B based on the determined measurement value candidate range code EM12, and checks a mathematical relation KV82 between the measured value VN81 and the selected measurement value candidate range RN12 based on a data comparison CD82 between the measured value VN81 and the obtained candidate range limit value pair DN1B to make a logical decision PB82 on whether the measured value VN81 is within the selected measurement value candidate range RN12. Under a condition that the logical decision PB82 is positive, the processing unit 331 determines the physical parameter candidate range RD1E2 which the variable physical parameter QU1A is currently in.

Under a condition that the logical decision PB82 is positive, the processing unit 331 checks a range relation KE8B between the measurement value target range RN1T and selected the measurement value candidate range RN12 by comparing the obtained measurement value target range code EM1T and the determined measurement value candidate range code EM12 to make a logical decision PZ82 on whether the obtained measurement value target range code EM1T and the determined measurement value candidate range code EM12 are equal. Under a condition that the logical decision PZ82 is negative, the processing unit 331 uses the output component 338 to generate the operation signal SG81, wherein the operation signal SG81 is used to cause the variable physical parameter QU1A to enter the physical parameter target range RD1ET.

For example, under a condition that the logical decision PB82 is positive, the processing unit 331 checks a range relation KE9B between the physical parameter target range RD1ET and the selected physical parameter candidate range RD1E2 by comparing the obtained measurement value target range code EM1T and the determined measurement value candidate range code EM12 to make a logical decision PZ92 on whether the physical parameter target range RD1ET and the selected physical parameter candidate range RD1E2 are equal. Under a condition that the logical decision PZ92 is negative, the processing unit 331 uses the output component 338 by recognizing the range relation KE9B as a range difference relation to generate the operation signal SG81 which is used to cause the variable physical parameter QU1A to enter the physical parameter target range RD1ET. Under a condition that the logical decision PZ82 is negative, the logical decision PZ92 is negative.

In some embodiments, under a condition that the variable physical parameter QU1A is configured to be within the physical parameter target range RD1ET based on the control signal SC81, the input unit 380 receives the user input operation BQ81, and provides an input data DH81 to the processing unit 331 in response to the user input operation BQ81. The processing unit 331 performs a data coding operation EA81 on the input data DH81 to determine the specific input code UW81. The processing unit 331 performs a check operation ZP81 for the measurement application function FA81 in response to determining the specific input code UW81 to decide whether the determined specific input code UW81 is equal to the variable physical parameter range code UN8A.

For example, under a condition that the processing unit 331 determines the specific input code UW81, the processing unit 331 reads the variable physical parameter range code UN8A being equal to the measurement value target range code EM1T by using the storage unit 332, and performs the check operation ZP81 used to check an arithmetic relation KP81 between the determined specific input code UW81 and the read measurement value target range code EM1T. The check operation ZP81 is configured to compare the determined specific input code UW81 and the read measurement value target range code EM1T by performing a data comparison CE81 for the measurement application function FA81 to decide whether the determined specific input code UW81 and the read measurement value target range code EM1T are different.

Under a condition that the processing unit 331 determines the code difference DX81 between the determined specific input code UW81 and the variable physical parameter range code UN8A, being equal to the obtained measurement value target range code EM1T, by performing the data comparison CE81, the processing unit 331 causes the output component 338 to perform a signal generation operation BY82 for the measurement application function FA81 to generate an operation signal SG82. For example, the operation signal SG82 is one of a functional signal and a control signal. The output component 338 transmits the operation signal SG82 to the physical parameter application unit 335.

The physical parameter application unit 335 causes the variable physical parameter QU1A to enter the corresponding physical parameter range RY1ET from the physical parameter target range RD1ET in response to the operation signal SG82. For example, the operation signal SG82 is one selected from a group consisting of a pulse width modulation signal, an electrical level signal, a driving signal and an instruction signal. For example, the physical parameter application unit 335 causes the variable physical parameter QU1A in response to the operation signal SG82 to leave the physical parameter target range RD1ET to enter the specific physical parameter range RD1E5 which is included in the plurality of different physical parameter reference ranges RD1E1, RD1E2, . . . .

For example, the plurality of different measurement value reference range codes EM11, EM12, . . . include a specific measurement value range code EM15 being different from the measurement value target range code EM1T. The specific measurement value range code EM15 is configured to indicate the specific physical parameter range RD1E5. Under a condition that the determined specific input code UW81 is equal to the specific measurement value range code EM15 to cause the determined specific input code UW81 and the variable physical parameter range code UN8A, being equal to the obtained measurement value target range code EM1T, to have the code difference DX81 therebetween, the processing unit 331 determines the code difference DX81 by performing the data comparison CE81, and uses the output component 338 to generate the operation signal SG82 in response to determining the code difference DX81. The physical parameter application unit 335 causes the variable physical parameter QU1A in response to the operation signal SG82 to leave the physical parameter target range RD1ET to enter the specific physical parameter range RD1E5 included in the corresponding physical parameter range RY1ET.

For example, after the processing unit 331 causes the output component 338 to perform the signal generation operation BY82, the processing unit 331 performs a verification operation associated with the variable physical parameter QU1A within a designated time. Under a condition that the processing unit 331 determines the specific physical parameter range RD1E5 which the variable physical parameter QU1A enters based on the verification operation, the processing unit 331 assigns the determined specific input code UW81, being equal to the specific measurement value range code EM15, to the variable physical parameter range code UN8A. For example, the specific physical parameter range RD1E5 is equal to one of the physical parameter application range RD1EL and the physical parameter target range RD1EU.

In some embodiments, under a condition that the processing unit 331 causes the variable physical parameter QU1A to be in the physical parameter target state JE1U by checking the first mathematical relation KQ81 the input unit 380 receives the user input operation BQ82, and provides an input data DH82 to the processing unit 331 in response to the user input operation BQ82. The processing unit 331 performs a data coding operation EA82 on the input data DH82 to determine the specific input code UW82.

Figure 27:
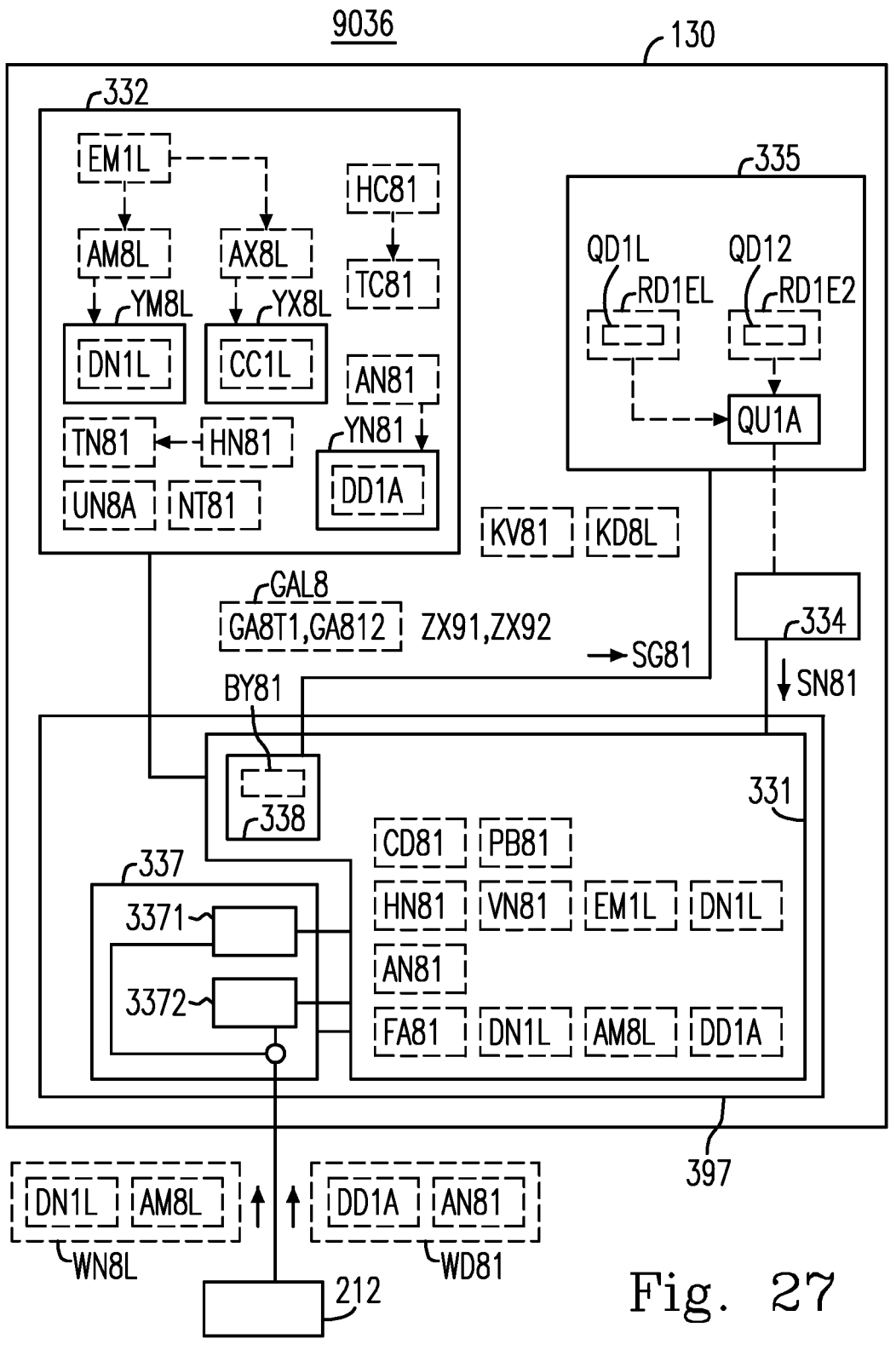
FIG. 27 is a schematic diagram showing an implementation structure of the control system shown in FIG. 1.
Figure 28:
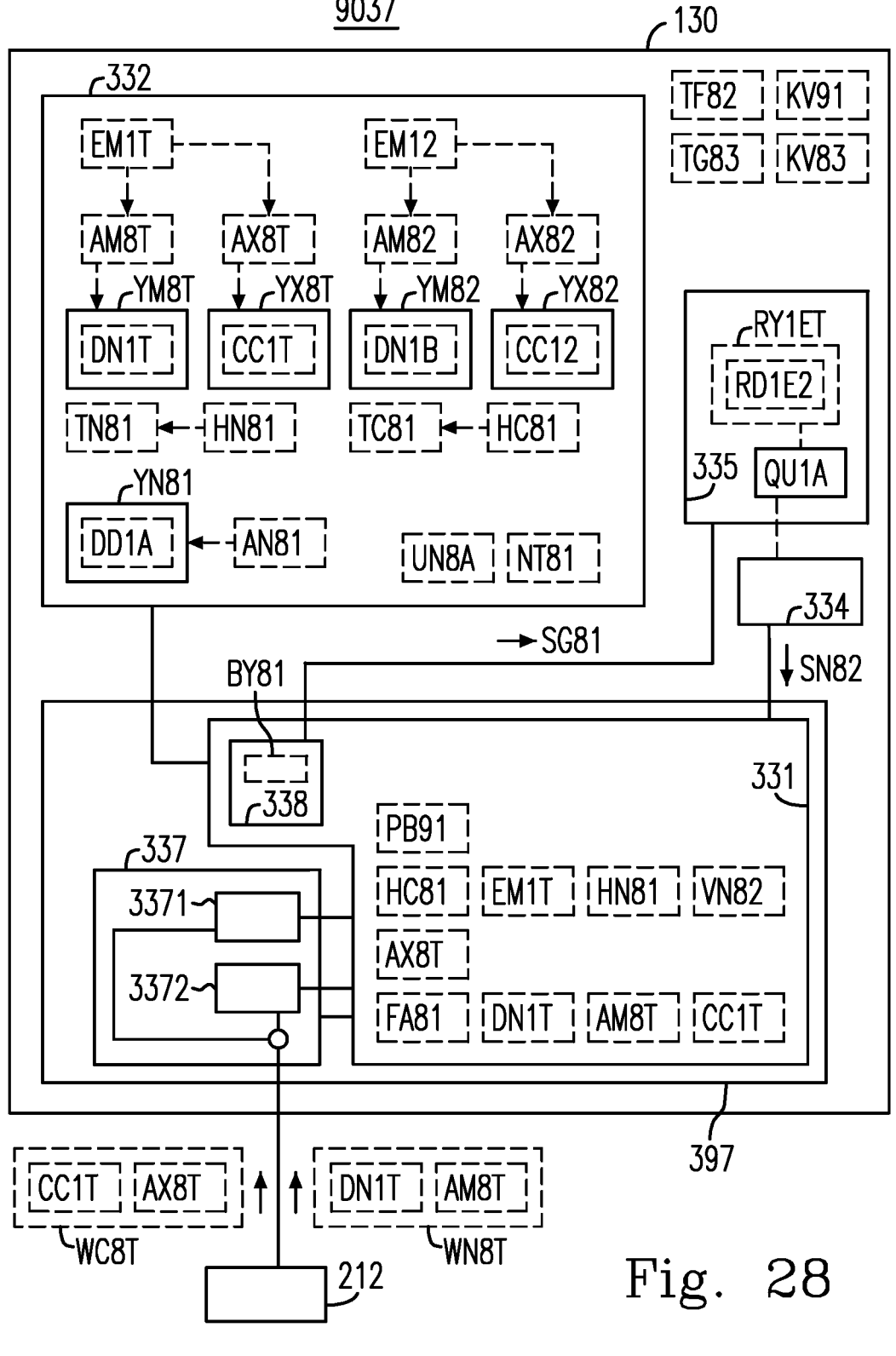
FIG. 28 is a schematic diagram showing an implementation structure of the control system shown in FIG. 1.
Figure 29:
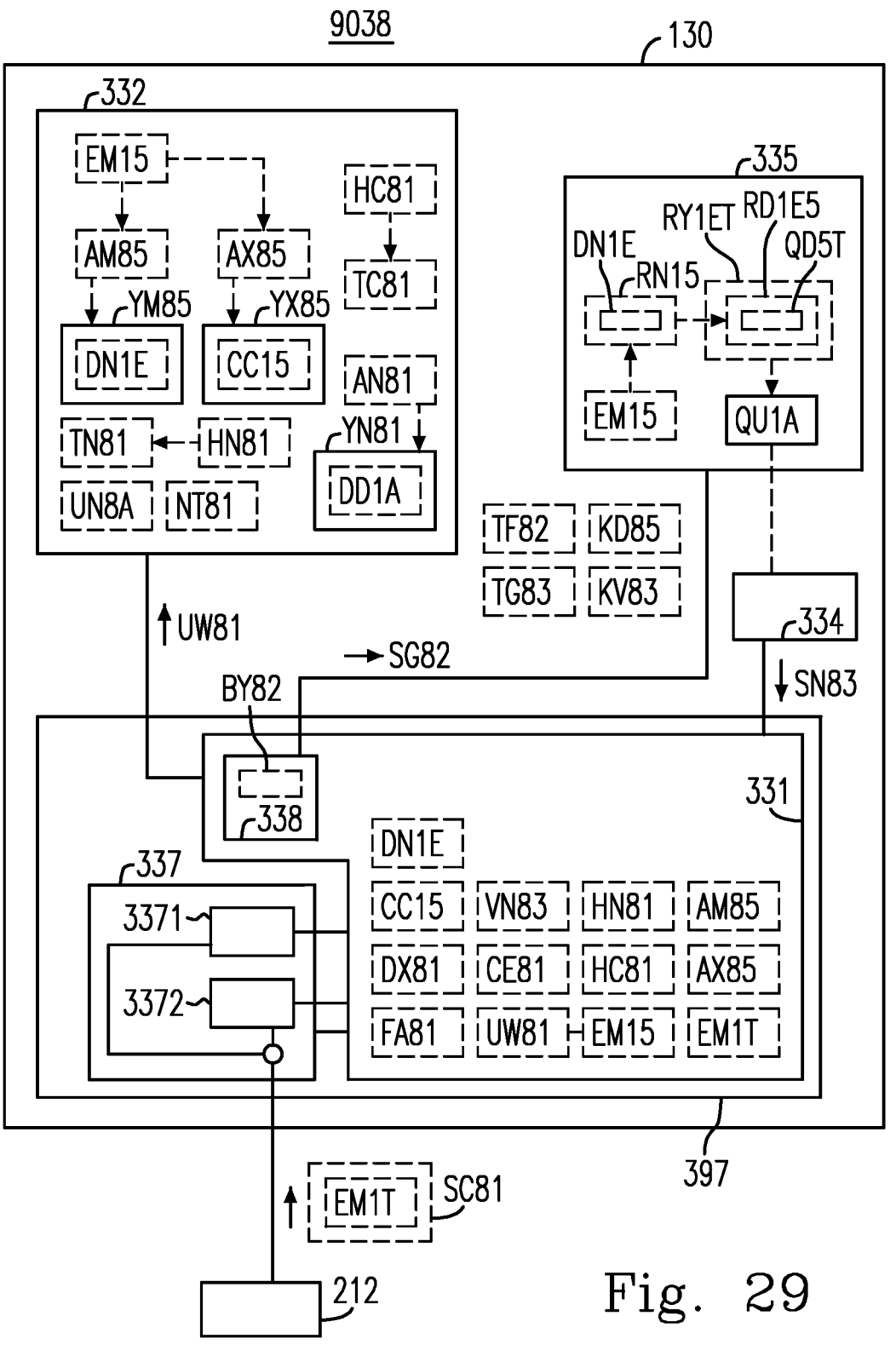
FIG. 29 is a schematic diagram showing an implementation structure of the control system shown in FIG. 1.

Please refer to FIG. 27, FIG. 28 and FIG. 29. FIG. 27 is a schematic diagram showing an implementation structure 9036 of the control system 901 shown in FIG. 1. FIG. 28 is a schematic diagram showing an implementation structure 9037 of the control system 901 shown in FIG. 1. FIG. 29 is a schematic diagram showing an implementation structure 9038 of the control system 901 shown in FIG. 1. As shown in FIG. 27, FIG. 28 and FIG. 29, each of the implementation structure 9036, the implementation structure 9037 and the implementation structure 9038 includes the control device 212 and the functional device 130. The functional device 130 includes the operation unit 397, the sensing unit 334, the physical parameter application unit 335 and the storage unit 332. The operation unit 397 includes the processing unit 331, the receiving unit 337 and the transmission unit 384.

In some embodiments, the storage unit 332 has the memory location YM8L, and stores the application range limit value pair DN1L at the memory location YM8L. The memory location YM8L is identified based on the defaulted measurement value application range code EM1L. For example, the memory location YM8L is identified based on the memory address AM8L, or is identified by the memory address AM8L.

The storage unit 332 has the memory location YM8T and the memory location YX8T being different from the memory location YM8T, stores the target range limit value pair DN1T at the memory location YM8T, and stores the handle CC1T at the memory location YX8T. For example, each of the memory location YM8T and the memory location YX8T is identified based on the defaulted measurement value target range code EM1T. The handle CC1T is defaulted based on the designated physical parameter QD1T being within the physical parameter target range RD1ET. The memory location YM8T is identified based on a memory address AM8T, or is identified by the memory address AM8T. The memory location YX8T is identified based on the memory address AX8T, or is identified by the memory address AX8T. The memory location YM8L is different from the memory location YX8T.

The storage unit 332 further has a memory location YM82 and a memory location YX82 being different from the memory location YM82, stores the candidate range limit value pair DN1B at the memory location YM82, and stores a handle CC12 at the memory location YX82. For example, each of the memory location YM82 and the memory location YX82 is identified based on the defaulted measurement value candidate range code EM12. The handle CC12 is defaulted based on a designated physical parameter QD12 being within the physical parameter candidate range RD1E2.

For example, the measurement application function specification GAL8 includes a physical parameter representation GA812, wherein the physical parameter representation GA812 is used to indicate the designated physical parameter QD12 being within the physical parameter target range RD1E2. The handle CC12 is defaulted based on the physical parameter representation GA812 and a data coding operation ZX92 used to convert the physical parameter representation GA812. The memory location YM82 is identified based on the memory address AM82, or is identified by the memory address AM82. The memory location YX82 is identified based on the memory address AX82, or is identified by the memory address AX82.

For example, the storage unit 332 further has a memory location YX8L, and stores a handle CC1L at the memory location YX8L. The memory location YX8L is identified based on a memory address AX8L, or is identified by the memory address AX8L. The handle CC1L is defaulted based on a designated physical parameter QD1L being within the physical parameter application range RD1EL.

In some embodiments, each of the application range limit value pair DN1L, the target range limit value pair DN1T and the candidate range limit value pair DN1B belongs to a measurement range limit data code type TN81. The measurement range limit data code type TN81 is identified by a measurement range limit data code type identifier HN81. Each of the handle CC1T and the handle CC12 belongs to a handle type TC81. The handle type TC81 is identified by a handle type identifier HC81. Each of the measurement range limit data code type identifier HN81 and the handle type identifier HC81 is defaulted.

The memory address AM8L is defaulted based on the defaulted measurement value application range code EMIL and the defaulted measurement range limit data code type identifier HN81. The memory address AX8L is defaulted based on the defaulted measurement value application range code EMIL and the defaulted handle type identifier HC81. The memory address AX8T is defaulted based on the defaulted measurement value target range code EM1T and the defaulted handle type identifier HC81. The third memory address AM8T is defaulted based on the defaulted measurement value target range code EM1T and the defaulted measurement range limit data code type identifier HN81. The memory address AM82 is defaulted based on the defaulted measurement value candidate range code EM12 and the defaulted measurement range limit data code type identifier HN81. The memory address AX82 is defaulted based on the defaulted measurement value candidate range code EM12 and the defaulted handle type identifier HC81.

In some embodiments, the processing unit 331 determines the measurement value application range code EMIL in response to the control signal SC81, obtains the defaulted measurement range limit data code type identifier HN81 in response to the control signal SC81, obtains the memory address AM8L based on the determined measurement value application range code EMIL and the obtained measurement range limit data code type identifier HN81, and uses the storage unit 332 based on the obtained memory address AM8L to access the application range limit value pair DN1L, stored at the memory location YM8L, to obtain the application range limit value pair DN1L.

The processing unit 331 checks the mathematical relation KV81 based on the data comparison CD81 between the measured value VN81 and the obtained application range limit value pair DN1L to make the logical decision PB81 on whether the measured value VN81 is within the selected measurement value application range RN1L, and determines the physical parameter application range RD1EL which the variable physical parameter QU1A is currently in under a condition that the logical decision PB81 is positive. For example, under a condition that the logical decision PB81 is positive, the processing unit 331 determines a physical parameter situation that the variable physical parameter QU1A is currently within the physical parameter application range RD1EL, and thereby recognizes a physical parameter relation KD8L between the variable physical parameter QU1A and the physical parameter application range RD1EL as a physical parameter intersection relation that the variable physical parameter QU1A is currently within the physical parameter application range RD1EL. The processing unit 331 checks the physical parameter relation KD8L by checking the mathematical relation KV81.

The processing unit 331 obtains the defaulted handle type identifier HC81 in response to the control signal SC81, and obtains the measurement value target range code EM1T from the control signal SC81. Under a condition that the processing unit 331 determines the range difference DS81, the processing unit 331 obtains the memory address AX8T based on the obtained measurement value target range code EM1T and the obtained handle type identifier HC81, and uses the storage unit 332 based on the obtained memory address AX8T to access the handle CC1T stored at the memory location YX8T. The processing unit 331 causes the output component 338 based on the accessed handle CC1T to perform the signal generation operation BY81 for the measurement application function FA81 to generate the operation signal SG81, wherein the operation signal SG81 is used to control the physical parameter application unit 335 to cause the variable physical parameter QU1A to enter the physical parameter target range RD1ET.

The processing unit 331 obtains the third memory address AM8T based on the obtained measurement value target range code EM1T and the obtained measurement range limit data code type identifier HN81, and uses the storage unit 332 based on the obtained third memory address AM8T to access the target range limit value pair DN1T, stored at the memory location YM8T, to obtain the target range limit value pair DN1T. The processing unit 331 checks the mathematical relation KV91 between the measured value VN82 and the measurement value target range RN1T by comparing the measured value VN82 and the obtained target range limit value pair DN1T to make the logical decision PB91 on whether the measured value VN82 is within the measurement value target range RN1T.

In some embodiments, before the receiving unit 337 receives the control signal SC81, one of the receiving component 3371 and the receiving component 3372 receives the writing request message WN8L which includes the defaulted application range limit value pair DN1L and the defaulted memory address AM8L. For example, one of the receiving component 3371 and the receiving component 3372 receives the writing request message WN8L from the control device 212 beforehand. The processing unit 331 uses the storage unit 332 in response to the writing request message WN8L to store the application range limit value pair DN1L of the writing request message WN8L to the memory location YM8L.

Before the receiving unit 337 receives the control signal SC81, one of the receiving component 3371 and the receiving component 3372 receives the writing request message WC8T including the defaulted handle CC1T and the defaulted memory address AX8T. For example, one of the receiving component 3371 and the receiving component 3372 receives the writing request message WC8T from the control device 212 beforehand. The processing unit 331 uses the storage unit 332 in response to the writing request message WC8T to store the handle CC1T of the writing request message WC8T to the memory location YX8T.

Before the receiving unit 337 receives the control signal SC81, one of the receiving component 3371 and the receiving component 3372 receives a writing request message WN8T which includes the defaulted target range limit value pair DN1T and the defaulted third memory address AM8T. For example, one of the receiving component 3371 and the receiving component 3372 receives the writing request message WN8T from the control device 212 beforehand. The processing unit 331 uses the storage unit 332 in response to the writing request message WN8T to store the target range limit value pair DN1T of the writing request message WN8T to the memory location YM8T.

The storage unit 332 further has a memory location YN81, and stores the rated range limit value pair DD1A at the memory location YN81. The memory location YN81 is identified based on a memory address AN81, or is identified by the memory address AN81. For example, the memory address AN81 is defaulted. Before the receiving unit 337 receives the control signal SC81, one of the receiving component 3371 and the receiving component 3372 receives a writing request message WD81 which includes the defaulted rated range limit value pair DD1A and the defaulted memory address AN81. For example, one of the receiving component 3371 and the receiving component 3372 receives the writing request message WD81 from the control device 212 beforehand. The processing unit 331 uses the storage unit 332 in response to the writing request message WD81 to store the rated range limit value pair DD1A of the writing request message WD81 to the memory location YN81.

In some embodiments, the processing unit 331 obtains the memory address AM82 based on the determined measurement value candidate range code EM12 and the obtained measurement range limit data code type identifier HN81, and uses the storage unit 332 based on the obtained memory address AM82 to access the candidate range limit value pair DN1B, stored at the memory location YM82, to obtain the candidate range limit value pair DN1B.

In some embodiments, the specific physical parameter range RD1E5 is represented by a specific measurement value range RN15. The specific measurement value range RN15 has a specific range limit value pair DN1E. The storage unit 332 further has a memory location YM85 and a memory location YX85 being different from the memory location YM85, The memory location YM85 is identified based on a memory address AM85, and is defaulted based on the specific measurement value range code EM15 and the measurement range limit data code type identifier HN81. The memory location YX85 is identified based on a memory address AX85, and is defaulted based on the specific measurement value range code EM15 and the handle type identifier HC81.

The storage unit 332 stores the specific range limit value pair DN1E at the memory location YM85, and 在 stores a handle CC15 at the memory location YX85. The specific range limit value pair DN1E is configured to denote the specific physical parameter range RD1E5, and belongs to the measurement range limit data code type TN81. The handle CC15 belongs to the handle type TC81, and is defaulted based on a designated physical parameter QD5T being within the specific physical parameter range RD1E5.

Under a condition that the determined specific input code UW81 is equal to the defaulted specific measurement value range code EM15 to cause the determined specific input code UW81 and the variable physical parameter range code UN8A, being equal to the obtained measurement value target range code EM1T, have the code difference DX81 therebetween, the processing unit 331 determines the code difference DX81 by performing the data comparison CE11. Under a condition that the processing unit 331 determines the code difference DX81, the processing unit 331 obtains the memory address AX85 based on the determined specific input code UW81, being equal to the defaulted specific measurement value range code EM15, and the obtained handle type identifier HC81.

The processing unit 331 uses the storage unit 332 based on the obtained memory address AX85 to access the handle CC15 stored at the memory location YX85, and causes the output component 338 based on the accessed handle CC15 to perform the signal generation operation BY82 for the measurement application function FA81 to generate the operation signal SG82, wherein the operation signal SG82 is used to control the physical parameter application unit 335 to cause the variable physical parameter QU1A enter the specific physical parameter range RD1E5 included in the corresponding physical parameter range RY1ET.

In some embodiments, after the processing unit 331 causes the output component 338 within an operation time TF82 to perform the signal generation operation BY82 to generate the operation signal SG82, the sensing unit 334 senses the variable physical parameter QU1A to generate a sense signal SN83. The processing unit 331 obtains a measured value VN83 in response to the sense signal SN83 at a designated time TG83 being later than the operation time TF82. The processing unit 331 is configured to obtain the memory address AM85 based on the determined specific input code UW81, being equal to the defaulted specific measurement value range code EM15, and the obtained measurement range limit data code type identifier HN81, and 來 uses the storage unit 332 based on the obtained memory address AM85 to access the specific range limit value pair DN1E stored at the memory location YM85.

Under a condition that the processing unit 331 checks a mathematical relation KV83 between the measured value VN83 and the specific measurement value range RN15 by comparing the measured value VN83 and the obtained specific range limit value pair DN1E to determine the specific physical parameter range RD1E5 which the variable physical parameter QU1A is currently in, the processing unit 331 uses the storage unit 332 based on a code difference between the variable physical parameter range code UN8A and the determined specific input code UW81, being equal to the defaulted specific measurement value range code EM15, to assign the determined specific input code UW81 to the variable physical parameter range code UN8A.

For example, the processing unit 331 determines a physical parameter situation that the variable physical parameter QU1A is currently within the specific physical parameter range RD1E5 by checking the mathematical relation KV83, and thereby recognizes a physical parameter relation KD85 between the variable physical parameter QU1A and the specific physical parameter range RD1E5 as a physical parameter intersection relation that the variable physical parameter QU1A is currently within the specific physical parameter range RD1E5. The processing unit 331 checks the physical parameter relation KD85 by checking the mathematical relation KV83.

Figure 30:
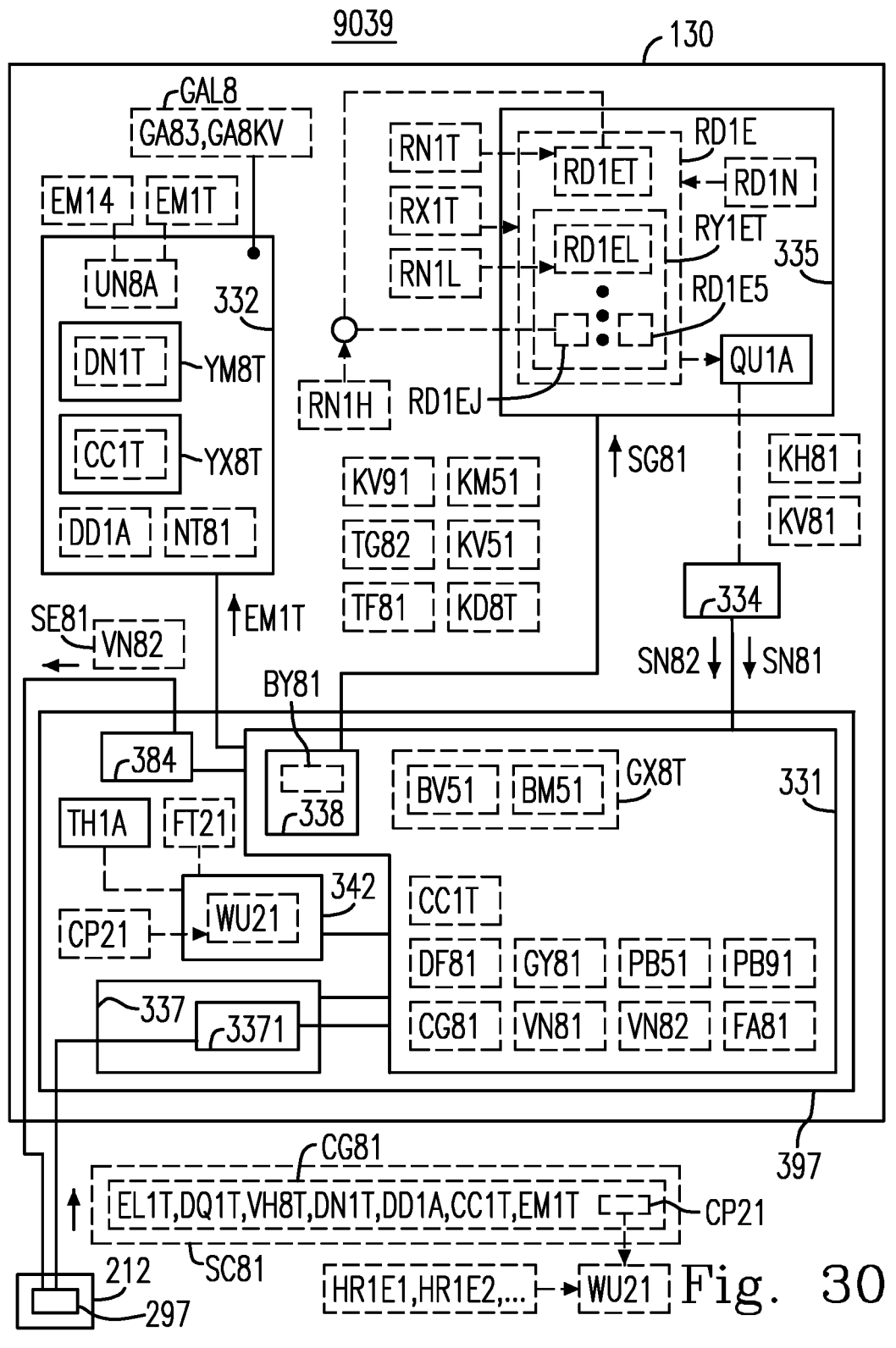
FIG. 30 is a schematic diagram showing an implementation structure of the control system shown in FIG. 1.
Figure 31:
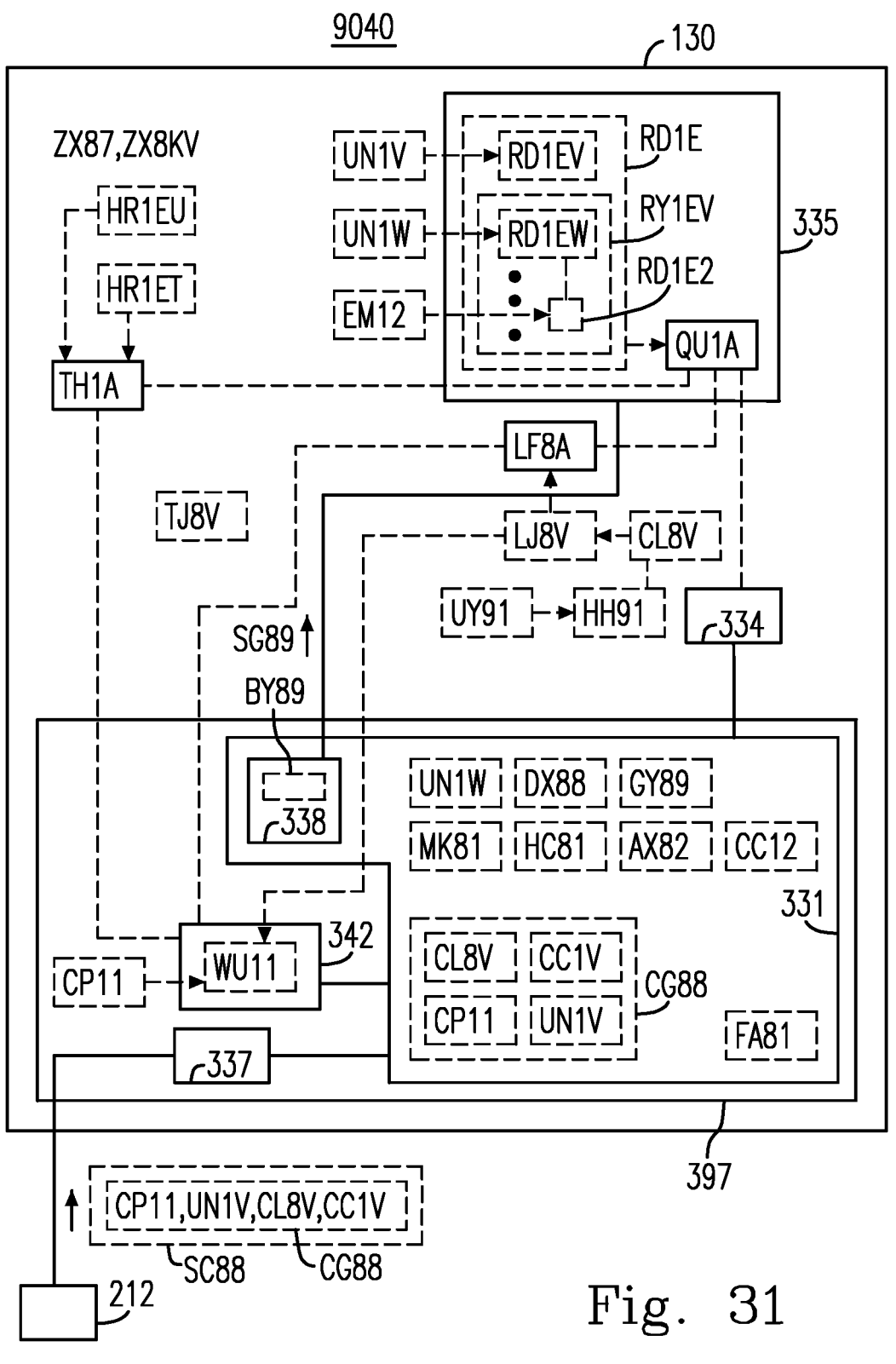
FIG. 31 is a schematic diagram showing an implementation structure of the control system shown in FIG. 1.
Figure 32:
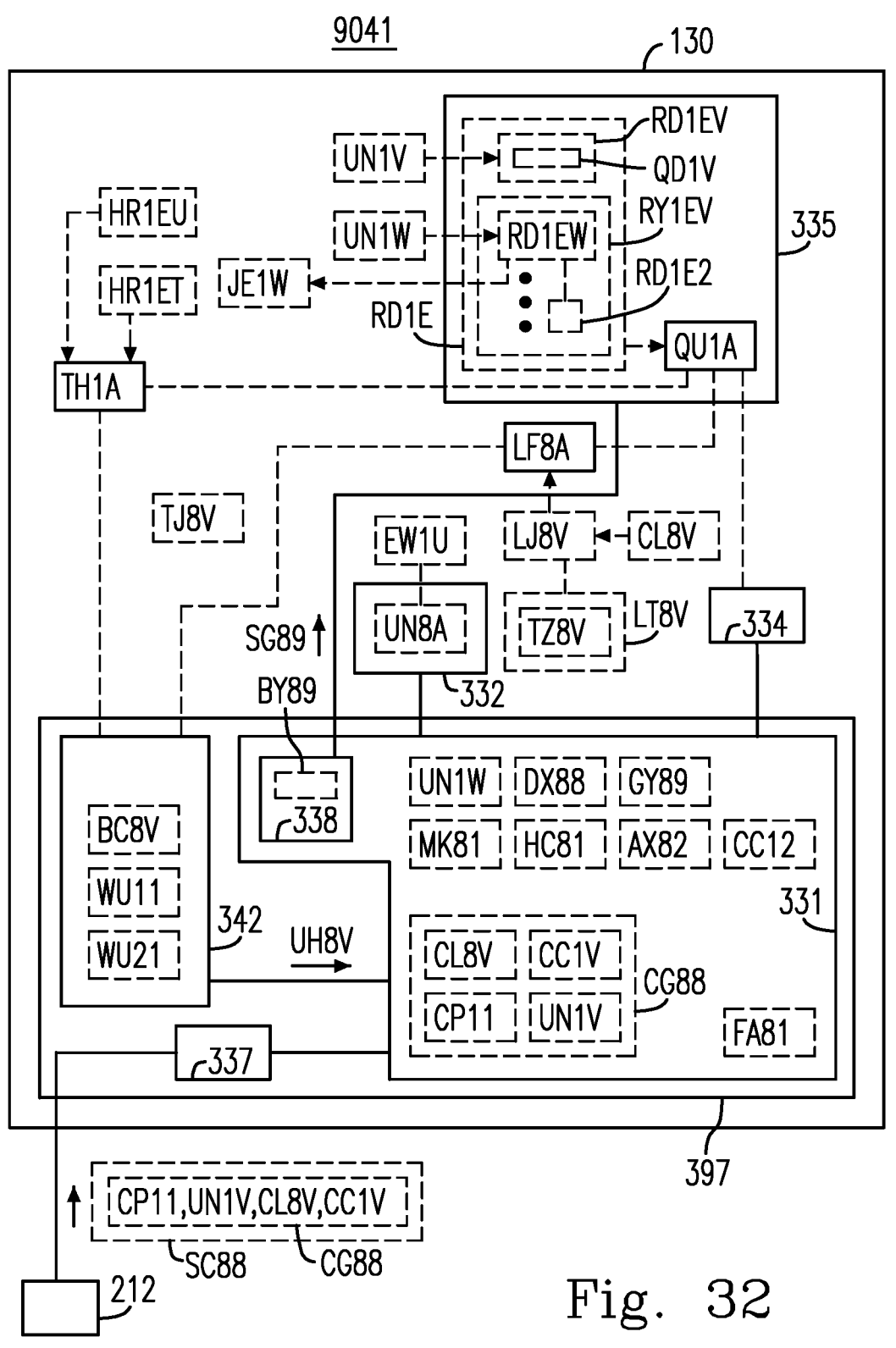
FIG. 32 is a schematic diagram showing an implementation structure of the control system shown in FIG. 1.

Please refer to FIG. 30, FIG. 31 and FIG. 32. FIG. 30 is a schematic diagram showing an implementation structure 9039 of the control system 901 shown in FIG. 1. FIG. 31 is a schematic diagram showing an implementation structure 9040 of the control system 901 shown in FIG. 1. FIG. 32 is a schematic diagram showing an implementation structure 9041 of the control system 901 shown in FIG. 1. As shown in FIG. 30, FIG. 31 and FIG. 32, each of the implementation structure 9039, the implementation structure 9040 and the implementation structure 9041 includes the control device 212 and the functional device 130. The functional device 130 includes the operation unit 397, the sensing unit 334, the physical parameter application unit 335 and the storage unit 332. The operation unit 397 includes the processing unit 331, the timer 342, the receiving unit 337 and the transmission unit 384.

In some embodiments, the control signal SC81 received by the receiving unit 337 carries the control message CG81, wherein the control message CG81 includes a timing operation mode code CP21, the measurement value designation range code EL1T, the designated range limit value pair DQ1T, the measurement time length value VH8T, the target range limit value pair DN1T, the rated range limit value pair DD1A, the handle CC1T and the measurement value target range code EM1T. The timing operation mode code CP21 denotes a timing operation mode WU21 in which the timer 342 is operated.

The processing unit 331 obtains the control message CG81 from the control signal SC81, and starts the timer 342 based on the obtained timing operation mode code CP21 to cause the timer 342 to operate in the timing operation mode WU21. The timer 342 senses the clock time TH1A in the timing operation mode WU21. The timing operation mode WU21 is characterized based on the plurality of different clock time reference intervals HR1E1, HR1E2, . . . . Under a condition that the processing unit 331 determines the range difference DS81 based on the control signal SC81, the processing unit 331 causes the output component 338 based on the obtained handle CC1T to perform the signal generation operation BY81, wherein the signal generation operation BY81 is used to cause the variable physical parameter QU1A to enter the physical parameter target range RD1ET.

In some embodiments, the processing unit 331 obtains the measurement value target range code EM1T and the target range limit value pair DN1T from the received control signal SC81. Under a condition that the specific measurement value range code EM14 is different from the obtained measurement value target range code EM1T and the processing unit 331 来 determines the physical parameter target range RD1ET which the variable physical parameter QU1A is currently in by comparing the measured value VN82 and the obtained target range limit value pair DN1T, the processing unit 331 uses the storage unit 332 based on the code difference DF81 between the variable physical parameter range code UN8A, being equal to the specific measurement value range code EM14, and the obtained measurement value target range code EM1T to assign the obtained measurement value target range code EM1T to the variable physical parameter range code UN8A.

For example, the processing unit 331 determines a physical parameter situation that the variable physical parameter QU1A is currently within the physical parameter target range RD1ET by comparing the measured value VN82 and the obtained target range limit value pair DN1T, and thereby recognizes a physical parameter relation KD8T between the variable physical parameter QU1A and the physical parameter target range RD1ET as a physical parameter intersection relation that the variable physical parameter QU1A is currently within the physical parameter target range RD1ET. The processing unit 331 checks the physical parameter relation KD8T by comparing the measured value VN82 and the obtained target range limit value pair DN1T.

In some embodiments, the processing unit 331 performs a check operation BV51 used to check a mathematical relation KV51 between the measured value VN81 and the measurement value target range RN1T in response to the control signal SC81. Under a condition that the processing unit 331 determines the corresponding physical parameter range RY1ET which the variable physical parameter QU1A is currently in based on the check operation BV51, the processing unit 331 performs the signal generation control GY81 within the operation time TF81 based on the control signal SC81 to transmit the operation signal SG81 toward the physical parameter application unit 335. The operation signal SG81 is used to cause the variable physical parameter QU1A from the corresponding physical parameter range RY1ET, which the variable physical parameter QU1A is currently in, to enter the physical parameter target range RD1ET.

The control signal SC81 carries the target range limit value pair DN1T, the rated range limit value pair DD1A and the handle CC1T. The processing unit 331 obtains the target range limit value pair DN1T from the control signal SC81, and performs the check operation BV51 by comparing the measured value VN81 and the obtained target range limit value pair DN1T to make a logical decision PB51 on whether the measured value VN81 is within the corresponding measurement value range RX1T. Under a condition that the logical decision PB51 is positive, the processing unit 331 determines the corresponding physical parameter range RY1ET which the variable physical parameter QU1A is currently in.

The processing unit 331 obtains the handle CC1T from the control signal SC81, and performs the signal generation control GY81 based on the obtained handle CC1T. The output component 338 generates the operation signal SG81 in response to the signal generation control GY81. For example, the control signal SC81 carries the measurement value target range code EM1T, obtains the measurement value target range code EM1T from the control signal SC81, and obtains the stored handle CC1T from the storage unit 332 based on the obtained measurement value target range code EM1T.

In some embodiments, the processing unit 331 obtains the rated range limit value pair DD1A from the control signal SC81, and performs a check operation BM51 used to check a mathematical relation KM51 between the measured value VN81 and the rated measurement value range RD1N by comparing the measured value VN81 and the obtained rated range limit value pair DD1A. For example, the processing unit 331 makes the logical decision PB51 based on the check operation BV51 and the check operation BM51. For example, the physical parameter relation check control GX8T includes the check operation BV51 and the check operation BM51.

The processing unit 331 obtains the measured value VN82 in the designated measurement value format HH81 in response to the sense signal SN82 within the designated time TG82 being later than the operation time TF81. The processing unit 331 checks the mathematical relation KV91 between the measured value VN82 and the measurement value target range RN1T by comparing the measured value VN82 and the target range limit value pair DN1T, obtained from the control signal SC81, to make the logical decision PB91 on whether the measured value VN82 is within the measurement value target range RN1T. Under a condition that the logical decision PB91 is positive, the processing unit 331 determines within the designated time TG82 the physical parameter target range RD1ET which the variable physical parameter QU1A is currently in, and causes the transmission unit 384 to transmit the control response signal SE81, carrying the obtained measured value VN82, toward the operation unit 297.

In some embodiments, the variable physical parameter QU1A is characterized based on the physical parameter target range RD and a physical parameter application range RD1EJ being different from the physical parameter target range RD1ET; and one of the physical parameter target range RD1ET and the physical parameter application range RD1EJ is represented by a measurement value indication range RN1H. Under a condition that the processing unit 331 determines the physical parameter application range RD1EJ which the variable physical parameter QU1A is currently in by checking a mathematical relation KH81 between the measured value VN81 and the measurement value indication range RN1H, the processing unit 331 causes the variable physical parameter QU1A to enter the physical parameter target range RD1ET from the physical parameter application range RD1EJ. For example, the physical parameter application range RD1EJ is equal to one of the corresponding physical parameter range RY1ET and the physical parameter application range RD1EL.

In a first situation: the physical parameter application range RD1EJ is represented by the measurement value indication range RN1H; the measurement value indication range RN1H is equal to the measurement value application range RN1L; and the mathematical relation KH81 is equal to the mathematical relation KV81. In a second situation being different from the first situation: the physical parameter application range RD1EJ corresponds to the physical parameter target range RD1ET, and is equal to the corresponding physical parameter range RY1ET; the corresponding physical parameter range RY1ET is represented by the corresponding measurement value range RX1T; the physical parameter target range RD1ET is represented by the measurement value indication range RN1H; the measurement value indication range RN1H is equal to the measurement value target range RN1T; and the mathematical relation KH81 is equal to the mathematical relation KV51.

In some embodiments, the variable physical parameter QU1A is associated with a variable time length LF8A, and is characterized based on a physical parameter target range RD1EV. The physical parameter target range RD1EV is indicated by a physical parameter target range code UN1V. The timer 342 is used to sense or measure the variable time length LF8A in a timing operation mode WU11 which is different from the timing operation mode WU21. The timing operation mode WU11 is denoted by a timing operation mode code CP11 being different from the timing operation mode code CP21. The variable time length LF8A is characterized based on a reference time length LJ8V.

The reference time length LJ8V is denoted by a measurement time length value CL8V. The measurement time length value CL8V is defaulted in a designated measurement value format HH91 based on the reference time length LJ8V and the timer specification FT21. For example, the designated measurement value format HH91 is characterized based on a designated bit number UY91. Under a condition that the variable physical parameter QU1A is in the physical parameter target range RD1EU within the clock time application interval HR1EU, the receiving unit 337 receives a control signal SC88 from the control device 212. For example, the designated measurement value format HH91 is a designated count value format.

The control signal SC88 carries the timing operation mode code CP11, the physical parameter target range code UN1V, the measurement time length value CL8V and a handle CC1V. For example, the handle CC1V is defaulted based on a designated physical parameter QD1V being within the physical parameter target range RD1EV. The control signal SC88 serves to indicate at least one of the physical parameter target range RD1EV and the physical parameter target state JE1V by carrying the physical parameter target range code UN1V.

In some embodiments, the processing unit 331 is configured to obtain the timing operation mode code CP11, the physical parameter target range code UN1V, the measurement time length value CL8V and the handle CC1V from the control signal SC88. The processing unit 331 stops the timer 342 based on the obtained timing operation mode code CP11, restarts the timer 342 based on the obtained measurement time length value CL8V, and causes the timer 342 to operate in the timing operation mode WU11 by restarting the timer 342. The timer 342 is restarted to begin an application time length LT8V matching the reference time length LJ8V. The timer 342 senses the variable time length LF8A in the timing operation mode WU11 by performing a counting operation BC8V used for the application time length LT8V to experience the application time length LT8V. The timing operation mode WU11 is characterized based on the reference time length LJ8V.

The processing unit 331 experiences the application time length LT8V to arrive a specific time TJ8V based on the counting operation BC8V. The application time length LT8V has an end time TZ8V. The specific time TJ8V is adjacent to the end time TZ8V. For example, the control signal SC88 carries a control message CG88. The control message CG88 includes the timing operation mode code CP11, the physical parameter target range code UN1V, the measurement time length value CL8V and the handle CC1V. The processing unit 331 is configured to obtain the control message CG88 from the control signal SC88. The processing unit 331 causes the variable physical parameter QU1A to be in the physical parameter target range RD1EV within the application time length LT8V in response to the obtained control message CG88.

The measurement application function specification GAL8 includes a time length representation GA8KV. The time length representation GA8KV is used to indicate the reference time length LJ8V. For example, the measurement time length value CL8V is defaulted in the designated measurement value format HH91 based on the time length representation GA8KV, the timer specification FT21 and a data coding operation ZX8KV used to convert the time length representation GA8KV. The physical parameter target range RD1EV is configured to correspond to a corresponding physical parameter range RY1EV. The rated physical parameter range RD1E is equal to a range combination of the physical parameter target range RD1EV and the corresponding physical parameter range RY1EV.

In some embodiments, the processing unit 331 causes the timer 342 to operate in the timing operation mode WU11 based on the obtained timing operation mode code CP11. The processing unit 331 causes the timer 342 based on the obtained measurement time length value CL8V to perform the counting operation BC8V in the timing operation mode WU11. Under a condition that the variable physical parameter QU1A is configured to be within the physical parameter target range RD1EV based on the control signal SC81, the processing unit 331 arrives the specific time TJ8V based on the counting operation BC8V, and causes the output component 338 within the specific time TJ8V to perform the signal generation operation BY89, wherein the signal generation operation BY89 is used to cause the variable physical parameter QU1A to leave the physical parameter target range RD1EV to enter the corresponding physical parameter range RY1EV.

For example, under a condition that the variable physical parameter QU1A is configured to be within the physical parameter target range RD1EV based on the control signal SC88, the processing unit 331 experiences the application time length LT8V based on the counting operation BC8V to arrive the specific time TJ8V. The processing unit 331 fetches a physical parameter target range code UN1W, being different from the obtained physical parameter target range code UN1V, within the specific time TJ8V by performing a scientific calculation MK81 using the obtained physical parameter target range code UN1V. The physical parameter target range RD1EW is denoted by the physical parameter target range code UN1W. For example, the physical parameter target range code UN1W indicates the physical parameter target state JE1W.

For example, the control device 212 determines the measurement time length value CL8V based on the reference time length LJ8V and the timer specification FT21, and outputs the control signal SC88 based on the determined measurement time length value CL8V. The control message CG88 further includes the measurement time length value CL8V. The control signal SC88 is used to cause the variable physical parameter QU1A to be within the physical parameter target range RD1EV for the application time length LT8V sufficiently matching the reference time length LJ8V. For example, the physical parameter target range code UN1W is equal to the measurement value candidate range code EM12.

For example, when the receiving unit 337 receives the control signal SC88, the variable physical parameter range code UN8A is equal to the physical parameter target state code EW1U. Under a condition that the physical parameter target range code UN1V of the control signal SC88 is different from the physical parameter target state code EW1U of the variable physical parameter range code UN8A, the processing unit 331 generates an operation signal SG88 based on a code difference DX88 between the physical parameter target range code UN1V of the control signal SC88 and the physical parameter target state code EW1U of the variable physical parameter range code UN8A, and transmits the operation signal SG88 toward the physical parameter application unit 335. The operation signal SG88 is used to cause the variable physical parameter QU1A to be in the physical parameter target range RD1EV.

In some embodiments, the processing unit 331 fetches the memory address AX82 based on the fetched measurement value candidate range code EM12 (or the fetched physical parameter target range code UN1W) and the obtained handle type identifier HC81. The processing unit 331 uses the storage unit 332 based on the fetched memory address AX82 to read the handle CC12 stored at the memory location YX82, and performs a signal generation control GY89 used to control the output component 338 based on the read handle CC12.

The output component 338 performs the signal generation operation BY89 for the measurement application function FA81 to generate the operation signal SG89 in response to the signal generation control GY89, wherein the operation signal SG89 is used to control the physical parameter application unit 335 to cause the variable physical parameter QU1A to enter the physical parameter target range RD1EW included in the corresponding physical parameter range RY1EV. For example, the operation signal SG89 is one of a functional signal and a control signal. The physical parameter target range RD1EW is one selected from a group consisting of the physical parameter application range RD1ET, the physical parameter target range RD1EU and the physical parameter candidate range RD1E2, and is different from the physical parameter target range RD1EV.

For example, the processing unit 331 causes the timer 342 based on the obtained measurement time length value CL8V to perform the counting operation BC8V to arrive the end time TZ8V. When the timer 342 arrives the end time TZ8V by performing the counting operation BC8V, the timer 342 transmits an interruption request signal UH8V toward the processing unit 331 to arrive the specific time TJ8V. The processing unit 331 performs the scientific calculation MK81 using the obtained physical parameter target range code UN1V within the specific time TJ8V in response to the interruption request signal UH8V to fetch the physical parameter target range code UN1W being different from the obtained physical parameter target range code UN1V. For example, the processing unit 331 recognizes the specific time TJ8V by receiving the interruption request signal UH8V from the timer 342, and thereby experiences the application time length LT8V. The specific time TJ8V is adjacent to the end time TZ8V.

In some embodiments, the variable physical parameter QU1A is characterized based on the rated physical parameter range RD1E. The rated physical parameter range RD1E includes the physical parameter target range RD1ET, the physical parameter application range RD1EL and the physical parameter candidate range RD1E2, and is represented by the rated measurement value range RD1N. For example, the rated measurement value range RD1N includes the measurement value target range RN1T, the measurement value application range RN1L and the measurement value candidate range RN12. The physical parameter target range RD1ET, the physical parameter application range RD1EL and the physical parameter candidate range RD1E2 are respectively represented by the measurement value target range RN1T, the measurement value application range RN1L and the measurement value candidate range RN12.

The physical parameter application range RD1EL and the physical parameter candidate range RD1E2 are different. The physical parameter target range RD1ET is equal to or different from the physical parameter application range RD1EL. The physical parameter target range RD1ET is equal to or different from the physical parameter candidate range RD1E2. The measurement value application range RN1L and the measurement value candidate range RN12 are different. The measurement value target range RN1T is equal to or different from the measurement value application range RN1L. The measurement value target range RN1T is equal to or different from the measurement value candidate range RN12.

In some embodiments, the rated physical parameter range RD1E of the variable physical parameter QU1A includes the plurality of different physical parameter reference ranges RD1E1, RD1E2, . . . . The plurality of different physical parameter reference ranges RD1E1, RD1E2, . . . include the physical parameter target range RD1ET, the physical parameter application range RD1EL and the physical parameter candidate range RD1E2. The variable physical parameter QU1A is in one selected from a plurality of different reference state based on the plurality of different physical parameter reference ranges RD1E1, RD1E2, . . . . The plurality of different reference state include a first reference state, a second reference state and a third reference state, thereby the variable physical parameter QU1A is characterized by a current state. The current state is one selected from the plurality of different reference states.

For example, the first reference state and the second reference state are complementary. Under a condition that the variable physical parameter QU1A is within the physical parameter application range RD1EL, the variable physical parameter QU1A is in the first reference state. Under a condition that the variable physical parameter QU1A is within the physical parameter candidate range RD1E2, the variable physical parameter QU1A is in the second reference state. Under a condition that the variable physical parameter QU1A is within the physical parameter target range RD1ET, the variable physical parameter QU1A is in the third reference state. The third reference state is equal to or different from the first reference state. The third reference state is equal to or different from the second reference state.

Each of the handle CC1T carried by the control signal SC81 and the handle CC1T stored by the storage unit 332 is defaulted based on the designated physical parameter QD1T being within the physical parameter target range RD1ET. Under a condition that the processing unit 331 determines the range difference DS81, the processing unit 331 causes the output component 338 based on the obtained handle CC1T to perform the signal generation operation BY81 for the measurement application function FA81 to generate the operation signal SG81.

The physical parameter application unit 335 causes the variable physical parameter QU1A to change from a current state to the third reference state in response to the operation signal SG81, or cause the variable physical parameter QU1A to change from a specific physical parameter QU17 to a specific physical parameter QU18 in response to the operation signal SG81. For example, the current state is one of the first reference state and the second reference state. The specific physical parameter QU17 is within the physical parameter application range RD1EL, or is within the physical parameter candidate range RD1E2. The specific physical parameter QU18 is within the physical parameter target range RD1ET. For example, the specific physical parameter QU17 is within the corresponding physical parameter range RY1ET.

In some embodiments, the plurality of different reference states respectively cause the physical parameter application unit 335 to be in a plurality of different functional states. The plurality of different functional states are different, and include a first functional state, a second functional state and a third functional state. For example, the first functional state and the second functional state are complementary. Under a condition that the variable physical parameter QU1A is within the physical parameter application range RD1EL, the physical parameter application unit 335 is in the first functional state. Under a condition that the variable physical parameter QU1A is within the physical parameter candidate range RD1E2, the physical parameter application unit 335 is in the second functional state. Under a condition that the variable physical parameter QU1A is within the physical parameter target range RD1ET, the physical parameter application unit 335 is in the third functional state. The third functional state is equal to or different from the first functional state. The third functional state is equal to or different from the second functional state.

For example, the measurement value target range code EM1T is a measurement value target range number. The measurement value target range RN1T is arranged in the rated measurement value range RD1N based on the measurement value target range code EM1T. The measurement value application range code EMIL is a measurement value target range number. The measurement value application range RN1L is arranged in the rated measurement value range RD1N based on the measurement value application range code EMIL. The measurement value candidate range code EM12 is a measurement value target range number. The measurement value candidate range RN12 is arranged in the rated measurement value range RD1N based on the measurement value candidate range code EM12.

In some embodiments, the physical parameter target range RD1ET is one of a relatively high physical parameter range and a relatively low physical parameter range; and the physical parameter application range RD1EL is another of the relatively high physical parameter range and the relatively low physical parameter range. Under a condition that the variable physical parameter QU1A is the first variable electrical voltage, the relatively high physical parameter range and the relatively low physical parameter range are a relatively high electrical voltage range and a relatively low electrical voltage range respectively. Under a condition that the variable physical parameter QU1A is the first variable electrical current, the relatively high physical parameter range and the relatively low physical parameter range are a relatively high electrical current range and a relatively low electrical current range respectively. Under a condition that the variable physical parameter QU1A is the first variable electrical resistance, the relatively high physical parameter range and the relatively low physical parameter range are a relatively high electrical resistance range and a relatively low electrical resistance range respectively.

Under a condition that the variable physical parameter QU1A is the first variable luminance, the relatively high physical parameter range and the relatively low physical parameter range are a relatively high luminance range and a relatively low luminance range respectively. Under a condition that the variable physical parameter QU1A is the first variable luminous intensity, the relatively high physical parameter range and the relatively low physical parameter range are a relatively high luminous intensity range and a relatively low luminous intensity range respectively. Under a condition that the variable physical parameter QU1A is the first variable sound volume, the relatively high physical parameter range and the relatively low physical parameter range are a relatively high sound volume range and a relatively low sound volume range respectively. Under a condition that the variable physical parameter QU1A is the first variable angular velocity, the relatively high physical parameter range and the relatively low physical parameter range are a relatively high angular velocity range and a relatively low angular velocity range respectively.

For example, the physical parameter target range RD1ET is one of a relatively high physical parameter range and a relatively low physical parameter range; and the physical parameter candidate range RD1E2 is another of the relatively high physical parameter range and the relatively low physical parameter range. For example, the physical parameter application range RD1EL is one of a relatively high physical parameter range and a relatively low physical parameter range; and the physical parameter candidate range RD1E2 is another of the relatively high physical parameter range and the relatively low physical parameter range. For example, the physical parameter target range RD1ET is one of a relatively high physical parameter range and a relatively low physical parameter range; and the specific physical parameter range RD1E4 is another of the relatively high physical parameter range and the relatively low physical parameter range. For example, the physical parameter target range RD1ET is one of a relatively high physical parameter range and a relatively low physical parameter range; and the specific physical parameter range RD1E5 is another of the relatively high physical parameter range and the relatively low physical parameter range.

In some embodiments, under a condition that the functional device 130 is a relay, the physical parameter application unit 335 is a control switch. Under a condition that the physical parameter application unit 335 is the control switch, the control switch has a variable switch state, and is in one of a turn-on state and a turn-off state based on the variable physical parameter QU1A. For example, the variable switch state is equal to one of the turn-on state and the turn-off state, and the turn-on state and the turn-off state are complementary. The turn-on state is one of the first functional state and the second functional state, and the turn-off state is another of the first functional state and the second functional state.

Under a condition that the processing unit 331 determines the range difference DS81, the processing unit 331 recognizes the current state as a specific state being different from the third reference state, and thereby generates the operation signal SG81. The physical parameter application unit 335 causes the variable physical parameter QU1A to enter the physical parameter target range RD1ET in response to the operation signal SG81, therefore the current state is changed to the third reference state. Under a condition that the processing unit 331 determines the code difference DX81, the processing unit 331 uses the output component 338 to generate the operation signal SG82. The physical parameter application unit 335 causes the variable physical parameter QU1A in response to the operation signal SG82 to enter the specific physical parameter range RD1E5, included in the corresponding physical parameter range RY1ET, from the physical parameter target range RD1ET; therefore, under a condition that the specific physical parameter range RD1E5 is equal to the physical parameter candidate range RD1E2, the current state is changed to the second reference state.

For example, the variable physical parameter QU1A is the first variable electrical current. The physical parameter application range RD1EL, the physical parameter candidate range RD1E2, the physical parameter target range RD1ET and the physical parameter target range RD1EV are a first electrical-current reference range, a second electrical-current reference range, a third electrical-current reference range and a fourth electrical-current reference range respectively. The handle CC1L is defaulted based on a first designated electrical current being within the first electrical-current reference range. The handle CC12 is defaulted based on a second designated electrical current being within the second electrical-current reference range. The handle CC1T is defaulted based on a third designated electrical current being within the third electrical-current reference range. The handle CC1V is defaulted based on a fourth designated electrical current being within the fourth electrical-current reference range.

The measurement time length value CL8V is defaulted in the designated measurement value format HH91 based on the time length representation GA8KV, the timer specification FT21 and the data coding operation ZX8KV. The processing unit 331 obtains the measurement time length value CL8V from the control signal SC88, and causes the timer 342 to perform the counting operation BC8V based on the obtained measurement time length value CL8V. Under a condition that the first variable electrical current is configured to be within the fourth electrical-current reference range based on the control signal SC88, the processing unit 331 experiences the application time length LT8V to arrive the specific time TJ8V based on the counting operation BC8V, thereby the first variable electrical current remains to be within the fourth electrical-current reference range within the application time length LT8V associated with the counting operation BC8V.

For example, under a condition that the variable physical parameter QU1A is a variable rotation speed, the physical parameter application range RD1EL, the physical parameter candidate range RD1E2 and the physical parameter target range RD1ET are a first rotation-speed reference range, a second rotation-speed reference range and a third rotation-speed reference range respectively. Under a condition that the variable physical parameter QU1A is a variable temperature, the physical parameter application range RD1EL, the physical parameter candidate range RD1E2 and the physical parameter target range RD1ET are a first temperature reference range, a second temperature reference range and a third temperature reference range respectively.

Figure 33:
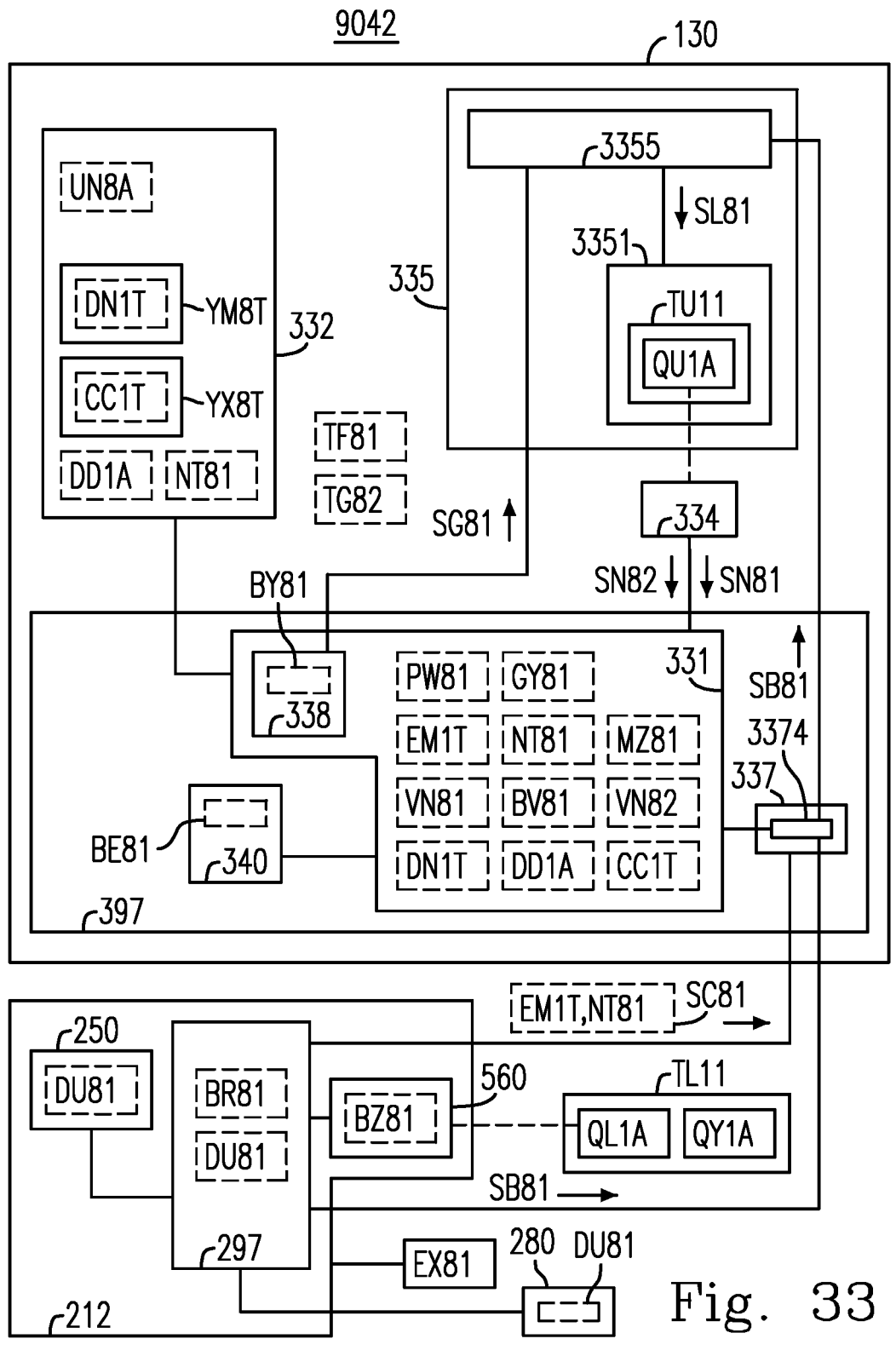
FIG. 33 is a schematic diagram showing an implementation structure of the control system shown in FIG. 1.

Please refer to FIG. 33. FIG. 33 is a schematic diagram showing an implementation structure 9042 of the control system 901 shown in FIG. 1. As shown in FIG. 33, the implementation structure 9042 includes the control device 212, the functional device 130 and a server 280. The control device 212 is linked to the server 280. The functional device 130 includes the operation unit 397, the sensing unit 334, the physical parameter application unit 335 and the storage unit 332. The operation unit 397 includes the processing unit 331, the receiving unit 337, the transmission unit 384 and a timer 340 coupled to the processing unit 331. The timer 340 is controlled by the processing unit 331.

In some embodiments, the receiving component 3374 included in the receiving unit 337 is coupled to the processing unit 331, and receives the physical parameter signal SB81 from the control device 212 under a condition that the variable physical parameter QU1A is to be provided by means of the control device 212. The physical parameter application unit 335 receives the physical parameter signal SB81 from the receiving component 3374. The processing unit 331 causes the physical parameter application unit 335 to use the physical parameter signal SB81 to form the variable physical parameter QU1A which is determined according to the physical parameter signal SB81.

The control device 212 includes the operation unit 297, a storage unit 250 coupled to the operation unit 297, and a sensing unit 560 coupled to the operation unit 297. The operation unit 297 performs one of a reading operation BR81 and a sensing operation BZ81 to output the physical parameter signal SB81. The reading operation BR81 reads a physical parameter data record DU81 which is stored in one of the storage unit 250 and the server 280. The sensing unit 560 senses a variable physical parameter QL1A by performing the sensing operation BZ81 to cause the operation unit 297 to output the physical parameter signal SB81. For example, the sensing unit 560 is controlled by the operation unit 297 sense the variable physical parameter QL1A.

For example, the variable physical parameter QU1A belongs to the physical parameter type TU11. The variable physical parameter QL1A belongs to a physical parameter type TL11. The physical parameter type TU11 is equal to or different from the physical parameter type TL11. The control device 212 is in an application environment EX81. One of the control device 212 and the application environment EX81 has the variable physical parameter QL1A. The physical parameter data record DU81 is provided beforehand based on a variable physical parameter QY1A. The variable physical parameter QY1A belongs to the physical parameter type TL11. For example, the physical parameter type TU11 is different from a time type.

In some embodiments, the physical parameter application unit 335 includes a driving circuit 3355, and a physical parameter formation portion 3351 coupled to the driving circuit 3355. The physical parameter formation portion 3351 is used to form the variable physical parameter QU1A, and includes the physical parameter formation area AU11. The driving circuit 3355 is coupled to the receiving component 3374 and the output component 338, and is controlled by the processing unit 331 through the output component 338. The driving circuit 3355 receives the physical parameter signal SB81 from the receiving component 3374, receives the operation signal SG81 from the output component 338, and processes the physical parameter signal SB81 to output a driving signal SL81 in response to the operation signal SG81.

The physical parameter formation portion 3351 receives the driving signal SL81, and causes the variable physical parameter QU1A to be within the physical parameter target range RD1ET in response to the driving signal SL81. For example, under a condition that the reasonable decision PW81 is positive, the processing unit 331 causes the output component 338 to perform the signal generation operation BY81 for the measurement application function FA81 to provide the operation signal SG81 to the driving circuit 3355. The driving circuit 3355 drives the physical parameter formation portion 3351 in response to the operation signal SG81 to cause the variable physical parameter QU1A to enter the physical parameter target range RD1ET.

In some embodiments, the rated measurement value range RD1N is configured to have a plurality of different measurement value reference ranges RN11, RN12, . . . . For example, the plurality of different measurement value reference ranges RN11, RN12, . . . have a total reference range number NT81, and include the measurement value target range RN1T. For example, the total reference range number NT81 is defaulted. The storage unit 332 stores the rated range limit value pair DD1A. The processing unit 331 is configured to obtain the total reference range number NT81 from one of the control signal SC81 and the storage unit 332, obtains the measurement value target range code EM1T from the control signal SC81, and obtains the rated range limit value pair DD1A from the storage unit 332 in response to the control signal SC81.

The processing unit 331求 performs the scientific calculation MR81 based on the measured value VN81, the obtained total reference range number NT81 and the obtained rated range limit value pair DD1A to select the measurement value application range code EMIL from the plurality of different measurement value reference range codes EM11, EM12, . . . to determine the measurement value application range code EMIL. For example, the scientific calculation MR81 is built beforehand based on the defaulted total reference range number NT81 and the defaulted rated range limit value pair DD1A.

The processing unit 331 performs the scientific calculation MZ81 to obtain the application range limit value pair DN1L based on the determined measurement value application range code EM1L, the obtained total reference range number NT81 and the fetched rated range limit value pair DD1A. For example, the scientific calculation MZ81 is built beforehand based on the defaulted total reference range number NT81 and the defaulted rated range limit value pair DD1A.

In some embodiments, the processing unit 331 causes the timer 340 to perform a counting operation BE81 in response to the signal generation control GY81 which is performed within the operation time TF81. The processing unit 331 arrives the designated time TG82 based on the counting operation BE81, and obtains the measured value VN82 in response to the sense signal SN82 at the designated time TG82.

The variable physical parameter QL1A is one selected from a group consisting of a second variable electrical parameter, a second variable mechanics parameter, a second variable optical parameter, a second variable temperature, a second variable electrical voltage, a second variable electrical current, a second variable electrical power, a second variable electrical resistance, a second variable electrical capacitance, a second variable electrical inductance, a second variable frequency, a second clock time, a second variable time length, a second variable luminance, a second variable luminous intensity, a second variable sound volume, a second variable data flow, a second variable amplitude, a second variable spatial location, a second variable displacement, a second variable sequence position, a second variable angle, a second variable spatial length, a second variable distance, a second variable translational velocity, a second variable angular velocity, a second variable acceleration, a second variable force, a second variable pressure and a second variable mechanical power.

The variable physical parameter QY1A is one selected from a group consisting of a third variable electrical parameter, a third variable mechanics parameter, a third variable optical parameter, a third variable temperature, a third variable electrical voltage, a third variable electrical current, a third variable electrical power, a third variable electrical resistance, a third variable electrical capacitance, a third variable electrical inductance, a third variable frequency, a third clock time, a third variable time length, a third variable luminance, a third variable luminous intensity, a third variable sound volume, a third variable data flow, a third variable amplitude, a third variable spatial location, a third variable displacement, a third variable sequence position, a third variable angle, a third variable spatial length, a third variable distance, a third variable translational velocity, a third variable angular velocity, a third variable acceleration, a third variable force, a third variable pressure and a third variable mechanical power.

Figure 34:
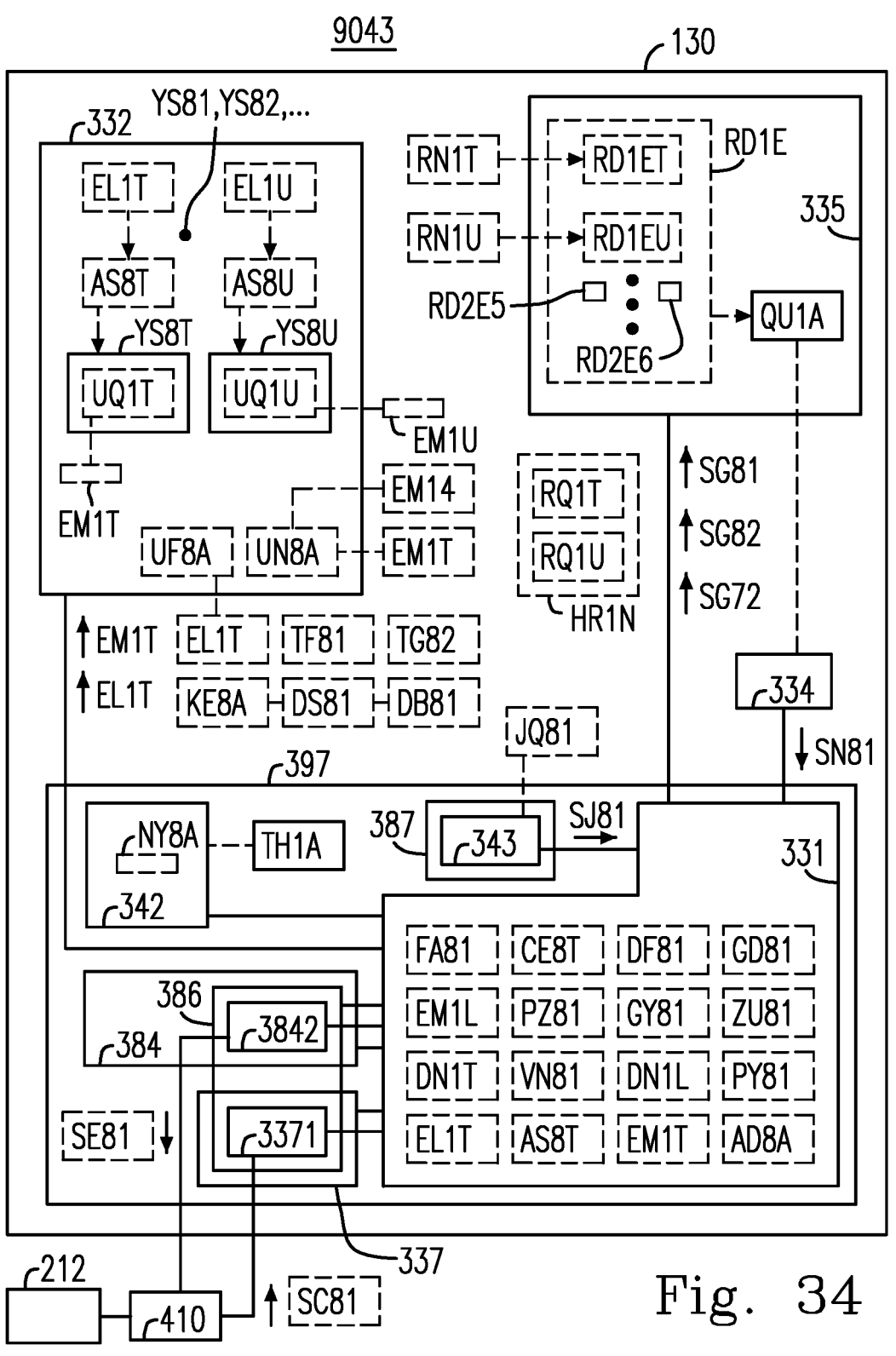
FIG. 34 is a schematic diagram showing an implementation structure of the control system shown in FIG. 1.
Figure 35:
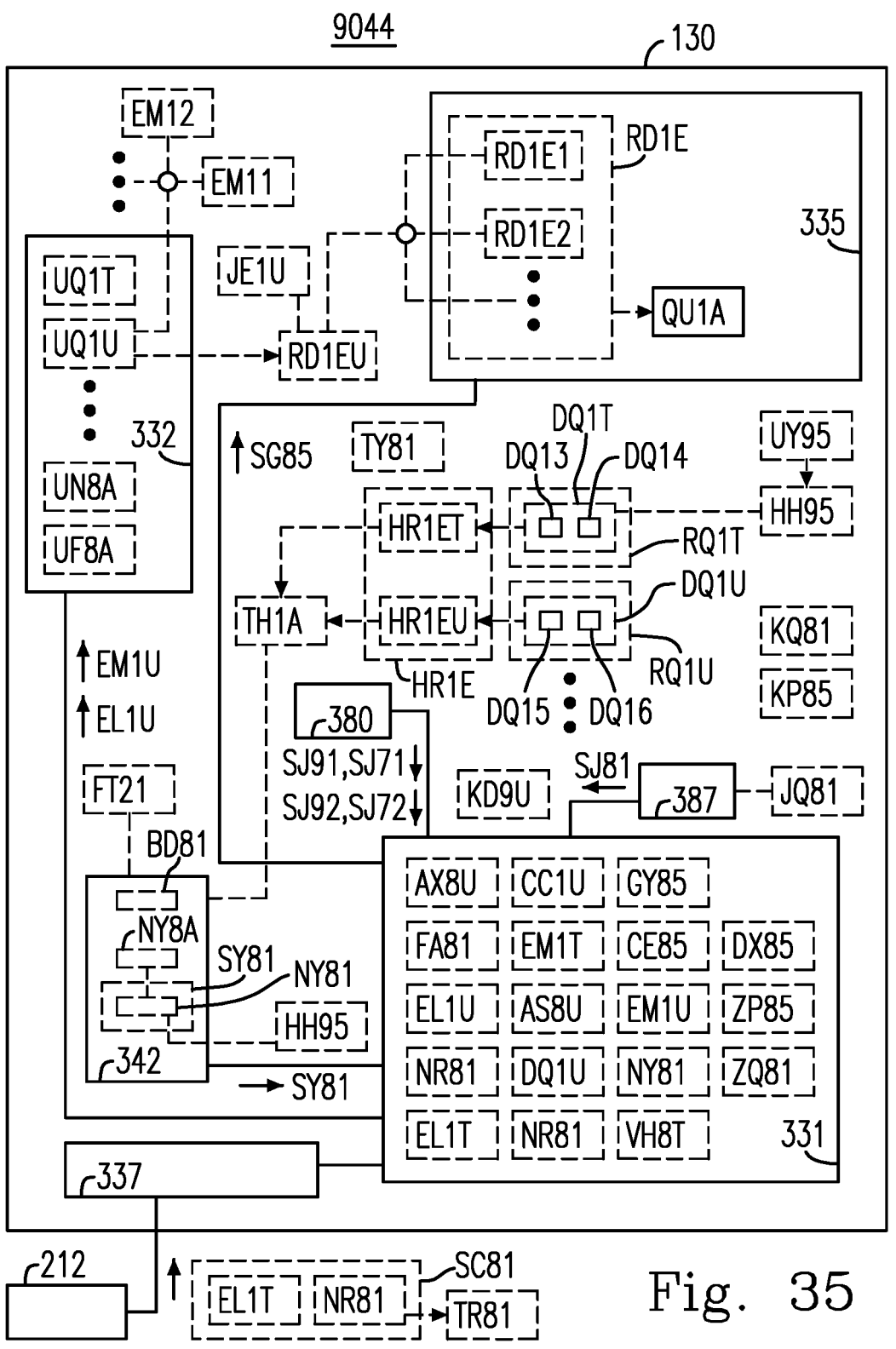
FIG. 35 is a schematic diagram showing an implementation structure of the control system shown in FIG. 1.
Figure 36:
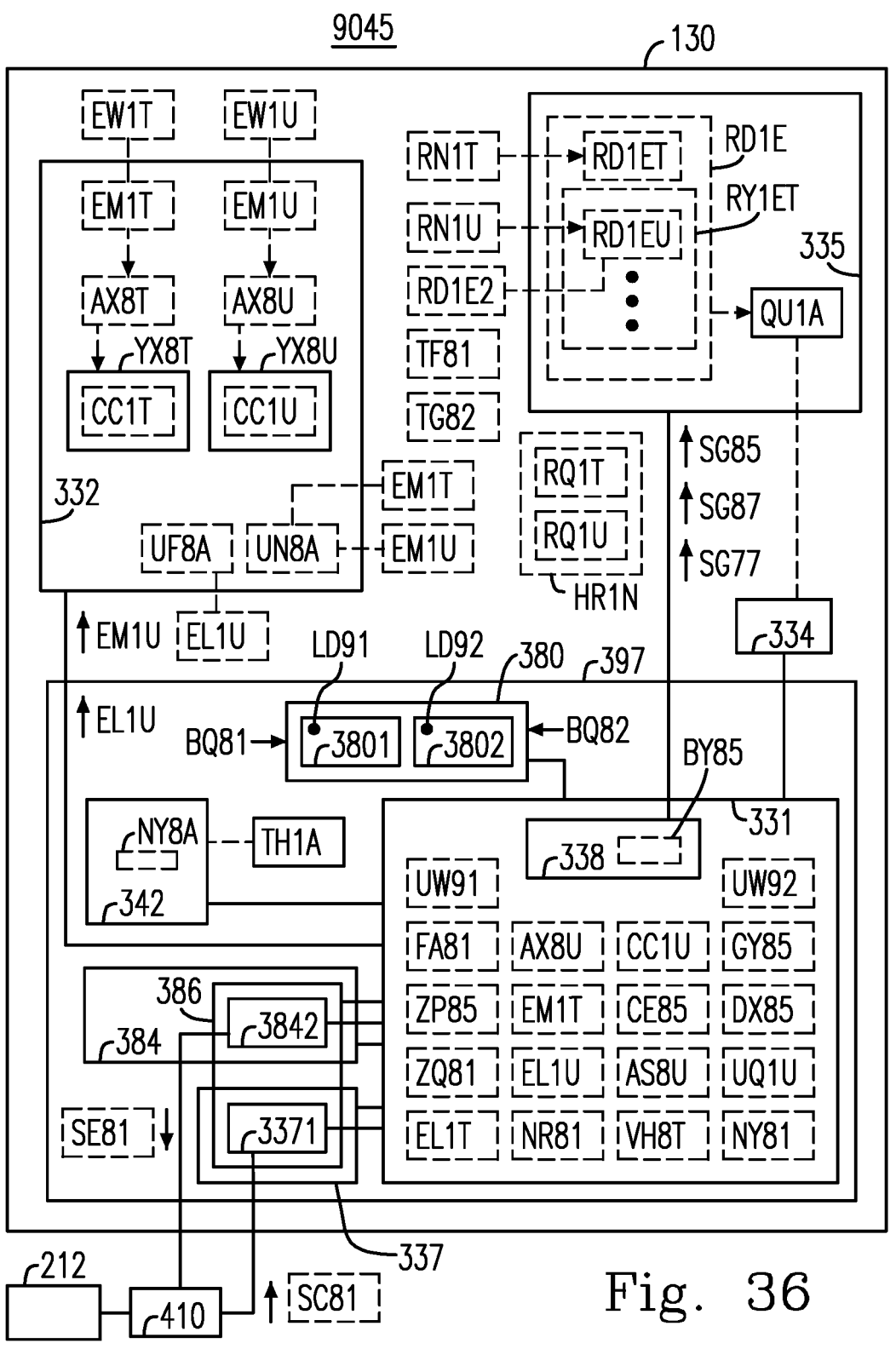
FIG. 36 is a schematic diagram showing an implementation structure of the control system shown in FIG. 1.

Please refer to FIG. 34, FIG. 35 and FIG. 36. FIG. 34 is a schematic diagram showing an implementation structure 9043 of the control system 901 shown in FIG. 1. FIG. 35 is a schematic diagram showing an implementation structure 9044 of the control system 901 shown in FIG. 1. FIG. 36 is a schematic diagram showing an implementation structure 9045 of the control system 901 shown in FIG. 1. As shown in FIG. 34, FIG. 35 and FIG. 36, each of the implementation structure 9043, the implementation structure 9044 and the implementation structure 9045 includes the control device 212, the functional device 130 and the server 280. The functional device 130 includes the operation unit 397, the sensing unit 334, the physical parameter application unit 335 and the storage unit 332. The operation unit 397 includes the processing unit 331, the receiving unit 337, the input unit 380, the transmission unit 384, the timer 342 coupled to the processing unit 331, and a timer 343 coupled to the processing unit 331.

In some embodiments, each of the control device 212, the functional device 130 and the server 280 is coupled to a network 410. The control device 212 is linked to the server 280 through the network 410. The functional device 130 includes the operation unit 397, the sensing unit 334, the physical parameter application unit 335 and the storage unit 332. The operation unit 397 includes the processing unit 331, the receiving unit 337 and the transmission unit 384. The control device 212 transmits the control signal SC81 toward the functional device 130 through the network 410. The functional device 130 transmits the control response signal SE81 toward the control device 212 through the network 410.

For example, the operation unit 397 includes a communication interface unit 386 coupled to the processing unit 331. The processing unit 331 is coupled to the network 410 through the communication interface unit 386. For example, the communication interface unit 386 is controlled by the processing unit 230, and includes the transmission component 3842 coupled to the processing unit 331 and the receiving component 3371 coupled to the processing unit 331. The processing unit 331 is coupled to the server 280 through the communication interface unit 386 and the network 410. For example, the communication interface unit 386 is one of a wired communication interface unit and a wireless communication interface unit.

Each of the receiving unit 337, the transmission unit 384, the timer 342, the timer 343, the sensing unit 334, the physical parameter application unit 335, the storage unit 332 and the communication interface unit 386 is controlled by the processing unit 331. Under a condition that the trigger event JQ81 is the integer overflow event, the timer 343 being the trigger application unit 387 causes the integer overflow event to occur in response to a time control GD81 associated with the processing unit 331. For example, the processing unit 331 performs the time control GD81 used to control the timer 343 in response to the control signal SC81. The timer 343 forms the integer overflow event in response to the time control GD81.

Please additionally refer to FIG. 9, FIG. 10, FIG. 11 and FIG. 12. In some embodiments, when the receiving unit 337 receives the control signal SC81, the physical parameter target range code UQ1T is equal to the defaulted measurement value target range code EM1T. The control signal SC81 carries the defaulted measurement value designation range code EL1T. The processing unit 331 obtains the carried measurement value designation range code EL1T from the control signal SC81, obtains the memory address AS8T based on the obtained measurement value designation range code EL1T, and accesses the physical parameter target range code UQ1T, stored at the memory location YS8T, based on the obtained memory address AS8T to obtain the defaulted measurement value target range code EM1T.

For example, under a condition that the physical parameter target range code UQ1T is equal to the defaulted measurement value target range code EM1T, the control signal SC81 serves to indicate the measurement value target range RN1T by carrying the defaulted measurement value designation range code EL1T. The processing unit 331 performs the data acquisition AD8A using the obtained measurement value target range code EM1T to obtain the target range limit value pair DN1T.

In some embodiments, under a condition that the processing unit 331 determines the physical parameter application range RD1EL which the variable physical parameter QU1A is currently in by comparing the measured value VN81 and the obtained application range limit value pair DN1L, the processing unit 331 checks the range relation KE8A between the measurement value target range RN1T and the measurement value application range RN1L by comparing the obtained target range limit value pair DN1T and the obtained application range limit value pair DN1L to make the logical decision PY81 on whether the obtained target range limit value pair DN1T and the obtained application range limit value pair DN1L are equal.

Under a condition that the logical decision PY81 is negative, the processing unit 331 recognizes the range relation KE8A as the range difference relation to determine the range difference DS81. For example, the processing unit 331 obtains the predetermined application range limit value pair DN1L based on the determined measurement value application range code EMIL. For example, the processing unit 331 determines the range difference DB81 between the physical parameter target range RD1ET and the physical parameter application range RD1EL by determining the range difference DS81.

In some embodiments, under a condition that the processing unit 331 determines the physical parameter application range RD1EL which the variable physical parameter QU1A is currently in by comparing the measured value VN81 and the obtained application range limit value pair DN1L, the processing unit 331 makes the logical decision PZ81 on whether the obtained measurement value target range code EM1T and the determined measurement value application range code EMIL are equal by comparing the obtained measurement value target range code EM1T and the determined measurement value application range code EMIL. Under a condition that the logical decision PZ81 is negative, the processing unit 331 recognizes the range relation KE8A as the range difference relation to determine the range difference DS81.

Under a condition that the processing unit 331 determines at least one of the range difference DS81 and the range difference DB81, the processing unit 331 performs the signal generation control GY81 used to generate the operation signal SG81 within the operation time TF81. The operation signal SG81 is used to cause the variable physical parameter QU1A to enter the physical parameter target range RD1ET being equal to the physical parameter target range RD1ET. The processing unit 331 performs the verification operation ZU81 associated with the variable physical parameter QU1A within the designated time TG82 which is later than the operation time TF81. Under a condition that the processing unit 331 determines the physical parameter target range RD1ET which the variable physical parameter QU1A is currently in based on the verification operation ZU81 within the designated time TG82, the processing unit 331 performs the data comparison CE8T between the variable physical parameter range code UN8A, being equal to the specific measurement value range code EM14, and the obtained measurement value target range code EM1T.

Under a condition that the processing unit 331 determines the code difference DF81 between the variable physical parameter range code UN8A, being equal to the specific measurement value range code EM14, and the obtained measurement value target range code EM1T based on the data comparison CE8T, the processing unit 331 uses the storage unit 332 to assign the obtained measurement value target range code EM1T to the variable physical parameter range code UN8A.

In some embodiments, under a condition that the variable physical parameter QU1A is configured to be within the physical parameter target range RD1ET based on the control signal SC81, the processing unit 331 arrives the operation time TY81 based on the counting operation BD81. Within the operation time TY81, the timer 342 senses the clock time TH1A to cause the variable count value NY8A to be equal to the measured value NY81, and thereby generates the sense signal SY81 carrying the measured value NY81.

For example, the trigger application unit 387 provides the operation request signal SJ81 to the processing unit 331 in response to the trigger event JQ81, and thereby causes the processing unit 331 to receive the operation request signal SJ81. The processing unit 331 obtains the measured value NY81 from the sense signal SY81 in the designated measurement value format HH95 within the operation time TY81 in response to the operation request signal SJ81, and obtains or determines the measurement value application range code EL1U within the operation time TY81 by performing the scientific calculation MH85, using the obtained measurement value designation range code EL1T, in order to check the mathematical relation KQ81 between the obtained measured value NY81 and the measurement value application range RQ1U. For example, the trigger application unit 387 is one selected from a group consisting of the receiving unit 337, the input unit 380, the display unit 382, the sensing unit 334 and the timer 343.

In some embodiments, the measurement value designation range RQ1T has the designated range limit value pair DQ1T. The designated range limit value pair DQ1T includes the designated range limit value DQ13 and the designated range limit value DQ14 being opposite to the designated range limit value DQ13. Each of the measurement value designation range RQ1T and the designated range limit value pair DQ1T is defaulted in the designated measurement value format HH95 based on the clock time designation interval HR1ET and the timer specification FT21. The measurement value application range RQ1U has the application range limit value pair DQ1U. The application range limit value pair DQ1U includes the first application range limit value DQ15 and the second application range limit value DQ16 being opposite to the first application range limit value DQ15. Each of the measurement value application range RQ1U and the application range limit value pair DQ1U is defaulted in the designated measurement value format HH95 based on the clock time application interval HR1EU and the timer specification FT21.

For example, within the operation time TY81, the physical parameter target range code UQ1U is equal to one of the defaulted measurement value target range code EM1U and the defaulted physical parameter target state code EW1U. The storage unit 332 stores the designated range limit value pair DQ1T and the application range limit value pair DQ1U. The designated range limit value pair DQ1T and the application range limit value pair DQ1U are respectively stored in the storage unit 332 based on the measurement value designation range code EL1T and the measurement value application range code EL1U. For example, the defaulted physical parameter target state code EW1U is equal to the defaulted measurement value target range code EM1U.

The processing unit 331 is configured to obtain the application range limit value pair DQ1U from the storage unit 332 based on the obtained measurement value application range code EL1U within the operation time TY81, and performs a check operation ZQ81 used to check the mathematical relation KQ81 between the measured value NY81 and the measurement value application range RQ1U by comparing the obtained measured value NY81 and the obtained application range limit value pair DQ1U. Under a condition that the processing unit 331 determines the clock time application interval HR1EU which the clock time TH1A is currently in based on the check operation ZQ81 within the operation time TY81, the processing unit 331 obtains the memory address AS8U based on the obtained measurement value application range code EL1U, and accesses the physical parameter target range code UQ1U, stored at the memory location YS8U, based on the obtained memory address AS8U within the operation time TY81 to obtain the physical parameter target range code UQ1U.

For example, the processing unit 331 determines a time situation that the clock time TH1A is currently within the clock time application interval HR1EU based on the check operation ZQ81, and thereby recognizes a time relation between the clock time TH1A and the clock time application interval HR1EU as a time intersection relation that the clock time TH1A is currently within the clock time application interval HR1EU. Under a condition that the processing unit 331 obtains the physical parameter target range code UQ1U from the memory location YS8U, the processing unit 331 performs a check operation ZP85 for the measurement application function FA81 within the operation time TY81 to decide whether the obtained physical parameter target range code UQ1U is equal to the variable physical parameter range code UN8A.

In some embodiments, under a condition that the processing unit 331 obtains the physical parameter target range code UQ1U from the memory location YS8U, the processing unit 331 reads the variable physical parameter range code UN8A being equal to the measurement value target range code EM1T by using the storage unit 332, and performs the check operation ZP85 used to check an arithmetic relation KP85 between the obtained physical parameter target range code UQ1U and the read measurement value target range code EM1T. The check operation ZP85 is configured to compare the obtained physical parameter target range code UQ1U and the read measurement value target range code EM1T by performing a data comparison CE85 for the measurement application function FA81 to decide whether the obtained physical parameter target range code UQ1U and the read measurement value target range code EM1T are different.

Under a condition that the processing unit 331 determines a code difference DX85 between the obtained physical parameter target range code UQ1U and the variable physical parameter range code UN8A, being equal to the obtained measurement value target range code EM1T, by performing the data comparison CE85, the processing unit 331 causes the output component 338 to perform a signal generation operation BY85 for the measurement application function FA81 within the operation time TY81 to generate an operation signal SG85. For example, the operation signal SG85 is a control signal. The output component 338 transmits the operation signal SG85 to the physical parameter application unit 335. The physical parameter application unit 335 causes the variable physical parameter QU1A to enter the corresponding physical parameter range RY1ET from the physical parameter target range RD1ET in response to the operation signal SG85. For example, under a condition that the processing unit 331 obtains the physical parameter target range code UQ1U, being equal to the defaulted measurement value candidate range code EM12, from the memory location YS12, the physical parameter application unit 335 causes the variable physical parameter QU1A in response to the operation signal SG85 to enter the physical parameter target range RD1EU being equal to the physical parameter candidate range RD1E2.

For example, the storage unit 332 has a memory location YX8U being different from the memory location YX8T, and stores a handle CC1U at the memory location YX8U. The memory location YX8U is identified based on a memory address AX8U. The memory address AX8U is defaulted according to the defaulted physical parameter target state code EW1U. The handle CC1U is defaulted based on a designated physical parameter QD1U being within the physical parameter target range RD1EU. Under a condition that the processing unit 331 determines the code difference DX85, the processing unit 331 obtains the memory address AX8U based on the obtained physical parameter target range code UQ1U being equal to the defaulted physical parameter target state code EW1U.

The processing unit 331 uses the storage unit 332 based on the obtained memory address AX8U to access the handle CC1U, stored at the memory location YX8U, to obtain the handle CC1U, and causes the output component 338 based on the accessed handle CC1U within the operation time TY81 to perform the signal generation operation BY85 for the measurement application function FA81 to generate the operation signal SG85. The operation signal SG85 is used to cause the variable physical parameter QU1A to enter the physical parameter target range RD1EU from the physical parameter target range RD1ET.

In some embodiments, the input unit 380 includes the push button 3801 and a push button 3802. The push button 3801 is located at a spatial location LD91. The push button 3801 is located at a spatial location LD92 being different from the spatial location LD91. Under a condition that the variable physical parameter QU1A is configured to be in the physical parameter target range RD1ET based on the operation signal SG81: the push button 3801 is associated with the defaulted physical parameter target range limit ZD1T1; the push button 3802 is associated with the defaulted physical parameter target range limit ZD1T2; and the input unit 380 receives a user input operation BQ81. The user input operation BQ81 uses one of the push button 3801 and the push button 3802.

Under a condition that the user input operation BQ81 uses the push button 3801, the input unit 380 provides the operation request signal SJ91 to the processing unit 331 in response to the user input operation BQ81 using the push button 3801. The processing unit 331 causes the output component 338 in response to the operation request signal SJ91 to transmit the operation signal SG82 toward the physical parameter application unit 335. The operation signal SG82 is used to cause the variable physical parameter QU1A to enter the specific physical parameter range RD1E5 through the defaulted physical parameter target range limit ZD1T1.

Under a condition that the user input operation BQ81 uses the push button 3802, the input unit 380 provides an operation request signal SJ71 to the processing unit 331 in response to the user input operation BQ81 using the push button 3802. The processing unit 331 causes the output component 338 in response to the operation request signal SJ71 to transmit an operation signal SG72 toward the physical parameter application unit 335. The operation signal SG72 is used to cause the variable physical parameter QU1A through the defaulted physical parameter target range limit ZD1T2 to enter a specific physical parameter range RD2E5 which included in the plurality of different physical parameter reference ranges RD1E1, RD1E2, . . . . The specific physical parameter range RD2E5 is different from each of the physical parameter target range RD1ET and the specific physical parameter range RD1E5.

In some embodiments, under a condition that the variable physical parameter QU1A is configured to be in the physical parameter target range RD1EU based on the operation signal SG85: the push button 3801 is associated with the defaulted physical parameter target range limit ZD1U1; the push button 3802 is associated with the defaulted physical parameter target range limit ZD1U2; and the input unit 380 receives a user input operation BQ82. The user input operation BQ82 uses one of the push button 3801 and the push button 3802.

Under a condition that the user input operation BQ82 uses the push button 3801, the input unit 380 provides the operation request signal SJ92 to the processing unit 331 in response to the user input operation BQ82 using the push button 3801. The processing unit 331 causes the output component 338 in response to the operation request signal SJ92 to transmit the operation signal SG87 toward the physical parameter application unit 335. The operation signal SG87 is used to cause the variable physical parameter QU1A to enter the specific physical parameter range RD1E6 through the defaulted physical parameter target range limit ZD1U1.

Under a condition that the user input operation BQ82 uses the push button 3802, the input unit 380 provides an operation request signal SJ72 to the processing unit 331 in response to the user input operation BQ82 using the push button 3802. The processing unit 331 causes the output component 338 in response to the operation request signal SJ72 to transmit an operation signal SG77 toward the physical parameter application unit 335. The operation signal SG77 is used to cause the variable physical parameter QU1A through the defaulted physical parameter target range limit ZD1U2 to enter a specific physical parameter range RD2E6 which is included in the plurality of different physical parameter reference ranges RD1E1, RD1E2, . . . . The specific physical parameter range RD2E6 is different from each of the physical parameter target range RD1EU and the specific physical parameter range RD1E6.

Figure 37:
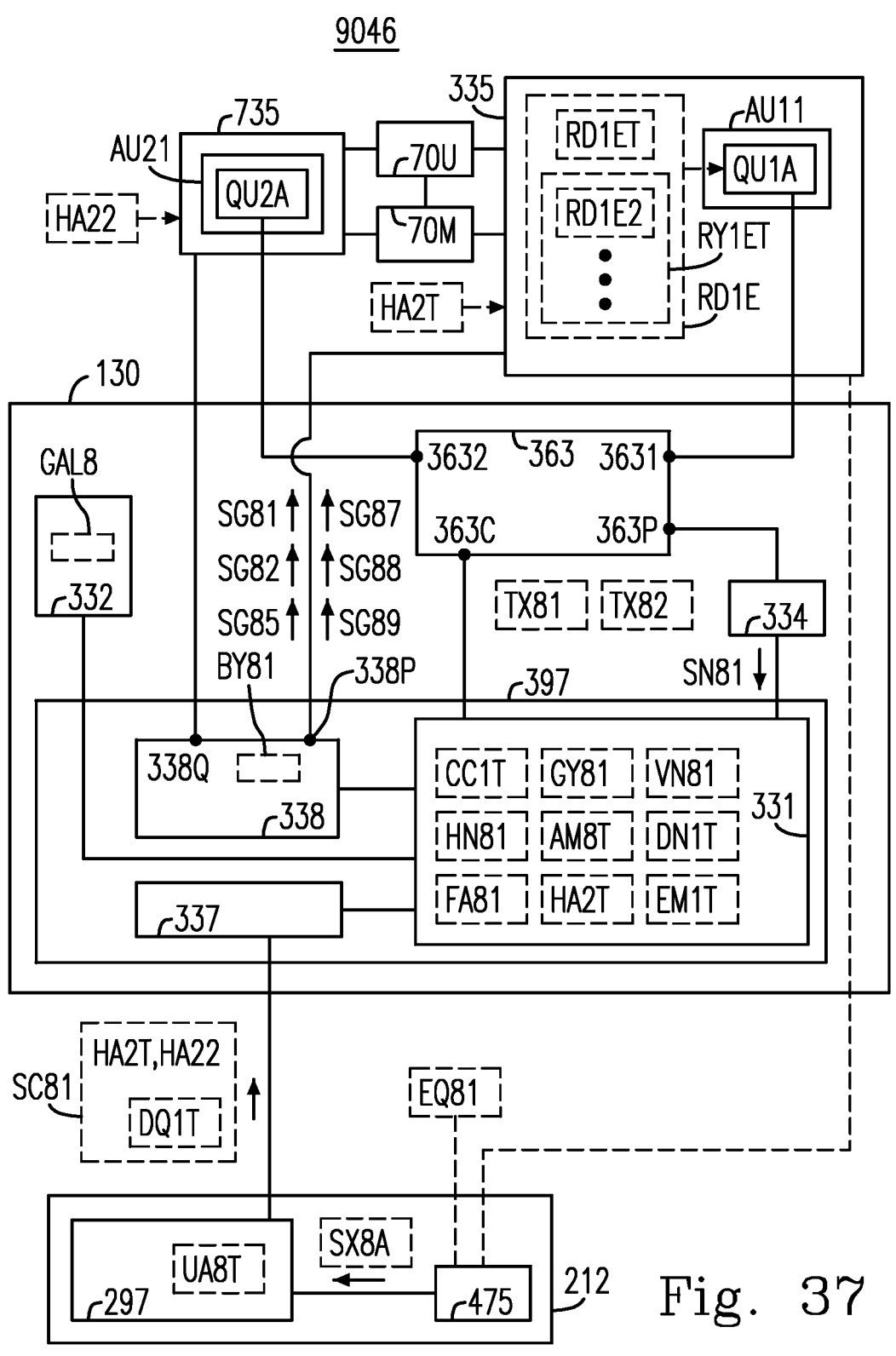
FIG. 37 is a schematic diagram showing an implementation structure of the control system shown in FIG. 1.
Figure 38:
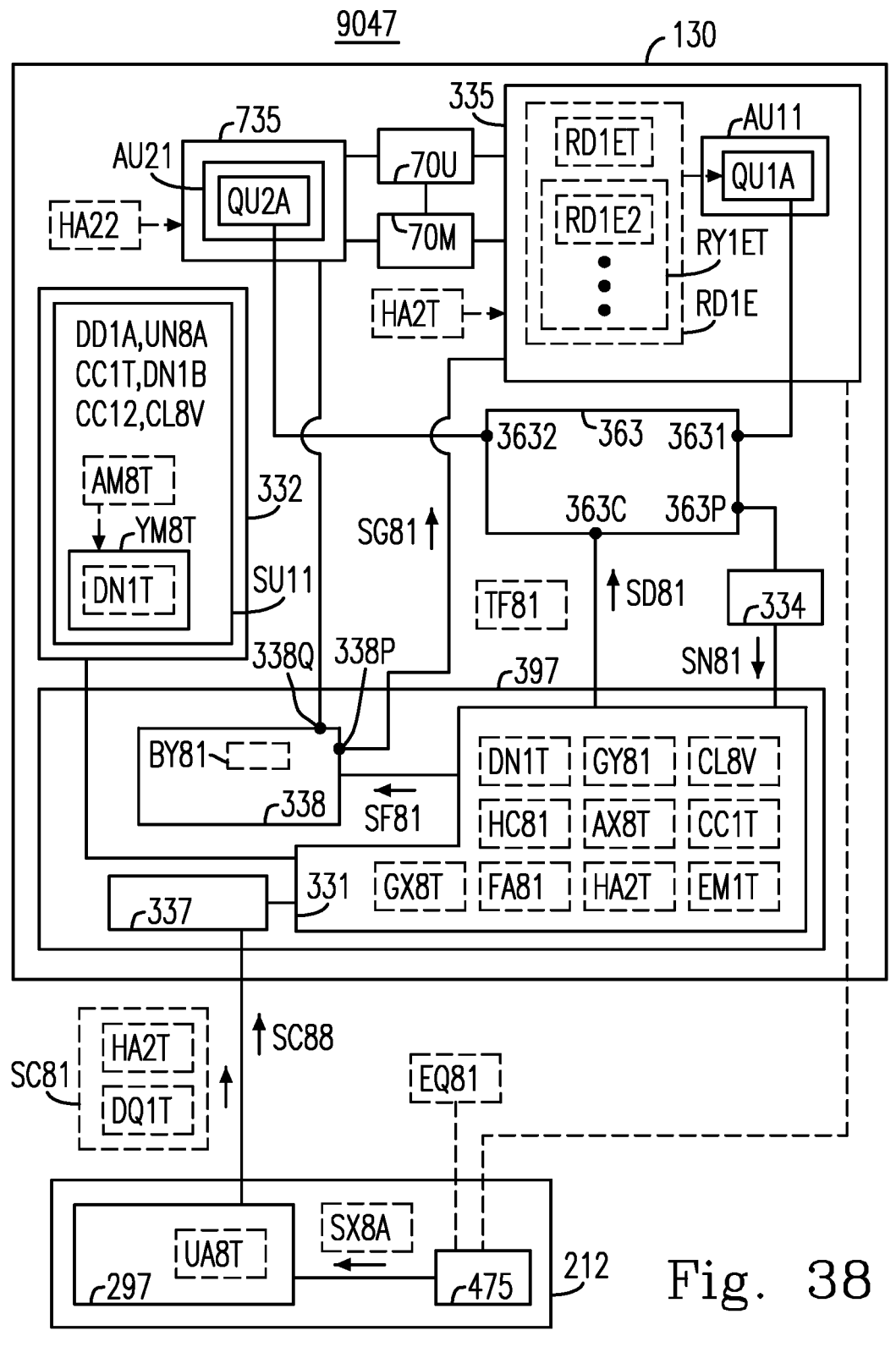
FIG. 38 is a schematic diagram showing an implementation structure of the control system shown in FIG. 1.
Figure 39:
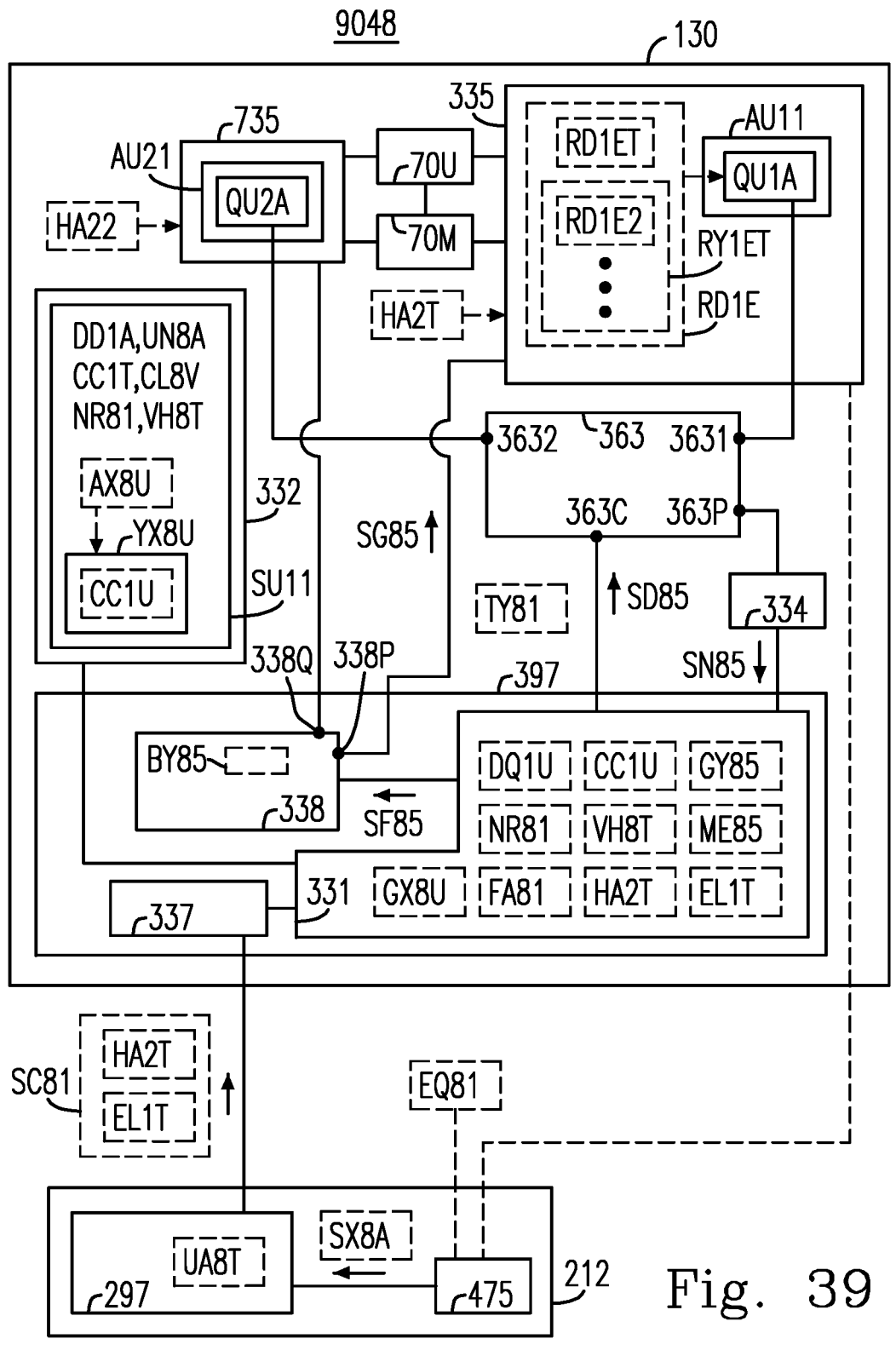
FIG. 39 is a schematic diagram showing an implementation structure of the control system shown in FIG. 1.
Figure 40:
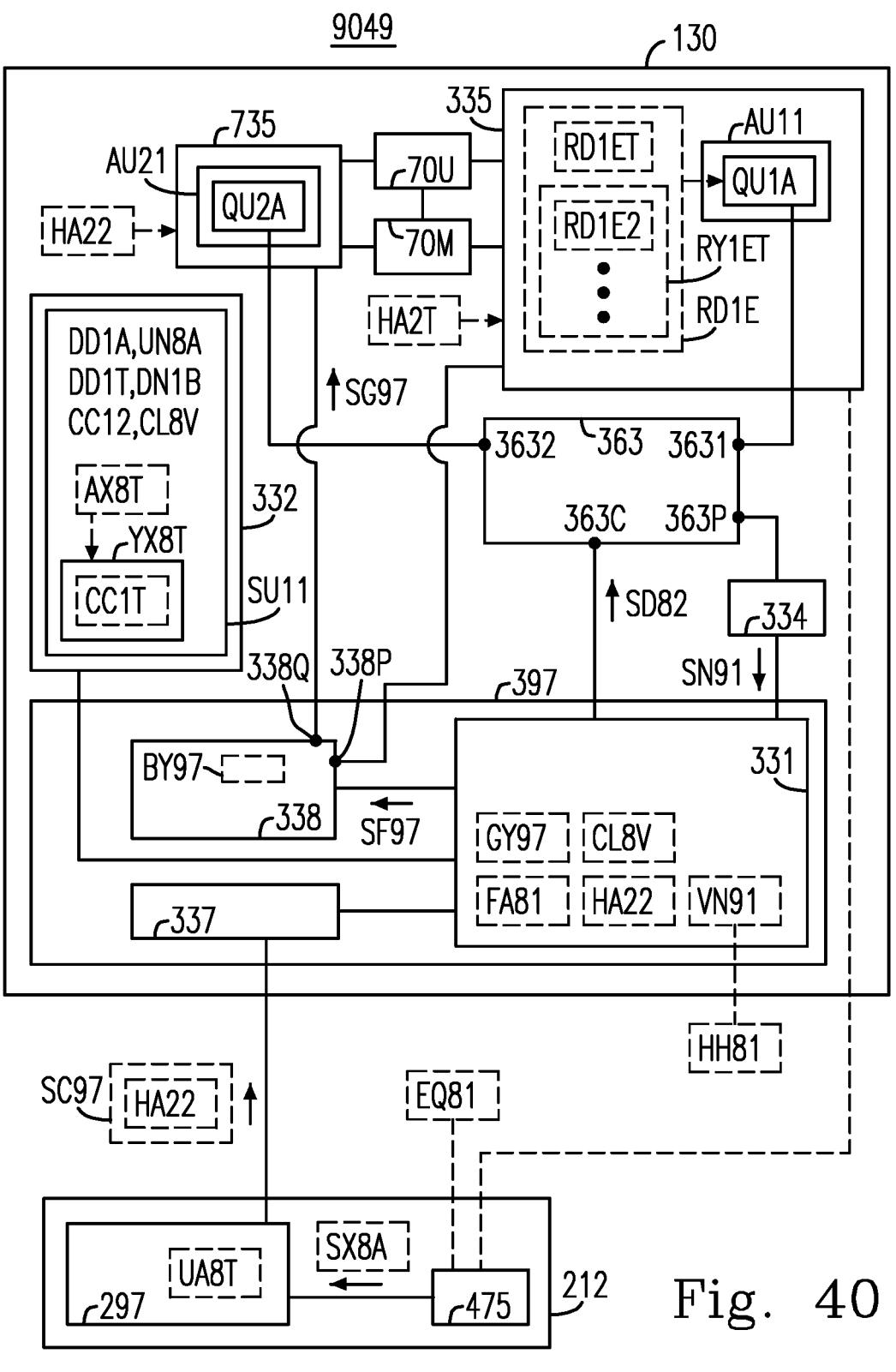
FIG. 40 is a schematic diagram showing an implementation structure of the control system shown in FIG. 1.

Please refer to FIG. 37, FIG. 38, FIG. 39 and FIG. 40. FIG. 37 is a schematic diagram showing an implementation structure 9046 of the control system 901 shown in FIG. 1. FIG. 38 is a schematic diagram showing an implementation structure 9047 of the control system 901 shown in FIG. 1. FIG. 39 is a schematic diagram showing an implementation structure 9048 of the control system 901 shown in FIG. 1. FIG. 40 is a schematic diagram showing an implementation structure 9049 of the control system 901 shown in FIG. 1. As shown in FIG. 37, FIG. 38, FIG. 39 and FIG. 40, each of the implementation structure 9046, the implementation structure 9047, the implementation structure 9048 and the implementation structure 9049 includes the control device 212 and the functional device 130. The control device 212 includes the operation unit 297 and the state-change detector 475.

The functional device 130 includes the operation unit 397, the storage unit 332, the sensing unit 334, the physical parameter application unit 335 and a physical parameter application unit 735. The operation unit 397 includes the processing unit 331, the receiving unit 337, the transmission unit 384 and the output component 338 coupled to the processing unit 331. The output component 338 is located in the outside of the processing unit 331, and is controlled by the processing unit 331 control. For example, the physical parameter application unit 735 is a functional target. The state-change detector 475 is a trigger application unit, and provides the trigger signal SX8A to the operation unit 297 in response to the trigger event EQ81. For example, the trigger signal SX8A is an operation request signal.

In some embodiments, the functional device 130 further includes a physical parameter application unit 735 coupled to the operation unit 397, and a multiplexer 363 coupled to the operation unit 397. The physical parameter application unit 735 is coupled to the output component 338, and includes a physical parameter formation area AU21. The physical parameter formation area AU21 has a variable physical parameter QU2A. The multiplexer 363 has an input terminal 3631, an input terminal 3632, a control terminal 363C and an output terminal 363P. The control terminal 363C is coupled to the processing unit 331. For example, the physical parameter application unit 735 is a physically realizable functional unit, and has a functional structure being similar to the physical parameter application unit 335. For example, the physical parameter application unit 735 is disposed in one of the inside of the functional device 130 and the outside of the functional device 130.

The input terminal 3631 is coupled to the physical parameter formation area AU11. The input terminal 3632 is coupled to the physical parameter formation area AU21. The output terminal 363P is coupled to the sensing unit 334. For example, the variable physical parameter QU1A and the variable physical parameter QU2A are a fourth variable electrical parameter and a fifth variable electrical parameter respectively. For example, the fourth variable electrical parameter and the fifth variable electrical parameter are a fourth variable electrical voltage and a fifth variable electrical voltage respectively. The input terminal 3631 and the output terminal 363P have a first functional relation therebetween. The first functional relation is equal to one of a first conduction relation and a first cut-off relation.

The input terminal 3632 and the output terminal 363P have a second functional relation therebetween. The second functional relation is equal to one of a second conduction relation and a second cut-off relation. Under a condition that the first functional relation is equal to the first conduction relation, the sensing unit 334 is used to sense the variable physical parameter QU1A through the output terminal 363P and the input terminal 3631, and is coupled to the physical parameter formation area AU11 through the output terminal 363P and the input terminal 3631.

Under a condition that the second functional relation is equal to the second conduction relation, the sensing unit 334 is used to sense the variable physical parameter QU2A through the output terminal 363P and the input terminal 3632, and is coupled to the physical parameter formation area AU21 through the output terminal 363P and the input terminal 3632. For example, the multiplexer 363 is controlled by the processing unit 331, and is an analog multiplexer. For example, the sensing unit 334 senses the variable physical parameter QU1A through the multiplexer 363 at an operation time TX81, and senses the variable physical parameter QU2A through the multiplexer 363 at an operation time TX82 being different from the operation time TX81.

For example, each of the storage unit 332, the sensing unit 334, the multiplexer 363, the physical parameter application unit 335 and the physical parameter application unit 735 is coupled to the operation unit 397, and is controlled by the processing unit 331. The control device 212 is separate from the functional device 130, or the control device 212 is in contact with the functional device 130. The operation unit 397 is separate from the physical parameter application unit 335, or the operation unit 397 is in contact with the physical parameter application unit 335. The operation unit 397 is separate from the physical parameter application unit 735, or the operation unit 397 is in contact with the physical parameter application unit 735. The operation unit 397 is separate from the sensing unit 334, or the operation unit 397 is in contact with the sensing unit 334. The control device 212 is used to control the variable physical parameter QU2A.

In some embodiments, the physical parameter application unit 335 is identified by an application unit identifier HA2T. The physical parameter application unit 735 is identified by an application unit identifier HA22. The physical parameter application unit 335 and the physical parameter application unit 735 are respectively located at different spatial locations; and each of the physical parameter application unit 335 and the physical parameter application unit 735 is coupled to the processing unit 331 by being coupled to the output component 338. Each of the application unit identifier HA2T and the application unit identifier HA22 is defaulted based on the measurement application function specification GAL8. The control signal SC81 further carries at least one of the application unit identifier HA2T and the application unit identifier HA22.

The receiving unit 337 receives the control signal SC81 from the operation unit 297. Under a condition that the control signal SC81 carries the application unit identifier HA2T, the processing unit 331 selects the physical parameter application unit 335 in response to the control signal SC81 to perform a control. Under a condition that the control signal SC81 carries the application unit identifier HA22, the processing unit 331 selects the physical parameter application unit 735 in response to the control signal SC81 to perform a control. For example, the application unit identifier HA2T is a first functional unit number. The application unit identifier HA22 is a second functional unit number.

For example, the physical parameter application unit 335 is separate from the physical parameter application unit 735, or the physical parameter application unit 335 is separate from the physical parameter application unit 735 by a material layer 70U which is disposed between the physical parameter application unit 335 and the physical parameter application unit 735. Each of the physical parameter application unit 335, the material layer 70U and the physical parameter application unit 735 is coupled to a support medium 70M. The functional device 130 includes the material layer 70U, or the material layer 70U is disposed in the outside of the functional device 130. The functional device 130 includes the support medium 70M, or the support medium 70M is disposed in the outside of the functional device 130. For example, the support medium 70M is coupled to the operation unit 397.

In some embodiments, under a condition that the control signal SC81 carries the application unit identifier HA2T, the processing unit 331 obtains the application unit identifier HA2T from the control signal SC81 in response to the control signal SC81, and causes the sensing unit 334 based on the obtained application unit identifier HA2T to sense the variable physical parameter QU1A, and thereby receives the sense signal SN81 from the sensing unit 334. The processing unit 331 obtains the measured value VN81 in the designated measurement value format HH81 based on the received sense signal SN81, and causes the output component 338 based on the obtained application unit identifier HA2T to transmit at least one selected from a group consisting of the operation signal SG81, the operation signal SG82, the operation signal SG85, the operation signal SG87, the operation signal SG88 and the operation signal SG89 toward the physical parameter application unit 335.

For example, the processing unit 331 provides a control signal SD81 to the control terminal 363C based on the obtained application unit identifier HA2T in response to the control signal SC81. For example, the control signal SD81 is a selection control signal, and serves to indicate the input terminal 3631. The multiplexer 363 causes the first functional relation between the input terminal 3631 and the output terminal 363P to be equal to the first conduction relation in response to the control signal SD81. Under a condition that the first functional relation is equal to the first conduction relation, the sensing unit 334 senses the variable physical parameter QU1A to generate the sense signal SN81, so that the processing unit 331 receives the sense signal SN81 from the sensing unit 334. Under a condition that the first functional relation is equal to the first conduction relation, the sensing unit 334 senses the variable physical parameter QU1A to generate the sense signal SN85, so that the processing unit 331 receives the sense signal SN85 from the sensing unit 334.

The storage unit 332 has the storage space SU11. The storage unit 332 further stores the rated range limit value pair DD1A, the variable physical parameter range code UN8A, the target range limit value pair DN1T, the handle CC1T, the candidate range limit value pair DN1B and the handle CC12 in the storage space SU11 based on the defaulted application unit identifier HA2T. The processing unit 331 further uses the storage unit 332 based on the obtained application unit identifier HA2T to access any of the rated range limit value pair DD1A, the variable physical parameter range code UN8A, the target range limit value pair DN1T, the handle CC1T, the candidate range limit value pair DN1B and the handle CC12.

In some embodiments, the first memory address AM8T is defaulted based on the defaulted application unit identifier HA2T, the defaulted measurement value target range code EM1T and the defaulted measurement range limit data code type identifier HN81. The processing unit 331 uses the obtained application unit identifier HA2T, the obtained measurement value target range code EM1T and the obtained measurement range limit data code type identifier HN81 to obtain the first memory address AM8T in response to the control signal SC81, and uses the storage unit 332 based on the obtained first memory address AM8T to access the target range limit value pair DN1T, stored at the first memory location YM8T, to obtain the target range limit value pair DN1T.

For example, the memory address AX8T is defaulted based on the defaulted application unit identifier HA2T, the defaulted measurement value target range code EM1T and the defaulted handle type identifier HC81. Under a condition that the processing unit 331 determines the corresponding physical parameter range RY1ET which the variable physical parameter QU1A is currently in, the processing unit 331 obtains the memory address AX8T based on the obtained application unit identifier HA2T, the obtained measurement value target range code EM1T and the obtained handle type identifier HC81, and uses the storage unit 332 based on the obtained memory address AX8T to access the handle CC1T, stored at the memory location YX8T, to obtain the handle CC1T. For example, the storage unit 332 further stores the measurement time length value CL8V, the clock reference time value NR81 and the measurement time length value VH8T to cause the storage space SU11 to further have the measurement time length value CL8V, the clock reference time value NR81 and the measurement time length value VH8T.

The processing unit 331 obtains the measurement time length value CL8V from the storage space SU11 in response to the control signal SC88. The processing unit 331 causes the storage unit 332 to store the clock reference time value NR81 and the measurement time length value VH8T based on the defaulted measurement value designation range code EL1T. The control signal SC81 carries the measurement value designation range code EL1T. The processing unit 331 obtains the measurement value designation range code EL1T from the control signal SC81, and accesses the clock reference time value NR81 and the measurement time length value VH8T, stored in the storage space SU11, based on the obtained measurement value designation range code EL1T to obtain the clock reference time value NR81 and the measurement time length value VH8T. The processing unit 331 performs the scientific calculation ME85 to obtain the application range limit value pair DQ1U based on the obtained measurement time length value VH8T and the obtained clock reference time value NR81.

In some embodiments, under a condition that the processing unit 331 determines the corresponding physical parameter range RY1ET which the variable physical parameter QU1A is currently in, the processing unit 331 performs the signal generation control GY81 used to control the output component 338 based on the obtained application unit identifier HA2T and the obtained handle CC1T. The output component 338 performs the signal generation operation BY81 for the measurement application function FA81 to generate the operation signal SG81 in response to the signal generation control GY81, and causes the output component 338 to transmit the operation signal SG81 toward the physical parameter application unit 335. The operation signal SG81 is used to control the physical parameter application unit 335 to cause the variable physical parameter QU1A to enter the physical parameter target range RD1ET.

For example, the processing unit 331 provides a control signal SF81 to the output component 338 by performing the signal generation control GY81. The output component 338 performs the signal generation operation BY81 to generate the operation signal SG81 in response to the control signal SF81. Under a condition that the processing unit 331 determines the physical parameter application state JE1L which the variable physical parameter QU1A is currently in based on the physical parameter relation check control GX8T, the processing unit 331 performs the signal generation control GY81 used to control the output component 338 based on the obtained application unit identifier HA2T and the obtained handle CC1T within the operation time TF81. The physical parameter application state JE1L is determined beforehand based on the physical parameter application range RD1EL.

For example, the output component 338 includes an output terminal 338P and an output terminal 338Q. The output terminal 338P is coupled to the physical parameter application unit 335. The output terminal 338P is coupled to the physical parameter application unit 735. The output terminal 338P and the output terminal 338Q are respectively located at different spatial locations. The defaulted application unit identifier HA2T is configured to indicate the output terminal 338P. The defaulted application unit identifier HA22 is configured to indicate the output terminal 338Q. For example, the control signal SC81 causes the processing unit 331 to select the physical parameter application unit 335 to perform a control by carrying the application unit identifier HA2T which is configured to indicate the output terminal 338P. The signal generation control GY81 serves to indicate the output terminal 338P, and is used to cause the output component 338 to receive the control signal SF81. The control signal SF81 serves to indicate the output terminal 338P. The output component 338 performs the signal generation operation BY81, using the output terminal 338P, to transmit the operation signal SG81 toward the physical parameter application unit 335 in response to one of the signal generation control GY81 and the control signal SF81.

In some embodiments, under a condition that the processing unit 331 determines the physical parameter application state JE1T which the variable physical parameter QU1A is currently in based on the physical parameter relation check control GX8U, the processing unit 331 performs the signal generation control GY85 used to control the output component 338 based on the obtained application unit identifier HA2T and the obtained handle CC1U within the operation time TY81. The output component 338 performs the signal generation operation BY85 for the measurement application function FA81 to generate the operation signal SG85 in response to the signal generation control GY85, and causes the output component 338 to transmit the operation signal SG85 toward the physical parameter application unit 335. For example, the processing unit 331 provides a control signal SF85 to the output component 338 by performing the signal generation control GY85. The output component 338 performs the signal generation operation BY85 to generate the operation signal SG85 in response to the control signal SF85.

The operation signal SG85 is used to control the physical parameter application unit 335 to cause the variable physical parameter QU1A to enter the physical parameter target range RD1EU from the physical parameter target range RD1ET. For example, the signal generation control GY85 serves to indicate the output terminal 338P, and is used to cause the output component 338 to receive the control signal SF85. The control signal SF85 serves to indicate the output terminal 338P. The output component 338 performs the signal generation operation BY85, using the output terminal 338P, to transmit the operation signal SG85 toward the physical parameter application unit 335 in response to one of the signal generation control GY85 and the control signal SF85.

In some embodiments, the receiving unit 337 receives a control signal SC97 from the control device 212. The control signal SC97 carries the application unit identifier HA22. Under a condition that the control signal SC97 carries the application unit identifier HA22, the processing unit 331 obtains the application unit identifier HA22 from the control signal SC97 in response to the control signal SC97, and provides a control signal SD82 to the control terminal 363C based on the obtained application unit identifier HA22. For example, the control signal SD82 is a selection control signal, serves to indicate the input terminal 3632, and is different from the control signal SD81. For example, the control signal SC97 is the control signal SC81. Under a condition that the control signal SC81 carries the application unit identifier HA22, the processing unit 331 obtains the application unit identifier HA22 from the control signal SC81 in response to the control signal SC81.

The multiplexer 363來 causes the second functional relation between the input terminal 3632 and the output terminal 363P to be equal to the second conduction relation in response to the control signal SD82. Under a condition that the second functional relation is equal to the second conduction relation, the sensing unit 334 senses the variable physical parameter QU1A to generate a sense signal SN91. The processing unit 331 receives the sense signal SN91 from the sensing unit 334, and obtains a measured value VN91 in the designated measurement value format HH81 based on the received sense signal SN91. For example, the control signal SC97 causes the processing unit 331 to select the physical parameter application unit 735 to perform a control by carrying the application unit identifier HA22 which is configured to indicate the output terminal 338Q.

In a specific situation, the processing unit 331 performs a signal generation control GY97 used to control the output component 338 based on the obtained measured value VN91 and the obtained application unit identifier HA22. The signal generation control GY97 serves to indicate the output terminal 338Q, and is used to cause the output component 338 to receive a control signal SF97. The control signal SF97 serves to indicate the output terminal 338Q. The output component 338 performs a signal generation operation BY97, using the output terminal 338Q, to transmit an operation signal SG97 toward the physical parameter application unit 735 in response to one of the signal generation control GY97 and the control signal SF97. The operation signal SG97 is used to control the variable physical parameter QU2A, and is one of a functional signal and a control signal. For example, the processing unit 331 provides the control signal SF97 to the output component 338 by performing the signal generation control GY97. The output component 338 performs the signal generation operation BY97 to generate the operation signal SG97 in response to the control signal SF97.

Figure 41:
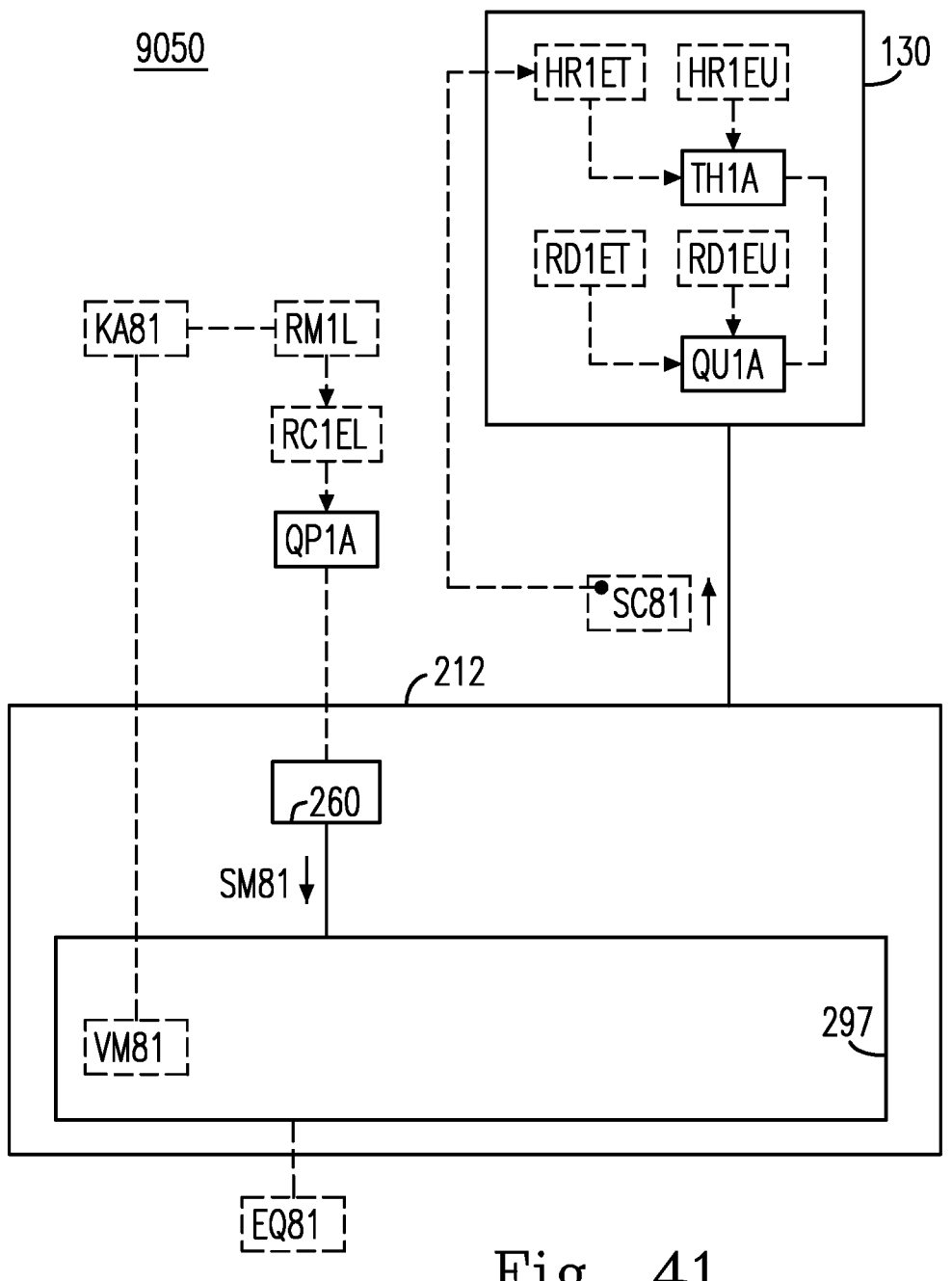
FIG. 41 is a schematic diagram showing an implementation structure of the control system shown in FIG. 1.

Please refer to FIG. 41, which is a schematic diagram showing an implementation structure 9050 of the control system 901 shown in FIG. 1. As shown in FIG. 41, the implementation structure 9050 includes the functional device 130 and the control device 212 for controlling the functional device 130. In some embodiments, the functional device 130 has the variable physical parameter QU1A associated with the clock time TH1A. The variable physical parameter QU1A is characterized based on the physical parameter target range RD1ET. The clock time TH1A is characterized based on the clock time designation interval HR1ET. The clock time designation interval HR1ET is associated with the physical parameter target range RD1ET. The control device 212 for controlling the variable physical parameter QU1A includes a sensing unit 260 and the operation unit 297.

The sensing unit 260 senses a variable physical parameter QP1A to generate a sense signal SM81. For example, the variable physical parameter QP1A is characterized based on a physical parameter application range RC1EL which is represented by a measurement value application range RM1L. The operation unit 297 is coupled to the sensing unit 260. Under a condition that the trigger event EQ81 occurs, the operation unit 297 obtains a measured value VM81 in response to the sense signal SM81. Under a condition that the operation unit 297 determines the physical parameter application range RC1EL which the variable physical parameter QP1A is currently in by checking a mathematical relation KA81 between the measured value VM81 and the measurement value application range RM1L, the operation unit 297 generates the control signal SC81 which serves to indicate the clock time designation interval HR1ET. For example, the measured value VM81 is a physical parameter measured value.

The control signal SC81 is used to control the functional device 130 to cause the variable physical parameter QU1A to be in the physical parameter target range RD1ET within the clock time designation interval HR1ET. The clock time TH1A is further characterized based on the clock time application interval HR1EU being adjacent to the clock time designation interval HR1ET. The variable physical parameter QU1A is characterized based on the physical parameter target range RD1EU. The clock time application interval HR1EU is associated with the physical parameter target range RD1EU. The control signal SC81 is used to control the functional device 130 to cause the variable physical parameter QU1A to be in the physical parameter target range RD1EU within the clock time application interval HR1EU.

Figure 42:
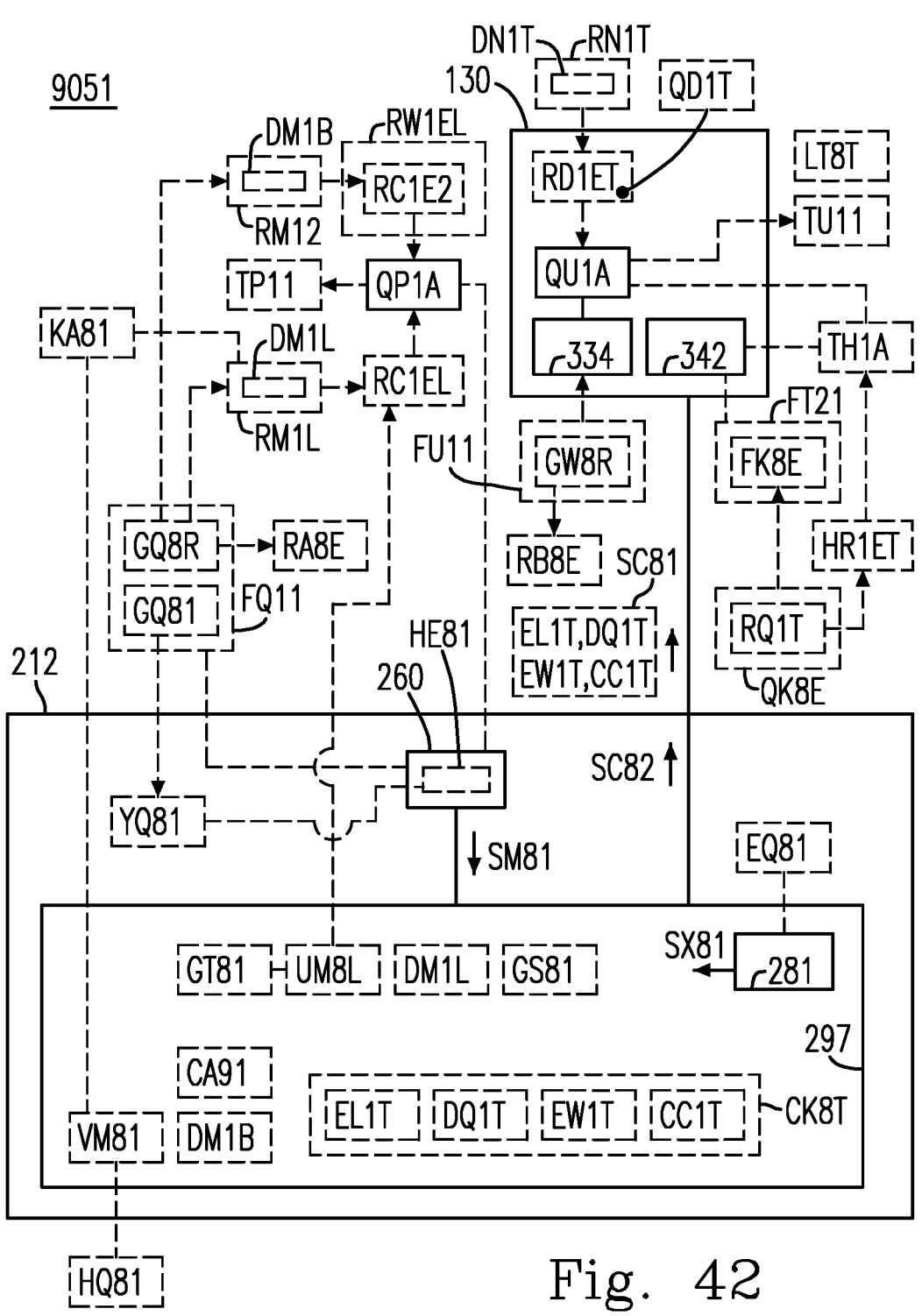
FIG. 42 is a schematic diagram showing an implementation structure of the control system shown in FIG. 1.
Figure 43:
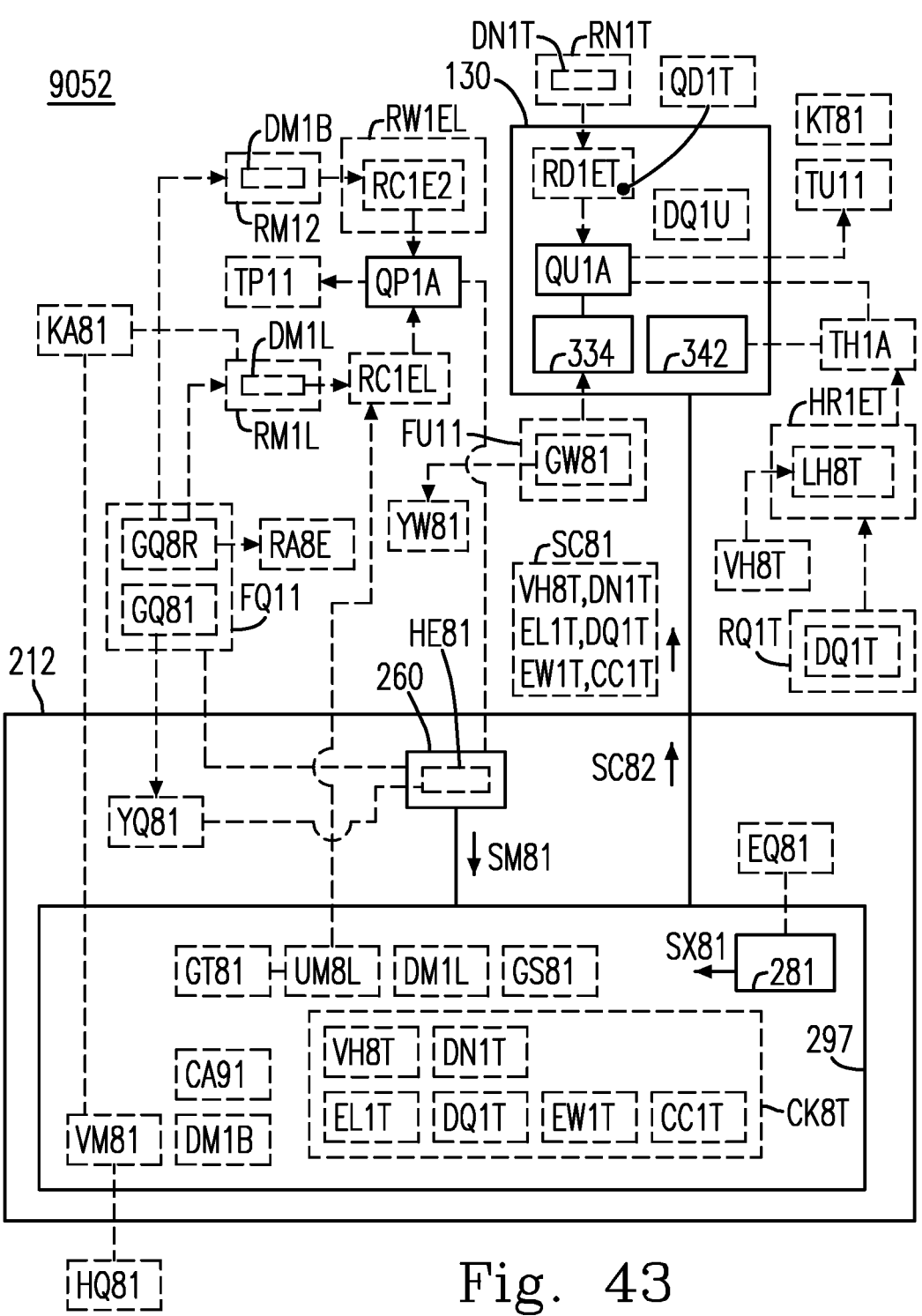
FIG. 43 is a schematic diagram showing an implementation structure of the control system shown in FIG. 1.

Please refer to FIG. 42 and FIG. 43. FIG. 42 is a schematic diagram showing an implementation structure 9051 of the control system 901 shown in FIG. 1. FIG. 43 is a schematic diagram showing an implementation structure 9052 of the control system 901 shown in FIG. 1. As shown in FIG. 42 and FIG. 43, each of the implementation structure 9051 and the implementation structure 9052 includes the functional device 130 and the control device 212. Please additionally refer to FIG. 41. In some embodiments, the sensing unit 260 is configured to meet a sensor specification FQ11 associated with the measurement value application range RM1L. For example, the sensor specification FQ11 includes a sensor measurement range representation GQ8R used to indicate a sensor measurement range RA8E, and a sensor sensibility representation GQ81 used to indicate a sensor sensibility YQ81. The sensor sensibility YQ81 is associated with a sense signal generation HE81 performed by the sensing unit 260.

The variable physical parameter QU1A is controlled by means of the timer 342, and is characterized based on the physical parameter target range RD1ET. The timer 342 senses the clock time TH1A, and meets the timer specification FT21 associated with the clock time designation interval HR1ET. For example, the clock time designation interval HR1ET is represented by the measurement value designation range RQ1T. The timer specification FT21 includes the full measurement value range representation FK8E used to indicate the full measurement value range QK8E. For example, the measurement value designation range RQ1T is equal to a portion of the full measurement value range QK8E.

The variable physical parameter QU1A is further controlled by means of the sensing unit 334. The sensing unit 334 senses the variable physical parameter QU1A, and meets the sensor specification FU11 associated with the physical parameter target range RD1ET. The physical parameter target range RD1ET is represented by the measurement value target range RN1T. For example, the sensor specification FU11 includes the sensor measurement range representation GW8R used to indicate the sensor measurement range RB8E, and the sensor sensibility representation GW81 used to indicate the sensor sensibility YW81. The sensor sensibility YW81 is equal to or different from the sensor sensibility YQ81. The measurement value target range RN1T is defaulted based on the sensor measurement range representation GW8R, and has the target range limit value pair DN1T.

The measured value VM81 is obtained in a designated measurement value format HQ81 by the operation unit 297. The variable physical parameter QP1A is further characterized based on a physical parameter candidate range RC1E2 being different from the physical parameter application range RC1EL. Each of the measurement value application range RM1L and a measurement value candidate range RM12 representing the physical parameter candidate range RC1E2 is defaulted in the designated measurement value format HQ81 based on one of the sensor measurement range representation GQ8R and the sensor specification FQ11. For example, each of the measurement value application range RM1L and the measurement value candidate range RM12 is defaulted in the designated measurement value format HQ81 based on the sensor measurement range representation GQ8R and the sensor sensibility representation GQ81. The measurement value designation range RQ1T is defaulted based on the timer specification FT21, has the designated range limit value pair DQ1T, and is denoted by a measurement value designation range code EL1T.

In some embodiments, the control signal SC81 carries the measurement value designation range code EL1T, the designated range limit value pair DQ1T, the physical parameter application state code EW1T and the handle CC1T, and is used to cause the variable physical parameter QU1A to be in the physical parameter target range RD1ET within the clock time designation interval HR1ET. For example, the handle CC1T is defaulted based on a designated physical parameter QD1T being within the physical parameter target range RD1ET. The control signal SC81 serves to indicate at least one of the measurement value designation range RQ1T and the clock time designation interval HR1ET by carrying the designated range limit value pair DQ1T. The control signal SC81 serves to indicate at least one of the measurement value designation range RQ1T and the clock time designation interval HR1ET by carrying the measurement value designation range code EL1T.

The measurement value application range RM1L has an application range limit value pair DM1L. For example, the application range limit value pair DM1L is defaulted. The operation unit 297 obtains the application range limit value pair DM1L in response to the trigger event EQ81, and checks the mathematical relation KA81 by comparing the measured value VM81 and the obtained application range limit value pair DM1L. The measurement value candidate range RM12 has a candidate range limit value pair DM1B. For example, the candidate range limit value pair DM1B is defaulted. The operation unit 297 obtains the defaulted candidate range limit value pair DM1B in response to the trigger event EQ81.

For example, the operation unit 297 includes a trigger application unit 281. The trigger event EQ81 is associated with the trigger application unit 281. The trigger application unit 281 generates an operation request signal SX81 in response to the trigger event EQ81. The operation unit 297 obtains the measured value VM81 based on the sense signal SM81 in response to the operation request signal SX81, and obtains the application range limit value pair DM1L in response to the operation request signal SX81.

In some embodiments, the physical parameter application range RC1EL is configured to correspond to a corresponding physical parameter range RW1EL being outside the physical parameter application range RC1EL. Under a condition that the operation unit 297 determines the corresponding physical parameter range RW1EL which the variable physical parameter QP1A is currently in by checking the mathematical relation KA81, the operation unit 297 performs a data comparison CA91 between the measured value VM81 and the obtained reference range limit value pair DM1B. Under a condition that the operation unit 297 determines the physical parameter candidate range RC1E2 which the variable physical parameter QP1A is currently in based on the data comparison CA91, the operation unit 297 generates a control signal SC82 used to control the variable physical parameter QU1A, wherein the control signal SC82 is different from the control signal SC81.

Under a condition that the operation unit 297 determines the physical parameter application range RC1EL which the variable physical parameter QP1A is currently in by checking the mathematical relation KA81, the operation unit 297 is configured to obtain a control data code CK8T which includes the measurement value designation range code EL1T, the designated range limit value pair DQ1T, the physical parameter application state code EW1T and the handle CC1T, performs a signal generation control GS81 used to generate the control signal SC81 based on the control data code CK8T, and performs a data storage control operation GT81, wherein the data storage control operation GT81 is used to cause a physical parameter application range code UM8L, denoting the determined physical parameter application range RC1EL, to be recorded. The variable physical parameter QU1A and the variable physical parameter QP1A respectively belong to the physical parameter type TU11 and a physical parameter type TP11. For example, the physical parameter type TU11 is equal to or different from the physical parameter type TP11. For example, the data storage control operation GT81 is a secure operation.

In some embodiments, the clock time designation interval HR1ET has the designated time length LH8T. The designated time length LH8T is denoted by the measurement time length value VH8T. The control signal SC81 further carries the measurement time length value VH8T. The carried designated range limit value pair DQ1T and the carried measurement time length value VH8T are used to cause the functional device 130 to obtain the application range limit value pair DQ1U; therefore, the control signal SC81 is used to cause the functional device 130 to check the time relation KT81 between the clock time TH1A and the clock time application interval HR1EU, and is used to control the functional device 130 to cause the variable physical parameter QU1A to be in the physical parameter target range RD1EU within the clock time application interval HR1EU.

For example, the control signal SC81 further carries the target range limit value pair DN1T. The control signal SC81 來 serves to indicate at least one of the measurement value target range RN1T and the physical parameter target range RD1ET by carrying the target range limit value pair DN1T. The control data code CK8T further includes the measurement time length value VH8T and the target range limit value pair DN1T.

Figure 44:
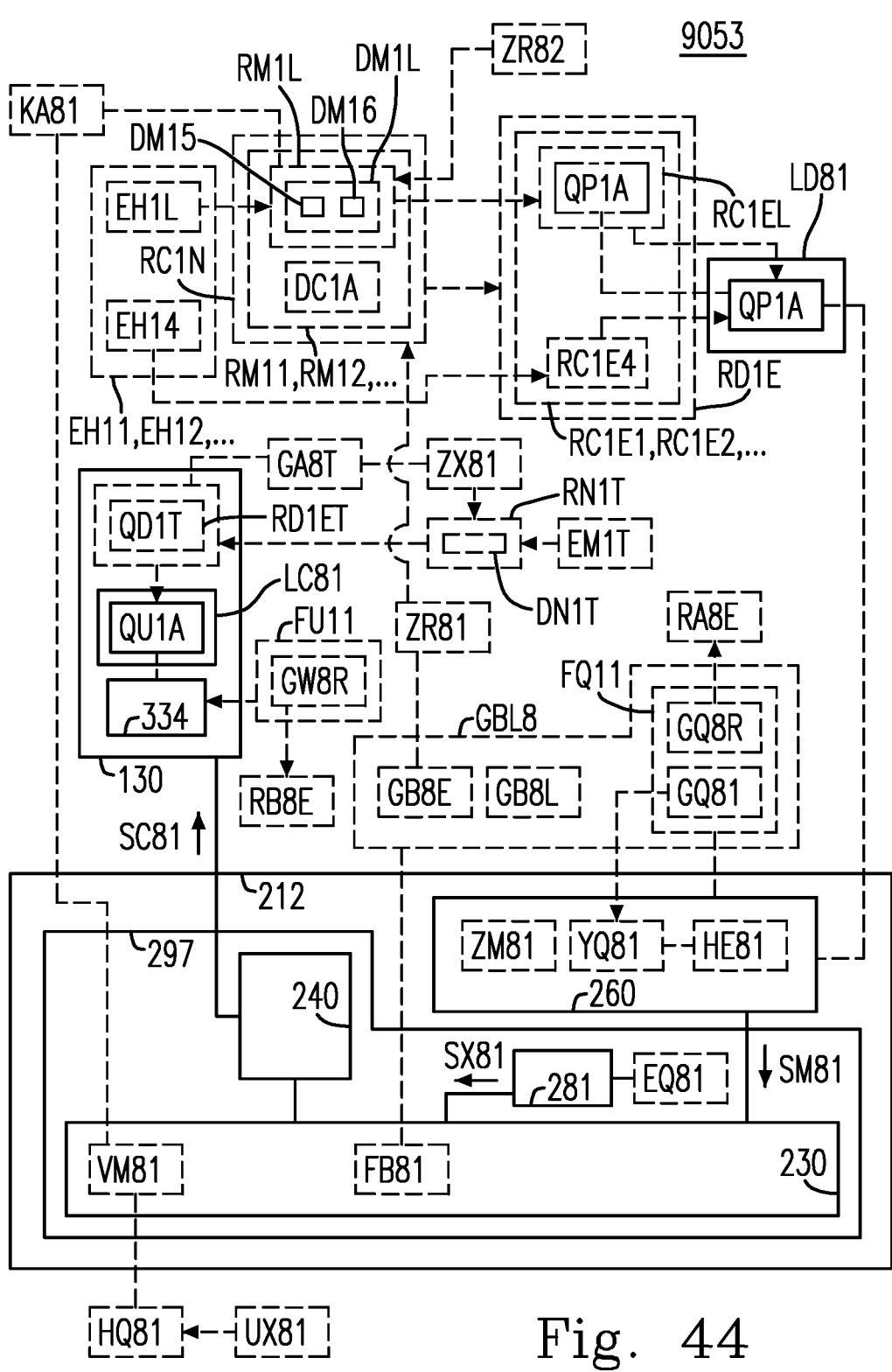
FIG. 44 is a schematic diagram showing an implementation structure of the control system shown in FIG. 1.
Figure 45:
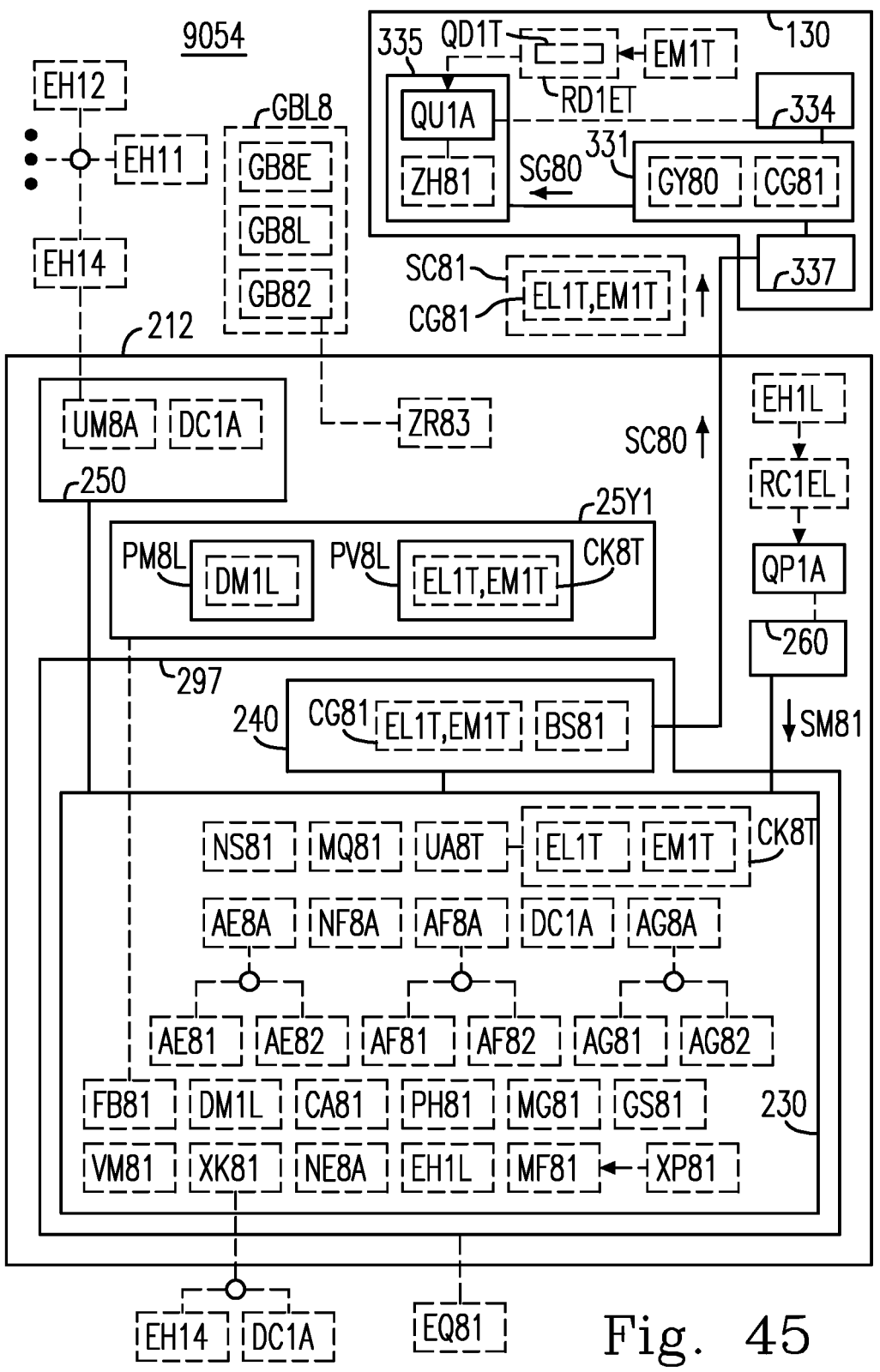
FIG. 45 is a schematic diagram showing an implementation structure of the control system shown in FIG. 1.
Figure 46:
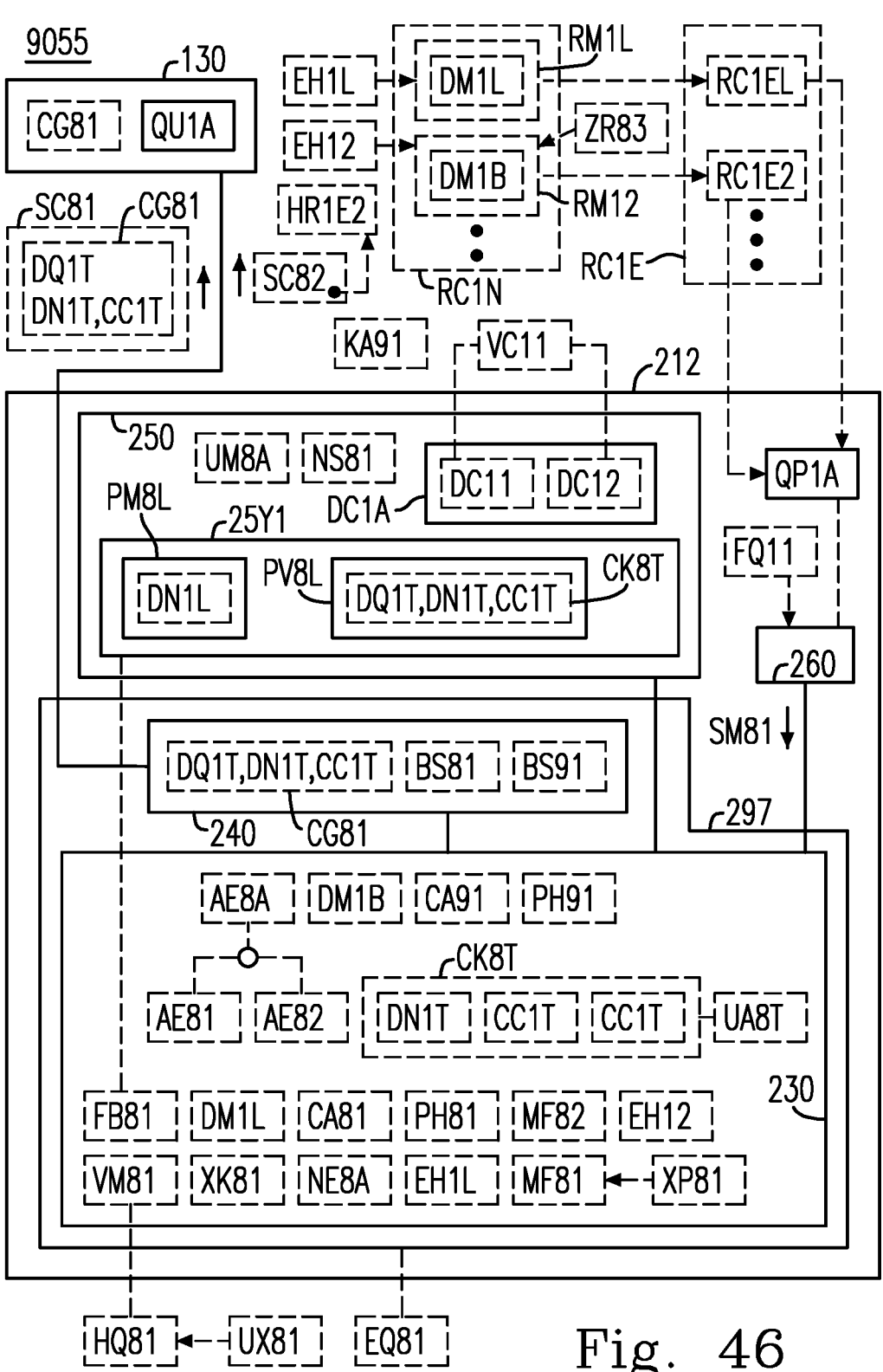
FIG. 46 is a schematic diagram showing an implementation structure of the control system shown in FIG. 1.
Figure 47:
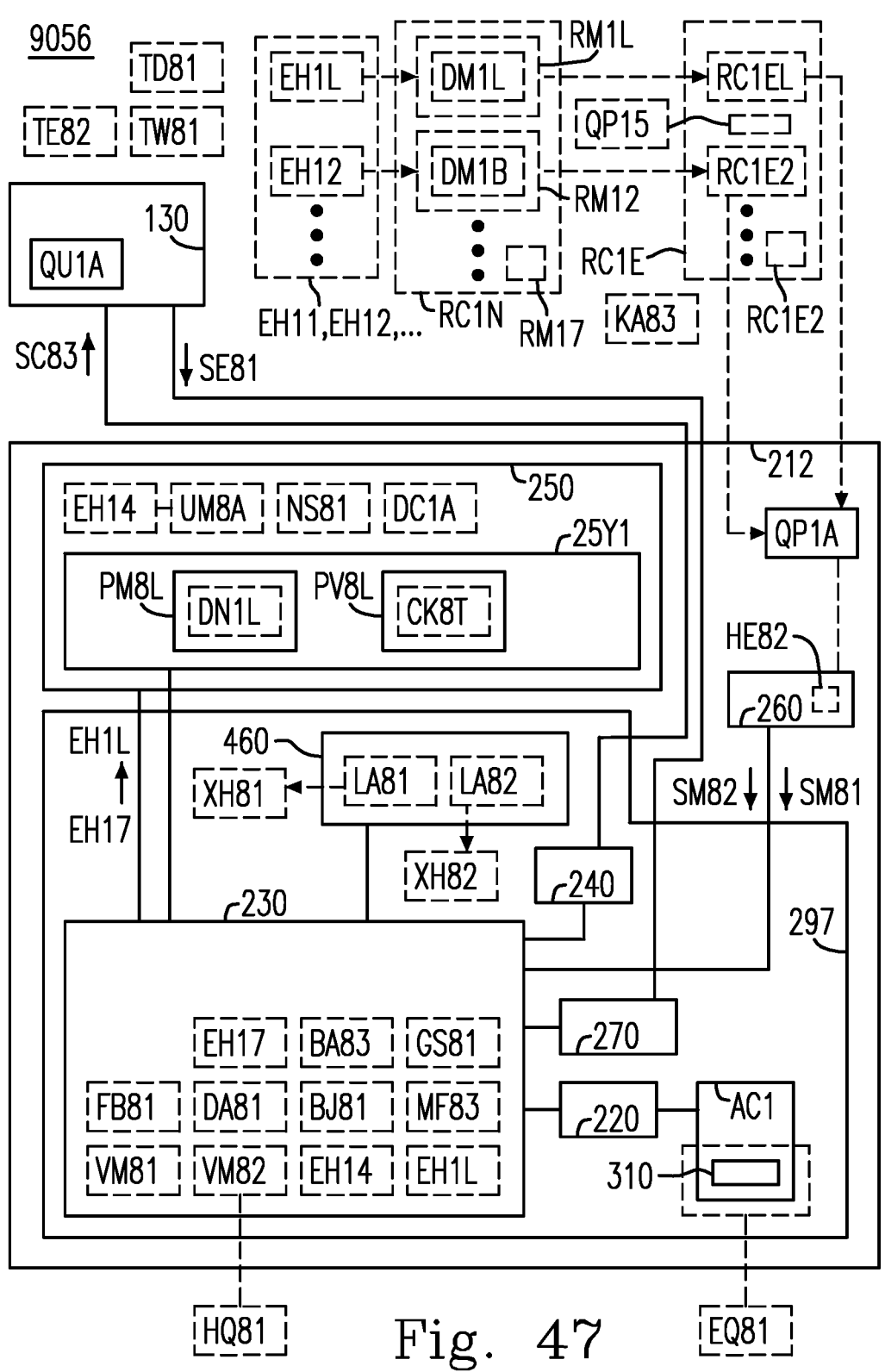
FIG. 47 is a schematic diagram showing an implementation structure of the control system shown in FIG. 1.
Figure 48:
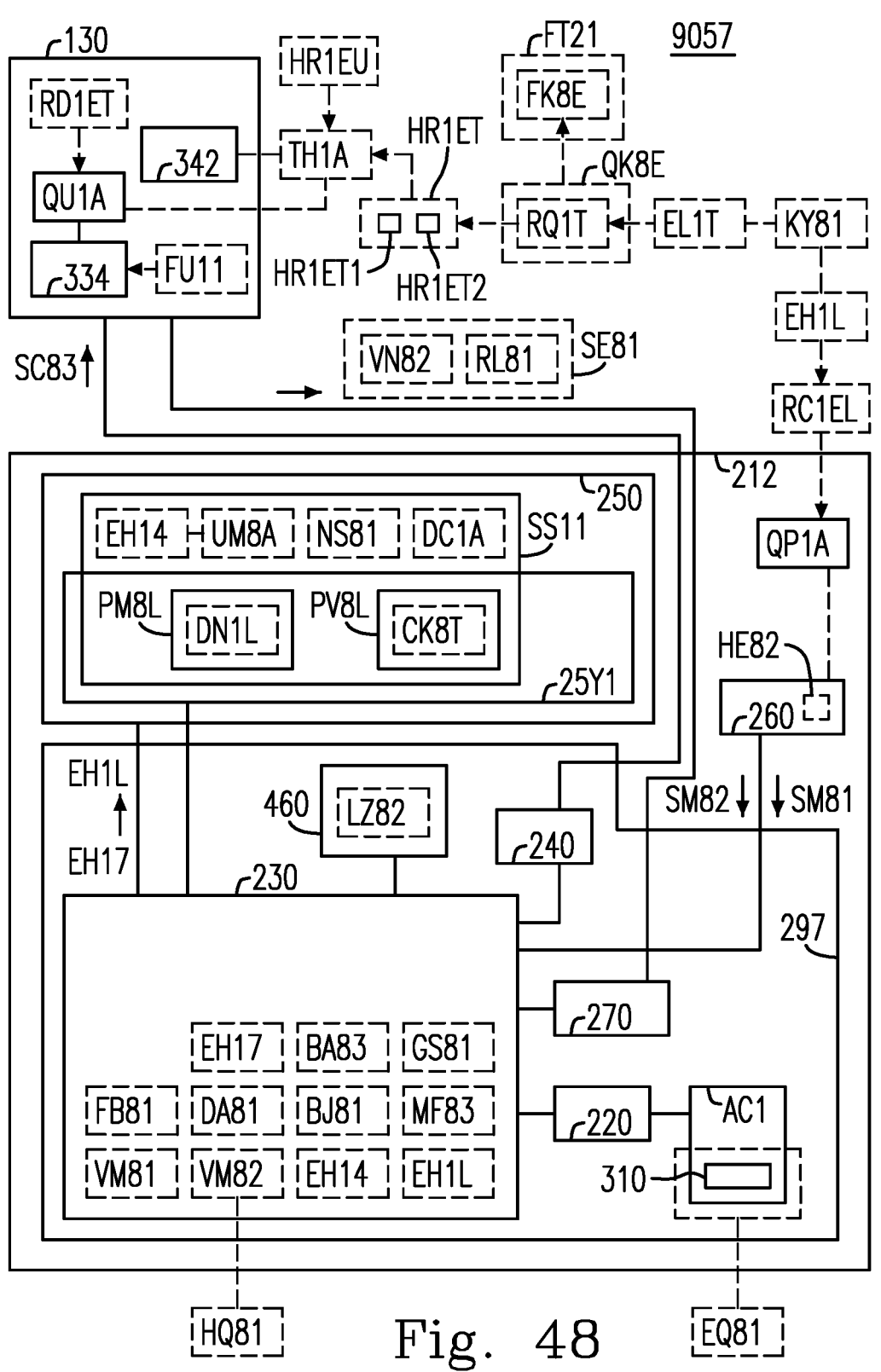
FIG. 48 is a schematic diagram showing an implementation structure of the control system shown in FIG. 1.
Figure 49:
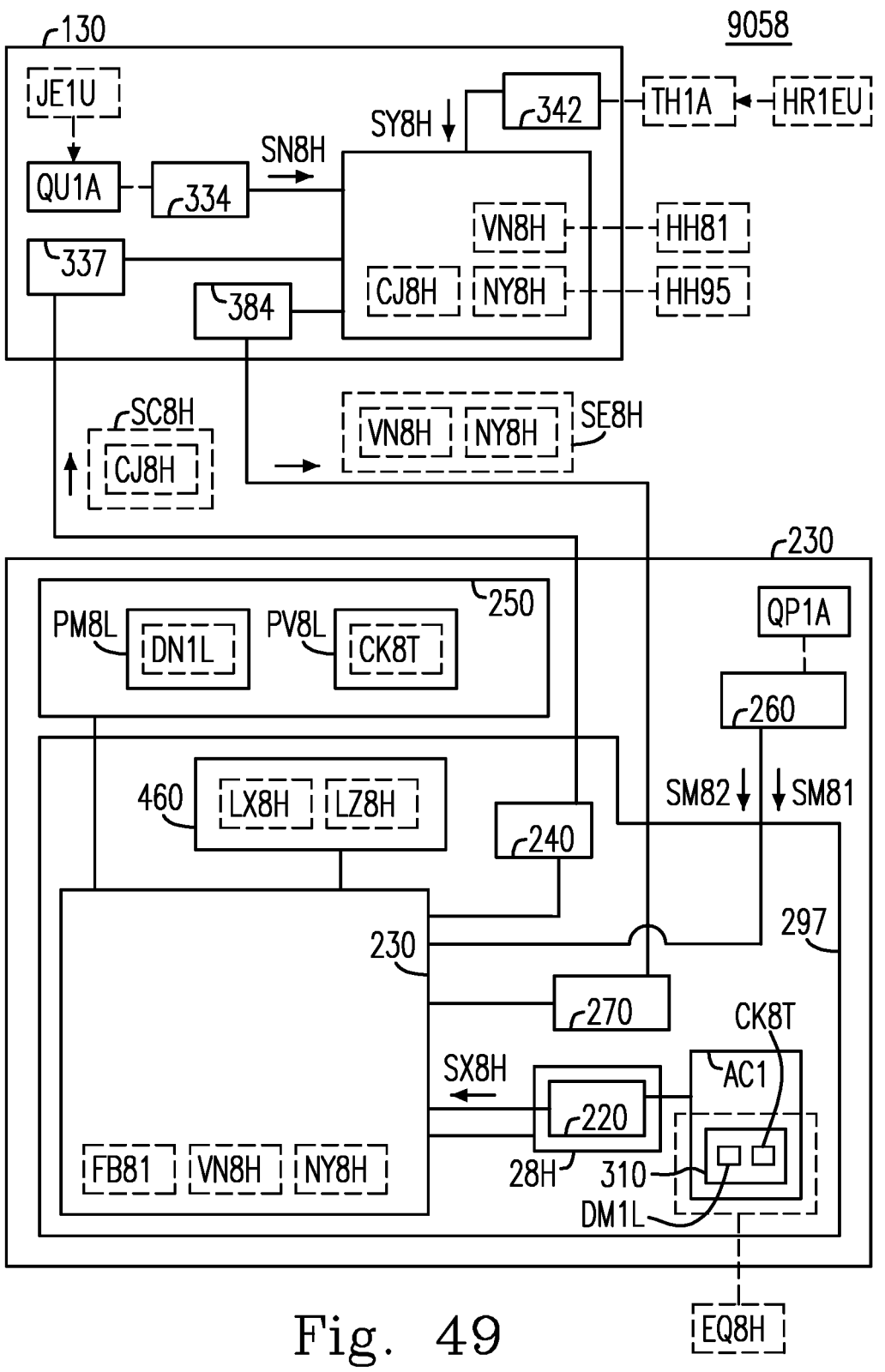
FIG. 49 is a schematic diagram showing an implementation structure of the control system shown in FIG. 1.
Figure 50:
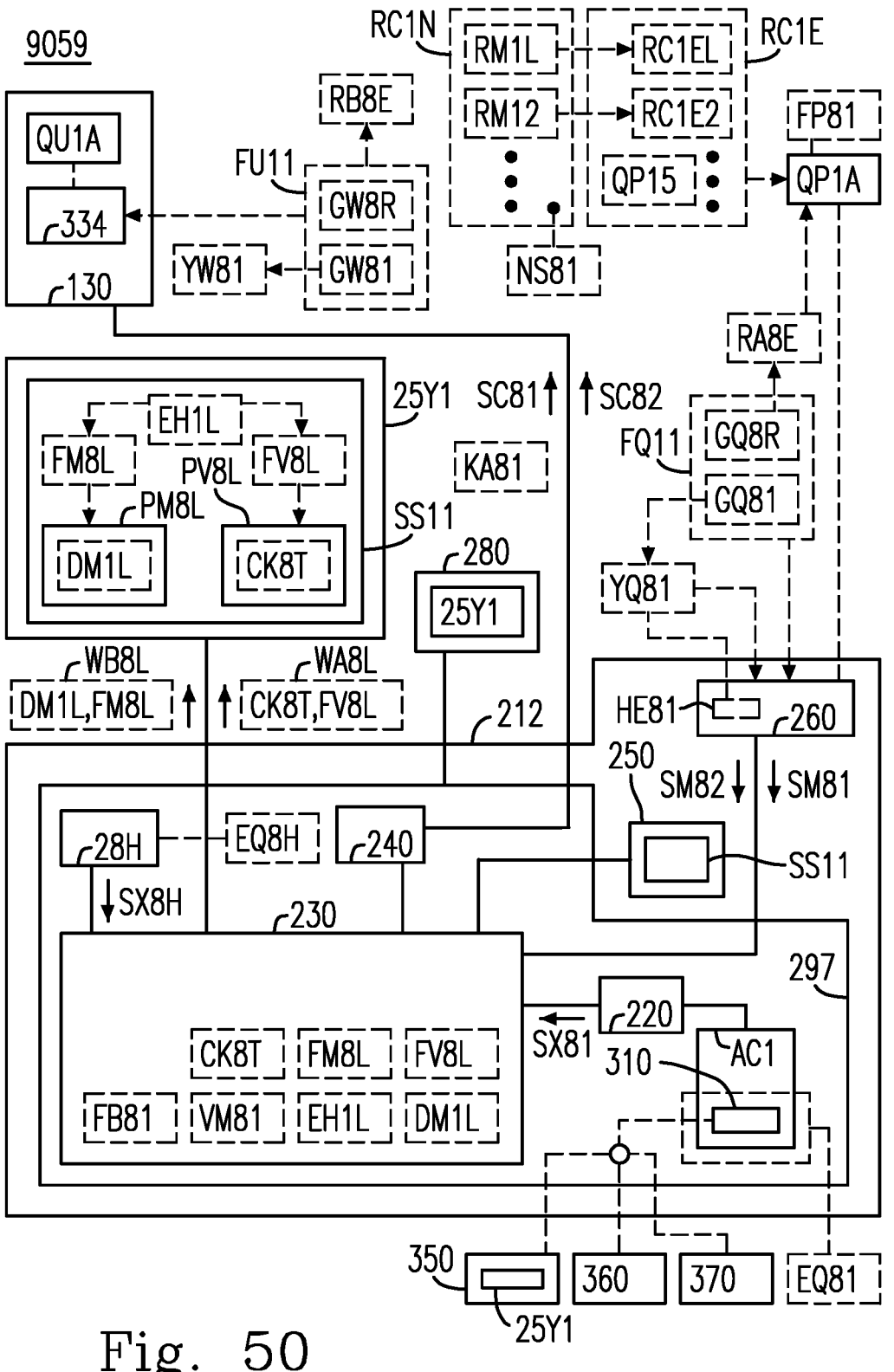
FIG. 50 is a schematic diagram showing an implementation structure of the control system shown in FIG. 1.

Please refer to FIG. 44, FIG. 45, FIG. 46, FIG. 47, FIG. 48, FIG. 49 and FIG. 50. FIG. 44 is a schematic diagram showing an implementation structure 9053 of the control system 901 shown in FIG. 1. FIG. 45 is a schematic diagram showing an implementation structure 9053 of the control system 901 shown in FIG. 1. FIG. 46 is a schematic diagram showing an implementation structure 9055 of the control system 901 shown in FIG. 1. FIG. 47 is a schematic diagram showing an implementation structure 9056 of the control system 901 shown in FIG. 1. FIG. 48 is a schematic diagram showing an implementation structure 9057 of the control system 901 shown in FIG. 1. FIG. 49 is a schematic diagram showing an implementation structure 9058 of the control system 901 shown in FIG. 1. FIG. 50 is a schematic diagram showing an implementation structure 9059 of the control system 901 shown in FIG. 1. As shown in FIG. 44, FIG. 45, FIG. 46, FIG. 47, FIG. 48, FIG. 49 and FIG. 50, each of the implementation structure 9052, the implementation structure 9053, the implementation structure 9054, the implementation structure 9055, the implementation structure 9056, the implementation structure 9057, the implementation structure 9058 and the implementation structure 9059 includes the control device 212 and the functional device 130.

Please additionally refer to FIG. 41. In some embodiments, the variable physical parameter QU1A and the variable physical parameter QP1A are respectively formed at a practical location LD81 and a practical location LC81 being different from the practical location LD81. The operation unit 297 is configured to perform a measurement application function FB81 associated with the physical parameter application range RC1EL, and includes a processing unit 230 coupled to the sensing unit 260, a transmission unit 240 coupled to the processing unit 230, and a display unit 460 coupled to the processing unit 230. The measurement application function FB81 is configured to meet a measurement application function specification GBL8 associated with the physical parameter application range RC1EL. For example, the measurement application function FB81 is a trigger application function. The measurement application function specification GBL8 is a trigger application function specification. The transmission unit 240 is an output unit.

The sensing unit 260 is configured to meet a sensor specification FQ11 associated with the measurement value application range RM1L. For example, the sensor specification FQ11 includes a sensor measurement range representation GQ8R used to indicate a sensor measurement range RA8E, and a sensor sensibility representation GQ81 used to indicate a sensor sensibility YQ81. The sensor sensibility YQ81 is associated with a sense signal generation HE81 performed by the sensing unit 260. For example, when the trigger event EQ81 occurs, the sensing unit 260 senses the variable physical parameter QP1A to perform the sense signal generation HE81 being dependent on the sensor sensibility YQ81, wherein the sense signal generation HE81 is used to generate the sense signal SM81.

The variable physical parameter QU1A is controlled by means of the timer 342. The timer 342 meets the timer specification FT21 associated with the clock time designation interval HR1ET. For example, the clock time designation interval HR1ET is represented by the measurement value designation range RQ1T. The timer specification FT21 includes the full measurement value range representation FK8E used to indicate the full measurement value range QK8E. For example, the measurement value designation range RQ1T is equal to a portion of the full measurement value range QK8E.

The variable physical parameter QU1A is controlled by means of the sensing unit 334. The sensing unit 334 is configured to meet the sensor specification FU11 associated with the measurement value target range RN1T. For example, the sensor specification FU11 includes the sensor measurement range representation GW8R used to indicate the sensor measurement range RB8E, and the sensor sensibility representation GW81 used to indicate the sensor sensibility YW81. The sensor sensibility YW81 is equal to or different from the sensor sensibility YQ81.

In some embodiments, under a condition that the trigger event EQ81 occurs, the processing unit 230 obtains the measured value VM81 in a designated measurement value format HQ81 in response to the sense signal SM81. For example, the designated measurement value format HQ81 is characterized based on a designated bit number UX81. Under a condition that the processing unit 230 determines the physical parameter application range RC1EL which the variable physical parameter QP1A is currently in, the processing unit 230 causes the transmission unit 240 to generate the control signal SC81. The variable physical parameter QP1A is further characterized based on a rated physical parameter range RC1E. For example, the rated physical parameter range RC1E is represented by a rated measurement value range RC1N, and includes a plurality of different physical parameter reference ranges RC1E1, RC1E2, . . . which are respectively represented by a plurality of different measurement value reference ranges RM11, RM12, . . . .

The plurality of different physical parameter reference ranges RC1E1, RC1E2, . . . includes the physical parameter application range RC1EL. The measurement application function specification GBL8 includes the timer specification FT21, the sensor specification FQ11, a rated physical parameter range representation GB8E used to indicate the rated physical parameter range RC1E, and a physical parameter application range representation GB8L used to indicate the physical parameter application range RC1EL. The physical parameter target range RD1ET is indicated by a physical parameter candidate range representation GA8T. For example, the physical parameter candidate range representation GA8T is defaulted.

The rated measurement value range RC1N is defaulted in the designated measurement value format HQ81 based on the rated physical parameter range representation GB8E, the sensor measurement range representation GQ8R and a data coding operation ZR81 used to convert the rated physical parameter range representation GB1E, has a rated range limit value pair DC1A, and includes the plurality of different measurement value reference ranges RM11, RM12, . . . which are respectively denoted by a plurality of different measurement value reference range codes EH11, EH12, . . . . For example, the rated range limit value pair DC is defaulted in the designated measurement value format HQ81. Each of the rated measurement value range RC1N and the rated range limit value pair DC1A is defaulted in the designated measurement value format HQ81 based on one of the sensor measurement range representation GQ8R and the sensor specification FQ11.

In some embodiments, the plurality of different measurement value reference ranges RM11, RM12, . . . includes the measurement value application range RM1L. The measurement value application range RM1L is denoted by a measurement value application range code EH1L included in the plurality of different measurement value reference range codes EH11, EH12, . . . , and has an application range limit value pair DM1L; thereby the measurement value application range code EH1L is configured to indicate the physical parameter application range RC1EL. For example, each of the plurality of different measurement value reference range codes EH11, EH12, . . . is defaulted based on the measurement application function specification GBL8.

The application range limit value pair DM1L includes an application range limit value DM15 of the measurement value application range RM1L and an application range limit value DM16 being opposite to the application range limit value DM15, and is defaulted in the designated measurement value format HQ81 based on the physical parameter application range representation GB8L, the sensor measurement range representation GQ8R and a data coding operation ZR82 used to convert the physical parameter application range representation GB8L. The measurement value application range RM1L is defaulted in the designated measurement value format HQ81 based on the physical parameter application range representation GB8L, the sensor measurement range representation GQ8R and the data coding operation ZR82.

The measurement value target range RN1T is defaulted based on the physical parameter candidate range representation GA8T, the sensor measurement range representation GQ8R and a data coding operation ZX83 used to convert the physical parameter candidate range representation GA8T, and is denoted by the measurement value target range code EM1T. The control device 212 further includes a storage unit 250 coupled to the processing unit 230, and includes a trigger application unit 281 coupled to the processing unit 230. The storage unit 250 stores the defaulted rated range limit value pair DC1A and a variable physical parameter range code UM8A. For example, the measurement value target range RN1T has a target range limit value pair DN1T.

In some embodiments, when the trigger event EQ81 associated with the trigger application unit 281 occurs, the variable physical parameter range code UM8A is equal to a specific measurement value range code EH14 selected from the plurality of different measurement value reference range codes EH11, EH12, . . . . For example, the specific measurement value range code EH14 indicates a specific physical parameter range RC1E4 which is previously determined by the processing unit 230 based on a sensing operation ZM81. The specific physical parameter range RC1E4 is selected from the plurality of different physical parameter reference ranges RC1E1, RC1E2, . . . . The sensing operation ZM81 performed by the sensing unit 260 is used to sense the variable physical parameter QP1A. Before the trigger event EQ81 occurs, the specific measurement value range code EH14 is assigned to the variable physical parameter range code UM8A.

For example, before the trigger event EQ81 occurs, the processing unit 230 obtains the specific measurement value range code EH14. Under a condition that the processing unit 230 determines the specific physical parameter range RC1E4 based on the sensing operation ZM81 before the trigger event EQ81 occurs, the processing unit 230 assigns the obtained specific measurement value range code EH14 to the variable physical parameter range code UM8A by using the storage unit 250. The specific measurement value range code EH14 denotes a specific measurement value range which is configured to represent the specific physical parameter range RC1E4. The specific measurement value range is defaulted in the designated measurement value format HQ81 based on the sensor measurement range representation GQ8R. For example, the sensing unit 260 performs a sense signal generation being dependent on the sensor sensibility YQ81 to generate a sense signal by performing the sensing operation ZM81.

Before the trigger event EQ81 occurs, the processing unit 230 receives the sense signal, obtains a specific measured value in the designated measurement value format HQ81 in response to the sense signal, and performs a specific check operation used to check a mathematical relation between the specific measured value and the specific measurement value range. Under a condition that the processing unit 230 determines the specific physical parameter range RC1E4 which the variable physical parameter QP1A is in based on the specific check operation, the processing unit 230 assigns the obtained specific measurement value range code EH14 to the variable physical parameter range code UM8A by using the storage unit 250. The processing unit 230 decides in response to a specific sensing operation, used to sense the variable physical parameter QP1A, whether the processing unit 230 is to use the storage unit 250 to change the variable physical parameter range code UM8A. For example, the specific sensing operation is performed by the sensing unit 260.

In some embodiments, the trigger application unit 281 provides an operation request signal SX81 to the processing unit 230 in response to the trigger event EQ81, and thereby causes the processing unit 230 to receive the operation request signal SX81. Under a condition that the trigger event EQ81 occurs, the processing unit 230 obtains an operation reference data code XK81 from the storage unit 250 in response to the operation request signal SX81, and performs a data determination AE8A using the operation reference data code XK81 by running a data determination procedure NE8A to determine the measurement value application range code EH1L selected from the plurality of different measurement value reference range codes EH11, EH12, . . . in order to select the measurement value application range RM1L from the plurality of different measurement value reference ranges RM11, RM12, . . . .

The operation reference data code XK81 is equal to a permissible reference data code which is defaulted based on the measurement application function specification GBL8. The data determination procedure NE8A is built based on the measurement application function specification GBL8. The data determination AE8A is one of a data determination operation AE81 and a data determination operation AE82. Under a condition that the operation reference data code XK81 is obtained to be equal to the specific measurement value range code EH14 by accessing the variable physical parameter range code UM8A stored in the storage unit 250, the data determination AE8A being the data determination operation AE81 determines the measurement value application range code EH1L based on the obtained specific measurement value range code EH14. For example, the determined measurement value application range code EH1L is equal to or different from the obtained specific measurement value range code EH14.

Under a condition that the operation reference data code XK81 is obtained to be equal to the defaulted rated range limit value pair DC1A by accessing the rated range limit value pair DC1A stored in the storage unit 250, the data determination AE8A being the data determination operation AE82 selects the measurement value application range code EH1L from the plurality of different measurement value reference range codes EH11, EH12, . . . by performing a scientific calculation MF81 using the measured value VM81 and the obtained rated range limit value pair DC1A to determine the measurement value application range code EH1L. For example, the scientific calculation MF81 is performed based on a specific empirical formula XP81. The specific empirical formula XP81 is formulated beforehand based on the defaulted rated range limit value pair DC1A and the plurality of different measurement value reference range codes EH11, EH12, . . . . For example, the specific empirical formula XP81 is formulated beforehand based on the measurement application function specification GBL8.

The processing unit 230 obtains the application range limit value pair DM1L based on the determined measurement value application range code EH1L, and checks the mathematical relation KA81 based on a data comparison CA81 between the measured value VM81 and the obtained application range limit value pair DM1L to make a logical decision PH81 on whether the measured value VM81 is within the selected measurement value application range RM1L. Under a condition that the logical decision PH81 is positive, the processing unit 230 determines the physical parameter application range RC1EL which the variable physical parameter QP1A is currently in.

For example, under a condition that the application range limit value DM15 is different from the application range limit value DM16 and the measured value VM81 is between the application range limit value DM15 and the application range limit value DM16, the processing unit 230 makes the logical decision PH81 to be positive by comparing the measured value VM81 and the obtained application range limit value pair DM1L. Under a condition that the application range limit value DM15, the application range limit value DM16 and the measured value VM81 are equal, the processing unit 230 makes the logical decision PH81 to be positive by comparing the measured value VM81 and the obtained application range limit value pair DM1L.

In some embodiments, the control device 212 has the variable physical parameter QP1A. The variable physical parameter QU1A exists in the functional device 130. The trigger event EQ81 is one selected from a group consisting of a trigger action event, a user input event, a signal input event, a state change event, an identification medium appearance event and an integer overflow event, and is applied to the measurement application function FB81. Before the trigger event EQ81 being the trigger action event occurs, the receiving unit 337 receives a control signal SC80 from the transmission unit 240. The processing unit 331 performs a signal generation control GY80 used to control the output component 338 in response to the received control signal SC80. The output component 338 generates an operation signal SG80 used to control the variable physical parameter QU1A in response to the signal generation control GY80. The physical parameter application unit 335 receives the operation signal SG80 from the output component 338, and performs the specific functional operation ZH81 associated with the variable physical parameter QU1A in response to the received operation signal SG80. Under a condition that the trigger event EQ81 being the trigger action event is to occur, the functional device 130 is configured to perform the specific functional operation ZH81 associated with the variable physical parameter QU1A. For example, the specific functional operation ZH81 is used to cause the trigger action event to occur.

The measurement application function FB81 is associated with a memory unit 25Y1. The measurement value designation range RQ1T is denoted by the measurement value designation range code EL1T; thereby the measurement value designation range code EL1T is configured to indicate the clock time designation interval HR1ET. For example, the measurement value designation range code EL1T is defaulted based on the measurement application function specification GBL8. The defaulted measurement value application range code EH1L and the defaulted measurement value designation range code EL1T have a mathematical relation KY81 therebetween.

The memory unit 25Y1 has a memory location PM8L and a memory location PV8L being different from the memory location PM8L, stores the application range limit value pair DM1L at the memory location PM8L, and stores a control data code CK8T at the memory location PV8L. For example, each of the memory location PM8L and the memory location PV8L is identified based on the defaulted measurement value application range code EH1L. The control data code CK8T includes the measurement value designation range code EL1T. For example, each of the application range limit value pair DM1L and the control data code CK8T is stored by the memory unit 25Y1 based on the defaulted measurement value application range code EH1L. The control data code CK8T further includes the measurement value target range code EM1T.

In some embodiments, the processing unit 230 performs a data acquisition AF8A using the determined measurement value application range code EH1L by running a data acquisition procedure NF8A to obtain the application range limit value pair DM1L. For example, the data acquisition AF8A is one of a data acquisition operation AF81 and a data acquisition operation AF82. The data acquisition procedure NF8A is built based on the measurement application function specification GBL8. The data acquisition operation AF81 uses the memory unit 25Y1 based on the determined measurement value application range code EH1L to access the application range limit value pair DM1L, stored at the memory location PM8L, to obtain the application range limit value pair DM1L.

The data acquisition operation AF82 fetches the defaulted rated range limit value pair DC1A by reading the rated range limit value pair DC1A stored in the storage unit 250, and obtains the application range limit value pair DM1L by performing a scientific calculation MG81 using the determined measurement value application range code EH1L and the fetched rated range limit value pair DC1A. For example, the rated range limit value pair DC1A includes a rated range limit value DC11 of the rated measurement value range RC1N and a rated range limit value DC12 being opposite to the rated range limit value DC11, and is defaulted in the designated measurement value format HQ81 based on the rated physical parameter range representation GB8E, the sensor measurement range representation GQ8R and the data coding operation ZR81.

In some embodiments, under a condition that the processing unit 230 determines the physical parameter application range RC1EL the variable physical parameter QP1A is currently in, the processing unit 230 performs a data acquisition AG8A using the determined measurement value application range code EH1L to obtain a control application code UA8T. For example, the data acquisition AG8A is one of a data acquisition operation AG81 and a data acquisition operation AG82.

The data acquisition operation AG81 uses the memory unit 25Y1 based on the determined measurement value application range code EH1L to access the control data code CK8T stored at the memory location PV8L to obtain the control application code UA8T being equal to the control data code CK8T. The data acquisition operation AG82 obtains the control application code UA8T being equal to the defaulted measurement value designation range code EL1T by performing a scientific calculation MQ81 using the determined measurement value application range code EH1L and the mathematical relation KY81.

The processing unit 230 performs a signal generation control GS81 for the measurement application function FB81 to control the transmission unit 240 within an operation time TD81 based on the obtained control application code UA8T. The transmission unit 240 performs a signal generation operation BS81 for the measurement application function FB81 in response to the signal generation control GS81 to generate the control signal SC81. For example, the control signal SC81 serves to indicate at least one of the measurement value designation range RQ1T and the clock time designation interval HR1ET by carrying the measurement value designation range code EL1T, and is used to cause the variable physical parameter QU1A to be in the physical parameter target range RD1ET within the clock time designation interval HR1ET. For example, the control signal SC81 carries the control message CG81. The processing unit 230 causes the transmission unit 240 based on the obtained control application code UA8T to generate the control message CG81.

In some embodiments, the plurality of different physical parameter reference ranges RC1E1, RC1E2, . . . further includes a physical parameter candidate range RC1E2 being different from the physical parameter application range RC1EL. The plurality of different measurement value reference ranges RM11, RM12, . . . have a total reference range number NS81, and further includes a measurement value candidate range RM12 representing the physical parameter candidate range RC1E2. The measurement application function specification GBL8 further includes a physical parameter candidate range representation GB82 used to indicate the physical parameter candidate range RC1E2.

The measurement value candidate range RM12 is denoted by a measurement value candidate range code EH12 being different from the measurement value application range code EH1L, has a candidate range limit value pair DM1B, and is configured to represent the physical parameter candidate range RC1E2; so that the measurement value candidate range code EH12 is configured to indicate the physical parameter candidate range RC1E2. For example, the candidate range limit value pair DM1B is defaulted in the designated measurement value format HQ81 based on the physical parameter candidate range representation GB82, the sensor measurement range representation GQ8R and a data coding operation ZR83 used to convert the physical parameter candidate range representation GB82.

The measurement value candidate range RM12 is defaulted in the designated measurement value format HQ81 based on the physical parameter candidate range representation GB82, the sensor measurement range representation GQ8R and the data coding operation ZR83. The total reference range number NS81 is defaulted based on the measurement application function specification GBL8. The processing unit 230 obtains the total reference range number NS81 in response to the trigger event EQ81. The scientific calculation MF81 further uses the obtained total reference range number NS81. The scientific calculation MG81 further uses the obtained total reference range number NS81. For example, the total reference range number NS81 is greater than or equal to 2. For example, there is the total reference range number NS81≥3; there is the total reference range number NS81≥4; there is the total reference range number NS81≥5; there is the total reference range number NS81≥6; and there is the total reference range number NS81≤255.

In some embodiments, the clock time designation interval HR1ET is adjacent to the clock time application interval HR1EU, and has the beginning limit time HR1ET1 and the end limit time HR1ET2 being opposite to the beginning limit time HR1ET1. The functional device 130 receives the control signal SC81, obtains the measurement value designation range code EL1T and the measurement value target range code EM1T from the received control signal SC81, starts the timer 342 based on the obtained measurement value designation range code EL1T, and thereby causes the timer 342 to measure the clock time TH1A according to the beginning limit time HR1ET1.

The functional device 130 causes the variable physical parameter QU1A to be in the physical parameter target range RD1ET within the clock time designation interval HR1ET based on the obtained measurement value target range code EM1T. For example, the control signal SC81 carries a control message CG81 which is determined based on the control application code UA8T. The control message CG81 includes the measurement value designation range code EL1T and the measurement value target range code EM1T. For example, the control message CG81 includes the designated range limit value pair DQ1T, the target range limit value pair DN1T and the handle CC1T.

The measurement value application range RM1L is a first portion of the rated measurement value range RC1N. The measurement value candidate range RM12 is a second portion of the rated measurement value range RC1N. The physical parameter application range RC1EL is separate from the physical parameter candidate range RC1E2, or the physical parameter application range RC1EL is adjacent to the physical parameter candidate range RC1E2. Under a condition that the physical parameter application range RC1EL is separate from the physical parameter candidate range RC1E2, the measurement value application range RM1L is separate from the measurement value candidate range RM12. Under a condition that the physical parameter application range RC1EL is adjacent to the physical parameter candidate range RC1E2, the measurement value application range RM1L is adjacent to the measurement value candidate range RM12.

For example, the measurement value application range code EH1L is configured to be equal to an integer. The rated range limit value DC12 is greater than the rated range limit value DC11. The rated range limit value DC12 and the rated range limit value DC11 have therebetween a relative value VC11 being relative to the rated range limit value DC11. The relative value VC11 is equal to a calculation result that the rated range limit value DC11 is subtracted from the rated range limit value DC12. For example, the application range limit value pair DM1L is defaulted based on the rated range limit value DC11, the rated range limit value DC12, the integer, and a ratio of the relative value VC11 to the total reference range number NS11. The scientific calculation MG81 uses one selected from a group consisting of the rated range limit value DC11, the rated range limit value DC12, the integer, the ratio and any combination thereof.

In some embodiments, under a condition that the logical decision PH81 is negative, the processing unit 230 determines the measurement value candidate range code EH12 selected from the plurality of different measurement value reference range codes EH11, EH12, . . . by performing a fourth scientific calculation MF12 using the determined measurement value application range code EH1L in order to select the measurement value candidate range RM12 from the plurality of different measurement value reference ranges RM11, RM12, . . . .

The processing unit 230 obtains the candidate range limit value pair DM1B based on the determined measurement value candidate range code EH12, and checks a mathematical relation KA91 between the measured value VM81 and the selected measurement value candidate range RM12 based on a data comparison CA91 between the measured value VM81 and the obtained candidate range limit value pair DM1B to make a logical decision PH91 on whether the measured value VM81 is within the selected measurement value candidate range RM12. Under a condition that the logical decision PH91 is positive, the processing unit 230 determines the physical parameter candidate range RC1E2 which the variable physical parameter QP1A is currently in.

Under a condition that the processing unit 230 determines the physical parameter candidate range RC1E2 which the variable physical parameter QP1A in currently in, the processing unit 230 causes the transmission unit 240 to perform a signal generation operation BS91 for the measurement application function FB81 to generate a control signal SC82 used to control the variable physical parameter QU1A. The control signal SC82 is different from the control signal SC81, and serves to indicate the clock time reference intervals HR1E2.

Under a condition that the specific measurement value range code EH14 is different from the determined measurement value application range code EH1L and the processing unit 230 determines the physical parameter application range RC1EL which the variable physical parameter QP1A is currently in by making the logical decision PH81, the processing unit 230 uses the storage unit 250 based on a code difference DA81 between the variable physical parameter range code UM8A, being equal to the specific measurement value range code EH14, and the determined measurement value application range code EH1L to assign the determined measurement value application range code EH1L to the variable physical parameter range code UM8A. Under a condition that the trigger event EQ81 is the state change event that the variable physical parameter QP enters the physical parameter application range RC1EL from the specific physical parameter range RC1E4, the processing unit 230 determines the trigger event EQ81 being the state change event based on the code difference DA81.

In some embodiments, the operation unit 297 further includes a response area AC1, a reader 220 and a receiving unit 270. The response area AC1 is used to perform the measurement application function FB81. The reader 220 is coupled to the response area AC1. The receiving unit 270 is coupled to the processing unit 230, and is controlled by the processing unit 230. Under a condition that the trigger event EQ81 is the identification medium appearance event and the processing unit 230 recognizes an identification medium 310 appeared in the response area AC1 through the reader 220, the processing unit 230 obtains the measured value VM81 based on the sense signal SM81. For example, the trigger event EQ81 is the identification medium appearance event associated with the identification medium 310 and the reader 220.

When the trigger event EQ81 occurs, the display unit 460 displays a state indication LA81. For example, the state indication LA81 is used to indicate a specific state XH81 that the variable physical parameter QP1A is configured to be within the specific physical parameter range RC1E4. Under a condition that the specific measurement value range code EH14 is different from the determined measurement value application range code EH1L and the processing unit 230 determines the physical parameter application range RC1EL which the variable physical parameter QP1A is currently in by making the logical decision PH81, the processing unit 230 further causes the display unit 460 based on the code difference DA81 to change the state indication LA81 to a state indication LA82. For example, the state indication LA82 is used to indicate a specific state XH82 that the variable physical parameter QP1A is configured to be within the physical parameter application range RC1EL.

In some embodiments, under a condition that the receiving unit 270 receives a control response signal SE81, which is generated in response to the control signal SC81, from the functional device 130 within a designated time TW81 being later than the operation time TD81, the processing unit 230 performs a specific practical operation BJ81 associated with the variable physical parameter QU1A in response to the control response signal SE81. For example, the processing unit 230 obtains the carried measured value VN82 from the control response signal SE81, and causes the display unit 460 based on the obtained measured value VN82 to display a measurement message LZ82 associated with the obtained measured value VN82. For example, the specific practical operation BJ81 is a display control operation using the obtained measured value VN82. The processing unit 230 causes the display unit 460 to display the measurement message LZ82 by performing the display control operation.

For example, the control response signal SE81 carries the measured value VN82 and the positive operation report RL81. The processing unit 230 obtains the carried measured value VN82 and the carried positive operation report RL81 from the control response signal SE81. The specific practical operation BJ81 uses at least one of the obtained measured value VN82 and the obtained positive operation report RL81 to cause the display unit 460 to display an operation information associated with at least one of the obtained measured value VN82 and the obtained positive operation report RL81.

After the operation time TD81, the sensing unit 260 senses the variable physical parameter QP to generate a sense signal SM82. For example, after the operation time TD81, the sensing unit 260 senses the variable physical parameter QP1A to perform a sense signal generation HE82 being dependent on the sensor sensibility YQ81, wherein the sense signal generation HE82 is used to generate the sense signal SM82.

In some embodiments, the processing unit 230 obtains a measured value VM82 in the designated measurement value format HQ81 in response to the sense signal SM82 within a designated time TE82 being later than the operation time TD81. The processing unit 230 obtains within the designated time TE82 a specific measurement value range code EH17 included in the plurality of different measurement value reference range codes EH11, EH12, . . . by performing a scientific calculation MF83 using the determined measurement value application range code EH1L. For example, the specific measurement value range code EH17 is different from the determined measurement value application range code EH1L, and denotes a specific measurement value range RM17 included in the plurality of different measurement value reference ranges RM11, RM12, . . . .

The specific measurement value range RM17 represents a specific physical parameter range RC1E7 included in the plurality of different physical parameter reference ranges RC1E1, RC1E2, . . . . The processing unit 230 performs a check operation BA83 used to check a mathematical relation KA83 between the measured value VM82 and the specific measurement value range RM17 based on the specific measurement value range code EH17.

In some embodiments, under a condition that the processing unit 230 determines the specific physical parameter range RC1E7 which the variable physical parameter QP1A is currently in based on the check operation BA83 within the designated time TE82, the processing unit 230 causes the transmission unit 240 to generate a control signal SC83 used to control the variable physical parameter QU1A, and uses the storage unit 250 to assign the specific measurement value range code EH17 to the variable physical parameter range code UM8A. For example, the control signal SC83 is different from the control signal SC81, and serves to indicate a specific clock time interval HR1E7. The plurality of different clock time reference intervals HR1E1, HR1E2, . . . includes the specific clock time interval HR1E7.

Under a condition that the trigger event EQ81 occurs, the sensing unit 260 senses the variable physical parameter QP1A being in a constraint condition FP81 to provide the sense signal SM81 to the processing unit 230. For example, the constraint condition FP81 is that the variable physical parameter QP1A is equal to a specific physical parameter QP15 included in the rated physical parameter range RC1E. The processing unit 230 estimates the specific physical parameter QP15 to obtain the measured value VM81 based on the sense signal SM81. Because the variable physical parameter QP1A being in the constraint condition FP81 is within the physical parameter application range RC1EL, the processing unit 230 recognizes the measured value VM81 as a permissible value being within the measurement value application range RM1L, thereby recognizes the mathematical relation KA81 between the measured value VM81 and the measurement value application range RM1L as a numerical-value intersection relation, and thereby determines the physical parameter application range RC1EL which the variable physical parameter QP1A is currently in.

In some embodiments, the processing unit 230 causes the transmission unit 240 to transmit the control signal SC8H toward the receiving unit 337 in response to a trigger event EQ8H. For example, the trigger event EQ8H is associated with the control device 212. The control signal SC8H carries a control message CJ8H. Under a condition that the variable physical parameter QU1A is in the physical parameter target state JE1U within the clock time application interval HR1EU by checking the mathematical relation KQ81, the receiving unit 337 receives the control signal SC8H from the transmission unit 240. The processing unit 331 obtains the control message CJ8H from the control signal SC8H. The processing unit 331 uses the sense signal SN8H in response to the control message CJ8H to obtain the measured value VN8H in the designated measurement value format HH81, and uses the sense signal SY8H in response to the control message CJ8H to obtain the measured value NY8H in the designated measurement value format HH95.

The processing unit 331 causes the transmission unit 384 based on the obtained measured value VN8H and the obtained measured value NY8H to transmit the control response signal SE8H toward the receiving unit 270. The receiving unit 270 receives the control response signal SE8H from the transmission unit 384. The control response signal SE8H carries the measured value VN8H and the measured value NY8H, and is used by the control device 212 to perform a specific practical operation associated with at least one of the variable physical parameter QU1A and the clock time TH1A. For example, the processing unit 230 obtains the measured value VN8A and the measured value NY8H from the received control response signal SE8H, causes the display unit 460 based on the obtained measured value VN8H to display the measurement message LZ8H associated with the variable physical parameter QU1A, and causes the display unit 460 based on the obtained measured value NY8H to display the measurement message LX8H associated with the clock time TH1A. For example, the processing unit 230 performs the specific practical operation using the obtained measured value VN8H and the obtained measured value NY8H to cause the display unit 460 to perform a display operation. The display operation displays the measurement message LZ8H and the measurement message LX8H.

For example, the operation unit 297 includes a trigger application unit 28H coupled to the processing unit 230. The trigger event EQ8H is associated with the trigger application unit 28H, and is one selected from a group consisting of a trigger action event, a user input event, a signal input event, a state change event and an identification medium appearance event. The trigger application unit 28H provides an operation request signal SX8H to the processing unit 230 in response to the trigger event EQ8H, and thereby causes the processing unit 230 to receive the operation request signal SX8H. The processing unit 230 obtains the control message CJ8H in response to the operation request signal SX8H, and causes the transmission unit 240 based on the obtained control message CJ8H to transmit the control signal SC8H, carrying the control message CJ8H, toward the functional device 130. For example, the trigger application unit 28H is one of the reader 220 and the sensing unit 260.

In some embodiments, the sensing unit 260 is characterized based on the sensor sensibility YQ81 associated with the sense signal generation HE81, and is configured to meet the sensor specification FQ11. The sensor specification FQ11 includes the sensor sensibility representation GQ81 used to indicate the sensor sensibility YQ81, and the sensor measurement range representation GQ8R used to indicate the sensor measurement range RA8E. For example, the rated physical parameter range RC1E is configured to be equal to the sensor measurement range RA8E, or is configured to be a portion of the sensor measurement range RA8E. The sensor measurement range RA8E is associated with a physical parameter sensing performed by the sensing unit 260. The sensor measurement range representation GQ8R is provided based on a first defaulted measurement unit. For example, the first defaulted measurement unit is one of a metric measurement unit and a British Association measurement unit.

Each of the rated measurement value range RC1N, the rated range limit value pair DC1A, the measurement value application range RM1L, the application range limit value pair DM1L, the measurement value candidate range RM12, the candidate range limit value pair DM1B and the plurality of different measurement value reference ranges RM11, RM12, . . . is defaulted in the designated measurement value format HQ81 based on one of the sensor measurement range representation GQ8R and the sensor specification FQ11. For example, each of the rated measurement value range RC1N and the rated range limit value pair DC1A is defaulted in the designated measurement value format HQ81 based on the rated physical parameter range representation GB8E, the sensor measurement range representation GQ8R, the sensor sensibility representation GQ81 and the data coding operation ZR81. Each of the measurement value application range RM1L and the application range limit value pair DM1L is defaulted in the designated measurement value format HQ81 based on the physical parameter application range representation GB8L, the sensor measurement range representation GQ8R, the sensor sensibility representation GQ81 and the data coding operation ZR82.

Each of the measurement value candidate range RM12 and the candidate range limit value pair DM1B is defaulted in the designated measurement value format HQ81 based on the physical parameter candidate range representation GB82, the sensor measurement range representation GQ8R, the sensor sensibility representation GQ81 and the data coding operation ZR83. Each of the rated physical parameter range representation GB8E, the physical parameter application range representation GB8L, the physical parameter candidate range representation GA8T and the physical parameter candidate range representation GB82 is provided based on a second defaulted measurement unit. For example, the second defaulted measurement unit is one of a metric measurement unit and a British Association measurement unit, and is equal to or different from the first defaulted measurement unit. For example, the physical parameter target range RD1ET is configured to be a portion of the sensor measurement range RB8E.

The variable physical parameter QP1A is further characterized based on the sensor measurement range RA8E. For example, each of the sensor measurement range representation GQ8R, the rated physical parameter range representation GB8E, the physical parameter application range representation GB8L, the physical parameter candidate range representation GA8T, the physical parameter candidate range representation GB82 and the sensor measurement range representation GW8R belongs to a decimal data type. Each of the measured value VM81, the measured value VM82, the rated range limit value pair DC1A, the application range limit value pair DM1L, the target range limit value pair DN1T and the candidate range limit value pair DM1B belongs to the binary data type, and is suitable to be applied to computer processing. Each of the sensor specification FQ11, the sensor specification FU11 and the measurement application function specification GBL8 is defaulted.

In some embodiments, the memory location PM8L is identified based on a memory address FM8L. The memory address FM8L is defaulted based on the defaulted measurement value application range code EH1L. The memory location PV8L is identified based on a memory address FV8L. The memory address FV8L is defaulted based on the defaulted measurement value application range code EH1L.

Before the trigger event EQ81 occurs, the processing unit 230 is configured to fetch the defaulted measurement value application range code EH1L, the defaulted application range limit value pair DM1L and the defaulted control data code CK8T, obtains the memory address FM8L based on the fetched measurement value application range code EH1L, and causes the operation unit 297 based on the fetched application range limit value pair DM1L and the obtained memory address FM8L to provide a writing request message WB8L including the fetched application range limit value pair DM1L and the obtained memory address FM8L. For example, the writing request message WB8L is used to cause the memory unit 25Y1 to store the carried application range limit value pair DM1L at the memory location PM8L.

Before the trigger event EQ81 occurs, the processing unit 230 obtains the memory address FV8L based on the fetched measurement value application range code EH1L, and causes the operation unit 297 based on the fetched control data code CK8T and the obtained memory address FV8L to provide a writing request message WA8L including the fetched control data code CK8T and the obtained memory address FV8L. For example, the writing request message WA8L is used to cause the memory unit 25Y1 to store the carried control data code CK8T at the memory location PV8L.

The control device 212 is coupled to a server 280. The identification medium 310 is one selected from a group consisting of an electronic tag 350, a bar code medium 360 and a bio identification action medium 370. One selected from a group consisting of the electronic tag 350, the storage unit 250 and the server 280 includes the memory unit 25Y1. For example, the storage unit 250 has a storage space SS11. The storage space SS11 has the variable physical parameter range code UM8A, the rated range limit value pair DC1A and the total reference range number NS81.

In some embodiments, the rated physical parameter range RC1E includes a specific physical parameter QP15, and is represented by the rated measurement value range RC1N. The sensing unit 260 senses the variable physical parameter QP1A being in the constraint condition FP81 to provide the sense signal SM81 to the processing unit 230. For example, the constraint condition FP81 is that the variable physical parameter QP1A is equal to the specific physical parameter QP15. Under a condition that the trigger event EQ81 occurs, the processing unit 230 estimates the specific physical parameter QP15 to obtain the measured value VM81 based on the sense signal SM81.

For example, the identification medium 310 records the application range limit value pair DM1L and the control data code CK8T. For example, the reader 220 is the trigger application unit 281, and provides the operation request signal SX81 to the processing unit 230 in response to the trigger event EQ81 associated with the identification medium 310, and thereby causes the processing unit 230 to receive the operation request signal SX81. The processing unit 230 causes the reader 220 in response to the operation request signal SX81 to read the recorded application range limit value pair DM1L and the recorded control data code CK8T, and thereby obtains the recorded application range limit value pair DM1L and the recorded control data code CK8T from the identification medium 310 through the reader 220.

Figure 51:
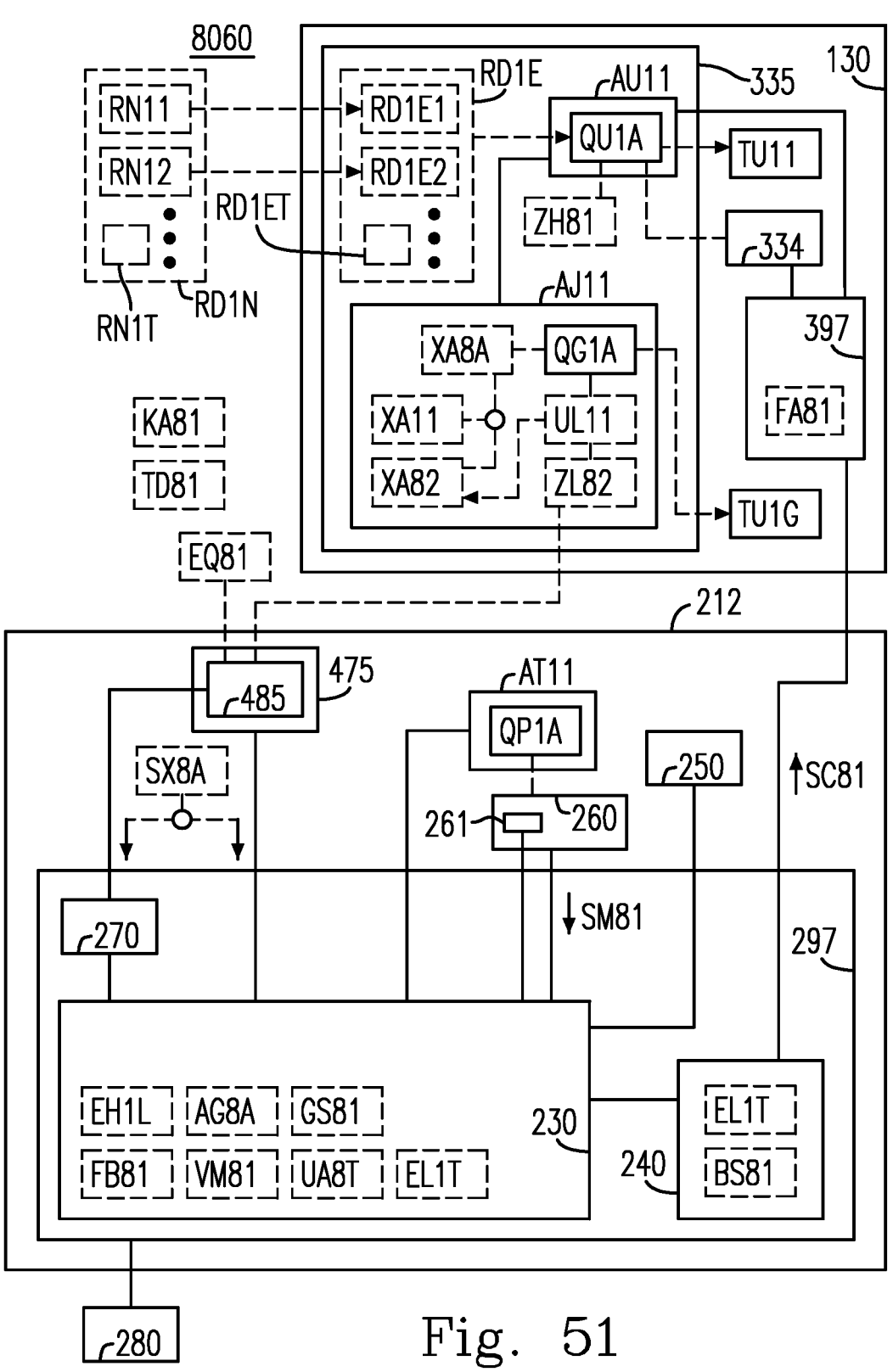
FIG. 51 is a schematic diagram showing an implementation structure of the control system shown in FIG. 1.

Please refer to FIG. 51. FIG. 51 is a schematic diagram showing an implementation structure 9060 of the control system 901 shown in FIG. 1. As shown in FIG. 51, the implementation structure 9060 includes the control device 212, the functional device 130 and the server 280. The control device 212 is linked to the server 280. The control device 212 is used to control the variable physical parameter QU1A existing in the functional device 130 by means of the trigger event EQ81, and includes the operation unit 297 and the sensing unit 260. The operation unit 297 includes the processing unit 230, the receiving unit 270 and the transmission unit 240. The processing unit 230 is coupled to the server 280.

The control device 212 is disposed in the application environment EX81. The variable physical parameter QP1A exists in a physical parameter formation area AT11. One of the control device 212 and the application environment EX81 has the variable physical parameter QP1A. For example, the sensing unit 260 is coupled to the physical parameter formation area AT11 having the variable physical parameter QP1A. The variable physical parameter QU1A exists in the physical parameter formation area AU11. For example, under a condition that the physical parameter formation area AT11 is located in the application environment EX81, the physical parameter formation area AT11 is adjacent to the control device 212. For example, the sensing unit 260 includes the physical parameter formation area AT11.

For example, the physical parameter formation area AU11 is separate from the physical parameter formation area AT11; and the physical parameter formation area AU11 and the physical parameter formation area AT11 are respectively formed at the practical location LD81 and the practical location LC81, so that the variable physical parameter QU1A and the variable physical parameter QP1A are respectively formed at the practical location LD81 and the practical location LC81 being different from the practical location LD81. For example, the physical parameter formation area AT11 is one selected from a group consisting of a load area, a display area, a sensing area, a power supply area and an environment area. For example, the physical parameter formation area AU11 is one selected from a group consisting of a load area, a display area, a sensing area, a power supply area and an environment area.

For example, the processing unit 230 causes the variable physical parameter QP1A to form in the physical parameter formation area AT11 in response to the trigger event EQ81. Under a condition that the variable physical parameter QP1A exists in the physical parameter formation area AT11, the sensing unit 260 senses the variable physical parameter QP1A to generate the sense signal SM81. For example, the physical parameter formation area AT11 is a user interface area.

In some embodiments, the functional device 130 includes the operation unit 397, the sensing unit 334 coupled to the operation unit 397, and a physical parameter application unit 335 coupled to the operation unit 397. The physical parameter application unit 335 is controlled by the operation unit 397, and includes the physical parameter formation area AU11 having the variable physical parameter QU1A. The variable physical parameter QU1A is further characterized based on a rated physical parameter range RD1E including the physical parameter target range RD1ET. The rated physical parameter range RD1E is represented by a rated measurement value range RD1N, and includes a plurality of different physical parameter reference ranges RD1E1, RD1E2, . . . which are respectively represented by a plurality of different measurement value reference ranges RN11, RN12, The plurality of different physical parameter reference ranges RD1E1, RD1E2, . . . include the physical parameter target range RD1ET and a physical parameter candidate range RD1E2.

The rated measurement value range RD1N includes the plurality of different measurement value reference ranges RN11, RN12, . . . , and is defaulted in the designated measurement value format HQ81 based on the rated physical parameter range representation GB8E, the sensor measurement range representation GQ8R and the data coding operation ZR81 used to convert the rated physical parameter range representation GB8E. The plurality of different measurement value reference ranges RN11, RN12, . . . include the measurement value target range RN1T and a measurement value candidate range RN12 representing the physical parameter candidate range RD1E2. The measurement value candidate range RN12 is denoted by a measurement value candidate range code EM12, and has a candidate range limit value pair DN1B, so that the measurement value candidate range code EM12 is configured to indicate the physical parameter candidate range RD1E2. Before the trigger event EQ81 occurs, the variable physical parameter QU1A is configured to be within a specific physical parameter range RD1E4. The specific physical parameter range RD1E4 is included in the plurality of different physical parameter reference ranges RD1E1, RD1E2, . . . .

In some embodiments, the trigger action event caused by the functional device 130 is a state change event. The control device 212 further includes a state-change detector 475 coupled to the processing unit 230. For example, the state-change detector 475 is one of a limit detector and an edge detector. The limit detector is a limit switch 485. The state-change detector 475 is configured to detect a characteristic physical parameter arrival ZL82 associated with a defaulted characteristic physical parameter UL81. The physical parameter application unit 335 includes a physical parameter application area AJ11. The physical parameter application area AJ11 has a variable physical parameter QG1A. The variable physical parameter QG1A is dependent on the variable physical parameter QU1A, and is characterized based on the defaulted characteristic physical parameter UL81. For example, the physical parameter application area AJ11 is one selected from a group consisting of a load area, a display area, a sensing area, a power supply area and an environment area. The defaulted characteristic physical parameter UL81 is associated with the variable physical parameter QU1A.

Before the trigger event EQ81 occurs, the operation unit 397 causes the physical parameter application unit 335 to perform the specific functional operation ZH81 associated with the variable physical parameter QU1A. The specific functional operation ZH81 is used to control the variable physical parameter QG1A, and causes the trigger event EQ81 to occur by changing the variable physical parameter QG1A. The variable physical parameter QG1A is configured to be in a variable physical state XA8A. For example, the operation unit 397 is controlled by the control device 212 to cause the physical parameter application unit 335 to perform the specific functional operation ZH81. For example, the rated measurement value range RD1N has a rated range limit value pair DD1A.

Under a condition that the variable physical parameter QU1A is configured to be within the specific physical parameter range RD1E4 before the trigger event EQ81 occurs, the specific functional operation ZH81 causes the variable physical parameter QG1A to arrive the defaulted characteristic physical parameter UL81 to form the characteristic physical parameter arrival ZL82, and changes the variable physical state XA8A from a non-characteristic physical parameter arrival state XA81 to a practical characteristic physical parameter arrival state XA82 by forming the characteristic physical parameter arrival ZL82. The state-change detector 475 generates a trigger signal SX8A in response to the characteristic physical parameter arrival ZL82. For example, the practical characteristic physical parameter arrival state XA82 is characterized based on the defaulted characteristic physical parameter UL81. The state-change detector 475 generates the trigger signal SX8A in response to a state change event that the variable physical parameter QG1A is changed from the non-characteristic physical parameter arrival state XA81 to the practical characteristic physical parameter arrival state XA82.

In some embodiments, the receiving unit 270 is coupled to the state-change detector 475. The trigger event EQ81 is the state change event that the variable physical parameter QG1A enters the practical characteristic physical parameter arrival state XA82. One of the receiving unit 270 and the processing unit 230 receives the trigger signal SX8A. The processing unit 230 obtains the control application code UA8T in response to the received trigger signal SX8A, and performs the signal generation control GS81 for the measurement application function FB81 within the operation time TD81 based on the obtained control application code UA8T to cause the transmission unit 240 to generate the control signal SC81. For example, the state-change detector 475 is a trigger application unit, and provides the trigger signal SX8A to the processing unit 230 in response to the characteristic physical parameter arrival ZL82. The trigger signal SX8A is an operation request signal.

For example, under a condition that the state-change detector 475 is the limit switch, the characteristic physical parameter arrival ZL82 is a limit location arrival that the variable physical parameter QG1A being equal to a variable spatial location arrives the defaulted characteristic physical parameter UL81 being equal to a defaulted limit location. For example, the physical parameter application unit 335 forms the variable physical parameter QG1A in the physical parameter application area AJ11 by performing the specific functional operation ZH81 caused based on the variable physical parameter QU1A. Under a condition that the physical parameter application area AJ11 is coupled to the state-change detector 475, the state-change detector 475 detects the characteristic physical parameter arrival ZL82.

For example, the processing unit 230 uses the sense signal SM81 to obtain the measured value VM81 in response to the received trigger signal SX8A. Under a condition that the processing unit 230 determines the physical parameter application range RC1EL which the variable physical parameter QP1A is currently in by checking the mathematical relation KA81 between the measured value VM81 and the measurement value application range RM1L, the processing unit 230 performs the data acquisition AG8A using the determined measurement value application range code EH1L to obtain the control application code UA8T, and causes the transmission unit 240 based on the obtained control application code UA8T to generate or transmit the control signal SC81. The control signal SC81 serves to indicate at least one of the measurement value designation range RQ1T and the clock time designation interval HR1ET.

In some embodiments, the sensing unit 260 senses the variable physical parameter QP1A to generate the sense signal SM81 For example, under a condition that the trigger event EQ81 occurs, the sensing unit 260 senses the variable physical parameter QP1A to generate the sense signal SM81. After the processing unit 230 causes the transmission unit 240 by performing the signal generation control GS81 to generate the control signal SC81 within the operation time TD81, the sensing unit 260 senses the variable physical parameter QP1A to generate the sense signal SM82. For example, the sensing unit 260 is one selected from a group consisting of a time sensing unit, an electrical-parameter sensing unit, a mechanics-parameter sensing unit, an optical-parameter sensing unit, a temperature sensing unit, a wetness sensing unit, a motion sensing unit and a magnetic-parameter sensing unit.

For example, the sensing unit 260 includes a sensing component 261 coupled to the processing unit 230, and uses the sensing component 261 to generate the sense signal SM81 and the sense signal SM82. The sensing component 261 is one selected from a plurality of application sensors. The plurality of application sensors include an electrical-voltage sensor, an electrical-current sensor, an electrical-resistance sensor, an electrical-capacitance sensor, an electrical-inductance sensor, an accelerometer, a gyroscope, a pressure transducer, a strain gauge, a timer, a light detector, a temperature sensor and a wetness sensor. For example, the sensing component 261 generates a sense signal component. The sense signal SM81 includes the sense signal component.

Figure 52:
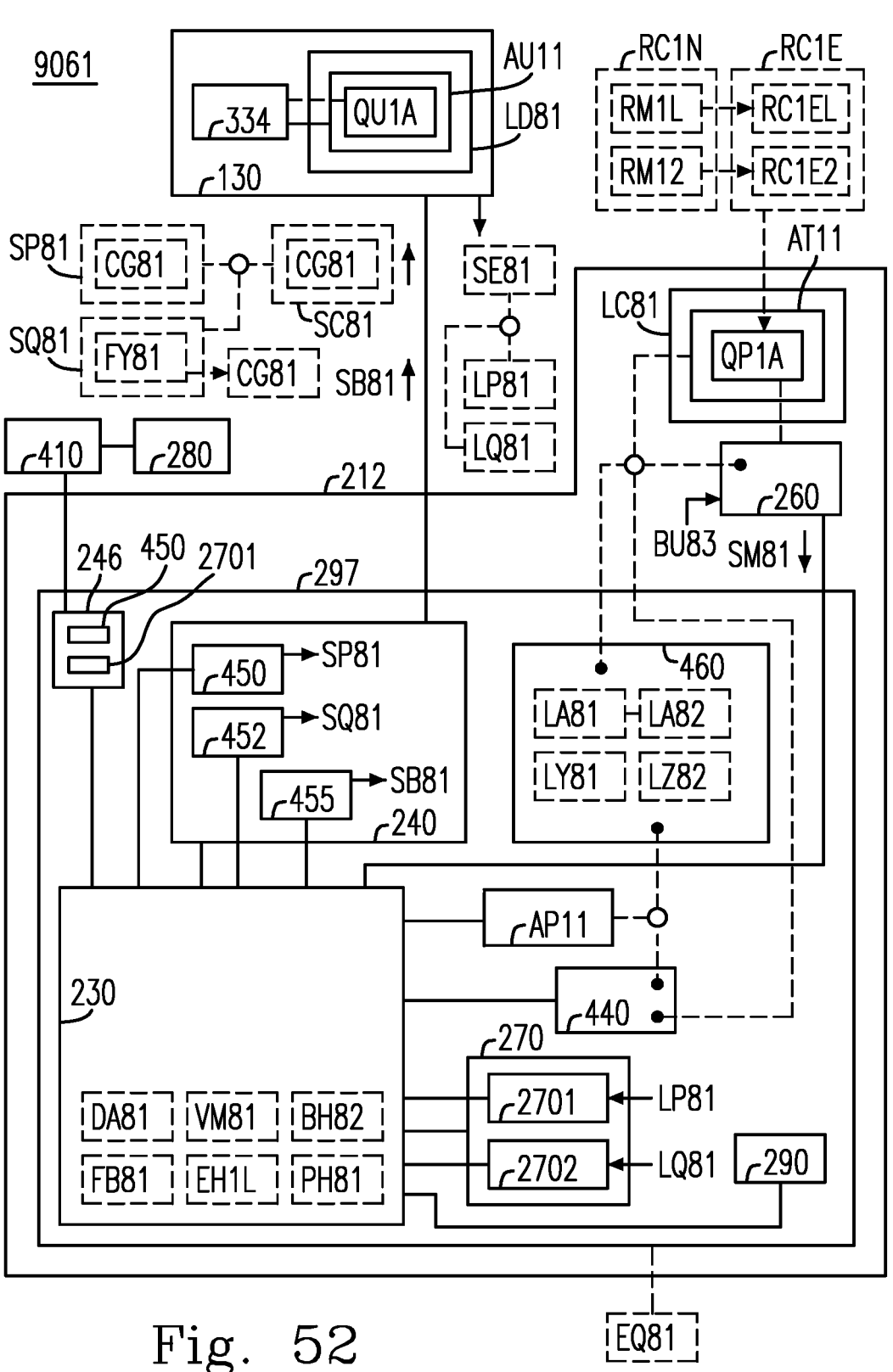
FIG. 52 is a schematic diagram showing an implementation structure of the control system shown in FIG. 1.

Please refer to FIG. 52, which is a schematic diagram showing an implementation structure 9061 of the control system 901 shown in FIG. 1. As shown in FIG. 52, the implementation structure 9061 includes the control device 212, the functional device 130 and the server 280. The control device 212 is one selected from a group consisting of a computing device, a communication device, a user device, a mobile device, a remote controller, an electronic device, a portable device, a desk-top device, a relatively fixed device, a fixed device, a smart phone and any combination thereof. The electronic tag 350 is one selected from a group consisting of a passive electronic tag, an active electronic tag, a semi-active electronic tag, a wireless electronic tag and a wired electronic tag. For example, the control device 212 transmits the control signal SC81 toward the functional device 130 through a practical link between the transmission unit 240 and the operation unit 397. The practical link is one of a wired link and a wireless link.

In some embodiments, the control signal SC81 is one of the electrical signal SP81 and the light signal SQ81. The transmission unit 240 includes a transmission component 450, a transmission component 452 and a transmission component 455. The transmission component 450 is coupled to the processing unit 230, and is used to output the electrical signal SP81 under a condition that the control signal SC81 is the electrical signal SP81. When the trigger event EQ81 occurs, the display unit 460 displays the state indication LA81. Under a condition that the specific measurement value range code EH14 is different from the determined measurement value application range code EH1L and the processing unit 230 determines the physical parameter application range RC1EL which the variable physical parameter QP1A is currently in by making the logical decision PH81, the processing unit 230 causes the display unit 460 based on the code difference DA81 to change the state indication LA81 to the state indication LA82. For example, the transmission component 450, the transmission component 452 and the transmission component 455 are three out components respectively.

The display unit 460 is coupled to the processing unit 230, and is used to display a measurement message LY81 associated with the measured value VM81. The processing unit 230 obtains the carried measured value VN82 from the control response signal SE81, and causes the display unit 460 according to the obtained measured value VN82 to display the measurement message LZ82 associated with the obtained measured value VN82. Under a condition that the control signal SC81 is the light signal SQ81, the transmission component 452 is used to output the light signal SQ81. The transmission component 455 is coupled to the processing unit 230. For example, the processing unit 230 is configured to cause the transmission component 455 to transmit a physical parameter signal SB81 toward the functional device 130. The variable physical parameter QU1A is formed based on the physical parameter signal SB81. For example, the electrical signal SP81 is a radio signal. The light signal SQ81 is an infrared signal.

In some embodiments, the control device 212 is coupled to the server 280, and further includes a physical parameter formation unit 290 coupled to the sensing unit 260. For example, under a condition that the variable physical parameter QP1A is to be generated by the physical parameter formation unit 290, the physical parameter formation unit

290 generates the variable physical parameter QP1A. The operation unit 297 further includes an input unit 440. The input unit 440 is coupled to the processing unit 230, and is controlled by the processing unit 230. For example, one of the input unit 440 and the display unit 460 includes a user interface area AP11.

The receiving unit 270 is coupled to the processing unit 230, is used to receive the control response signal SE81, and includes a receiving component 2701 and a receiving component 2702. Each of the receiving component 2701 and the receiving component 2702 is coupled to the processing unit 230. The control response signal SE81 is one of an electrical signal LP81 and a light signal LQ81. Under a condition that the control response signal SE81 is the electrical signal LP81, the receiving component 2701 is used to receive the electrical signal LP81. For example, the receiving component 2702 is a reader. Under a condition that the control response signal SE81 is the light signal LQ81, the receiving component 2702 is used to receive the light signal LQ81.

For example, one selected from a group consisting of the electronic tag 350, the storage unit 250 and the server 280 includes the memory unit 25Y1. For example, the electrical signal LP81 is a radio signal. The light signal LQ81 is an infrared signal. The receiving component 2701 and the receiving component 2702 are respectively two input components. For example, under a condition that the control device 212 is the remote controller, the control signal SC81 is the light signal SQ81. Under a condition that the control device 212 is the remote controller, the control response signal SE81 is the light signal LQ81. For example, the trigger event EQ81 is a user input event that the sensing unit 260 receives a user input operation BU83. The sensing unit 260 causes the processing unit 230 to receive the sense signal SM81 in response to the user input operation BU83. The processing unit 230 obtains the measured value VM81 in response to the sense signal SM81.

One selected from a group consisting of the application environment EX81, the sensing unit 260, the input unit 440, the display unit 460 and the physical parameter formation unit 290 has the physical parameter formation area AT11. The processing unit 230 causes the physical parameter formation area AT11 to have the variable physical parameter QP1A by performing a specific functional operation BH82 for the measurement application function FB81, and thereby causes the sensing unit 260 to sense the variable physical parameter QP1A being in the constraint condition FP81. One selected from a group consisting of the electronic tag 350, the storage unit 250 and the server 280 includes the memory unit 25Y1. Each of the sensing unit 260, the storage unit 250, the input unit 440, the transmission component 450, the transmission component 455, the display unit 460, the receiving component 2701, the receiving component 2702 and the physical parameter formation unit 290 is controlled by the processing unit 230. For example, one selected from a group consisting of the sensing unit 260, the input unit 440 and the display unit 460 includes the physical parameter formation area AT11.

The variable physical parameter QP1A is one selected from a group consisting of a fourth variable electrical parameter, a fourth variable mechanics parameter, a fourth variable optical parameter, a fourth variable temperature, a fourth variable electrical voltage, a fourth variable electrical current, a fourth variable electrical power, a fourth variable electrical resistance, a fourth variable electrical capacitance, a fourth variable electrical inductance, a fourth variable frequency, a fourth clock time, a fourth variable time length, a fourth variable luminance, a fourth variable luminous intensity, a fourth variable sound volume, a fourth variable data flow, a fourth variable amplitude, a fourth variable spatial location, a fourth variable displacement, a fourth variable sequence position, a fourth variable angle, a fourth variable spatial length, a fourth variable distance, a fourth variable translational velocity, a fourth variable angular velocity, a fourth variable acceleration, a fourth variable force, a fourth variable pressure and a fourth variable mechanical power.

In some embodiments, the physical parameter application range RC1EL is one of a relatively high physical parameter range and a relatively low physical parameter range; and the specific physical parameter range RC1E4 is another of the relatively high physical parameter range and the relatively low physical parameter range. Under a condition that the variable physical parameter QP1A is the fourth variable electrical voltage, the relatively high physical parameter range and the relatively low physical parameter range are a relatively high electrical-voltage range and a relatively low electrical-voltage range respectively. Under a condition that the variable physical parameter QP1A is the second variable electrical current, the relatively high physical parameter range and the relatively low physical parameter range are a relatively high electrical-current range and a relatively low electrical-current range respectively. Under a condition that the variable physical parameter QP1A is the fourth variable electrical resistance, the relatively high physical parameter range and the relatively low physical parameter range are a relatively high electrical-resistance range and a relatively low electrical-resistance range respectively.

Under a condition that the variable physical parameter QP1A is the fourth variable spatial location, the relatively high physical parameter range and the relatively low physical parameter range are a relatively high location range and a relatively low location range respectively. Under a condition that the variable physical parameter QP1A is the fourth variable pressure, the relatively high physical parameter range and the relatively low physical parameter range are a relatively high pressure range and a relatively low pressure range respectively. Under a condition that the variable physical parameter QP1A is the fourth variable length, the relatively high physical parameter range and the relatively low physical parameter range are a relatively high length range and a relatively low length range respectively. Under a condition that the variable physical parameter QP1A is the fourth variable angular velocity, the relatively high physical parameter range and the relatively low physical parameter range are a relatively high angular-velocity range and a relatively low angular-velocity range respectively.

For example, the physical parameter application range RC1EL is one of a relatively high physical parameter range and a relatively low physical parameter range; and the physical parameter candidate range RC1E2 is another of the relatively high physical parameter range and the relatively low physical parameter range. For example, the physical parameter application range RC1EL is one of a relatively high physical parameter range and a relatively low physical parameter range; and the specific physical parameter range RC1E7 is another of the relatively high physical parameter range and the relatively low physical parameter range. For example, the physical parameter candidate range RC1E2 is one of a relatively high physical parameter range and a relatively low physical parameter range; and the physical parameter candidate range RC1E3 is another of the relatively high physical parameter range and the relatively low physical parameter range.

In some embodiments, under a condition that the variable physical parameter QP1A is within the physical parameter application range RC1EL, the variable physical parameter QP1A is in a first reference state. Under a condition that the variable physical parameter QP1A is within the specific physical parameter range RC1E4, the variable physical parameter QP1A is in a second reference state. Under a condition that the variable physical parameter QP1A is within the physical parameter candidate range RC1E2, the variable physical parameter QP1A is in a third reference state. Under a condition that the variable physical parameter QP1A is within the specific physical parameter range RC1E7, the variable physical parameter QP1A is in a fourth reference state. The first reference state is equal to or different from the second reference state. The second reference state is different from the third reference state. The first reference state is different from the fourth reference state.

For example, the measurement value application range code EH1L is a measurement value target range number. The measurement value application range RM1L is arranged in the rated measurement value range RC1N based on the measurement value application range code EH1L. The measurement value candidate range code EH12 is a measurement value target range number. The measurement value candidate range RM12 is arranged in the rated measurement value range RC1N based on the measurement value candidate range code EH12. The measurement value designation range code EL1T is a measurement value target range number. The measurement value designation range RQ1T is arranged in the rated measurement value range HR1N based on the measurement value designation range code EL1T. The measurement value target range code EM1T is a measurement value target range number. The measurement value target range RN1T is arranged in the rated measurement value range RD1N based on the measurement value target range code EM1T.

For example, the variable physical parameter QP1A is the second variable electrical voltage. The physical parameter application range RC1EL, the specific physical parameter range RC1E4 and the physical parameter candidate range RD1E2 are a first electrical-voltage reference range, a second electrical-voltage reference range and a third electrical-voltage reference range respectively. For example, under a condition that the variable physical parameter QP1A is the second variable displacement, the physical parameter application range RC1EL, the specific physical parameter range RC1E4 and the physical parameter candidate range RD1E2 are a first displacement reference range, a second displacement reference range and a third displacement reference range respectively. For example, under a condition that the variable physical parameter QP1A is the second clock time, the physical parameter application range RC1EL, the specific physical parameter range RC1E4 and the physical parameter candidate range RD1E2 are a first clock time reference range, a second clock time reference range and a third clock time reference range respectively.

For example, the operation unit 297 includes a communication interface unit 246 coupled to the processing unit 230. The processing unit 230 is coupled to the network 410 through the communication interface unit 246. For example, the communication interface unit 246 is controlled by the processing unit 230, and includes the transmission component 450 coupled to the processing unit 230 and the receiving component 2701 coupled to the processing unit 230. The processing unit 230 is coupled to the server 280 through the communication interface unit 246 and the network 410, and causes the communication interface unit 246 to wiredly or wirelessly transmit any of the control signal SC81, the control signal SC82, the control signal SC83, the control signal SC88 and the control signal SC97 toward the communication interface unit 386 through the network 410. For example, the communication interface unit 246 is linked to the communication interface unit 386 through the practical link.

In some embodiments, under a condition that the control device 212 is the mobile device, the control signal SC81 and the control response signal SE81 are two radio signals respectively. Under a condition that the control device 212 is the remote controller, the control signal SC81 and the control response signal SE81 are two light signals respectively. The communication interface unit 246 is configured to wiredly or wirelessly communicate with the communication interface unit 386. The processing unit 331 is coupled to the server 280 through the communication interface unit 386 and the network 410, and causes the communication interface unit 386 to wiredly or wirelessly transmit the control response signal SE81 toward the communication interface unit 246 through the network 410.

For example, the practical link is one of a wired link and a wireless link. The communication interface unit 246 is one of a wired communication interface unit and a wireless communication interface unit. The communication interface unit 386 wiredly or wirelessly receives any of the control signal SC81, the control signal SC82, the control signal SC83, the control signal SC88 and the control signal SC97 from the communication interface unit 246 through the practical link. The communication interface unit 246 wiredly or wirelessly receives the control response signal SE81 from the communication interface unit 386 through the practical link.

Under a condition that the communication interface unit 246 and the communication interface unit 386 are two wireless communication interface units respectively, the communication interface unit 246 is configured to wirelessly communicate with the communication interface unit 386. For example, the network 410 is a wireless network. The processing unit 230 causes the communication interface unit 246 to transmit any of the control signal SC81, the control signal SC82, the control signal SC83, the control signal SC88 and the control signal SC97 toward the communication interface unit 386 through the wireless network. The processing unit 331 causes the communication interface unit 386 to transmit the control response signal SE81 toward the communication interface unit 246 through the wireless network.

Figure 53:
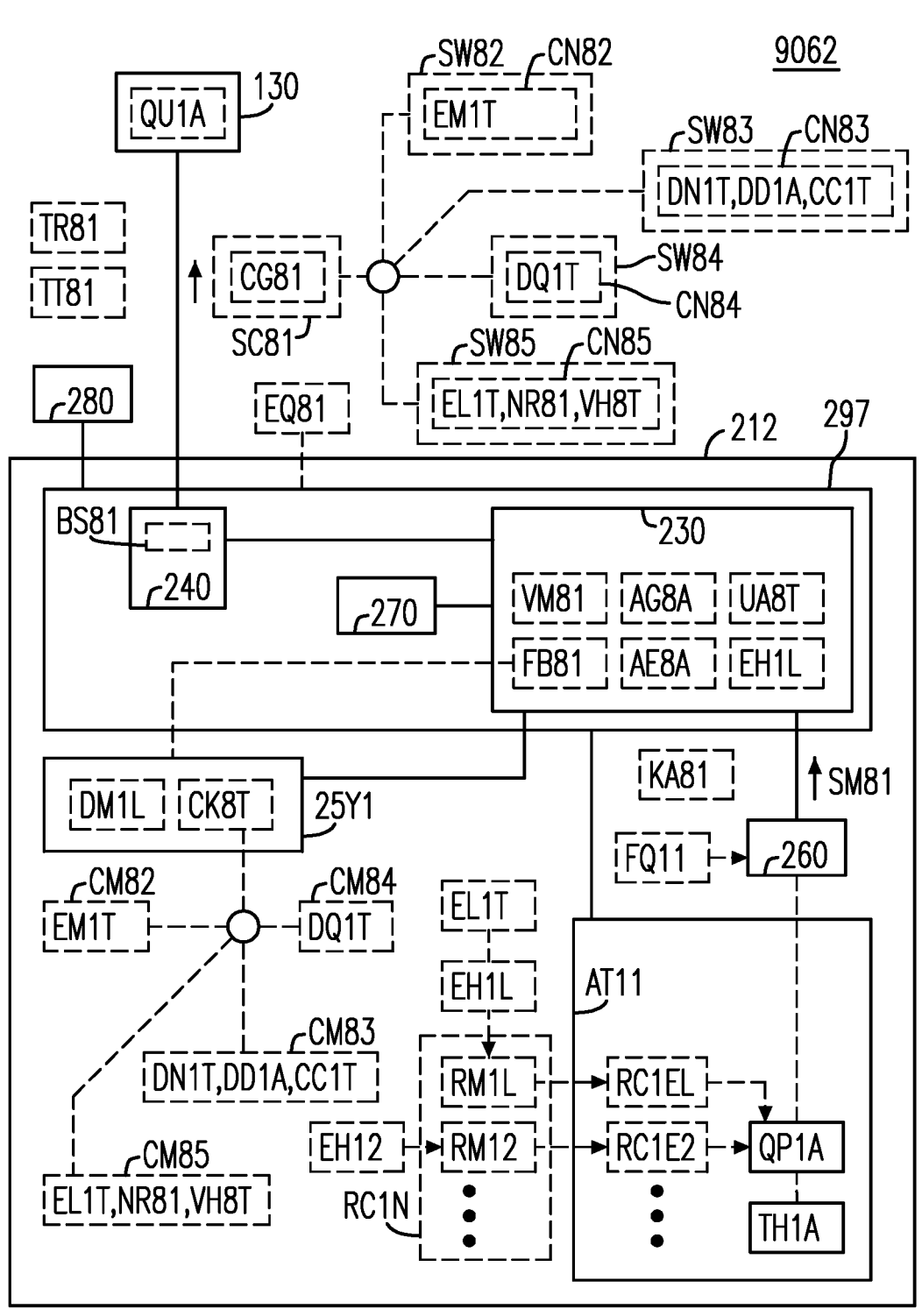
FIG. 53 is a schematic diagram showing an implementation structure of the control system shown in FIG. 1.
Figure 54:
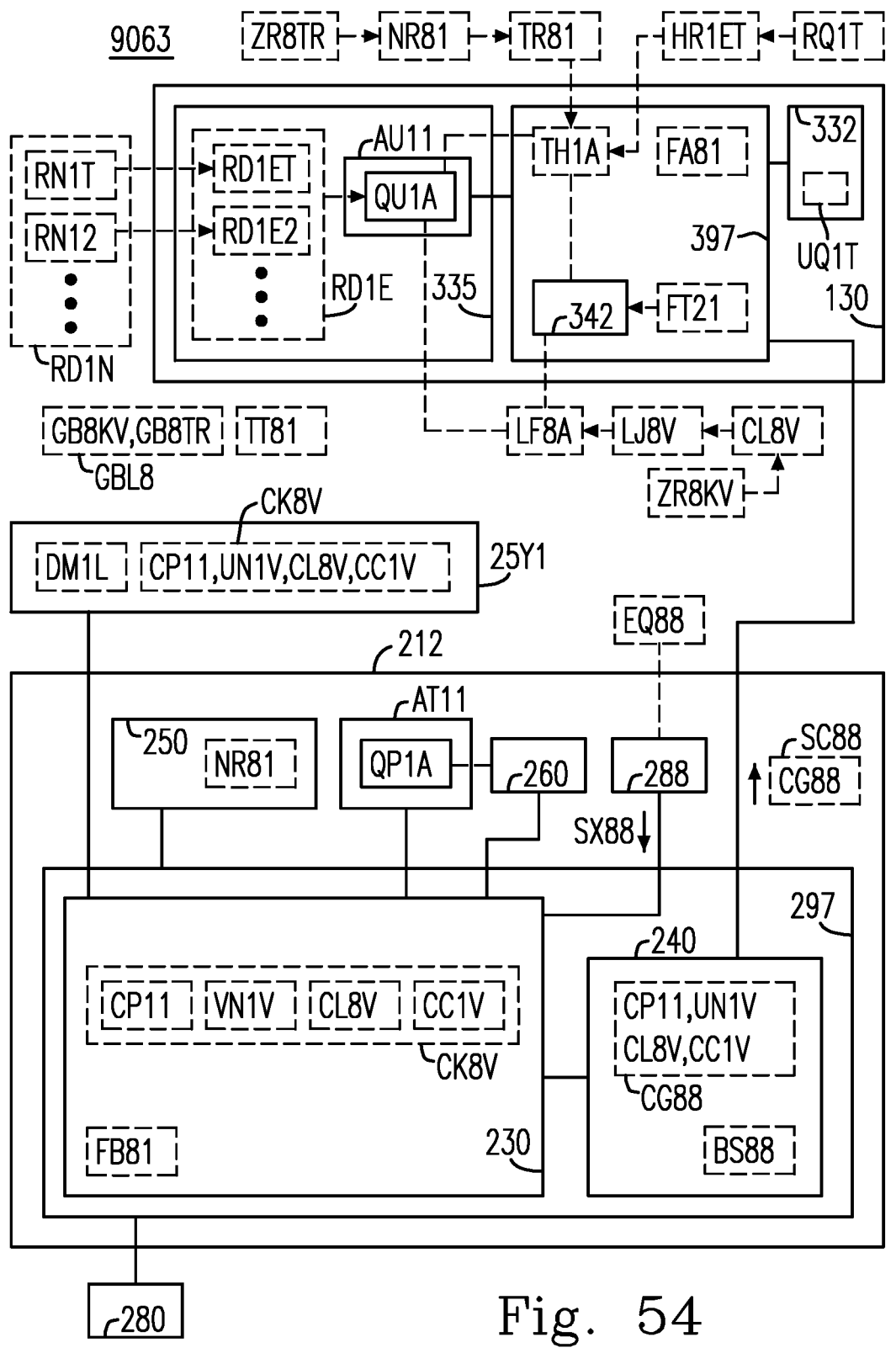
FIG. 54 is a schematic diagram showing an implementation structure of the control system shown in FIG. 1.
Figure 55:
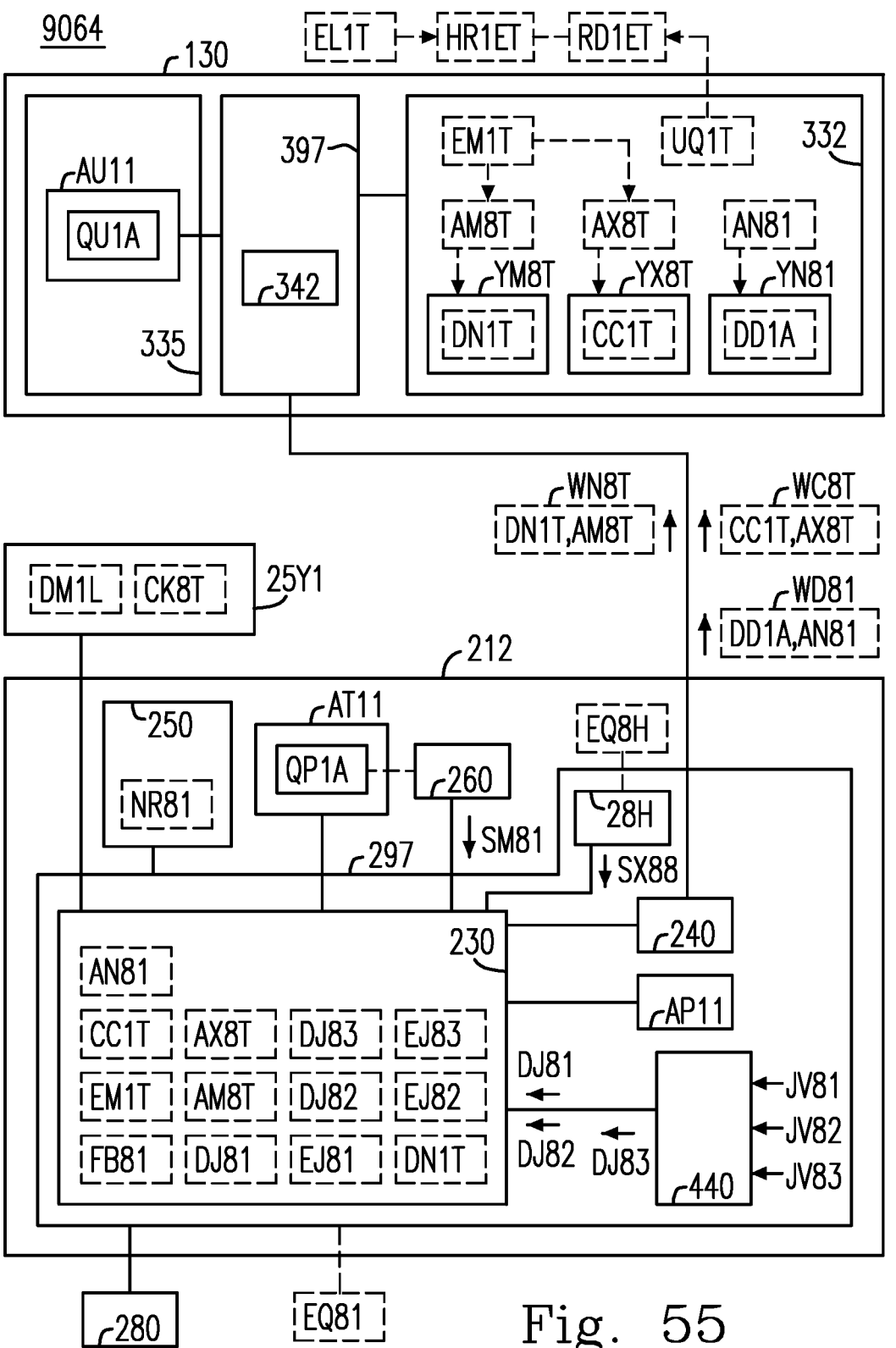
FIG. 55 is a schematic diagram showing an implementation structure of the control system shown in FIG. 1.

Please refer to FIG. 53, FIG. 54 and FIG. 55. FIG. 53 is a schematic diagram showing an implementation structure 9062 of the control system 901 shown in FIG. 1. FIG. 54 is a schematic diagram showing an implementation structure 9063 of the control system 901 shown in FIG. 1. FIG. 55 is a schematic diagram showing an implementation structure 9064 of the control system 901 shown in FIG. 1. As shown in FIG. 53, FIG. 54 and FIG. 55, each of the implementation structure 9062, the implementation structure 9063 and the implementation structure 9064 includes the control device 212, the functional device 130 and the server 280. The control device 212 is linked to the server 280. The control device 212 is used to control the variable physical parameter QU1A existing in the functional device 130, and includes the operation unit 297 and the sensing unit 260. The operation unit 297 includes the processing unit 230, the receiving unit 270 coupled to the processing unit 230, the input unit 440 coupled to the processing unit 230 and the transmission unit 240, and is coupled to the server 280.

In some embodiments, the measurement application function FB81 is associated with the memory unit 25Y1. The memory unit 25Y1 stores the control data code CK8T. The control data code CK8T is one selected from a group consisting of a control message code CM82, a control message code CM83, a control message code CM84 and a control message code CM85. The control message CG81 is one selected from a group consisting of a control data message CN82, a control data message CN83, a control data message CN84 and a control data message CN85.

Under a condition that the control data code CK8T is the control message code CM82, the control signal SC81 is an instruction signal SW82 carrying the control data message CN82. Each of the control message code CM82 and the control data message CN82 includes the measurement value target range code EM1T. The control signal SC81 serves to indicate the measurement value target range RN1T by carrying the measurement value target range code EM1T, and is used to cause the variable physical parameter QU1A to enter the physical parameter target range RD1ET represented by the measurement value target range RN1T.

Under a condition that the control data code CK8T is the control message code CM83, the control signal SC81 is an instruction signal SW83 carrying the control data message CN83. Each of the control message code CM83 and the control data message CN83 includes the target range limit value pair DN1T, the rated range limit value pair DD1A and the handle CC1T. For example, each of the control message code CM83 and the control data message CN83 further includes the measurement value target range code EM1T. The control signal SC81 serves to indicate the measurement value target range RN1T by carrying the target range limit value pair DN1T, and is used to cause the variable physical parameter QU1A to enter the physical parameter target range RD1ET represented by the measurement value target range RN1T.

In some embodiments, under a condition that the control data code CK8T is the control message code CM84, the control signal SC81 is an instruction signal SW84 carrying the control data message CN84. Each of the control message code CM84 and the control data message CN84 includes the designated range limit value pair DQ1T. The control signal SC81 serves to indicate at least one of the measurement value designation range RQ1T and the clock time designation interval HR1ET by carrying the designated range limit value pair DQ1T.

The functional device 130 stores the physical parameter target range code UQ1T. Under a condition that the control data code CK8T is the control message code CM85, the control signal SC81 is an instruction signal SW85 carrying the control data message CN85. Each of the control message code CM85 and the control data message CN85 includes the measurement value designation range code EL1T, the clock reference time value NR81 and the measurement time length value VH8T. The designated range limit value pair DQ1T includes the clock reference time value NR81. The measurement value designation range code EL1T is defaulted. The control signal SC81 enables a calculation of the designated range limit value pair DQ1T by carrying the measurement time length value VH8T, and is used to cause the variable physical parameter QP1A to be in the physical parameter target range RD1EU within the clock time application interval HR1EU.

Under a condition that the physical parameter target range code UQ1T is equal to the defaulted measurement value target range code EM1T, the control signal SC81 serves to indicate the measurement value target range RN1T by carrying the defaulted measurement value designation range code EL1T, and is used to cause the variable physical parameter QU1A to be in the physical parameter target range RD1ET, represented by the measurement value target range RN1T, within the clock time designation interval HR1ET.

In some embodiments, the operation unit 397 includes the timer 342. The timer 342 is used to measure the clock time TH1A, and is configured to meet the timer specification FT21. The variable physical parameter QU1A is associated with the clock time TH1A. The clock time TH1A is characterized based on a clock reference time TR81. For example, the clock reference time TR81 is equal to the beginning limit time HR1ET1. The trigger event EQ81 occurs at a trigger time TT81. The trigger time TT81 is a current time. The clock reference time value NR81 is defaulted in the designated measurement value format HH95 based on the clock reference time TR81 and the timer specification FT21. A time difference between the clock reference time TR81 and the trigger time TT81 is within a defaulted time length. Each of the timer specification FT81 and the timer specification FT21 is defaulted. For example, the designated measurement value format HH95 is characterized based on the designated bit number UY95.

The clock time TH1A is characterized based on the clock time designation interval HR1ET. The clock time designation interval HR1ET includes the clock reference time TR81, and is represented by the measurement value designation range RQ1T. The measurement value designation range RQ1T is defaulted in the designated measurement value format HH95 based on the timer specification FT21. The measurement value designation range code EL1T is configured to indicate the clock time designation interval HR1ET, and is defaulted based on the measurement application function specification GBL8. The physical parameter target range code UQ1T denotes the physical parameter target range RD1ET in which the variable physical parameter QU1A is expected to be within the clock time designation interval HR1ET. The physical parameter target range RD1ET is selected from the plurality of different physical parameter reference ranges RD1E1, RD1E2, . . . .

In some embodiments, under a condition that the variable physical parameter QP1A is equal to the clock time TH1A, the sensing unit 260 senses the clock time TH1A to generate the sense signal SM81, and serves as a timer. For example, under a condition that the variable physical parameter QP1A is equal to the clock time TH1A, the measurement value application range code EH1L is equal to the measurement value designation range code EL1T. The processing unit 230 performs the data determination AE8A to determine the measurement value application range code EH1L being equal to the measurement value designation range code EL1T in response to the trigger event EQ81.

For example, under a condition that the processing unit 230 determines the physical parameter application range RC1EL which the variable physical parameter QP1A is currently in, the processing unit 230 performs the data acquisition AG8A using the determined measurement value application range code EH1L to obtain the control application code UA8T being equal to the control data code CK8T. Under a condition that the obtained control data code CK8T includes the defaulted clock reference time value NR81, the defaulted measurement time length value VH8T and the defaulted measurement value designation range code EL1T, the processing unit 230 causes the transmission unit 240 based on the obtained control data code CK8T to perform the signal generation operation BS81 to generate the control signal SC81 carrying the obtained clock reference time value NR81, the obtained measurement time length value VH8T and the obtained measurement value designation range code EL1T.

For example, the physical parameter control function specification GBL8 includes a time length representation GB8TR. The time length representation GB8TR is used to indicate the clock reference time TR81. The clock reference time value NR81 is defaulted in the designated measurement value format HH95 based on the time length representation GB8TR, the timer specification FT21 and a data coding operation ZR8TR used to convert the time length representation GB8TR. For example, the time length representation GB8TR is equal to the time length representation GA8TR.

In some embodiments, the memory unit 25Y1 stores a control data code CK8V. The control data code CK8V includes the timing operation mode code CP11, the physical parameter target range code UN1V, the measurement time length value CL8V and the handle CC1V. Under a condition that the variable physical parameter QU1A is in the physical parameter target range RD1EU within the clock time application interval HR1EU based on the control signal SC81, the processing unit 230 accesses the control data code CK8V to obtain the control data code CK8V in response to a trigger event EQ88, and causes the transmission unit 240 based on the accessed control data code CK8V to transmit the control signal SC88 toward the receiving unit 337. The control signal SC88 carries the control message CG88.

For example, the operation unit 297 includes a trigger application unit 288 coupled to the processing unit 230. The trigger event EQ88 is associated with the trigger application unit 288, and is one selected from a group consisting of a trigger action event, a user input event, a signal input event, a state change event and an identification medium appearance event. The trigger application unit 288 provides an operation request signal SX88 to the processing unit 230 in response to the trigger event EQ88, and thereby causes the processing unit 230 to receive the operation request signal SX88. The processing unit 230 accesses the control data code CK8V to obtain the control data code CK8V in response to the operation request signal SX88. For example, the trigger application unit 288 is one selected from a group consisting of the reader 220, the receiving unit 270, the input unit 440, the display unit 460 and the sensing unit 260. For example, the trigger application unit 28H associated with the trigger event EQ8H is one selected from a group consisting of the reader 220, the receiving unit 270, the input unit 440, the display unit 460 and the sensing unit 260.

For example, the trigger application unit 288 includes the user interface area AP11 having the electricity application target WJ11, receives a first user input operation using the electricity application target WJ11 to cause the trigger event EQ88 to occur, and provides the operation request signal SX88 to the processing unit 230 in response to the first user input operation (or the trigger event EQ88). For example, the trigger application unit 28H includes the user interface area AP11 having the electricity application target WJ11, receives a second user input operation using the electricity application target WJ11 to cause the trigger event EQ8H to occur, and provides the operation request signal SX8H to the processing unit 230 in response to the second user input operation (or the trigger event EQ8H).

For example, the operation unit 397 includes the timer 342. The timer 342 is used to measure the variable time length LF8A, and is configured to meet the timer specification FT21. Each of the control data code CK8V and the control message CG88 includes the measurement time length value CL8V. The processing unit 230 sets the time length value CL8V in a designated measurement value format HH91 based on the reference time length LJ8V and the timer specification FT21, and causes the transmission unit 240 based on the obtained control data code CK8V to perform a signal generation operation BS88 to generate the control signal SC88 carrying the measurement time length value CL8V. For example, the designated measurement value format HH91 is characterized based on a designated bit number UY91.

The measurement application function specification GBL8 includes a time length representation GB8KV. The time length representation GB8KV is used to indicate the reference time length LJ8V. For example, the measurement time length value CL8V is defaulted in the designated measurement value format HH91 based on the time length representation GB8KV, the timer specification FT21 and a data coding operation ZR8KV used to convert the time length representation GB8KV. The storage unit 250 stores the control data code CK8V including the time length value CL8V. The processing unit 230 is configured to obtain the control data code CK8V from the storage unit 250. For example, the time length representation GB8KV is equal to the time length representation GA8KV.

In some embodiments, the functional device 130 includes the storage unit 332 coupled to the operation unit 397. The storage unit 332 has a memory location YM8T and a memory location YX8T being different from the memory location YM8T. For example, the memory location YM8T is identified based on a memory address AM8T. The memory location YX8T is identified based on a memory address AX8T. Each of the memory address AM8T and the memory address AX8T is defaulted based on the defaulted measurement value target range code EM1T.

Before the trigger event EQ81 occurs, the processing unit 230 obtains an input data DJ81 from the input unit 440 by means of the user interface area AP11, performs a data coding operation EJ81 on the input data DJ81 to determine the defaulted target range limit value pair DN1T, is configured to obtain the defaulted measurement value target range code EM1T, and fetches the memory address AM8T based on the obtained measurement value target range code EM1T. For example, before the trigger event EQ81 occurs, the input unit 440 receives a user input operation JV81 used to operate the user interface area AP11, and provides the input data DJ81 to the processing unit 230 in response to the user input operation JV81.

Before the trigger event EQ81 occurs, the processing unit 230 causes the transmission unit 240 based on the determined target range limit value pair DN1T and the fetched memory address AM8T to provide a writing request message WN8T to the operation unit 397. The writing request message WN8T includes the determined target range limit value pair DN1T and the fetched memory address AM8T. The operation unit 397 causes the storage unit 332 in response to the writing request message WN8T to store the target range limit value pair DN1T at the memory location YM8T.

In some embodiments, before the trigger event EQ81 occurs, the processing unit 230 obtains an input data DJ82 from the input unit 440 by means of the user interface area AP11, performs a data coding operation EJ82 on the input data DJ82 to determine the defaulted handle CC1T, and fetches the memory address AX8T based on the obtained measurement value target range code EM1T. For example, before the trigger event EQ81 occurs, the input unit 440 receives a user input operation JV82 used to operate the user interface area AP11, and provide the input data DJ82 to the processing unit 230 in response to the user input operation JV82.

Before the trigger event EQ81 occurs, the processing unit 230 causes the transmission unit 240 based on the determined handle CC1T and the fetched memory address AX8T to provide the writing request message WC8T to the operation unit 397. The writing request message WC8T includes the determined handle CC1T and the fetched memory address AX8T. The operation unit 397 causes the storage unit 332 in response to the writing request message WC8T to store the handle CC1T at the memory location YX8T.

The storage unit 332 further has a memory location YN81. For example, the memory location YN81 is identified based on a memory address AN81. The memory address AN81 is defaulted. Before the trigger event EQ81 occurs, the processing unit 230 obtains an input data DJ83 from the input unit 440 by means of the user interface area AP11, performs a data coding operation EJ83 on the input data DJ83 to determine the defaulted rated range limit value pair DD1A, and is configured to fetch the defaulted memory address AN81. For example, before the trigger event EQ81 occurs, the input unit 440 receives a user input operation JV83 used to operate the user interface area AP11, and provides the input data DJ83 to the processing unit 230 in response to the user input operation JV83.

Before the trigger event EQ81 occurs, the processing unit 230 causes the transmission unit 240 based on the determined rated range limit value pair DD1A and the fetched memory address AN81 to provide the writing request message WD81 to the operation unit 397. The writing request message WD81 includes the determined rated range limit value pair DD1A and the fetched memory address AN81. The operation unit 397 causes the storage unit 332 in response to the writing request message WD81 to store the rated range limit value pair DD1A at the memory location YN81.

Figure 56:
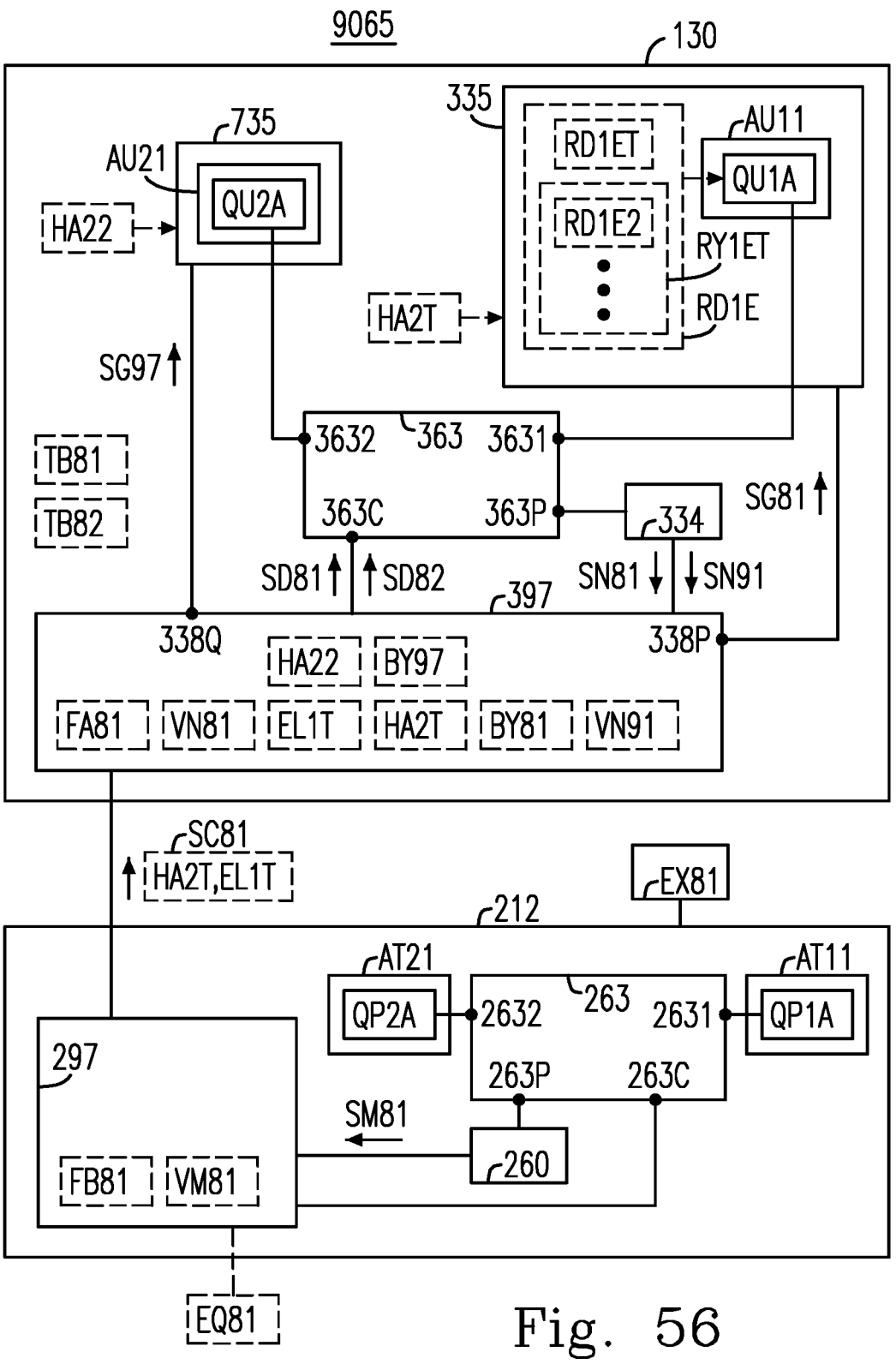
FIG. 56 is a schematic diagram showing an implementation structure of the control system shown in FIG. 1.
Figure 57:
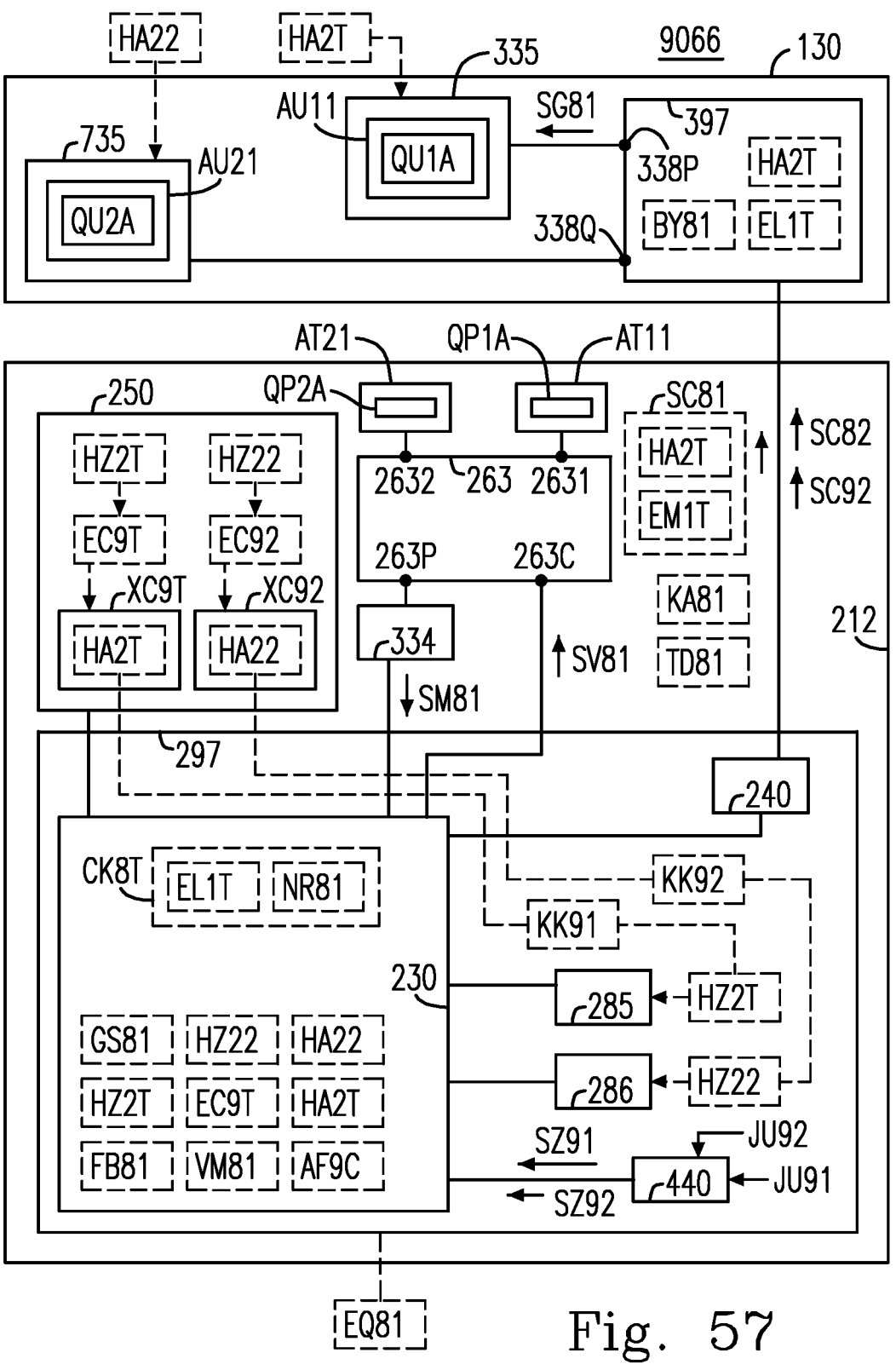
FIG. 57 is a schematic diagram showing an implementation structure of the control system shown in FIG. 1.
Figure 58:
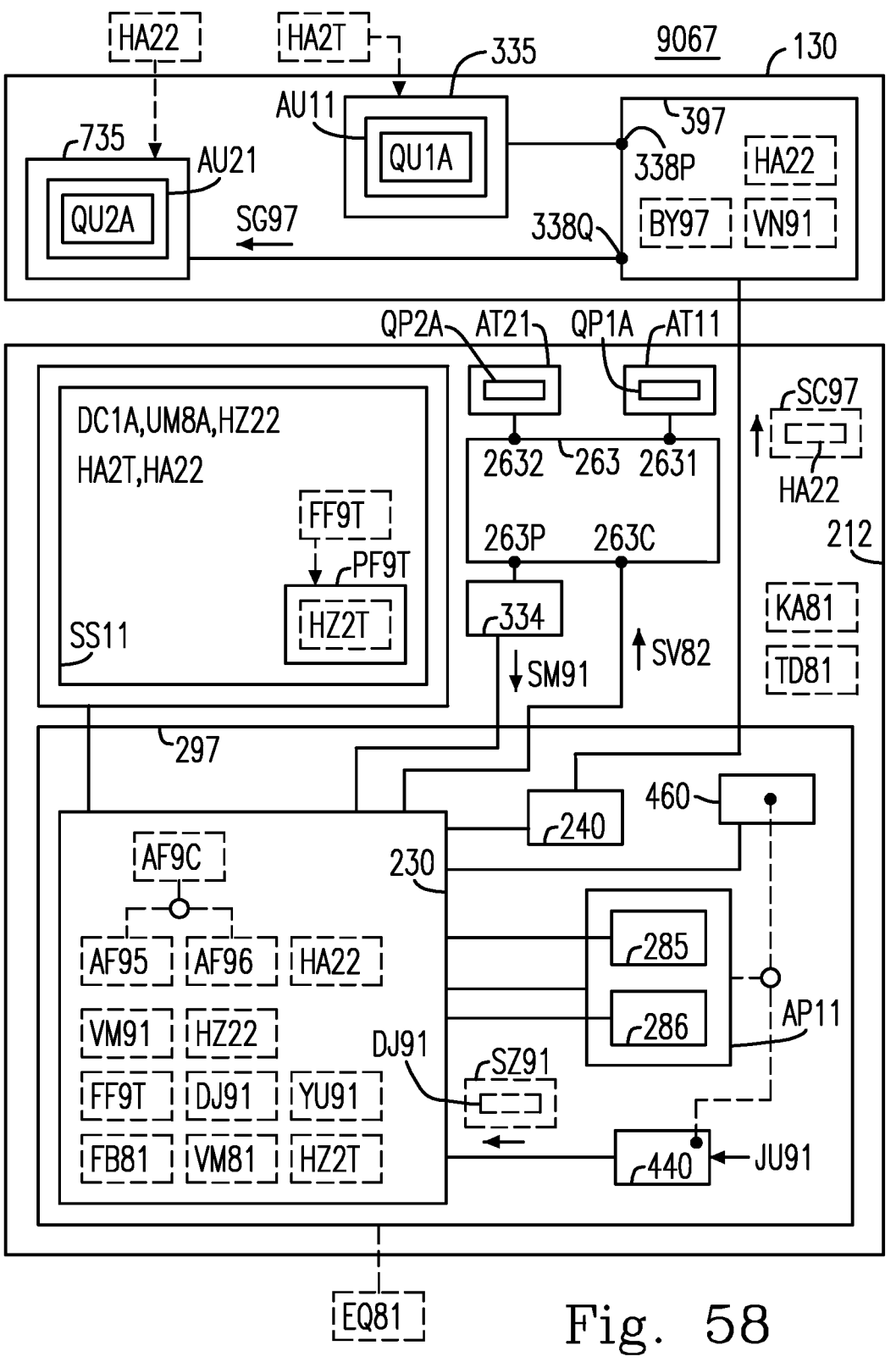
FIG. 58 is a schematic diagram showing an implementation structure of the control system shown in FIG. 1.
Figure 59:
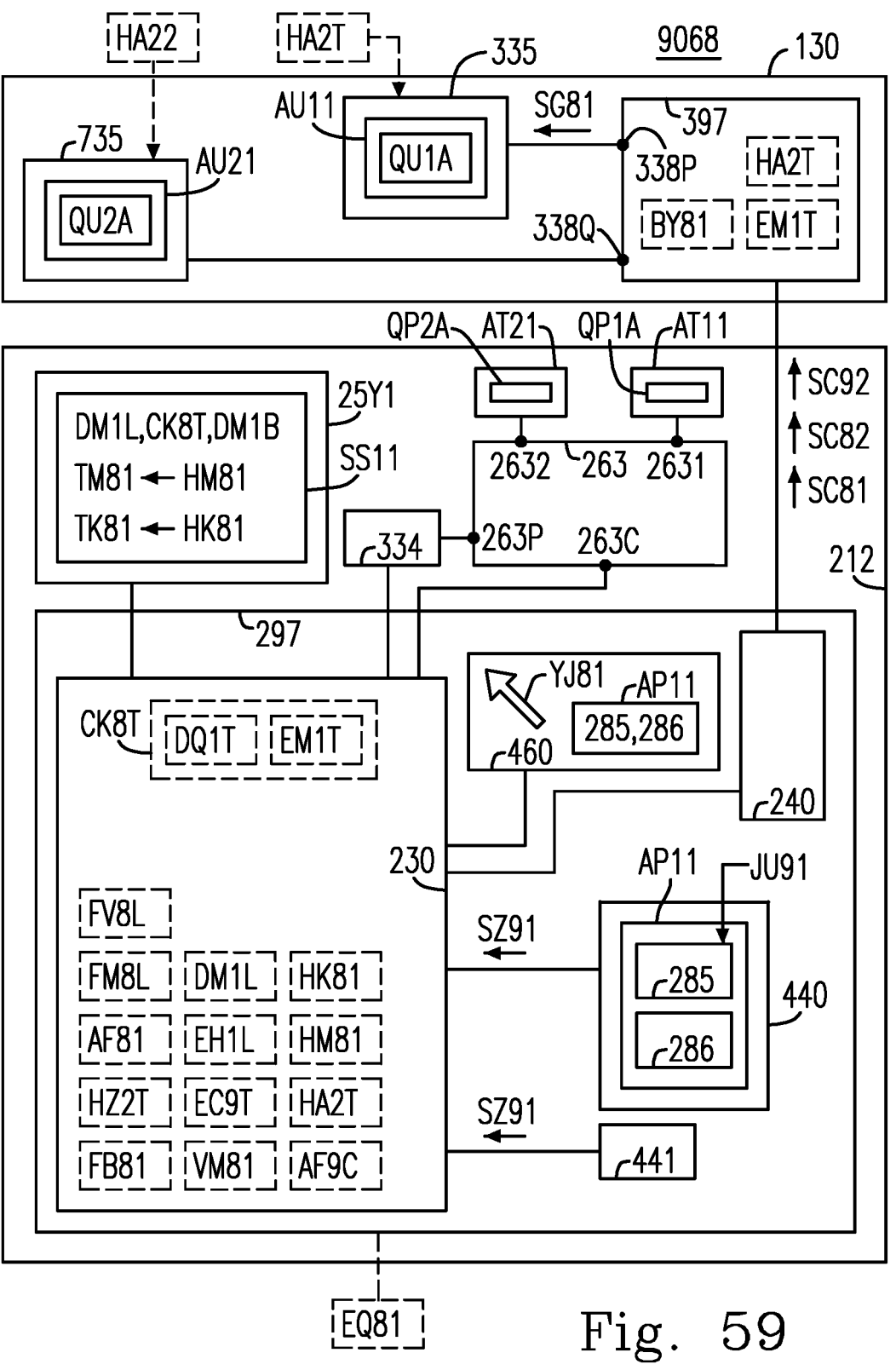
FIG. 59 is a schematic diagram showing an implementation structure of the control system shown in FIG. 1.

Please refer to FIG. 56, FIG. 57, FIG. 58 and FIG. 59. FIG. 56 is a schematic diagram showing an implementation structure 9065 of the control system 901 shown in FIG. 1. FIG. 57 is a schematic diagram showing an implementation structure 9066 of the control system 901 shown in FIG. 1. FIG. 58 is a schematic diagram showing an implementation structure 9067 of the control system 901 shown in FIG. 1. FIG. 59 is a schematic diagram showing an implementation structure 9068 of the control system 901 shown in FIG. 1. As shown in FIG. 56, FIG. 57, FIG. 58 and FIG. 59, each of the implementation structure 9065, the implementation structure 9066, the implementation structure 9067 and the implementation structure 9068 includes the control device 212, the functional device 130 and the server 280. The control device 212 is linked to the server 280. The control device 212 is used to control the variable physical parameter QU1A existing in the functional device 130 by means of the trigger event EQ81, and includes the operation unit 297 and the sensing unit 260. The operation unit 297 includes the processing unit 230, the receiving unit 270, the input unit 440 and the transmission unit 240. The processing unit 230 is coupled to the server 280.

In some embodiments, the functional device 130 includes the operation unit 397, the physical parameter application unit 335, the sensing unit 334, a physical parameter application unit 735 and a multiplexer 363. The operation unit 397 has an output terminal 338P and an output terminal 338Q. The output terminal 338P and the output terminal 338Q are respectively located at different spatial locations. Each of the physical parameter application unit 335, the sensing unit 334, the physical parameter application unit 735 and the multiplexer 363 is coupled to the operation unit 397. The output terminal 338P is coupled to the physical parameter application unit 335. The physical parameter application unit 735 includes a physical parameter formation area AU21, and is coupled to the output terminal 338Q. The physical parameter formation area AU21 has a variable physical parameter QU2A. For example, the physical parameter application unit 735 is a physically realizable functional unit, and has a functional structure being similar to the physical parameter application unit 335.

The sensing unit 334 is used to sense one selected from a plurality of practical physical parameters through the multiplexer 363. The plurality of practical physical parameters includes the variable physical parameter QU1A and the variable physical parameter QU2A. The control device 212 is used to control the variable physical parameter QU2A. The multiplexer 363 has an input terminal 3631, an input terminal 3632, a control terminal 363C and an output terminal 363P.

The control terminal 363C is coupled to the operation unit 397. The input terminal 3631 is coupled to the physical parameter formation area AU11. The input terminal 3632 is coupled to the physical parameter formation area AU21. The output terminal 363P is coupled to the sensing unit 334. For example, the variable physical parameter QU1A and the variable physical parameter QU2A are respectively a fifth variable electrical parameter and a sixth variable electrical parameter. For example, the fifth variable electrical parameter and the sixth variable electrical parameter are respectively a fifth variable electrical voltage and a sixth variable electrical voltage. The input terminal 3631 and the output terminal 363P have a first functional relation therebetween. The first functional relation is equal to one of a first conduction relation and a first cut-off relation.

The input terminal 3632 and the output terminal 363P have a second functional relation therebetween. The second functional relation is equal to one of a second conduction relation and a second cut-off relation. Under a condition that the first functional relation is equal to the first conduction relation, the sensing unit 334 is used to sense the variable physical parameter QU1A through the output terminal 363P and the input terminal 3631, and is coupled to the physical parameter formation area AU11 through the output terminal 363P and the input terminal 3631. Under a condition that the second functional relation is equal to the second conduction relation, the sensing unit 334 is used to sense the variable physical parameter QU2A through the output terminal 363P and the input terminal 3632, and is coupled to the physical parameter formation area AU21 through the output terminal 363P and the input terminal 3632. For example, the multiplexer 363 is controlled by the operation unit 397, and is an analog multiplexer.

In some embodiments, one of the control device 212 and the application environment EX81 has a physical parameter formation area AT21. The physical parameter formation area AT21 has a variable physical parameter QP2A. The control device 212 further includes a multiplexer 263 coupled to the processing unit 230. The multiplexer 263 has an input terminal 2631, an input terminal 2632, a control terminal 263C and an output terminal 263P. The control terminal 263C is coupled to the processing unit 230.

The input terminal 2631 is coupled to the physical parameter formation area AT11. The input terminal 2632 is coupled to the physical parameter formation area AT21. The output terminal 263P is coupled to the sensing unit 260. For example, the variable physical parameter QP1A and the variable physical parameter QP2A are respectively a seventh variable electrical parameter and an eighth variable electrical parameter. For example, the seventh variable electrical parameter and the eighth variable electrical parameter are respectively a seventh variable electrical voltage and an eighth variable electrical voltage. The input terminal 2631 and the output terminal 263P have a third functional relation therebetween. The third functional relation is equal to one of a third conduction relation and a third cut-off relation.

The input terminal 2632 and the output terminal 263P have a fourth functional relation therebetween. The fourth functional relation is equal to one of a fourth conduction relation and a fourth cut-off relation. Under a condition that the third functional relation is equal to the third conduction relation, the sensing unit 260 is used to sense the variable physical parameter QP1A through the output terminal 263P and the input terminal 2631, and is coupled to the physical parameter formation area AT11 through the output terminal 263P and the input terminal 2631.

Under a condition that the fourth functional relation is equal to the fourth conduction relation, the sensing unit 260 is used to sense the variable physical parameter QP2A through the output terminal 263P and the input terminal 2632, and is coupled to the physical parameter formation area AT21 through the output terminal 263P and the input terminal 2632. For example, the multiplexer 263 is controlled by the processing unit 230, and is an analog multiplexer. For example, the sensing unit 260 senses the variable physical parameter QP1A through the multiplexer 263 at an operation time TB81, and senses the variable physical parameter QP2A through the multiplexer 263 at an operation time TB82 being different from the operation time TB81.

In some embodiments, the physical parameter application unit 335 is identified by an application unit identifier HA2T. The physical parameter application unit 735 is identified by an application unit identifier HA22. The physical parameter application unit 335 and the physical parameter application unit 735 are respectively located at different spatial locations; and each of the physical parameter application unit 335 and the physical parameter application unit 735 is coupled to the operation unit 397. Each of the application unit identifier HA2T and the application unit identifier HA22 is defaulted based on the measurement application function specification GBL8. In order to control the physical parameter application unit 335, the control signal SC81 further carries the application unit identifier HA2T. The operation unit 397 receives the control signal SC81 from the control device 212. The operation unit 397 selects the physical parameter application unit 335 in response to the control signal SC81 to perform a control. For example, the application unit identifier HA2T is configured to indicate the output terminal 338P, and is a first functional unit number. The application unit identifier HA22 is configured to indicate the output terminal 338Q, and is a second functional unit number.

The control device 212 further includes an electricity-using target 285 coupled to the processing unit 230, and an electricity-using target 286 coupled to the processing unit 230. The electricity-using target 285 is identified by an electricity-using target identifier HZ2T, and is an electricity-using unit. The electricity-using target 286 is identified by an electricity-using target identifier HZ22, and is an electricity-using unit. Each of the electricity-using target identifier HZ2T and the electricity-using target identifier HZ22 is defaulted based on the measurement application function specification GBL8. Under a condition that the trigger event EQ81 occurs by means of the electricity-using target 285, the processing unit 230 selects the physical parameter application unit 335 in response to the trigger event EQ81 to perform a control. Under a condition that the trigger event EQ81 occurs by means of the electricity-using target 286, the processing unit 230 selects the physical parameter application unit 735 in response to the trigger event EQ81 to perform a control.

In some embodiments, the storage unit 250 has a memory location XC9T and a memory location XC92, stores the application unit identifier HA2T at the memory location XC9T, and stores the application unit identifier HA22 at the memory location XC92. The memory location XC9T is identified by a memory address EC9T, or is identified based on the memory address EC9T. The memory address EC9T is defaulted based on the electricity-using target identifier HZ2T; therefore, the electricity-using target 285 is associated with the application unit identifier HA2T. For example, the electricity-using target identifier HZ2T and the application unit identifier HA2T have a mathematical relation KK91 therebetween; therefore, the electricity-using target 285 is associated with the application unit identifier HA2T.

The memory location XC92 is identified by a memory address EC92, or is identified based on the memory address EC92. The memory address EC92 is defaulted based on the electricity-using target identifier HZ22; therefore, the electricity-using target 286 is associated with the application unit identifier HA22. For example, the electricity-using target identifier HZ22 and the application unit identifier HA22 have a mathematical relation KK92 therebetween; therefore, the electricity-using target 286 is associated with the application unit identifier HA22.

In some embodiments, the trigger event EQ81 occurs by means of the electricity-using target 285, and causes the processing unit 230 to receive an operation request signal SZ91. Under a condition that the trigger event EQ81 occurs by means of the electricity-using target 285, the processing unit 230 obtains the measured value VM81 and the electricity-using target identifier HZ2T in response to the operation request signal SZ91, and obtains the application unit identifier HA2T based on the obtained electricity-using target identifier HZ2T. The processing unit 230 causes the transmission unit 240 based on obtained the application unit identifier HA2T to transmit at least one of the control signal SC81, the control signal SC82 and the control signal SC83 toward the operation unit 397.

For example, the trigger event EQ81 is a user input event that the input unit 440 receives a user input operation JU91. The input unit 440 provides the operation request signal SZ91 to the processing unit 230 in response to the trigger event EQ81 being the user input event, and thereby causes the processing unit 230 to receive the operation request signal SZ91. Under a condition that the trigger event EQ81 occurs by means of the electricity-using target 285, the input unit 440 provides the operation request signal SZ91 to the processing unit 230 by means of the electricity-using target 285. The processing unit 230 provides a control signal SV81 to the control terminal 263C in response to the operation request signal SZ91. For example, the control signal SV81 is a selection control signal, and serves to indicate the input terminal 2631. The multiplexer 263 causes the third functional relation between the input terminal 2631 and the output terminal 263P to be equal to the third conduction relation in response to the control signal SV81.

Under a condition that the third functional relation is equal to the third conduction relation, the sensing unit 260 senses the variable physical parameter QP1A to generate the sense signal SM81. The processing unit 230 receives the sense signal SM81 from the sensing unit 260, and obtains the measured value VM81 in the designated measurement value format HQ81 based on the received sense signal SM81. For example, the electricity-using target 285 and the electricity-using target 286 are configured to respectively correspond to the physical parameter application unit 335 and the physical parameter application unit 735, and are respectively located at different spatial locations; and each of the electricity-using target 285 and the electricity-using target 286 is coupled to the processing unit 230.

In some embodiments, the input unit 440 receives the user input operation JU91, used to select the electricity-using target 285, to cause the trigger event EQ81 to occur. The input unit 440 generates the operation request signal SZ91 in response to the user input operation JU91. The processing unit 230 receives the operation request signal SZ91, uses the sense signal SM81 in response to the operation request signal SZ91 to obtain the measured value VM81, and performs a data acquisition AF9C in response to the operation request signal SZ91 to obtain the electricity-using target identifier HZ2T. For example, the storage unit 250 includes the storage space SS11. The storage space SS11 has the defaulted rated range limit value pair DC1A, the variable physical parameter range code UM8A, the electricity-using target identifier HZ2T, the electricity-using target identifier HZ22 and the application unit identifier HA2T.

In some embodiments, the processing unit 230 is configured to obtain the memory address EC9T based on the obtained electricity-using target identifier HZ2T, and accesses the application unit identifier HA2T, stored at the memory location XC9T, based on the obtained memory address EC9T to obtain the application unit identifier HA2T. Under a condition that the processing unit 230 determines the physical parameter application range RC1EL which the variable physical parameter QP1A is currently in by checking the mathematical relation KA81 between the measured value VM81 and the measurement value application range RM1L, the processing unit 230 performs the signal generation control GS81 based on the obtained application unit identifier HA2T and the accessed control data code CK8T to cause the transmission unit 240 to generate the control signal SC81, and causes the transmission unit 240 to transmit the control signal SC81 toward the operation unit 397.

For example, the control signal SC81 carries the application unit identifier HA2T. For example, the control signal SC81 carries the application unit identifier HA2T and the measurement value target range code EM1T. The operation unit 397 obtains the measurement value target range code EM1T and the application unit identifier HA2T from the control signal SC81 in response to the control signal SC81. In a third specific situation, the operation unit 397 performs the signal generation operation BY81 using the output terminal 338P based on the obtained measurement value target range code EM1T and the obtained application unit identifier HA2T to transmit an operation signal SG81 toward the physical parameter application unit 335. The physical parameter application unit 335 causes the variable physical parameter QU1A to be in the physical parameter target range RD1ET in response to the operation signal SG81.

In some embodiments, under a condition that the control signal SC81 carries the application unit identifier HA2T and the measurement value target range code EM1T, the operation unit 397 obtains the application unit identifier HA2T and the measurement value target range code EM1T from the control signal SC81 in response to the control signal SC81, and provides a control signal SD81 to the control terminal 363C based on the obtained application unit identifier HA2T. For example, the control signal SD81 is a selection control signal, and serves to indicate the input terminal 3631. The multiplexer 363 causes the first functional relation between the input terminal 3631 and the output terminal 363P to be equal to the first conduction relation in response to the control signal SD81. Under a condition that the first functional relation is equal to the first conduction relation, the sensing unit 334 senses the variable physical parameter QU1A to generate a sense signal SN81.

The operation unit 397 receives the sense signal SN81 from the sensing unit 334, and obtains a measured value VN81 based on the received sense signal SN81. In the third specific situation, the operation unit 397 performs the signal generation operation BY81 using the output terminal 338P based on the obtained measured value VN81, the obtained measurement value target range code EM1T and the obtained application unit identifier HA2T to transmit the operation signal SG81 toward the physical parameter application unit 335.

In some embodiments, the storage space SS11 further has a memory location PF9T. The storage unit 250 stores the defaulted electricity-using target identifier HZ2T at the memory location PF9T. The memory location PF9T is identified by a memory address FF9T, or is identified based on the memory address FF9T. The memory address FF9T is defaulted. The electricity-using target 285 is coupled to the memory location PF9T through the processing unit 230. For example, the operation request signal SZ91 carries an input data DJ91.

The data acquisition AF9C is one of a data acquisition operation AF95 and a data acquisition operation AF96. The data acquisition operation AF95 accesses the electricity-using target identifier HZ2T, stored at the memory location PF9T, by using the defaulted memory address FF9T to obtain the defaulted electricity-using target identifier HZ2T. The data acquisition operation AF96 processes the input data DJ91 based on a defaulted data derivation rule YU91 to obtain the defaulted electricity-using target identifier HZ2T.

In some embodiments, under a condition that a trigger event that the input unit 440 receives a user input operation JU92 used to select the electricity-using target 286 occurs, the input unit 440 causes the processing unit 230 to receive an operation request signal SZ92. The processing unit 230 obtains a measured value VM91 and the electricity-using target identifier HZ22 in response to the operation request signal SZ92, and obtains the application unit identifier HA22 based on the obtained electricity-using target identifier HZ22. The processing unit 230 causes the transmission unit 240 based on the obtained measured value VM91 and the obtained application unit identifier HA22 to transmit a control signal SC97 toward the operation unit 397. The control signal SC97 is used to control the variable physical parameter QU2A, and carries the application unit identifier HA22.

For example, the input unit 440 provides the operation request signal SZ92 to the processing unit 230 in response to the user input operation JU92 used to select the electricity-using target 286, and thereby causes the processing unit 230 to receive the operation request signal SZ92. The processing unit 230 provides a control signal SV82 to the control terminal 263C in response to the operation request signal SZ92. For example, the control signal SV82 is a selection control signal, serves to indicate the input terminal 2632, and is different from the control signal SV81. The multiplexer 263 causes the fourth functional relation between the input terminal 2632 and the output terminal 263P to be equal to the fourth conduction relation in response to the control signal SV82. Under a condition that the fourth functional relation is equal to the fourth conduction relation, the sensing unit 260 senses the variable physical parameter QP2A to generate a sense signal SM91. The processing unit 230 receives the sense signal SM91 from the sensing unit 260, and obtains the measured value VM91 based on the received sense signal SM91.

In some embodiments, the operation unit 397 obtains the application unit identifier HA22 from the control signal SC97 in response to the control signal SC97, and provides a control signal SD82 to the control terminal 363C based on the obtained application unit identifier HA22. For example, the control signal SD82 is a selection control signal, and serves to indicate the input terminal 3632. The multiplexer 363 causes the second functional relation between the input terminal 3632 and the output terminal 363P to be equal to the second conduction relation in response to the control signal SD82. Under a condition that the second functional relation is equal to the second conduction relation, the sensing unit 334 senses the variable physical parameter QU2A to generate a sense signal SN91.

The operation unit 397 receives the sense signal SN91 from the sensing unit 334, and obtains a measured value VN91 based on the received sense signal SN91. The operation unit 397 performs a signal generation operation BY97 using the output terminal 338Q based on the obtained measured value VN91 and the obtained application unit identifier HA22 to transmit an operation signal SC97 toward the physical parameter application unit 735. The operation signal SG97 is used to control the variable physical parameter QU2A.

For example, the user input operation JU81 is one of the user input operation JU91 and the user input operation JU92. The trigger event EQ81 is a user input event that the input unit 440 receives the user input operation JU92 used to select the electricity-using target 286. Under a condition that the input unit 440 receives the user input operation JU91 using the electricity-using target 285, the processing unit 230 causes the transmission unit 240 in response to the user input operation JU91 to transmit the control signal SC81 toward the operation unit 397. Under a condition that the input unit 440 receives the user input operation JU92 using the electricity-using target 286, the processing unit 230 causes the transmission unit 240 in response to the user input operation JU92 to transmit the control signal SC97 toward the operation unit 397.

In some embodiments, the user interface area AP11 has the electricity-using target 285 and the electricity-using target 286. The user input operation JU91 is performed by the user 295. The electricity-using target 285 is one of a third sensing target and a third display target. Under a condition that the electricity-using target 285 is the third sensing target, the input unit 440 includes the electricity-using target 285. Under a condition that the electricity-using target 285 is the third display target, the display unit 460 includes the electricity-using target 285. For example, the third sensing target is a third push-button target. The third display target is a third icon target.

The electricity-using target 286 is one of a fourth sensing target and a fourth display target. Under a condition that the electricity-using target 286 is the fourth sensing target, the input unit 440 includes the electricity-using target 286. Under a condition that the electricity-using target 286 is the fourth display target, the display unit 460 includes the electricity-using target 286. For example, the fourth sensing target is a fourth push-button target. The third display target is a fourth icon target. The operation unit 297 further includes a pointing device 441. For example, the input unit 440 includes the pointing device 441. For example, the input unit 440 is the pointing device 441.

For example, under a condition that the electricity-using target 285 is configured to exist in the input unit 440, the electricity-using target 285 receives the user input operation JU91 to cause the input unit 440 to provide the operation request signal SZ91 to the processing unit 230. Under a condition that the electricity-using target 285 is configured to exist in the display unit 460, the pointing device 441 receives the user input operation JU91, used to select the electricity-using target 285, to cause the pointing device 441 to provide the operation request signal SZ91 to the processing unit 230. For example, the user input operation JU91 is configured to select the electricity-using target 285 by means of the pointing device 441 and the selection tool YJ81. For example, the selection tool YJ81 is a cursor.

In some embodiments, each of the defaulted rated range limit value pair DC1A and the variable physical parameter range code UM8A is further stored in the storage space SS11 based on the defaulted application unit identifier HA2T. The processing unit 230 further uses the storage unit 250 to access any of the defaulted rated range limit value pair DC1A and the variable physical parameter range code UM8A based on the application unit identifier HA2T.

Each of the defaulted application range limit value pair DM1L, the defaulted control data code CK8T and the defaulted candidate range limit value pair DM1B is further stored in the storage space SS11 based on the defaulted application unit identifier HA2T. The processing unit 230 further uses the memory unit 25Y1 to access any of the defaulted application range limit value pair DM1L, the defaulted control data code CK8T and the defaulted candidate range limit value pair DM1B based on the application unit identifier HA2T.

Each of the defaulted application range limit value pair DM1L and the defaulted candidate range limit value pair DM1B is configured to belong to a measurement range limit data code type TM81. The measurement range limit data code type TM81 is identified by a measurement range limit data code type identifier HM81. The measurement range limit data code type identifier HM81 is defaulted. The defaulted control data code CK8T is configured to belong to a control data code type TK81. The control data code type TK81 is identified by a control data code type identifier HK81. The control data code type identifier HK81 is defaulted.

For example, the memory address FM8L is defaulted based on the defaulted application unit identifier HA2T, the defaulted measurement value application range code EH1L and the defaulted measurement range limit data code type identifier HM81. The processing unit 230 obtains the application unit identifier HA2T in response to the trigger event EQ81. The data acquisition operation AF81 obtains the memory address FM8L based on the obtained application unit identifier HA2T, the determined measurement value application range code EH1L and the obtained measurement range limit data code type identifier HM81, and 來 uses the memory unit 25Y1 to access the defaulted application range limit value pair DM1L, stored at the memory location PM8L, based on the obtained memory address FM8L.

For example, the memory address FV8L is defaulted based on the defaulted application unit identifier HA2T, the defaulted measurement value application range code EH1L and the defaulted control data code type identifier HK81. Under a condition that the processing unit 230 determines the physical parameter application range RC1EL which the variable physical parameter QP1A is currently in, the processing unit 230 obtains the memory address FV8L based on the obtained application unit identifier HA2T, the determined measurement value application range code EH1L and the obtained control data code type identifier HK81, and uses the memory unit 25Y1 to access the control data code CK8T, stored at the memory location PV8L, based on the obtained memory address FV8L.

Figure 60:
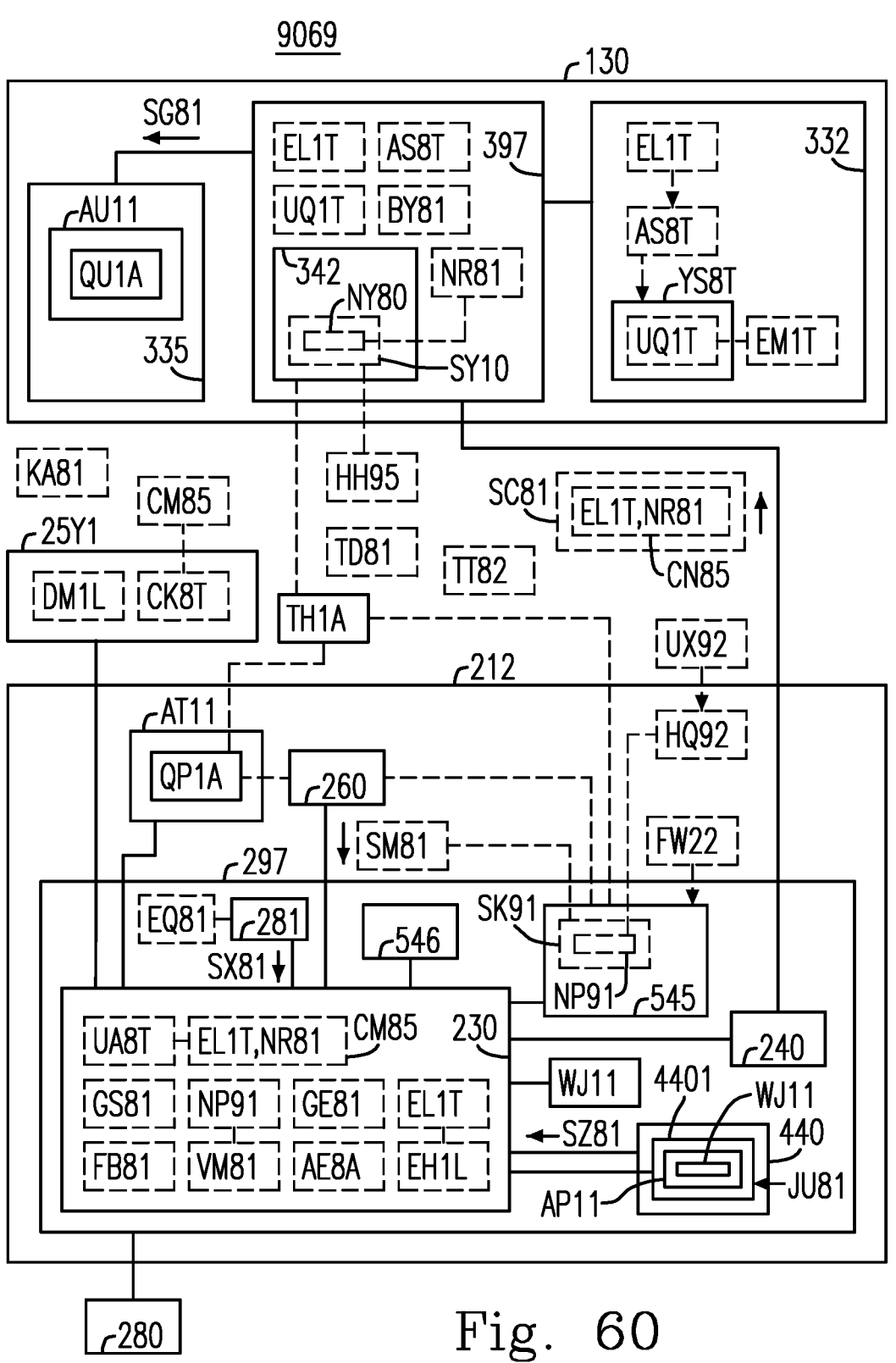
FIG. 60 is a schematic diagram showing an implementation structure of the control system shown in FIG. 1.

Please refer to FIG. 60. FIG. 60 is a schematic diagram showing an implementation structure 9069 of the control system 901 shown in FIG. 1. As shown in FIG. 60, the implementation structure 9069 includes the control device 212, the functional device 130 and the server 280. The control device 212 is linked to the server 280. The control device 212 is used to control the variable physical parameter QU1A existing in the functional device 130 by means of the trigger event EQ81, and includes the operation unit 297 and the sensing unit 260. The operation unit 297 includes the processing unit 230, the receiving unit 270, the input unit 440 and the transmission unit 240. The processing unit 230 is coupled to the server 280.

In some embodiments, the operation unit 297 includes a timer 545 coupled to the processing unit 230, an electricity application target WJ11 coupled to the processing unit 230, and a timer 546 coupled to the processing unit 230. The timer 545 is used to measure the clock time TH1A, and is configured to meet a timer specification FW22. The timer 545 is controlled by the processing unit 230 to sense the clock time TH1A to generate a sense signal SK91. For example, the sense signal SK91 is a clock time signal. For example, the user interface area AP11 has the electricity application target WM. The electricity application target WJ11 is one of a fifth push-button target and a fifth icon target. The electricity application target WJ11 is an electricity application unit.

Under a condition that the sensing unit 260 is configured to be equal to the timer 545, the sense signal SM81 is configured to be equal to the sense signal SK91, the sensor specification FQ11 is configured to be equal to the timer specification FW22, and the variable physical parameter QP1A is configured to be equal to the clock time TH1A. The memory unit 25Y1 stores the control data code CK8T being equal to the control message code CM85. For example, under a condition that the variable physical parameter QP1A is configured to be equal to the clock time TH1A, the measurement value application range code EH1L is equal to the measurement value designation range code EL1T. The timer specification FW22 is defaulted.

The trigger event EQ81 is the user input event that the input unit 440 receives the user input operation JU81. The user input operation JU81 is used to select the electricity application target WJ11. The input unit 440 provides the operation request signal SZ81 to the processing unit 230 in response to the trigger event EQ81, and thereby causes the processing unit 230 to receive the operation request signal SZ81. Under a condition that the user input event occurs, the processing unit 230 uses the sense signal SK91 to obtain the measured value VM81 in response to the operation request signal SZ81. For example, the sense signal SK91 being the clock time signal carries a measured value NP91 in a designated measurement value format HQ92. For example, the measured value NP91 is a specific count value. The designated measurement value format HQ92 is characterized based on a designated bit number UX92, and is a designated count value format.

In some embodiments, the trigger application unit 281 provides the operation request signal SX81 to the processing unit 230 in response to the trigger event EQ81, and thereby causes the processing unit 230 to receive the operation request signal SX81. The processing unit 230 obtains the control application code UA8T in response to the operation request signal SX81, and causes the transmission unit 240 based on the obtained control application code UA8T to transmit the control signal SC81, carrying the control message CG81, toward the functional device 130. For example, the control application code UA8T includes or is the control data code CK8T.

The trigger application unit 281 is one selected from a group consisting of the state-change detector 475, the reader 220, the receiving unit 270, the input unit 440, the display unit 460, the sensing unit 260 and the timer 546. The trigger event EQ81 is one selected from a group consisting of a trigger action event, a user input event, a signal input event, a state change event, an identification medium appearance event and an integer overflow event. Under a condition that the trigger event EQ81 is the integer overflow event, the timer 546 being the trigger application unit 281 causes the integer overflow event to occur in response to a time control GE81 associated with the processing unit 230. For example, the processing unit 230 is configured to perform the time control GE81 used to control the timer 546. The timer 546 forms the integer overflow event in response to the time control GE81.

The processing unit 230 uses the sense signal SK91 to obtain the measured value VM81 being equal to the measured value NP91. The processing unit 230 performs the data determination AE8A in response to the trigger event EQ81 to determine the measurement value application range code EH1L being equal to the measurement value designation range code EL1T. Under a condition that the processing unit 230 determines the physical parameter application range RC1EL which the variable physical parameter QP1A is currently in by checking the mathematical relation KA81 between the measured value VM81 and the measurement value application range RM1L, the processing unit 230 obtains the control application code UA8T, being equal to the control message code CM85, from the memory unit 25Y1 based on the determined measurement value application range code EH1L. For example, under a condition that the sensing unit 260 is configured to be equal to the timer 545, the designated measurement value format HQ81 is configured to be equal to the designated measurement value format HQ92.

For example, the control message code CM85 includes the defaulted measurement value designation range code EL1T, the defaulted clock reference time value NR81 and the defaulted measurement time length value VH8T. The processing unit 230 performs the signal generation control GS81 for the measurement application function FB81 to cause the transmission unit 240 to generate the control signal SC81, carrying the control data message CN85, within the operation time TD81 based on the obtained control application code UA8T. For example, the control data message CN85 includes the defaulted measurement value designation range code EL1T, the defaulted clock reference time value NR81 and the defaulted measurement time length value VH8T. Under a condition that the physical parameter target range code UQ1T is equal to the defaulted measurement value target range code EM1T, the control signal SC81 serves to indicate at least one of the measurement value designation range RQ1T and the clock time designation interval HR1ET by carrying the defaulted measurement value designation range code EL1T.

In some embodiments, the input unit 440 includes the user interface area AP11 and the electricity application target WJ11 (or the fifth push-button target) disposed in the user interface area AP11. For example, the display unit 460 includes the user interface area AP11 and the electricity application target WJ11 (or the fifth icon target) disposed in the user interface area AP11. For example, the input unit 440 includes a touch screen 4401. The touch screen 4401 includes the user interface area AP11 and the electricity application target WJ11 (or the fifth push-button target) disposed in the user interface area AP11, and receives the user input operation JU81.

For example, the electricity application target WJ11 of the touch screen 4401 receives the user input operation JU81. The touch screen 4401 is any of the trigger application unit 281, the trigger application unit 288 and the trigger application unit 28H. Under a condition that the touch screen 4401 is the trigger application unit 281, the touch screen 4401 provides the operation request signal SX81 to the processing unit 230 in response to the user input operation JU81 (or the trigger event EQ81).

In some embodiments, the functional device 130 includes the operation unit 397, the functional unit 335 and the storage unit 332. The timer 342 included in the operation unit 397 is used to measure the clock time TH1A, and is configured to meet the timer specification FT21. The variable physical parameter QU1A is associated with the clock time TH1A. The clock time TH1A is characterized based on a clock time designation interval HR1ET. The clock time designation interval HR1ET is represented by a measurement value designation range RQ1T. The measurement value designation range code EL1T is configured to indicate the clock time designation interval HR1ET.

The storage unit 332 has a memory location YS8T, and stores the physical parameter target range code UQ1T at the memory location YS8T. The physical parameter target range code UQ1T denotes a physical parameter target range RD1ET in which the variable physical parameter QU1A is expected to be within the clock time designation interval HR1ET, and is configured to be stored at the memory location YS8T based on the measurement value designation range code EL1T. The memory location YS8T is identified based on a memory address AS8T. The memory address AS8T is defaulted based on the measurement value designation range code EL1T. The physical parameter target range RD1ET is selected from the plurality of different physical parameter reference ranges RD1E1, RD1E2, . . . .

In some embodiments, when the operation unit 397 receives the control signal SC81, the physical parameter target range code UQ1T is equal to the defaulted measurement value target range code EM1T. The control signal SC81 carries the defaulted measurement value designation range code EL1T. The operation unit 397 obtains the carried measurement value designation range code EL1T from the control signal SC81, obtains the memory address AS8T based on the obtained measurement value designation range code EL1T, and accesses the physical parameter target range code UQ1T, stored at the memory location YS8T, to obtain the defaulted measurement value target range code EM1T based on the obtained memory address AS8T.

The operation unit 397 performs the signal generation operation BY81 for the measurement application function FA81 based on the obtained measurement value target range code EM1T to transmit the operation signal SG81 toward the physical parameter application unit 335. The physical parameter application unit 335 causes the variable physical parameter QU1A to be in the physical parameter target range RD1ET in response to the operation signal SG81. The operation unit 397 obtains the carried clock reference time value NR81 from the control signal SC81, causes the timer 342 based on the obtained clock reference time value NR81 to start within a starting time TT82, and thereby causes the timer 342 to generate a sense signal SY80 within the starting time TT82. The sense signal SY80 is an initial time signal, and carries a measured value NY80 in the designated measurement value format HH95. For example, the measured value NY80 is configured to be equal to the clock reference time value NR81.

While the invention has been described in terms of what is presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A control device for controlling a first variable physical parameter of a functional device, wherein the first variable physical parameter is characterized based on a physical parameter application state, the control device comprising:

a processing unit; and a sensing unit coupled to the processing unit, sensing a second variable physical parameter to generate a first sense signal and causing the processing unit to receive an operation request signal in response to a user input event, wherein:

the second variable physical parameter is characterized based on a rated physical parameter range represented by a rated measurement value range;

the rated physical parameter range includes a plurality of different physical parameter reference ranges which are respectively represented by a plurality of different measurement value reference ranges included in the rated measurement value range;

the plurality of different measurement value reference ranges are respectively denoted by a plurality of different measurement value reference range codes;

the plurality of different physical parameter reference ranges include a physical parameter application range which is represented by a measurement value application range included in the plurality of different measurement value reference ranges;

the measurement value application range is denoted by a measurement value application range code;

the user input event is that the sensing unit receives a user input operation;

the processing unit obtains a measured value based on the first sense signal in response to the operation request signal;

the processing unit determines the measurement value application range code in response to the operation request signal to select the measurement value application range from the plurality of different measurement value reference ranges, uses the determined measurement value application range code to obtain a control data code associated with the physical parameter application state under a condition that the processing unit determines the physical parameter application range which the second variable physical parameter is currently in by checking a mathematical relation between the measured value and the selected measurement value application range, and causes a control signal to be transmitted toward the functional device based on the obtained control data code;

the functional device causes the first variable physical parameter to be in the physical parameter application state in response to the control signal;

the control device is configured to perform in one of a first situation and a second situation, wherein:

in the first situation:

the plurality of different measurement value reference range codes include a specific measurement value range code indicating a specific physical parameter range which is included in the plurality of different physical parameter reference ranges;

the control device is configured to store a variable physical parameter range code;

the sensing unit senses the second variable physical parameter to generate a second sense signal before the user input event occurs;

under a condition that the processing unit determines the specific physical parameter range in which the second variable physical parameter is in response to the second sense signal before the user input event occurs, the processing unit assigns the specific measurement value range code to the variable physical parameter range code; and the processing unit obtains the specific measurement value range code by accessing the variable physical parameter range code in response to the operation request signal, and determines the measurement value application range code being different from the obtained specific measurement value range code based on the obtained specific measurement value range code; and in the second situation:

the rated measurement value range has a rated range limit value pair;

the rated range limit value pair includes a first rated range limit value and a second rated range limit value opposite to the first rated range limit value; and the processing unit performs a scientific calculation using the measured value and the rated range limit value pair in response to the operation request signal to select the measurement value application range code from the plurality of different measurement value reference range code so as to determine the selected measurement value application range code.

2. The control device according to claim 1, wherein:

the second variable physical parameter is one of a variable time length and a clock time;

the control device further comprises a transmission unit coupled to the processing unit;

the physical parameter application state is denoted by a physical parameter application state code;

the control data code includes the physical parameter application state code;

the processing unit performs a signal generation control based on the obtained control data code to cause the transmission unit to generate the control signal;

the transmission unit transmits the control signal to the functional device;

the control signal is used to cause the first variable physical parameter of the functional device to be in the physical parameter application state;

the sensing unit includes a physical parameter formation area, and is controlled by the processing unit;

the processing unit causes the second variable physical parameter to form in the physical parameter formation area in response to a trigger event;

the control device further includes a storage unit coupled to the processing unit;

the storage unit stores the control data code and the variable physical parameter range code; and under a condition that the processing unit determines the physical parameter application range which the second variable physical parameter is currently in by checking the mathematical relation, the processing unit uses the determined measurement value application range code to obtain the control data code from the storage unit.

3. A control device for controlling a first variable physical parameter of a functional device, wherein the first variable physical parameter is characterized based on a physical parameter application state, the control device comprising:

a sensing unit sensing a second variable physical parameter to generate a first sense signal;

a trigger application unit; and a processing unit coupled to the sensing unit and the trigger application unit, wherein:

the second variable physical parameter is characterized based on a rated physical parameter range represented by a rated measurement value range;

the rated physical parameter range includes a plurality of different physical parameter reference ranges which are respectively represented by a plurality of different measurement value reference ranges included in the rated measurement value range;

the plurality of different measurement value reference ranges are respectively denoted by a plurality of different measurement value reference range codes;

the plurality of different physical parameter reference ranges include a physical parameter application range which is represented by a measurement value application range included in the plurality of different measurement value reference ranges;

the trigger application unit causes the processing unit to receive an operation request signal in response to a trigger event;

the processing unit obtains a measured value based on the sense signal in response to the operation request signal, determines the measurement value application range code in response to the operation request signal to select the measurement value application range from the plurality of different measurement value reference ranges, uses the determined measurement value application range code to obtain a control data code associated with the physical parameter application state under a condition that the processing unit determines the physical parameter application range which the second variable physical parameter is currently in by checking a mathematical relation between the measured value and the selected measurement value application range, and causes a control signal to be transmitted toward the functional device based on the obtained control data code;

the functional device causes the first variable physical parameter to be in the physical parameter application state in response to the control signal;

the control device is configured to perform in one of a first situation and a second situation, wherein:

in the first situation:

the plurality of different measurement value reference range codes include a specific measurement value range code indicating a specific physical parameter range which is included in the plurality of different physical parameter reference ranges;

the control device is configured to store a variable physical parameter range code;

the sensing unit senses the second variable physical parameter to generate a second sense signal before the trigger event occurs;

under a condition that the processing unit determines the specific physical parameter range in which the second variable physical parameter is in response to the second sense signal before the trigger event occurs, the processing unit assigns the specific measurement value range code to the variable physical parameter range code; and the processing unit obtains the specific measurement value range code by accessing the variable physical parameter range code in response to the operation request signal, and determines the measurement value application range code being different from the obtained specific measurement value range code based on the obtained specific measurement value range code; and in the second situation:

the rated measurement value range has a rated range limit value pair;

the rated range limit value pair includes a first rated range limit value and a second rated range limit value opposite to the first rated range limit value; and the processing unit performs a scientific calculation using the measured value and the rated range limit value pair in response to the operation request signal to select the measurement value application range code from the plurality of different measurement value reference range code so as to determine the selected measurement value application range code.

4. The control device according to claim 3, wherein:
the trigger application unit is a timer; and
the timer causes an integer overflow event to occur, and causes the processing unit to receive the operation request signal in response to the integer overflow event.

5. The control device according to claim 3, wherein:
the second variable physical parameter is one of a variable time length and a clock time;

the control device further comprises a transmission unit coupled to the processing unit;

the physical parameter application state is denoted by a physical parameter application state code;

the control data code includes the physical parameter application state code;

the processing unit performs a signal generation control based on the obtained control data code to cause the transmission unit to generate the control signal;

the transmission unit transmits the control signal to the functional device;

the control signal is used to cause the first variable physical parameter of the functional device to be in the physical parameter application state;

the sensing unit includes a physical parameter formation area, and is controlled by the processing unit;

the processing unit causes the second variable physical parameter to form in the physical parameter formation area in response to the trigger event;

the control device further includes a storage unit coupled to the processing unit;

the storage unit stores the control data code and the variable physical parameter range code; and under a condition that the processing unit determines the physical parameter application range which the second variable physical parameter is currently in by checking the mathematical relation, the processing unit uses the determined measurement value application range code to obtain the control data code from the storage unit.

6. The control device according to claim 3, wherein:
the trigger application unit is a state-change detector; and
the state-change detector generates a trigger signal being the operation request signal in response to a state change event, wherein the state change event is that a third variable physical parameter is changed from a non-characteristic physical parameter arrival state to a practical characteristic physical parameter arrival state.

7. The control device according to claim 3, wherein:
the trigger application unit is a touch screen;
the touch screen includes an electricity application target being one of a push-button target and an icon target; and
under a condition that a user input event that the touch screen receives a user input operation using the electricity application target occurs, the processing unit obtains the measured value in response to the first sense signal.

8. The control device according to claim 3, wherein:
the trigger application unit is a switch; and
the switch is used to generate a trigger signal being the operation request signal.

9. The control device according to claim 3, wherein:
the trigger application unit is one of an input unit and a display unit, and includes a user interface area having an electricity-using target;
the electricity-using target is coupled to the processing unit, and is one of a push-button target and an icon target; and
the trigger event occurs by means of the electricity-using target, and causes the processing unit to receive the operation request signal.

10. A control device for controlling a first variable physical parameter of a functional device, wherein the first variable physical parameter is characterized based on a physical parameter application state, the control device comprising:
a sensing unit sensing a second variable physical parameter to generate a first sense signal;
a trigger application unit; and
a processing unit coupled to the sensing unit and the trigger application unit, wherein:
the second variable physical parameter is characterized based on a rated physical parameter range represented by a rated measurement value range;
the rated physical parameter range includes a plurality of different physical parameter reference ranges which are respectively represented by a plurality of different measurement value reference ranges included in the rated measurement value range;
the plurality of different measurement value reference ranges are respectively denoted by a plurality of different measurement value reference range codes;
the plurality of different physical parameter reference ranges include a physical parameter application range which is represented by a measurement value application range included in the plurality of different measurement value reference ranges;
the trigger application unit causes the processing unit to receive an operation request signal in response to a trigger event;

the processing unit obtains a measured value based on the sense signal in response to the operation request signal;

the processing unit determines the measurement value application range code in response to the operation request signal to select the measurement value application range from the plurality of different measurement value reference ranges, and uses the determined measurement value application range code to cause a control signal to be transmitted toward the functional device under a condition that the processing unit determines the physical parameter application range which the second variable physical parameter is currently in by checking a mathematical relation between the measured value and the selected measurement value application range;

the control signal serves to indicate the physical parameter application state;

the functional device causes the first variable physical parameter to be in the physical parameter application state in response to the control signal;

the control device is configured to perform in one of a first situation and a second situation;

in the first situation:

the plurality of different measurement value reference range codes include a specific measurement value range code indicating a specific physical parameter range which is included in the plurality of different physical parameter reference ranges;

the control device is configured to store a variable physical parameter range code;

the sensing unit senses the second variable physical parameter to generate a second sense signal before the trigger event occurs;

under a condition that the processing unit determines the specific physical parameter range in which the second variable physical parameter is in response to the second sense signal before the trigger event occurs, the processing unit assigns the specific measurement value range code to the variable physical parameter range code; and the processing unit obtains the specific measurement value range code by accessing the variable physical parameter range code in response to the operation request signal, and determines the measurement value application range code being different from the obtained specific measurement value range code based on the obtained specific measurement value range code; and in the second situation:

the rated measurement value range has a rated range limit value pair;

the rated range limit value pair includes a first rated range limit value and a second rated range limit value opposite to the first rated range limit value; and the processing unit performs a scientific calculation using the measured value and the rated range limit value pair in response to the operation request signal to select the measurement value application range code from the plurality of different measurement value reference range code so as to determine the selected measurement value application range code.

11. The control device according to claim 10, wherein:

the trigger application unit is a timer; and the timer causes an integer overflow event to occur, and causes the processing unit to receive the operation request signal in response to the integer overflow event.

12. The control device according to claim 10, wherein:

the second variable physical parameter is one of a variable time length and a clock time;

the control device further comprises a transmission unit coupled to the processing unit;

the physical parameter application state is denoted by a physical parameter application state code;

under a condition that the processing unit determines the physical parameter application range which the second variable physical parameter is currently in by checking the mathematical relation, the processing unit uses the determined measurement value application range code to obtain a control data code including the physical parameter application state code;

the processing unit performs a signal generation control based on the obtained control data code to cause the transmission unit to generate the control signal;

the transmission unit transmits the control signal to the functional device;

the control signal is used to cause the first variable physical parameter of the functional device to be in the physical parameter application state;

the sensing unit includes a physical parameter formation area, and is controlled by the processing unit;

the processing unit causes the second variable physical parameter to form in the physical parameter formation area in response to the trigger event;

the control device further includes a storage unit coupled to the processing unit;

the storage unit stores the control data code and the variable physical parameter range code; and under a condition that the processing unit determines the physical parameter application range which the second variable physical parameter is currently in by checking the mathematical relation, the processing unit uses the determined measurement value application range code to obtain the control data code from the storage unit.

13. The control device according to claim 10, wherein:

the trigger application unit is a state-change detector; and the state-change detector generates a trigger signal being the operation request signal in response to a state change event, wherein the state change event is that a third variable physical parameter is changed from a non-characteristic physical parameter arrival state to a practical characteristic physical parameter arrival state.

14. The control device according to claim 10, wherein:

the trigger application unit is a touch screen, wherein the touch screen includes an electricity application target being one of a push-button target and an icon target; and under a condition that a user input event that the touch screen receives a user input operation using the electricity application target occurs, the processing unit obtains the measured value in response to the first sense signal.

15. The control device according to claim 10, wherein:

the trigger application unit is a switch; and the switch is used to generate a trigger signal being the operation request signal.

16. The control device according to claim 10, wherein:

the trigger application unit is one of an input unit and a display unit, and includes a user interface area having an electricity-using target;

the electricity-using target is coupled to the processing unit, and is one of a push-button target and an icon target; and the trigger event occurs by means of the electricity-using target and causes the processing unit to receive the operation request signal.

\* \* \* \* \*